(12) United States Patent
Ziolkowski et al.

(10) Patent No.: US 12,462,318 B2
(45) Date of Patent: Nov. 4, 2025

(54) CONTENT EDITING SOFTWARE VIA AUTOMATIC AND AUDITABLE AUTHORSHIP ATTRIBUTION

(71) Applicant: U.S. Bank National Association, Minneapolis, MN (US)

(72) Inventors: Christopher Ziolkowski, Burnsville, MN (US); Valerie Lancelle, Caledonia, WI (US); Christopher Davis, Minneapolis, MN (US)

(73) Assignee: U.S. Bank National Association, Minneapolis, MN (US)

( * ) Notice: Subject to any disclaimer, the term of this patent is extended or adjusted under 35 U.S.C. 154(b) by 0 days.

(21) Appl. No.: 19/241,881

(22) Filed: Jun. 18, 2025

(65) Prior Publication Data
US 2025/0315907 A1 Oct. 9, 2025

Related U.S. Application Data

(63) Continuation of application No. PCT/US2025/012747, filed on Jan. 23, 2025.

(60) Provisional application No. 63/728,202, filed on Dec. 5, 2024, provisional application No. 63/664,959, filed on Jun. 27, 2024, provisional application No. 63/649,673, filed on May 20, 2024, provisional application No. 63/638,815, filed on Apr. 25, 2024, (Continued)

(51) Int. Cl.
G06Q 50/18 (2012.01)

(52) U.S. Cl.
CPC .................. G06Q 50/184 (2013.01)

(58) Field of Classification Search
CPC ........ G06Q 50/184; G06Q 10/10; G06F 8/33; G06F 8/73; G06F 16/9536; G06F 21/6227; H04N 21/4826; H04N 21/4788
See application file for complete search history.

(56) References Cited

U.S. PATENT DOCUMENTS

| 6,275,223 | B1 | 8/2001 | Hughes |
| 8,935,745 | B2 * | 1/2015 | Brock ................. G06F 16/9536 709/224 |
| 9,372,850 | B1 | 6/2016 | Takaki et al. |

(Continued)

FOREIGN PATENT DOCUMENTS

| CN | 117435230 A | 1/2024 |
| WO | 2018202690 A1 | 11/2018 |

OTHER PUBLICATIONS

Wittenberg, Chloe et al., Labeling AI-Generated Content: Promises, Perils, and Future Directions (Topical Policy Brief), MIT Schwarzman College of Computing, Washington Office, available at https://computing.mit.edu/wp-content/uploads/2023/11/AI-Policy_Labeling.pdf, Nov. 28, 2023; 16 Pages.

(Continued)

Primary Examiner — Sarah M Monfeldt
Assistant Examiner — Don Edmonds
(74) Attorney, Agent, or Firm — Merchant & Gould, P.C.

(57) ABSTRACT

A content editor or a plugin thereto automatically generates authorship tokens that identify content authored by a human author or an artificial author. The authorship tokens are applied to the work while the work is being produced. Thus, subsequent review of the work can identify regions produced by a human author and other regions produced by an artificial intelligence.

20 Claims, 58 Drawing Sheets

Related U.S. Application Data provisional application No. 63/625,601, filed on Jan. 26, 2024.

(56) References Cited

U.S. PATENT DOCUMENTS

| | | | |
|---|---|---|---|
| 11,468,232 | B1 | 10/2022 | Rath |
| 2003/0131313 | A1 | 7/2003 | Flanagan |
| 2004/0085354 | A1 | 5/2004 | Massand |
| 2008/0021922 | A1* | 1/2008 | Hailpern ............ G06F 21/6227 |
| 2008/0086718 | A1 | 4/2008 | Bostick et al. |
| 2010/0299292 | A1 | 11/2010 | Collazo |
| 2011/0279228 | A1 | 11/2011 | Kumar |
| 2012/0077176 | A1 | 3/2012 | Foster et al. |
| 2014/0053135 | A1 | 2/2014 | Bird et al. |
| 2014/0108531 | A1* | 4/2014 | Klau .................. H04N 21/4788 709/204 |
| 2015/0046346 | A1 | 2/2015 | Juola et al. |
| 2015/0052427 | A1 | 2/2015 | Vagell et al. |
| 2015/0100898 | A1 | 4/2015 | Jue |
| 2016/0034273 | A1 | 2/2016 | Leupold et al. |
| 2016/0119147 | A1* | 4/2016 | Saidalavi .............. G06Q 10/10 713/176 |
| 2016/0344828 | A1 | 11/2016 | Husler et al. |
| 2018/0307480 | A1 | 10/2018 | Doyle et al. |
| 2020/0142545 | A1 | 5/2020 | Wald et al. |
| 2020/0183818 | A1 | 6/2020 | Guenther et al. |
| 2020/0342879 | A1 | 10/2020 | Carbune et al. |
| 2021/0150406 | A1 | 5/2021 | Cheng et al. |
| 2021/0311729 | A1 | 10/2021 | Gupta et al. |
| 2021/0390447 | A1 | 12/2021 | Cheruvu et al. |
| 2022/0012284 | A1* | 1/2022 | Beck .................. H04N 21/4826 |
| 2022/0138266 | A1 | 5/2022 | Wang et al. |
| 2022/0237368 | A1 | 7/2022 | Tran |
| 2023/0109734 | A1 | 4/2023 | Galle et al. |
| 2023/0144379 | A1 | 5/2023 | Haikin et al. |
| 2023/0333821 | A1 | 10/2023 | Cosgrove et al. |
| 2024/0184566 | A1 | 6/2024 | Gabel et al. |
| 2024/0248711 | A1 | 7/2024 | Ziolkowski et al. |
| 2024/0273286 | A1 | 8/2024 | Iu et al. |
| 2024/0296288 | A1 | 9/2024 | Bitton et al. |
| 2024/0345837 | A1 | 10/2024 | Ziolkowski et al. |
| 2024/0411528 | A1 | 12/2024 | Ziolkowski et al. |
| 2025/0061137 | A1 | 2/2025 | Higgins et al. |
| 2025/0245492 | A1 | 7/2025 | Kolvennu et al. |

OTHER PUBLICATIONS

Best practices for writing code comments—Stack Overflow—Dec. 23, 2021, 21 Pages, available at https://stackoverflow.blog/2021/12/23/best-practices-for-writing-code-comments/, downloaded Jan. 19, 2024.
Coding and Comment Style: Broad Institute of MIT and Harvard; Jan. 19, 2024; 11 Pages, available at https://mitcommlab.mit.edu/broad/commkit/coding-and-comment-style/, downloaded Jan. 19, 2024.
Harding, William et al.—GitClear—Coding on Copilot—2023 Data Shows Downward Pressure on Code Quality (150 m lines of analyzed code + projections for 2024); Jan. 16, 2024; 24 Pages, abstract available at https://www.gitclear.com/coding_on_copilot_data_shows_ais_downward_pressure_on_code_quality (copy submitted), updated Jan. 26, 2024.
Califa, Joel—Commit together with co-authors—The GitHub Blog; Jan. 29, 2018;6 Pages, available at https://github.blog/2018-01-29-commit-together-with-co-authors/, downloaded Feb. 21, 2024.
Copyright Registration Guidance: Works Containing Material Generated by Artificial Intelligence; Federal Register/vol. 88, No. 51/Thursday, Mar. 16, 2023/Rules and Regulations; 5 Pages.
GitClear—A visual guide to Diff Delta—And how fusing commits together reduces tech debt & code review time; 2021; available at https://gitclear-public.s3.us-west-2.amazonaws.com/Diff%2BDelta%2Band%2BCommit%2BGroups.pdf, 26 pages.
Find out who is leaking your secrets with help from invisible zero-width characters (Home/Blog)—Posted on Apr. 5, 2018; 2 Pages, available at https://www.tripwire.com/state-of-security/secrets-invisible-zero-width-characters, downloaded Jan. 19, 2024.
Git blame—ATLASSIAN—Software Development (Tutorial); Jan. 19, 2024, 10 Pages, available at https://www.atlassian.com/git/tutorials/inspecting-a-repository/git-blame, downloaded Jan. 19, 2024.
GitHub Desktop—Simple collaboration from your desktop (Overview/Release Notes/Help); https://desktop.github.com; Printed Feb. 21, 2024; 4 Pages.
GNU Global Source Code Tag System (Edition 6.6.11, for GNU Global version 6.6.11; Published by Tama Communications Corporation (Tokyo, Japan); Nov. 20, 2023; 75 Pages, available at https://www.gnu.org/software/global/manual/global.html, downloaded Feb. 29, 2024.
Day, Lewis; Hackaday—How Do You Prove an AI Didn't Make Your Art?—https://hackaday.com; Nov. 27, 2023; 39 Pages.
Antony M; How to Prove I was Falsely Accused of Using AI in my Paper; Medium; Jan. 15, 2023; 13 Pages, available at https://medium.com/@antonytips/falsely-accused-of-using-ai-in-paper-5-evidence-to-prove-innocence-229acba310e1, downloaded Feb. 6, 2024.
Inventorship Guidance for AI-Assisted Inventions; Department of Commerce; Patent and Trademark Office; Federal Register/vol. 89, No. 30/Tuesday, Feb. 13, 2024; 9 Pages.
Vogel, Peter; No Comment: Why Commenting Code Is Still a Bad Idea (practical.net); Jul. 31, 2013; 10 Pages, https://visualstudiomagazine.com/articles/2013/07/26/why-commenting-code-is-still-bad.aspx, downloaded Jan. 19, 2024.
Black, Jessica; 5 Ways to Reduce GitHub Copilot Security and Legal Risks—FOSSA (https://fossa.com/); Printed Feb. 29, 2024; 6 Pages.
Alemohammad, Sina et al.; Self-Consuming Generative Models Go MAD; arXiv:2307.01850v! [cd.LG], Jul. 4, 2023; 31 Pages.
Steganography (definition); Wikipedia (The Free Encyclopedia); available at https://en.wikipedia.org/wiki/Stegangraphy, Printed Jan. 19, 2024; 11 Pages.
Tag based programming—Software Engineering Stack Exchange; available at https://softwareengineering.stackexchange/com/questions/322979/tag-based-programming, Printed Feb. 29, 2024; 3 Pages.
Martin, Jeff; The Challenges for License Compliance and Copyright with AI—Mend.io; Dec. 21, 2023; 3 Pages, available at https://mend.io/blog/the-challenges-for-license-compliance-and-copyright-with-ai/, downloaded Mar. 5, 2024.
Santos, Omar et al.; Toward Trustworthy AI: An Analysis of Artificial Intelligence (AI) Bill of Materials (AI BOMS); ResearchGate; available at https://www.researchgate.net/publication/3749213669, Oct. 2023; 7 Pages.
Wyatt, Eric; Typing Insights (Tips.Net); Apr. 22, 2019; 4 Pages, available at https://windows.tips.net/T007883_Typing_Insights.html, downloaded Feb. 29, 2024.
United States Copyright Office (Library of Congress); Review/Authorship work titled 'Zarya of the Dawn'; Feb. 23, 2023; 29 Pages.
Roush, Allen et al., Most Language Models can be Poets too: An AI Writing Assistant and Constrained Text Generation Studio, Oracle Corporation, Last Accessed Apr. 23, 2024 from https://arxiv.org/abs/2306.15926, 7 Pages.
Blake, Alex, This app just got me excited for the future of AI on Macs; https://www.digitaltrends.com/computing/ia-writer-7-chatgpt-dialog-partner/; Dated Dec. 4, 2023; 10 Pages.
Embeddings—Learn how to turn text into numbers, unlocking use cases like search—OpenAI API; https://platform.openai.com/docs/guides/embeddings; Dated Apr. 11, 2024; 15 Pages.
IA Writer 7 (Previous—5 Minutes Read—Next); https://ia.net/topics/ia-writer-7; Dated Nov. 30, 2023, 10 Pages.
IA Writer 7: Whoa, Feedback! (Previous—6 Minutes Read—Next); https://ia.net/topics/ia-writer-7-whoa-feedback; Dated Dec. 8, 2023; 8 Pages.
GitHub—iainc/Markdown-Annotations (Markdown Annotations embed authorship in text while preserving its readability and portability); https://github.com/iainc/Markdown-Annotations; Dated Apr. 15, 2024; 4 Pages.

(56) References Cited

OTHER PUBLICATIONS

GitHub—iainc/Markdown-Annotations (Gracefully hid annotation blocks in comments #1); https://github.com/iainc/Markdown-Annotations/issues/1; Dated Apr. 15, 2024; 4 Pages.

GitHub—iainc/Markdown-Annotations (An alternate perspective, if looking for feedback #2); https://github.com/iainc/Markdown-Annotations/issues/2; Dated Apr. 15, 2024; 3 Pages.

GitHub—iainc/Markdown-Annotations (Project name & name of hash annotation key is potentially misleading #3); https://github.com/iainc/Markdown-Annotations/issues/3; Dated Apr. 15, 2024; 2 Pages.

GitHub—iainc/Markdown-Annotations (Hand-editing is problematic #4) https://github.com/iainc/Mardown-Annotations/issues/4; Dated Apr. 15, 2024; 2 Pages.

GitHub—iainc/Markdown-Annotations (YAML front matter #5); https://github.com/iainc/Markdown-Annotations/issues/5; Dated Apr. 15, 2024; 2 Pages.

IA Writer 7/Hacker News (new/past/comments/ask/show/jobs/submit); https://news.ycombinator.com/item?id=38476552; Dated Apr. 15, 2024; 1 Page.

IA Writer 7/Hacker News (new/past/comments/ask/show/jobs/submit); https://news.ycombinator.com/item?id=38487950; Dated Apr. 15, 2024; 1 Page.

No AI Feature (Previous—7 Minutes Read—Next); https://ia.net/topics/no-feature; Dated Nov. 22, 2023; 10 Pages.

The Verge (Tech/Apps/Artificial Intelligence)—iA Writer can now track what you or ChatGPT wrote—The Verge; https://www.theverge.com/2023/12/1/23983835/ia-writer-generative-ai-authorship; Dated Dec. 1, 2023; 5 Pages.

The Verge (ia Comments); https://www.theverge.com/2023/12/1/23983835/ia-writer-generative-ai-authorship?showComments=1; Dated Dec. 1, 2023; 5 Pages.

Writing With AI (Previous—10 Minutes Read—Next); https://ia.net/topics/writing-with-ai; Dated Nov. 28, 2023; 16 Pages.

Levenshtein Distance (Online calculator: Levenshtein Distance); https://planetcalc.com/1721/; Dated Apr. 18, 2024; 8 Pages.

Ango, Steph, Photoshop for text (The Wayback Machine); https://web.archive.org/web/20231028235855—https://stephango.com/photoshop-for-text; Dated Oct. 18, 2022; 3 Pages.

Song et a;. "A Survey of Automatic Generation of Source Code Comments: Algorithms and Techniques," pp. 111411-111428, [Online—Retrieved from Internet on Aug. 24, 2024], <https://ieeexplore.ieee.org/stamp/stamp.jsp?tp=&arnumber=8778714>, (Year: 2019).

International Search Report and Written Opinion issued in PCT/US2025/012747, completed Apr. 3, 2025 and mailed Apr. 23, 2025.

Nayeli, Ellen, "ZeroGPT Review 2023: Is It Legit, Safe, or a Scam?", Aug. 10, XP093266217, 2023, https://web.archive.org/web/20230810125148/https://academichelp.net/ai-detectors/zerogpt-review.html [retrieved on Apr. 3, 2025].

Niful, Islam et al., "Distinguishing Human Generated Text from ChatGPT Generated Text Using Machine Learning," arxiv.org, May 1, 2023, XP093266205, https://arxiv.org/pdf/2306.01761 [retrieved on Apr. 3, 2025].

* cited by examiner

Determining a source of the edit 210

Determining that the edit was received over a human interface device 212

Determining whether the edit is characteristic of a manual or artificial edit 214

Determining whether generative artificial intelligence is active 216

Determining whether a sensor is used 218

FIG. 2C

Determining that the edit satisfies a threshold of significance 220

Determining a number of or percentage of units of content have changed 222

Determining whether the change is functional or cosmetic 224

Determining a significance score 226

Using sensor data 227

Accounting for the generative artificial intelligence's prompt 228

Accounting for predictability, creativity, entropy 229

Determining significance based on a suggestion associated with the edit 1700 (See FIG. 17)

FIG. 2D

Ensuring correct authorship token is associated with the region 240

Determining that a region associated with the edit lacks an authorship token 241

Including a portion of a creative work 242

Including features to resist mimicry 244

Modifying additional regions 246

Communicating with another system 247

Adding the authorship token into a separate file 248

Storing the authorship token in a same file as the content 249

Current repository library
Current Branch
AI-Human-Mixed
Change # 314159
Made By: ⊙ User 1
Authorship: Human
(2 Lines, 100%)
Files Changed: 1
Lines Changed: 1
Lines Added: 1
Auth. Changed: 0*

* Human comment added to AI authored line 16, but threshold of significance not reached

Description: Fixed bug where extra " " was present after last item of list

File  Edit  View  Repository  Branch  Help

Modules\Module_1.bas

```
        *   H   @@ Function SWAP_NAME (cell) @@
10  10      H   output = " "
11  11      A
12  12      A   For Each person In people
13  13      H       loc = InStr(person, " ")
14  14      A       first = Right(person, Len(person) - loc)
15  15      A       last = Left(person, loc - 1)
16      -   A       output = output & first & last & ", "
    16  +   A       output = output & first & last & ", "   ' removed later
17  17      A   Next person
18  18      H
19      +   H   output = Left (output, Len (output) - 2)   ' Removes extra ", "
    19  +   H
20  20      H   SWAP_NAME = output
21          H   End Function
```

⚠ *Warning: Can't merge to main due to restrictions on AI authorship*

Content 710

It was a dark and stormy night; the rain fell in torrents—except at occasional intervals, when it was checked by a violent gust of wind which swept up the streets (for it is in London that our scene lies), rattling along the housetops, and fiercely agitating the scanty flame of the lamps that struggled against the darkness.

Labeled Content 770

((It was a dark and stormy night;)) [[the rain fell in torrents— except at occasional intervals, when it was checked]] ((by a violent gust of wind)) [[which swept up the streets ]] (((for it is in London that our scene lies), rattling along the housetops))[[, and fiercely agitating the scanty flame of the lamps that struggled against the darkness.]]

Human Concepts: Dark, storm, night, Lamps, London gusty wind, rain on roofs

AI Concepts: Torrential, struggle against darkness, wind-blown rain — 772

FIG. 7B

Conv. Hist. 720

User: Write the opening sentence of a book describing a dark night

AI: Without the glow of the moon, the forest was veiled in velvet darkness and only the glow of their torches gave warmth against the night's chill. ←— 722A

←— 724A

User: Now make it during a storm

AI: Storm clouds covered the moon, leaving the forest veiled in darkness and sopping wet with torrential rain which their torches struggled to resist. ←— 722B

←— 724B

User: Now make the torches lamps and set the scene in a London neighborhood and describe rain on rooftops. ←— 722C

AI: Storm clouds covered the moon, and torrents of rain rattled against the roofs of the houses in old London as streetlamps maintained their vigil against the darkness along cobblestone streets. ←— 724C

User: Add a description of gusty wind to this:
   It was a dark and stormy night; the rain fell in torrents on the streets (for it is in London that our scene lies), rattling along the housetops as the flames of the lamps struggled against the darkness. ←— 722D

AI: It was a dark and stormy night; the rain fell in torrents— except at occasional intervals, when it was checked by a violent gust of wind which swept up the streets (for it is in London that our scene lies), rattling along the housetops, and fiercely agitating the scanty flame of the lamps that struggled against the darkness. ←— 724D

FIG. 7B (Continued)

First Content — 1602

"Be calm! I entreat you to hear me, before you give vent to your hatred on my devoted head. Have I not suffered enough, that you seek to increase my misery? Life, although it may only be an accumulation of anguish, is dear to me, and I will defend it. Remember, thou hast made me more powerful than thyself; my height is superior to thine; my joints more supple. But I will not be tempted to set myself in opposition to thee. I am thy creature, and I will be even mild and docile to my natural lord and king, if thou wilt also perform thy part, the which thou owest me. Oh, Frankenstein, be not equitable to every other, and trample upon me alone, to whom thy justice, and even thy clemency and affection, is most due. Remember, that I am thy creature; I ought to be thy Adam; but I am rather the fallen angel, whom thou drivest from joy for no misdeed. Every where I see bliss, from which [] alone am irrevocably excluded. I was benevolent and good; misery made me a fiend. Make me happy and I shall again be virtuous."

Second Content — 1604

Life is dear. Every where I see bliss. I am happy and virtuous.

| Life is dear. Every where I see blisss. I am happy and virtuous. | 1604 |
| Authoship: 🖳 (Artificial) | 16 |

1610

1606

| Life | Is dear | Every where I see bliss | I | am | happy | and | virtuosus |
|---|---|---|---|---|---|---|---|
| 155-159 | 212-219 | 840-865 | 878-879 | 886-888 | 968-973 | 975-978 | 996-1004 |
| 🖳 | 🖳 | 🖳 | 🖳 | 🖳 | 🖳 | 🖳 | 🖳 |
| colspan Arrangement: Human; Levenshtein Distance: 958; sentiment distance: 2.71828 ||||||||
| 0.4% | 0.7% | 2.4% | 0.1% | 0.2% | 0.6% | 0.3% | 1.1% |

```
┌─────────────────────────────────────────────────────────────┐
│ Hosting a discussion with a team collaboration application │
│                            2902                             │
└─────────────────────────────────────────────────────────────┘
                              ↓
┌─────────────────────────────────────────────────────────────┐
│           Creating an account of the discussion 2904        │
└─────────────────────────────────────────────────────────────┘
                              ↓
┌─────────────────────────────────────────────────────────────┐
│ Determining that a first portion of the account satisfies a │
│              threshold of significance 2906                 │
└─────────────────────────────────────────────────────────────┘
                              ↓
┌─────────────────────────────────────────────────────────────┐
│   Applying a first authorship token to the first portion 2908│
└─────────────────────────────────────────────────────────────┘
                              ↓
┌─────────────────────────────────────────────────────────────┐
│ Determining that a second portion of the account fails to   │
│         satisfy the threshold of significance 2910          │
└─────────────────────────────────────────────────────────────┘
                              ↓
┌─────────────────────────────────────────────────────────────┐
│  Applying a second authorship token to the second portion   │
│         that credits another participant 2912               │
└─────────────────────────────────────────────────────────────┘
                              ↓
┌─────────────────────────────────────────────────────────────┐
│                  Storing the account 2914                   │
└─────────────────────────────────────────────────────────────┘
                              ↓
┌─────────────────────────────────────────────────────────────┐
│                   Receiving a concept 2916                  │
└─────────────────────────────────────────────────────────────┘
                              ↓
┌─────────────────────────────────────────────────────────────┐
│ Determining participants that contributed to the concept    │
│           based on authorship tokens 2918                   │
└─────────────────────────────────────────────────────────────┘
```

While maintaining control over edits to the content:

Obtain content from sensor 3210

↓

Apply authorship token to content from sensor 3220

↓

Permitting an author to edit modify the content 3230

↓

Applying authorship tokens based on edit 3240

↓

Providing the content to others 3250

FIG. 32

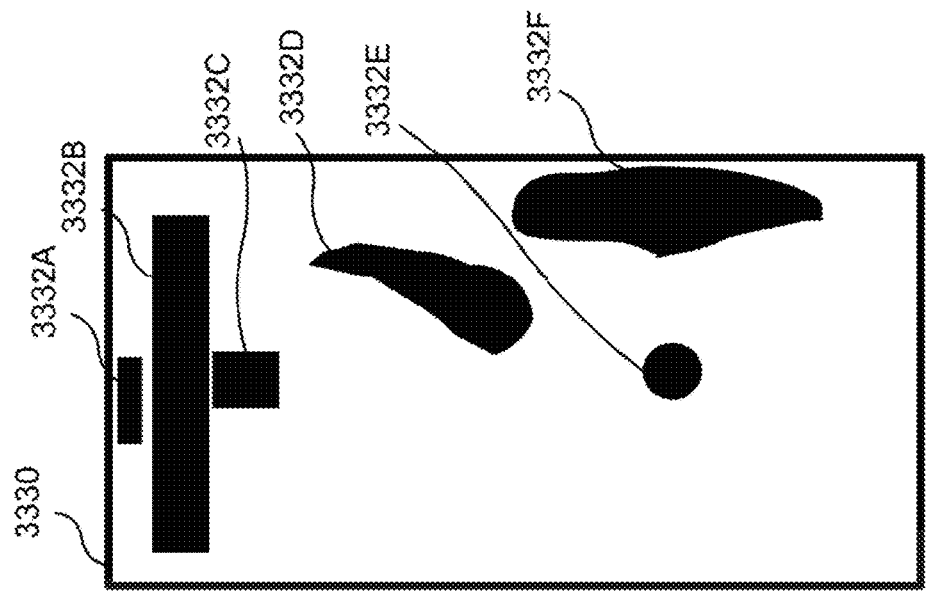
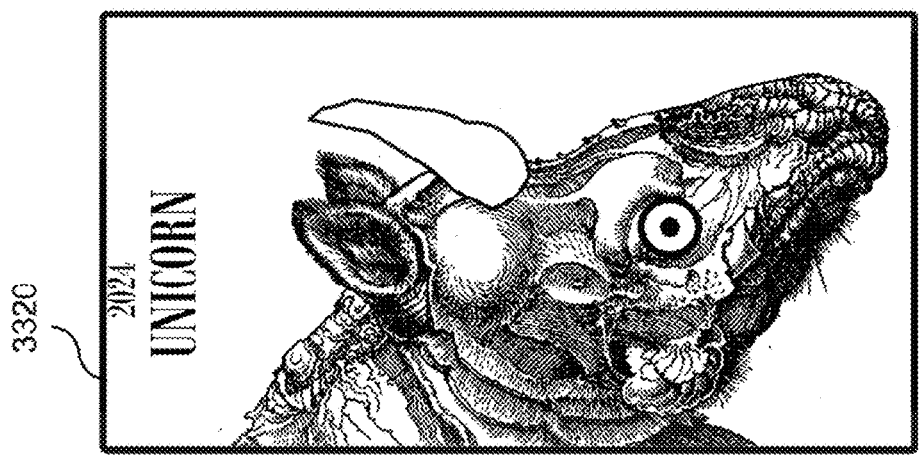
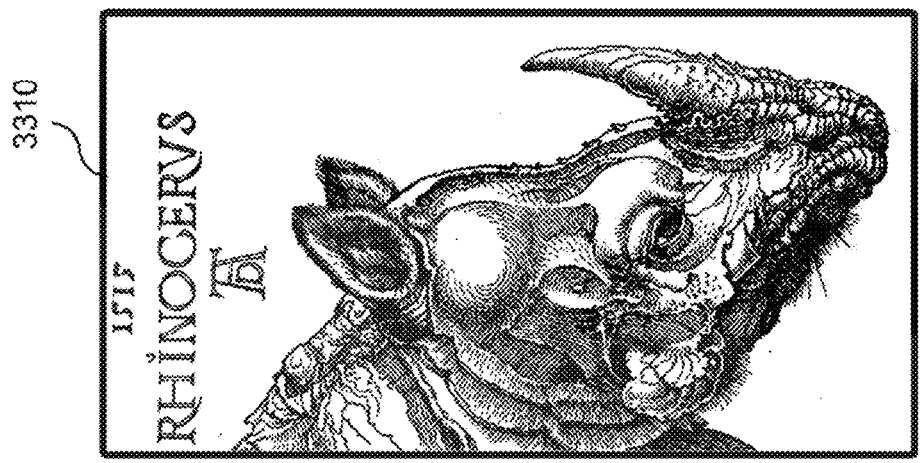
FIG. 33

3500

```
┌─────────────────────────────────────────────────┐
│   Determining source of edit to region of content │
│                      3510                         │
└─────────────────────────────────────────────────┘
                        │
                        ▼
┌─────────────────────────────────────────────────┐
│          Determining entropy of the edit          │
│                      3520                         │
└─────────────────────────────────────────────────┘
                        │
                        ▼
┌─────────────────────────────────────────────────┐
│  Determining the author of the edit based on the entropy │
│                      3530                         │
└─────────────────────────────────────────────────┘
                        │
                        ▼
┌─────────────────────────────────────────────────┐
│         Ensuring the region is associated with    │
│   an authorship token corresponding to the author │
│                      3540                         │
└─────────────────────────────────────────────────┘
```

```
Generating a first proposed artificial edit based on
a desired change 3610
                ↓
Determining entropy of the
first proposed artificial edit 3620
                ↓
Determining that the entropy fails to satisfy
a human authorship entropy threshold 3530
                ↓
Querying a human author
regarding the desired change 3640
                ↓
Receiving a human response to the query
3650
                ↓
Generating a second proposed artificial edit based on
the desired change and a response to the query 3660
                ↓
Determining entropy of the
second proposed artificial edit 3670
                ↓
Determining that the entropy satisfies
the human authorship entropy threshold 3670
                ↓
Apply the second proposed artificial edit
to the content 3680
```

Generating content using a content editor, the content having mixed human and artificial authorship
3810

Providing a manual edit to a region of content via a content editor 3812

Providing an artificial edit to a region of content via a content editor 3814

Providing the content to a third party
3820

FIG. 38

CONTENT EDITING SOFTWARE VIA AUTOMATIC AND AUDITABLE AUTHORSHIP ATTRIBUTION

CROSS REFERENCE TO RELATED APPLICATIONS

This application is a continuation of International Application PCT/US2025/012747, filed Jan. 23, 2025, which related to and claims the benefit of U.S. Provisional Patent Application Nos. 63/625,601 (filed Jan. 26, 2024), 63/638,815 (filed Apr. 25, 2024), 63/649,673 (filed May 20, 2024), 63/664,959 (filed Jun. 27, 2024), and 63/728,202 (filed Dec. 5, 2024). Each of these applications is incorporated by reference herein in their entirety for any and all purposes.

BACKGROUND

Traditionally, content creation software relied on human input to produce content. Thus, content could be assumed to have human authorship. Indeed, to label something as "human authored" was unnecessary because of course it was. Eventually, relatively basic or repetitive content could be generated with the help of simple software run at the creative direction of a human user (e.g., automatic creation of tables of contents based on document headers). But even then, such content was still considered human authored.

Only since the arrival of large language models has artificial intelligence grown in capability sufficient to allow for the ubiquitous generation of useful human-like content with little or no input from a human author. Now, content can have one or more human authors, one or more artificial authors, or even a combination thereof. Given the quality of content produced by generative artificial intelligence, it can be difficult, if not impossible, to separate human-generated content from artificially generated content from analyzing the content alone.

In addition, as new paradigms of interaction with artificial agents (e.g., which may be authors of content) develop, being able to track the provenance of content will remain useful. For instance, a human may interact with a multi-model interface or a multimodal model (e.g., GPT-4o by OPENAI) over visual, auditory, and text channels and receive an output over those same channels.

BRIEF DESCRIPTION OF THE DRAWINGS

FIG. 1, which is split into

FIG. 2, which is split into FIGS. 2A-H, illustrates an example method implementing techniques described herein.

FIG. 5 illustrates an example user interface showing a change to content.

FIG. 7, which is split into FIGS. 7A and 7B, illustrates a method for attributing authorship of content based on a conversation history.

FIG. 16 illustrates tracking the selection and arrangement of content.

FIG. 29 illustrates an example method for allocating tokens with respect to a discussion.

FIG. 32 illustrates an example method for the creation of content based on the output of a sensor of a mobile device using an application.

FIG. 33 illustrates an example of applying authorship tokens to an image

FIG. 35 illustrates an example method for ensuring a correct authorship token is associated with a region based on entropy.

FIG. 36 illustrates a method for constraining an artificial intelligence to produce content or edits having human authorship.

FIG. 38 illustrates a method for generating content having authorship tokens using a content editor.

DETAILED DESCRIPTION

Figure 1A:
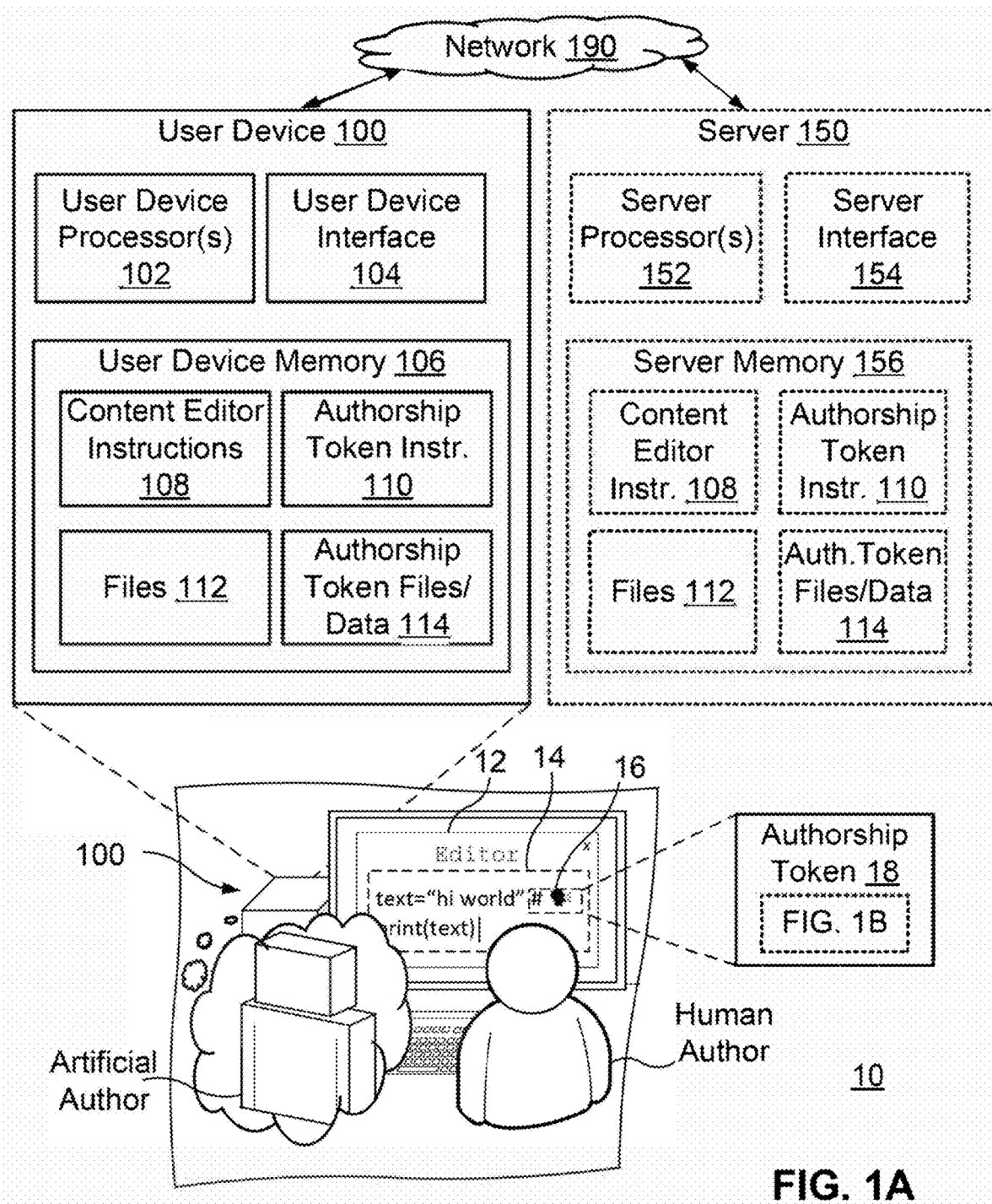
FIGS. 1A and 1B, illustrates an example system that can benefit from techniques described herein.

Now that it is no longer safe to assume that all content is human authored, it would be beneficial if a content editor had the technical capability to produce content that reliably distinguishes human authored content from artificially authored content (e.g., content produced by a generative artificial intelligence tool like GITHUB COPILOT or OFFICE COPILOT, both by MICROSOFT). Distinguishing human from artificial content is even more difficult when content is produced through a collaboration between a human author and an artificial author and may require being able to identify authorship of specific regions of the content. As described below, content editing software having technical features for identifying human versus artificial authorship has various technical benefits over traditional content editors that lack such features, including by increasing the accuracy of artificial intelligence models through improvements in training data, improvements in remediating data breaches, improvements in demonstrating authenticity, and improvements in accurately demonstrating provenance of regions of content, among other technical benefits.

For example, when training new generations of artificial intelligence, human authored training material is preferable to artificial training material because training an artificial intelligence on artificial data (also known as synthetic data) can lead to an erosion of quality. See, e.g., Alemohammad et al., *Self-Consuming Generative Models Go MAD*, arXiv: 2307.01850v1 (Jul. 4, 2023); and Shumailov et al., *AI Models Collapse when Trained on Recursively Generated Data*, Nature (Jul. 24, 2024). The risk of ingestion of such synthetic data is not limited to training data found "in the wild". There is also a risk that human data labelers or evaluators tasked with labeling AI training data and evaluating AI output could supplant their own human-authored evaluations with ones produced by another large language model. Thus, content with labels that distinguish human authorship from artificial authorship is improved as training data compared to content that lacks such labels. Further, editing software that is able to produce such beneficial labels has technical advantages relative to editing software that lack such features.

Further, applying authorship tokens or otherwise labeling data can provide security benefits when preventing or remediating unauthorized access to data. Synthetic data may have lower security requirements than "natural" data and being able to distinguish between the two may permit better tailoring of security settings to match the different kinds of data. In other words, whereas a same security standard may have been applied to both synthetic and natural data because of difficulty in distinguishing between the two, the use tokens may permit the conservation of security resources or computing resources by tailoring the standards to the labeled data. And if unauthorized access to synthetic data does occur, there may be different security, disclosure, or remediation implications than unauthorized access to natural data. Thus, being able to distinguish between synthetic and natural data can permit effective tailoring of remediation. Further still, being able to distinguish between synthetic and natural data can unlock new security capabilities, such as diluting natural data with synthetic data, thereby frustrating hackers' ability to efficiently use stolen data. As a result, content editors having features that permit such labeling provide security benefits relative to content editors that lack such labeling features.

It can also be beneficial to treat content differently depending on its authorship status in other contexts. For instance, a social media platform can improve its security, authenticity, and efficiency by having different policies regarding content created by humans compared with content created by artificial "bots". Social media websites or other recipients of content may prohibit content created by certain artificial authors but permit content produced by certain other artificial authors (e.g., based on alignment of the model used by the artificial author). Additionally, the rapid and accurate identification of artificial content versus human content may facilitate more efficient responses to takedown requests submitted to a social media platform.

Further, certain artificial authors (e.g., generative artificial intelligence systems) may have restrictions on how their content may be used (e.g., for non-commercial purposes only) and content produced by such artificial authors may be prohibited in a commercial context. The application of authorship tokens can improve security and compliance by having indications of authorship follow the content and be used to apply security and compliance policies to the use thereof.

As another example, certain organizations may prohibit artificial content (e.g., schools) or request that applicants identify which portions of a work were created by an artificial intelligence (see, e.g., U.S. Copyright Office, *Copyright Registration Guidance: Works Containing Material Generated by Artificial Intelligence*, 88 Fed. Reg. 51, Mar. 16, 2023). Even where a work is produced solely by a human without artificial authorship, it can be difficult to practically demonstrate that the work really was authored by a human rather than an artificial intelligence. For work with written by a human in conjunction with an artificial intelligence (or vice versa), it can be even more difficult to look back at a finished work to identify which regions had which authorship. Thus, a content editor able to label and update regions with authorship tokens is improved relative to a content editor that lacks such features.

While content editors have traditionally labeled files with author tags, such traditional techniques were insufficient at the time for accurately describing authorship and are even more insufficient for dealing with contemporary issues of artificial authorship. Traditionally, those labels merely automatically included the name of the user that created the file rather than describing the authorship of the content therein. Thus, a user could create a file, paste into the file content authored by someone else, and have the file inaccurately state that the user is the author of the content. Further, in some instances if a first user created a template and a second user filled in the template with content, the filled-out file may nonetheless inaccurately describe the author of the file as being the first user. Further still, such authorship information lacks granularity (e.g., on a region-by-region basis) and can often be changed by a malicious end user. Thus, even in the traditional context, such fields were insufficient. Such traditional labeling of the "author" of a file is even more insufficient for the contemporary problem of mixed human and artificial content at least because such fields treat all content as having been authored by the human person whose account is associated with the content editor even if artificial content generation is built into the content editor and used to produce all of the content in the file. Thus, again, traditional authorship features of content editing software are insufficient to address modern technical challenges arising from ubiquitous artificial content generation.

Authorship in version control systems like GIT or other collaborative content editors is typically automatically attributed on a commit or save level, thereby attributing all content (or all new content) since a prior save or commit as having been authored by the account making the commit regardless of how the content being committed was actually created (e.g., via manual creation by the human associated with the account or another human or artificial creation by an artificial intelligence or even by being passed from a source having unknown authorship) or being able to ascribe different authorship to different parts of the new content.

As another example, some tools allow for the automatic creation of redline markup showing the author of specific portions of a document. But such redline markup is limited to identifying the user account associated with the word processor as being the author of content, rather than the author that created the actual text content. Further, such markup lacks description of how the content was created, whether as the result of manual human input, as the result of pasting from another source, or as the result of generating by an artificial intelligence. Thus, such redline features of traditional content editing software are technically insufficient to address challenges arising from artificial content generation techniques.

Further, redline markup traditionally requires the content it is describing to be stored in a rich text format configured to handle such markup. For instance, many word processors or other office applications store content in Open Office XML file formats (e.g., as defined in ISO/IEC 29500-1:2016 or subsequent standards). However, such formatting is inappropriate for many kinds of files (e.g., source code, which is often stored in plain text), which traditionally lack the ability to usefully store such redline markup.

Merely automatically treating every piece of content added to a file as being authored by a human is insufficient because generative artificial intelligence often directly inserts content into the file into locations where the human would also insert text. Where it was previously safe to assume that only one author was operating an editor at a time, now generative artificial intelligence is being integrated into content editors in such a way that a human author and an artificial author may take turns editing the same content within the same editing session. As a result, edits coming from a single content editor on a single computer can now come from a human author and at least one artificial author. As advancement in artificial intelligence continues to grow, where a content editor may now have only a single artificial coauthor, future text editors may have multiple different artificial authors available and distinguishing which among them contributed to which content (e.g., because of different capabilities, licensing requirements, copyright statuses, other differences, or combinations thereof) may be beneficial. Further, while current artificial authors often require human involvement at some level of the process (e.g., copying and pasting content produced by an artificial author or accepting a provided change from an artificial author), future implementations may involve an artificial author acting autonomously or semi-autonomously.

Thus, traditional content editing software tracks the user account that committed or saved particular content but lacks the technical capability to conveniently track the actual author of the underlying content being saved or committed. Such software lacks the technical capability to distinguish which regions of the content committed by the user were manually authored by that user, were authored using a generative artificial intelligence (e.g., a code generation feature, such as GITHUB COPILOT or OFFICE COPILOT), were created by the user copying from another source (e.g., answers from WIKIPEDIA, STACK OVERFLOW, or open-source libraries), or combinations thereof. Indeed, it was often unnecessary to do so because it was easy and largely accurate to assume that the person committing the code was a human and the author of the code. But it is no longer safe to make that assumption. As artificial content generation features become more integrated into content editors, it becomes increasingly difficult to determine the provenance of content due to deficiencies in traditional technology for tagging authors.

One could painstakingly, manually label which portions of content were authored by a human or artificial intelligence, but such a process would be time consuming and inefficient. An individual could very easily forget to label sections, leading to a decrease in accuracy for the identifications. And it would be difficult for authors themselves to apply a consistent, accurate standard for determining when they are the author of the content versus an artificial intelligence. Further, such a technique would only be helpful for honest labelers and do little to address fraudulent labeling of artificial content as human authored (or vice versa). However, due to technical challenges in reliably and automatically identifying a source of an edit and authorship of an edit and other challenges, merely automating human labeling is impractical and insufficient. Further, while a program could automatically log every keystroke or input by an author to create a record usable to demonstrate authorship, such a log can raise privacy concerns, consume large amount of processing and memory resources, and can be difficult to correlate to a resulting output. A user recording themselves producing content (e.g., using a screen capture program or even a camera) raises similar challenges. Further, even if such logs were easy to make, they would require a reviewer to review and interpret the log to make authorship decisions, which is time consuming and difficult.

Thus, there is a need in the art for new technical solutions that conveniently and accurately identify and label content with an associated human or artificial author.

Techniques described herein are relevant to such technical solutions. Techniques described herein include the use of authorship tokens automatically generated and applied to regions of content during content editing. Such authorship tokens can be used to identify content authored by a particular author or kind of author (e.g., human or artificial). Such tokens can automatically be generated by the content editor (or a plugin thereto) or operating system and applied to the work while the work is being produced. Thus, subsequent review of the work can identify regions produced by a human author, regions produced by an artificial author, regions having mixed authorship, and regions having unknown authorship.

In a first example implementation, any edit to a region of content is sufficient for that region to be considered authored by the human or artificial intelligence that made the edit, and the region is labeled accordingly with an authorship token corresponding to that kind of author. In a simple implementation, human versus artificial authorship can be determined based on whether a human interface device is being used to effectuate the edit. If so, then the edit has human authorship. Otherwise, the edit has artificial authorship.

In an example implementation, a human authorship token is removed only if a different kind of author (e.g., an artificial intelligence but not another human) rewrites an entire region. For instance, a human writes a line of code using a human interface device (e.g., a keyboard), and the content editor appends a comment to the end of the line of code. The comment can be an empty comment or comment having one or more predetermined special characters corresponding to a specific author (e.g., a name of the author) or specific kind of author (e.g., human or artificial). In an example, the content is a line of code having a functional code portion and a comment portion. The comment portion can include an authorship token portion and a normal comment portion (e.g., a portion typically used by programmers to describe the line of code). To avoid visual clutter or resist tampering, the content editor can suppress the display of the authorship token portion (e.g., by hiding it) and permit display of only the normal comment portion.

In another example, mere de minimis changes to generated text may not necessarily be sufficient to demonstrate or change authorship. The content editor can detect whether an author makes an edit to a region of content (e.g., a line of code in an integrated development environment or text in a word processor). Responsive to determining that the edit to the content (individually or in aggregate with other edits) meets a threshold of significance (e.g., an amount of characters changed or type of characters changed), there can be a check for whether an authorship token (e.g., a special comment or data entry) is already present. If not, then an authorship token is added corresponding to the author that made the change. If so, then the authorship token is updated as necessary. The authorship token can usefully convey information about the authorship (e.g., whether the author is human or artificial, the author's name, the amount of content changed, other information, or combinations thereof) or even merely that the region is human authored.

In examples, there is a log that is updated during editing of a content. During editing of content, user produced content is added to the log, but artificial content is not added (or vice versa). Such files may include the human produced content verbatim, or may include a compressed version thereof to reduce an amount of resources required. Thus the log can be consulted to identify which content has which authorship in an easier way than reviewing a screen recording.

In some examples, there is a check for whether generative artificial intelligence is editing content. If so, then any human authorship tokens associated with region of content being edited can be removed. If content is pasted, authorship tokens can be removed, suppressed, or special tokens can be added indicating that that the provenance of the pasted content is unknown (e.g., possibly human generated or possibly artificial intelligence generated). In some examples, copyrighted works are automatically added to the file from a library of creative works produced or owned by the author or an organization for which the author works. The works can be added to comments in the file.

In examples, authorship tokens can be stored within the content being labeled. For instance, the content may be source code in plain text form with the authorship token being plain text intermingled with the source code. In further examples, authorship tokens are stored in a same file that stores the content being labeled but without being intermingled with the content it labels. For instance, a file format may store formatting (e.g., text formatting, such as font, size, boldness, style, and other information) separate from the text of the content. So too may the authorship token be stored separate from the content (e.g., text content) being labeled. In an example, the authorship information is prepended or appended to the beginning or end of the file, respectively. In yet further examples, the authorship tokens can be stored in a separate file from the content on a same device or at a separate device.

One or more aspects of one or both of the authorship tokens and the content may be captured and stored separately from the content in a log location or file. Such a log of authorship may be found in a text file, database, distributed ledger, or any other logging or tracking mechanism. Each mechanism of logging or tracking authorship carries different advantages and disadvantages. In one example, a text file log stored within a local directory offers the advantage of simplicity and low central processing unit resource usage, but may offer the disadvantage of not being as searchable or sharable as other solutions. It may also be more susceptible to being manipulated or altered by a malicious actor. A database (e.g., an SQL-based relational database) hosted elsewhere may offer more shared, centralized tracking, but at the cost of more computation power and complexity. Meanwhile, a blockchain or other distributed ledger solution may offer almost complete decentralization and resist manipulability, but at the cost of high computational and/or storage requirements. A person of skill in the art may weigh these and other factors in determining how to achieve desired results in view of the disclosure herein.

In some examples, content produced on or prior to an artificial intelligence date can have human authorship tokens retroactively applied or generated. For example, the artificial intelligence date can be a date prior to which it should be assumed that all content was produced by a human rather than an artificial intelligence. The artificial intelligence date can be a date on which artificial intelligence features were given to users (e.g., a date on which generative artificial intelligence was approved for use or installed into a content editor). The artificial intelligence date can be a date on which sufficiently advanced generative artificial intelligence was sufficiently available to the public or certain users (e.g., the date on which GPT-3 was released to the public). Thus, an entire code base can be labeled with human authorship tokens as appropriate. When a user opens a file for editing after the artificial intelligence date and the file was last modified prior to the artificial intelligence date, then human authorship tokens can be automatically produced (e.g., according to techniques herein) and added to content in the file. In some examples, when content is being pasted from another file (e.g., part of a same or different codebase), then the modification date of the pasted-content source file is checked. If the modification date is prior to an artificial intelligence date (e.g., a date indicating that there is a special concern that content produced on or after that date may have been produced by artificial intelligence), then content pasted from such files may have a human authorship token added. Otherwise the token can be suppressed.

A file can be parsed and sections of content having human authorship tokens can be identified. Such sections can be assumed to have been created by a human rather than a generative artificial intelligence for human authorship purposes. Sections of content having artificial authorship tokens can be identified and assumed to have been authored by an artificial intelligence rather than a human.

In some examples, to resist tampering, the content editor can resist the manual creation, deletion, or modification of authorship tokens (e.g., preventing a human or artificial author from adding content mimicking the format of authorship tokens). For example, when authorship tokens are stored in the same file as the content (e.g. in the form of source code comments or other text) the authorship tokens may be encrypted, signed, or otherwise be configured to resist tampering. Tamper-resistant tokens might be unreadable or unintelligible by a human author absent separate steps (e.g., decryption or validation with a hash of known provenance). Depending on how the tokens are stored, this might not prevent deletion of said tokens, but depending on the method of encryption, may resist fraudulent additions or modifications of such tokens.

In another example, where authorship tokens or data is stored in a separate file or separate part of a file, that separate file or portion may have different access or editing permissions as compared to a file or region of a file that is being edited by the author. The file or region containing authorship tokens may be non-modifiable or not readily modifiable by an author. In an example, authorship tokens are encrypted, encoded, or signed in such a way that resists tampering with the tokens. Thus, this can improve the reliability of authorship tokens by resisting the ability of a user (whether human or artificial intelligence) from inappropriately adding, removing, or modifying the tokens. Further still, authorship tokens, the content they describe, or representations thereof can be published to a blockchain, distributed ledger, Maerkle tree, or in another way that resists tampering.

Content having authorship tokens can be used in any of a variety of useful ways. The same program used to generate the authorship tokens or a different program can analyze the labeled content to determine which regions have human authorship tokens and which ones lack human authorship tokens (or are labeled as being artificially authored). A report can be generated describing which regions have which kinds of authors (based on the associated authorship tokens). Such a report can be used to support a copyright filing, patent filing (e.g., for determining inventorship), or copyright notice, be used for internal monitoring of author productivity, support billing for authored content (e.g., billing for usage of AI tools), support a request for indemnification or a warranty claim with a provider of an artificial author (e.g., certain providers of artificial authors may warrant the accuracy or non-infringement of content provided by their artificial authors), other uses, or combinations thereof. Further still, identifying authors of regions can be used to demonstrate the provenance of content to an auditor (e.g., for compliance purposes, to defeat allegations of plagiarizing an AI author, or to defeat allegations of passing off AI generated content as one's own). When the content is used for training an artificial intelligence (e.g., a generative artificial intelligence), regions of the content lacking a human authorship token can be excluded or labeled accordingly to resist degradation in generative AI content quality that can arise from training on AI generated content).

In some examples, content having particular authorship can be restricted. For example, an organization may have a policy regarding whether particular kinds of authorship is permitted (e.g., an organization may want a particular amount of human or artificial authorship in certain areas). Thus, an action taken with respect to content (publishing, committing, merging a branch, sending to a third party, sending to an external party, receiving, other actions, or combinations thereof) may be permitted or disallowed based on authorship of the content satisfying or failing to satisfy a particular threshold.

In some examples, authorship can be described or stored using bloom filters or similar data structures. For example, the bloom filter can be configured to store data such that regions can be tested to determine whether a region in question has particular authorship. Because of the nature of bloom filters potentially providing false positives (but not false negatives), the way that information is stored can be configured to be tolerant for those kinds of errors. For instance, an organization may be more concerned about false positives for artificial authorship than human authorship or vice versa. The use of the bloom filter can be so configured. Multiple bloom filters can be used to store other kinds of authorship information, such as internal or external.

Many examples herein are described in the context of raw, discrete content blocks (e.g., lines, functions, classes, words, sentences, paragraphs, etc.), but in some instances, authorship can be applied to architecture or outlines. In some examples, in addition to or instead of authorship describing authorship of raw content (e.g., the characters or other content that makes up a region), there may be authorship tokens that apply to or describe authorship of an architecture, plan, outline, organization, or other higher-level structuring of content. Such tokens may appear at the beginning of a file, at the end of the file, or at the relevant regions of the content. In some instances, a region may have tokens describing high level authorship as well as low-level authorship. The delineation between high- and low-level authorship can be defined by policy or preferences of an implementing entity. In an example, a first author (e.g., a human author) specifies an architecture for source code and a second author (e.g., a generative artificial intelligence) creates underlying code that implements it. The underlying code can be tagged as having an artificial author using artificial authorship tokens but there can be (e.g., at the beginning of the relevant region) a tag indicating human authorship of the overall architecture implemented by the artificial intelligence. Likewise, a human can specify an outline for a document that an artificial intelligence fleshes out. Further, organizational authorship may apply when rearranging or organizing content. In an example, an artificial intelligence may generate content and a human author may rearrange the code content (e.g., moving functions to different parts of a source code file or moving paragraphs around in a narrative document). The file may indicate that there is artificial authorship for the regions by applying artificial authorship tokens thereto, but there may also be an additional authorship token that applies in such a way that describes authorship of the arrangement or organization of the content.

Many examples herein describe application of authorship tokens to primarily text content edited by a text editor (e.g., a word processor or development environment). However, authorship tokens can be applied to in other contexts, such as using visual, audio editors, or other kinds of editors. For example, a user may cooperate with an artificial intelligence in the creation of visual content (e.g., a website or a user interface) using a visual development environment (e.g., a graphical user interface builder). The visual development environment may permit a user to specify locations for graphical user interface elements. In examples, techniques described in FIG. 2 may be modified to apply to such situations. For example, edits to content can be detected, significance determined, and authorship tokens provided accordingly. Likewise, techniques described herein can be applied in other contexts, such as audio creation or editing, visual content creation (e.g., 2D images, 3D objects, photographs or video). In some implementations, authorship tokens can be applied upon creation of content using sensors (e.g., cameras or microphones) and can persist through the editing journey of the content to demonstrate provenance of the content, optionally including a description of who edited or contributed to what aspect of the content.

In an example, to improve auditability of authorship, a generative artificial intelligence is configured to generate content that has an increased likelihood of being detected as having been generated by an artificial intelligence. For example, the generative artificial intelligence can be configured to have a statistically significant detectable feature unlikely to be produced by humans, such as favoring content having a specific number of syllables, consonants, vowels, or other detectable features. In another example, the generative artificial intelligence can be configured to favor use certain words, types of words or forms of words or sentences. In example, existing code produced by a human author is analyzed to determine such traits and then the generative artificial intelligence is configured to generate to content that is detectably different from such traits. Thus, sections of content produced by the generative artificial intelligence can be distinguished from content produced by a human author.

In another example, to improve the auditability of authorship, a generative artificial intelligence can be configured to produce content (e.g., code) having characteristics (e.g., in the case of code, variables or functions with specific kinds of names) that are less likely to be produced by a human author. For example, the artificial intelligence can be configured to favor producing code with variables having longer variable names, specific kinds of variable names (e.g., appending "_AI_GENERATED" to variable or function names produced by an artificial intelligence), or having special characters or combinations of characters that are inconvenient for a human to manually type. In an example, the generative artificial intelligence is trained or configured to produce names that would be considered ugly or too verbose by a human programmer. Thus, code produced by human versus an artificial intelligence could be distinguished.

An example system that can benefit from or implement techniques described herein is shown and described in relation to FIG. 1.

EXAMPLE SYSTEM

Figure 1B:
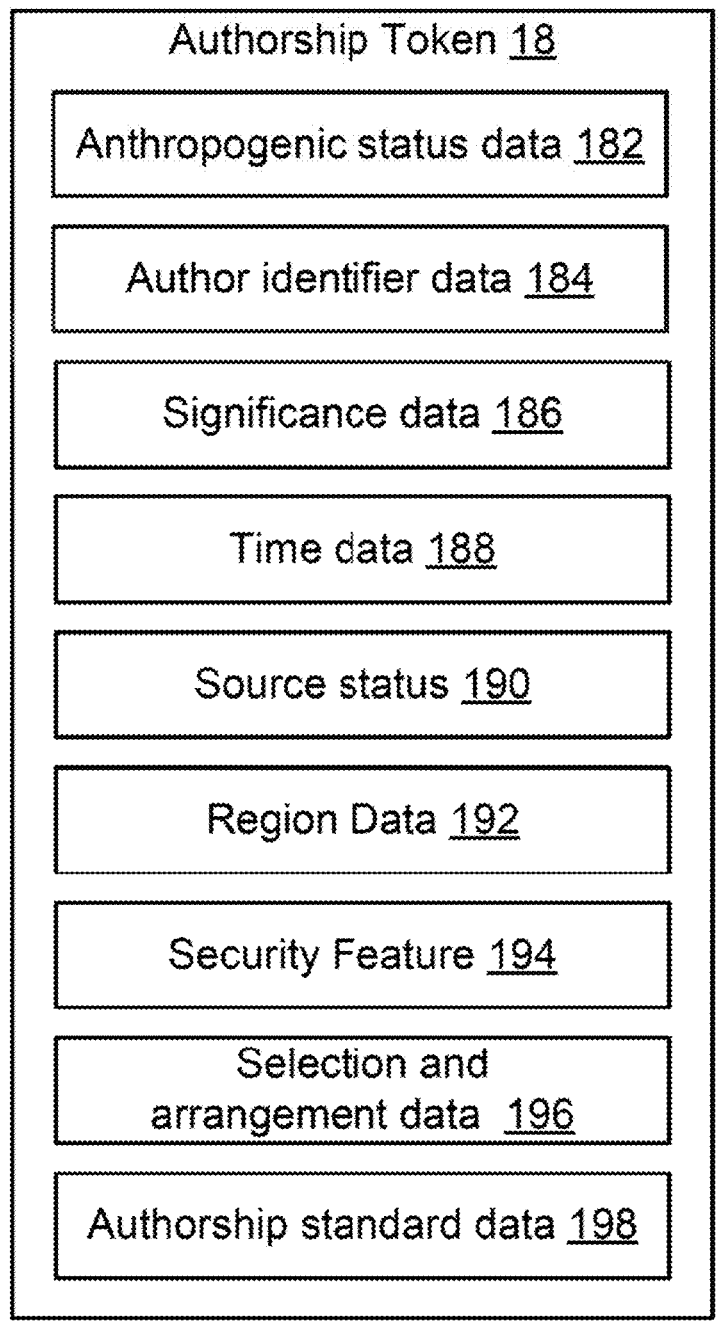

FIG. 1, which is made up of FIGS. 1A and 1B, illustrates a system 10 with which one or more aspects of techniques described herein can be implemented. The system 10 includes a user device 100 with a human author and an artificial author interacting with a same content editor 12 (e.g., as illustrated, a text editor) during an editing session. As further illustrated, embodiments of the system 10 can further include a server 150 connected to the user device 100 over a network 190.

Figure 10:
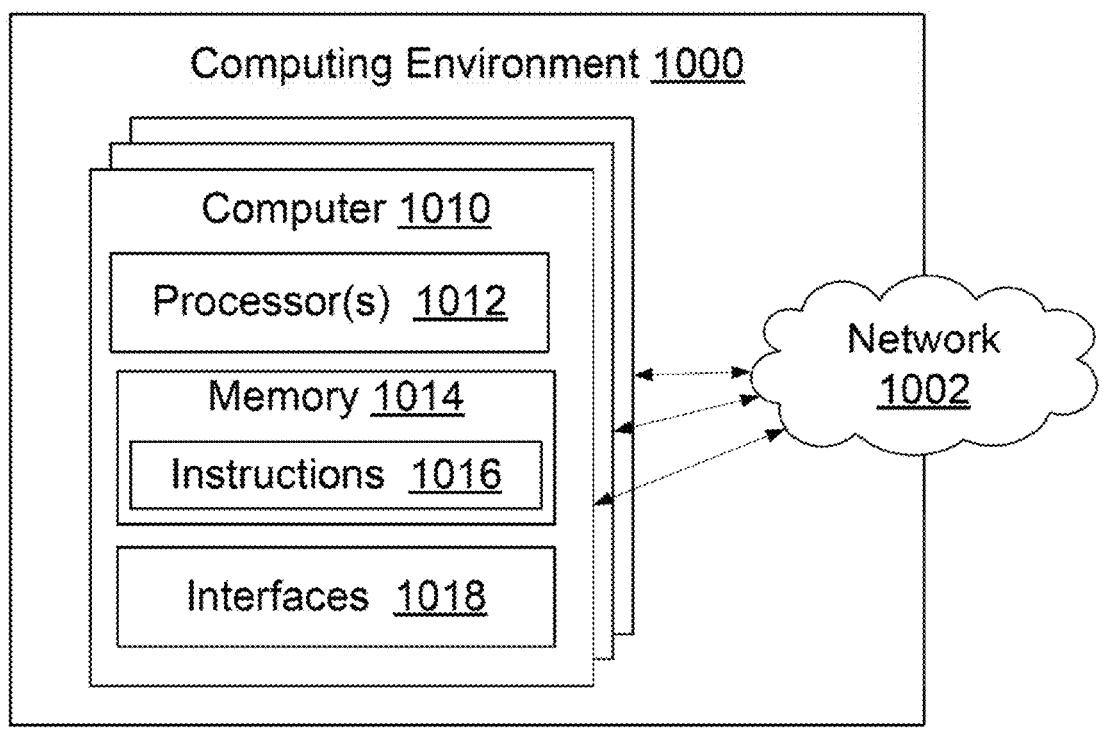
FIG. 10 illustrates an example computing environment usable with techniques described herein.

The user device 100 includes one or more aspects described elsewhere herein such as in reference to the computing environment 1000 of FIG. 10. In many examples, the user device 100 is a personal computing device, such as a smart phone, tablet, laptop computer, or desktop computer. But the user device 100 need not be so limited and may instead encompass other devices used by a user to produce content, such as text content, visual content, auditory content, or combinations thereof. In the illustrated example, the user device 100 includes one or more user device processors 102, one or more user device interfaces, and user device memory 106.

The one or more user device processors 102 are one or more components of the user device 100 that execute instructions, such as instructions that obtain data, process the data, and provide output based on the processing. The one or more user device processors 102 can include one or more aspects described below in relation to the one or more processors 1012 of FIG. 10.

The one or more user device interfaces 104 are one or more components of the user device 100 that facilitate receiving input from and providing output to something external to the user device 100. The one or more user device interfaces 104 can include one or more aspects described below in relation to the one or more interfaces 1018 of FIG. 10.

The user device memory 106 is a collection of one or more components of the user device 100 configured to store instructions and data for later retrieval and use. The user device memory 106 can include one or more aspects described below in relation to the memory 1014 of FIG. 10. As illustrated, the user device memory includes content editor instructions 108, token instructions 110, and files 112, among other potential contents.

The content editor instructions 108 are instruction that, when executed by the one or more user device processors 102, cause the one or more processors 102 to provide the content editor program 12. The content editor program 12 is software that provides features for the editing of content. While the illustrated text editor instructions 108 are local to the user device 100, technology herein can also be applied to cloud based or remote editors.

The content editor 12 can take any of a variety of forms, including text editors, such as word processing applications (e.g., MICROSOFT WORD, GOOGLE DOCS, OPENOFFICE, LIBREOFFICE, and PAGES) and software development environments (e.g., NOTEPAD++, VIM, EMACS, SUBLIME TEXT, VISUAL STUDIO CODE, CURSOR, ECLIPSE, XCODE, MICROSOFT VISUAL STUDIO, and PYCHARM), other environments, or combinations thereof. In addition or instead, the content editor 12 can include 2D visual content editors (e.g., ADOBE PHOTOSHOP, ADOBE ILLUSTRATOR, PROCREATE, PIXELMATOR, GNU IMAGE MANIPULATION PROGRAM, MICROSOFT PAINT, GOOGLE PHOTOS, and MICROSOFT VISIO), 3D visual content editors (e.g., BLENDER, 3D STUDIO MAX, MAYA, SOLIDWORKS, AUTOCAD, and LIBRECAD), video editors (e.g., ADOBE PREMIERE PRO and FINAL CUT PRO), audio editors (e.g., AUDACITY), digital audio workstations (e.g., ABLE- TON LIVE, ADOBE AUDITION, CAKEWALK, GARAGEBANK, and LOGIC PRO), presentation software (e.g., MICROSOFT POWERPOINT, GOOGLE SLIDES, KEYNOTE, and CANVA), spreadsheet software (e.g., MICROSOFT EXCEL and GOOGLE SHEETS), and notetaking software (MICROSOFT ONENOTE), among others. Further, while many examples above are standalone applications (whether standalone desktop applications, mobile applications, webservices, or other kinds of applications), a content editor may be a portion of a larger application or service. The content editor 12 may be a program or service that includes content editing functionality regardless of the wider or primary purpose of that program or service. For example, while email clients are not often thought of as content editors, they often include substantial content editing functionality, such as for composing emails. Such a composing aspect can be considered a content editor. Likewise, social media platforms (e.g., FACEBOOK, INSTAGRAM, X (née TWITTER), SNAPCHAT, and TIKTOK) and messaging platforms (e.g., SIGNAL, DISCORD, IMESSAGE, MICROSOFT TEAMS) include composing features (e.g., for creating a post or writing message) or editing features (e.g., for editing video, audio, image, or text content) as part of the platform. Such composing aspects can be considered content editors 12. Thus, "content editor" as used herein refers to a broad class of editors that permit the editing (including creation) of content among possibly other features. Even where a content editor is focused primarily on one kind of content (e.g., text or visual content), such an editor may offer functionality for editing other kinds of content and thus need not be limited to a program or function having the primary purpose of editing one kind of content. While many examples describe the editing of text content, such editing need not be limited to the editing of plain text. Content generators can be considered a subset of content editors.

The content editor 12 may include functionality to produce or receive content generated by a large language model or other generative artificial intelligence systems (e.g., GITHUB COPILOT or OFFICE COPILOT). Such content may be provided into a same or different editor window or tab as manually entered text or primary content.

As illustrated, the content editor 12 can be used to edit content 14, such as source code that includes one or more lines of code that can include one or more comments 16.

The authorship token instructions 110 are instructions that, when executed, facilitate the labeling of content within the content editor 12 as having been produced by a particular author or a particular kind of author (e.g., a human or artificial author). In some examples, the execution of the instructions 110 cause the one or more processors executing the instructions to provide an authorship engine. The authorship engine can perform one or more aspects described herein relating to authorship, such as the labeling of content and performance of one or more operations described herein. In an example, the authorship token instructions 110 are written as a plugin to or as a part of a content editor 12 or an operating system to create one or more authorship tokens 18, which are described in more detail below in relation to FIG. 1B. The authorship tokens 18 may be stored in the files 112, or in separate files associated therewith. In another example, the authorship token instructions 110 may execute at the user device 100 as a service concurrently with use of content editor 12, and may monitor various user interfaces of the user device 100 to determine user input intended to be received at the content editor 12, and to generate authorship tokens, which may be stored in the files 112 adjacent to content, or in separate files entirely, such as authorship token 18 files/data 114. In such instances, the authorship token instructions 110 may similarly create authorship tokens 18 in parallel with entry at content editor 12. Execution of authorship token instructions 110 can cause performance of one or more operations of method 200, other methods described herein, or combinations thereof.

The server 150 is a server device that can function as part of one or more processes described herein. In the illustrated example, the server 150 includes one or more server processors 152, one or more server interfaces 154, and server memory 150, among other components.

The one or more server processors 152 are one or more components of the server 150 that execute instructions, such as instructions that obtain data, process the data, and provide output based on the processing. The one or more server processors 152 can include one or more aspects described below in relation to the one or more processors 1012 of FIG. 10.

The one or more server interfaces 154 are one or more components of the server 150 that facilitate receiving input from and providing output to something external to the server 150. The one or more server interfaces 154 can include one or more aspects described below in relation to the one or more interfaces 1018 of FIG. 10.

The server memory 150 is a collection of one or more components of the server 150 configured to store instructions and data for later retrieval and use. The server memory 150 can include one or more aspects described below in relation to the memory 1014 of FIG. 10. As illustrated, the server memory 150 can store content editor instructions 108, authorship token instructions 110, files 112, and authorship token 18 files or data 114, among other files, data, or instructions. Such materials can perform the same or similar functions to those described in relation to the user device 100 and elsewhere. In addition or instead, they can perform server specific aspects and optionally cooperate with the user device 100 or other devices to perform operations or other aspects described herein.

The network 190 is a set of devices that facilitate communication from a sender to a destination, such as by implementing communication protocols. Example networks 190 include local area networks, wide area networks, intranets, or the Internet.

Example System—Authorship Tokens

FIG. 1B illustrates example data that may be stored in or in association with authorship tokens 18. The authorship token 18 can take any of a variety of useful forms. In many examples, authorship tokens 18 convey information regarding whether an associated region has human or artificial authorship. Other information can also be conveyed using an authorship token 18.

The authorship token 18 can take any of a variety of forms and the authorship information can be expressed in any of a variety of ways. In an example, the human authorship token 18 includes a human-readable plain text description of authorship (e.g., "human author", "artificial author", "COPILOT-v2-Authored", "internal human author", "internal chatbot author", "external chatbot author", "unknown author", or "authored by human John Doe with minor support by chatbot"). In addition or instead, the authorship information can be compressed into a smaller format where symbols, characters, or abbreviations are used to convey authorship or keys to a lookup table are included. In some examples, authorship conveyed in a form other than plain text.

As illustrated, the authorship tokens 18 can include anthropogenic status data 182, author identifier data 184, significance data 186, time data 188, source status 190, region data 192, a security feature 194, selection and arrangement data 196, and authorship standard data 198, other data, or combinations thereof.

The anthropogenic status data 182 can include information regarding whether the associated content has a human author or a non-human author. Thus, the anthropogenic status data can be used to determine whether the author is a human or an artificial intelligence. The anthropogenic status data 182 can have a predetermined form selected from the group consisting of a predetermined human authorship form indicating that the associated region has human authorship, a predetermined artificial authorship form indicating that the associated region has artificial authorship, a predetermined mixed authorship form indicating that the associated region has mixed human and artificial authorship, and a predetermined unknown authorship form indicating that the region has unknown authorship.

The author identifier data 184 can include information regarding an identify of the author. The author identifier data 184 may include information usable to identify the author, such as a user name, user identifier, author contact information (e.g., an associated email address), or other identification information. For instance, the author identifier data 184 can be the string "user1234", which can be used to identify the user. However, that identifier may not, on its own, convey whether the user is human or artificial.

The significance data 186 can include information regarding a significance of the contribution by the author to the associated region (see, e.g., information discussed in relation to operation 220 of FIG. 2E, below). For instance, the significance data 186 can include information regarding an amount of content in the region that was provided by the author, such as manually by a human author (e.g., the factors that went into the significance score). The values can be updated as one or more users make changes. For example, a user may generate a line of content with a generative artificial intelligence, make some minor changes insufficient to convert the region to human authorship, and then move on. Later the user may return to that line and make further changes. While neither set of edits alone would be sufficient to result in human authorship, the prior and subsequent edits taken together do reach a level of significance. As a result, the subsequent changes can update or replace the prior artificial authorship token 18 or may be stored in a new human authorship token 18 which may be reconciled with the previously-created artificial authorship token 18. The creation of a subsequent human authorship token 18 can take into account the human contribution to the content of the artificially authored region, or the two tokens 18 may be analyzed together to determine overall authorship of a particular region of content. Such dynamic generation, updating, and management of authorship tokens can beneficially improve accuracy of labeling of content in situations where a user returns to edit content several times. In some examples, the significance data 186 includes an indication of sub-regions of the region that have particular authorship.

The time data 188 can include information about a time associated with the content, such as when the associated region was first created, last edited, when the authorship token was last updated, other times, or combinations thereof. In an example, a timestamping library such as OPENTIME-STAMPS is used.

The source status 190 can include information about the source of the authorship. In an example, the source status 190 can indicate whether the source of the content is internal to or external from an organization, entity, file, project, or other relevant dividing line. The source data may also include or reference the location from which the associated data was obtained, such as a URL (Uniform Resource Locator) or identifier (e.g., a citation) associated with where the region was copied or obtained.

The region data 192 can include information about the region to which the authorship token 18 pertains. For example, the region data 192 can describe that the authorship token 18 is associated with one or more specific or associated: line, lexical scope, function, class, file, word, sentence, paragraph, page, chapter, section, entire work, meter, verse, logical region, pixel, frame, layer, channel, model, vertex, section, other region or combinations thereof. In some examples, the region data 192 specifies a specific region (e.g., by identifying it with a specific identifier) or indicates nearest one or more regions (e.g., that this authorship token 18 refers to the nearest, next, or prior region of a specific kind or quantity, such as the next five paragraphs).

The security feature 194 can include one or more aspects to enhance security, such as by resisting mimicry or facilitating security of the token 18. In some examples, the security feature 194 is a salt to facilitate security when hashing is used. In some examples, the security feature is a copyrighted work. The addition of such a copyrighted work can be used to demonstrate copyrightability. In some examples, copyrighted works are added only to regions associated with artificial authorship tokens 18 and not human authorship tokens 18. In other examples, they are applied regardless of whether human or artificial authorship is specified. The security feature 194 can include a hash or other representation of the data to which the authorship token 18 describes. In some examples, the security feature is not something appended to the authorship token 18 but features of it, such as being encrypted, hashed, hidden, other features, or combinations thereof.

The selection and arrangement data 196 can include data describing one or both of the selection and arrangement of the content in the associated region. In examples, the data describes whether or how different the arrangement of the associated content is from an original piece of content, which can include information regarding how much of the original work the content makes up (e.g., how much of the original content was selected to appear here). Additional information regarding the selection and arrangement of content is described below in relation to FIG. 16.

The authorship standard data 198 is data regarding the standard by which authorship was determined. For instance, as described elsewhere herein, there are various thresholds and parameters that affect authorship and different organizations may require different standards be followed. The authorship standard data 198 can provide information about the standard that was used to determine authorship expressed by the authorship token 18. In some examples, the authorship standard data 198 includes an identifier usable to look up the standard that was used to determine authorship and the associated parameters. In some instances, the authorship standard data 198 includes information about how the authorship was determined.

The authorship token 18 can include other data or formatting. In some examples, the format of the authorship token 18 depends on the content to which it applies or a standard that is being followed. In an example, where the content associated with the authorship token 18 is code, a language of the code can be determined by a file type of the file being edited, libraries being incorporated, analysis of header data, settings of the code editor (e.g., which syntax highlighting mode is active), by asking a user, or based on the context or syntax of the code itself. In such instances, a corresponding comment format for that language can be selected and used for adding the authorship token 18 as part of a comment.

In some examples, the authorship token 18 does not itself convey substantive information about the associated content of the associated region (e.g., what the code in the line does). The authorship token 18 can be predetermined without respect to the content of the region (e.g., not describe the line of code as a typical programming comment would or not be based on the content of the code but rather based only on authorship). The authorship token 18 can be predetermined with respect to how the author edited the content.

The authorship token 18 and the data associated therewith can supplement, be redundant to, or different from data stored in a version control system regarding the author that committed or saved the content and what is changed. For instance, the authorship token 18 may specify which author or which kind of author (e.g., human or artificial) made the change within the content editor and the authorship indicated in the commit reflects which account is associated with the content editor or with the commit system regardless of the authorship of the content being committed. In other examples, the commit indicates multiple different authors in a way that corresponds to the authorship tokens 18.

In some examples and situations, a human authorship token 18 is added to content even if the content was generated by an artificial intelligence or vice versa. The authorship token 18 can reflect an amount of a kind of authorship to a given region, which can range from no human authorship (e.g., entirely generated by an artificial intelligence) to complete human authorship (e.g., no artificial intelligence), a mixture thereof, or unknown provenance (e.g., the content was pasted from another source or was added while an authorship tracking feature was disabled).

In an example, the authorship token 18 is included in a comment within source code (e.g., within a comment 16 as illustrated in FIG. 1A). The authorship token 18 can be appended to the end of a line of code, can be applied to a preceding line of code, or be applied in other locations. In some instances, authorship tokens 18 are placed in particular locations before or after traditional code comments (e.g., which describe functionality of the code at issue). The comment can be created if one does not already exist. The authorship token 18 can be added to the beginning or end of the comment. The comment can be inserted at a beginning of the region, an end of the region, or between a beginning or end of the region. In some examples, when a file is saved or at another predetermined time, the authorship tokens 18 in a file can be automatically relocated to a more convenient location (e.g., before or after traditional comments or to a different region).

The authorship token 18 can be predetermined and without respect to the substance of the edit. For example, in a C++ source code file, the token 18 could be simply the "//" single-line comment marker placed at the very end of the line or immediately preceding a function or class definition where it would not interfere with any code or other comment. Alternatively, in the same circumstances, the editor may place a single line comment marker followed by a known series of characters to indicate human authorship, such as "/H". In some examples, the human authorship token 18 can include information about the manual edit (e.g., a number or percentage of characters of the region that have changed) without including the actual changes or without substantively describing the changes (e.g., without being able to reproduce the specific changes merely from the information contained within the authorship token). The inclusion of such data can allow the information to be used later when determining whether to update authorship. The authorship token 18 can be without respect to a form or function of the region in which the edit occurs (e.g., the authorship token 18 can lack information describing the code of interest).

In some implementations, the authorship token 18 can include one or more uncommon characters of a character encoding standard. This can be used to resist confusion and make it more likely to be identified compared to traditional comments that may be made to the source code.

In some examples, the content of the authorship tokens 18 can vary depending on the region. For example, where the file is a source code file, individual lines of code can include authorship tokens 18 specifying a particular level of detail, whereas authorship tokens 18 at a function, class, or file level can include relatively greater or lesser levels or kinds of detail. For instance, a line may specify a number of characters or words that were the product of human authorship, whereas a function may include a number of lines that were the product of human authorship (or were the product of more than a threshold amount of human authorship), and whereas a class may include a number of functions that include human authorship (e.g., more than a threshold amount thereof). Of course, authorship tokens 18 may include any of variety of kinds or amounts of information. A person of skill in the art may create a format of authorship tokens 18 that fits with a desired use case.

In some instances, the authorship tokens 18 include an identifier such that information about authorship can be found in another file or in another location within the same file. For instance, the authorship token 18 can be of the form "{H123abc}" where "H" indicates that the associated region has human authorship ("A" may be used to indicate artificial authorship) and "123abc" may be usable to find a portion of another file that describes more about the authorship of the region, such as information about the provenance of the region or its edits, prior authorship, other information, or combinations thereof.

In some examples, an authorship token 18 is stored in a format that is not readily recognizable or editable to a human or an AI. In an example, one or more authorship tokens 18 are stored in a QR code or another visual code that encodes the data.

Figure 3:
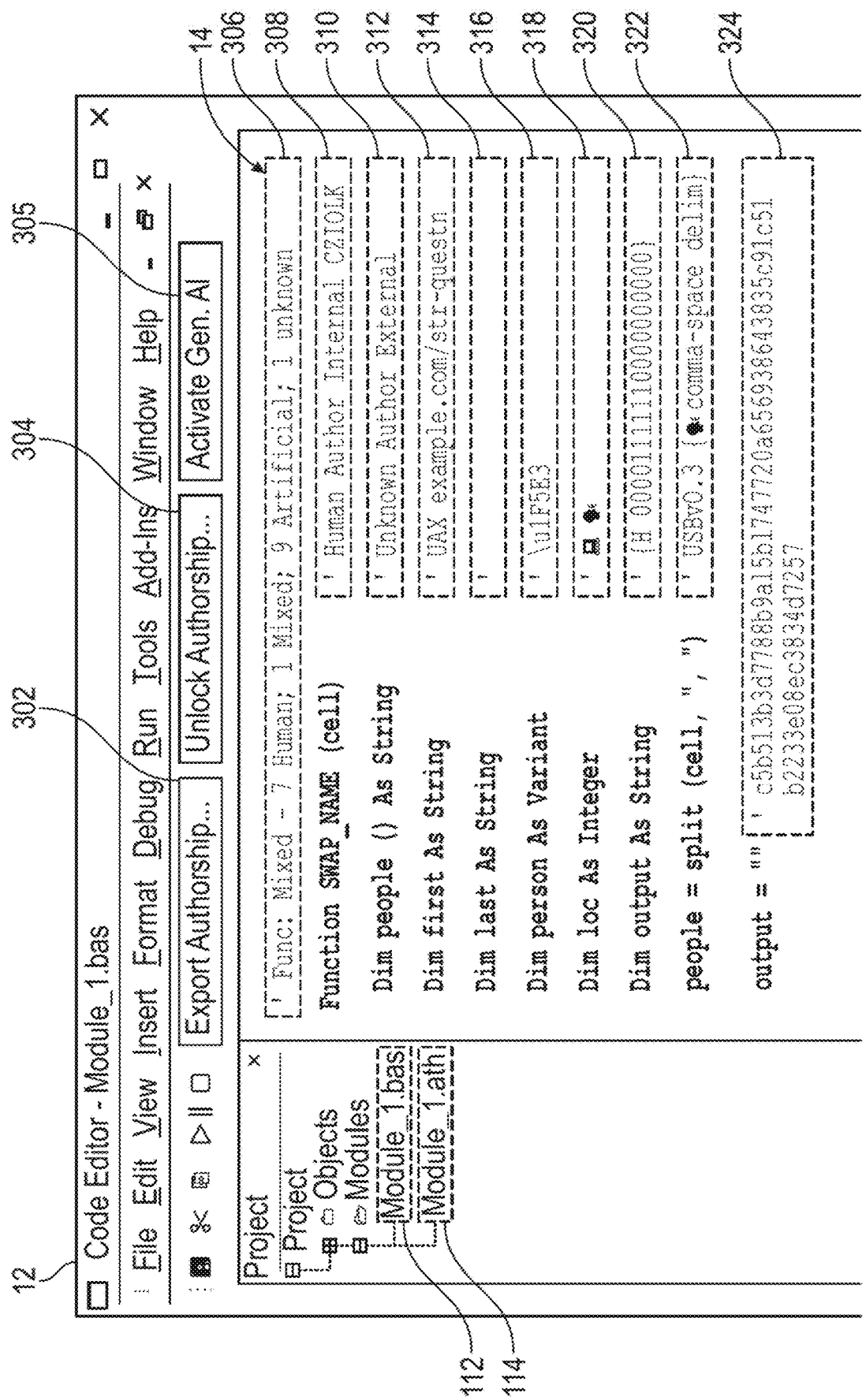
FIG. 3 illustrates an example text editor displaying a file having source code content that includes comments with varying styles of authorship tokens.
Figure 3:
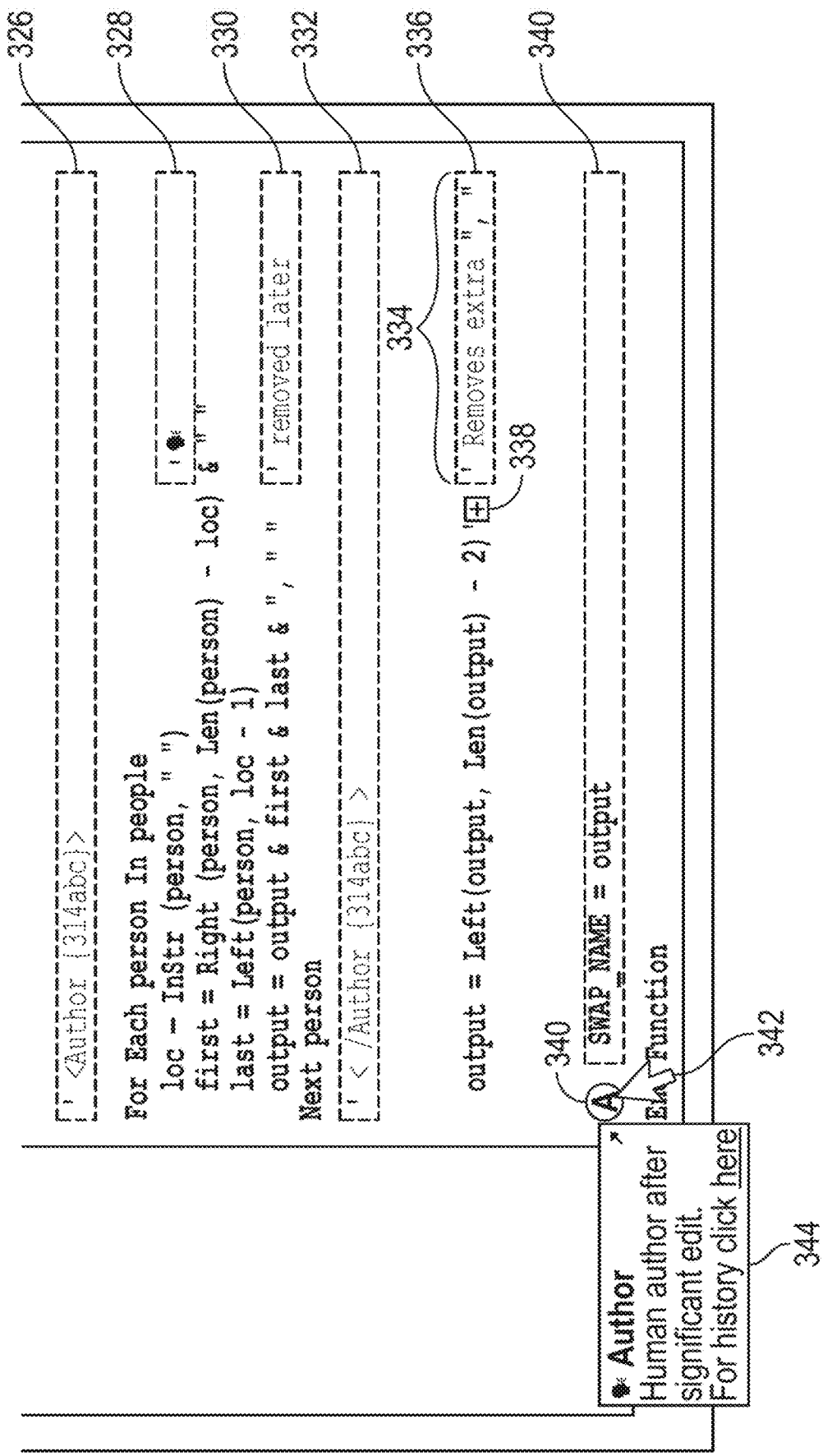

Additional information about authorship tokens 18 and examples thereof are described elsewhere herein, including in relation to FIG. 3.

Example Method

FIG. 2, which is made up of FIGS. 2A-2H, illustrates a method 200 that can facilitate the providing of authorship tokens 18. One or more operations of this method 200 can be performed in real-time while an author is using the content editor 12. Operations can be performed automatically or at least partially automatically. Where aspects herein are described as being predetermined or configurable, one or more parameters affecting such determinations or configurations can be specified by a user or administrator.

In an example, the method 200 is performed by an authorship engine while a user is using the content editor 12 (e.g., a development environment) to edit the file 112 (e.g., a source code file) containing the content 14 (e.g., source code). The content editor 12 can be provided by executing the content editor instructions 108 using the one or more processors, such as the user device processors 102. The method can begin with operation 202.

*Example Method—Determining that an Edit to Content has been Made*

Figure 2A:
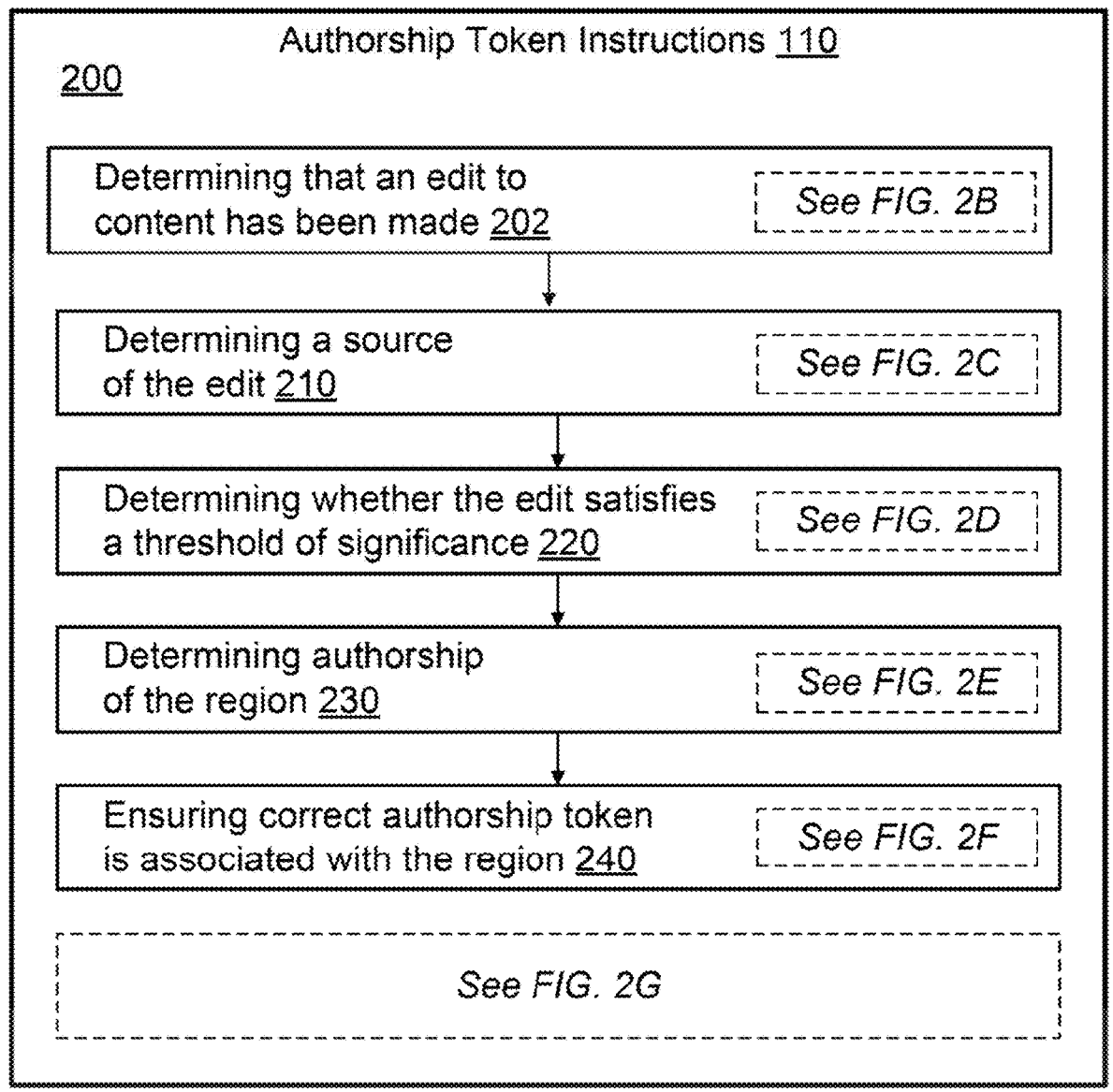
Figure 2B:
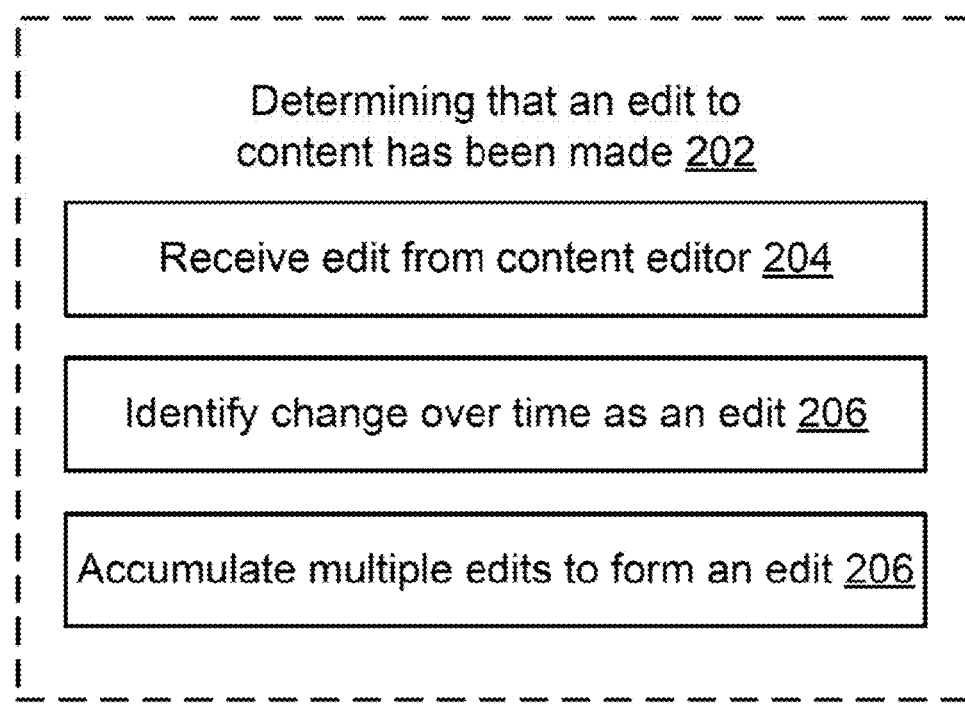

Operation 202 includes determining that an edit to content has been made. Here, "edit" is used broadly and can include creating new content, removing existing content, moving existing content, or modifying existing content. Thus, the determining can include detecting that content has been changed. The specific techniques for detecting an edit can vary depending on the content editor and how the authorship engine is integrated therewith. The determining that an edit has been made can occur in real-time as edits are being made by the author. In addition or instead, the edit can occur in other than real-time. In some examples, the edit is not just a single edit but a set of one or more edits. Edits can be accumulated in a data structure and then determined in this step at a later time. As shown in FIG. 2B, operation 202 can include operations 204 and 206.

Operation 204 includes receiving an indication of an edit from the content editor. For example, the authorship engine may have an API or a function that is called by the content editor when the content editor receives an edit to content. The data regarding the edit itself (including metadata regarding the edit) can be specified over that call. In addition or instead, the authorship engine can monitor events of the content editor or an operating system associated therewith and use the associated data to receive an indication of the edit from the content editor. In an example, the authorship engine is running on a WINDOWS computer and uses hooks to intercept or detect events (e.g., key up or down events or mouse events) and take actions based thereon. The authorship engine can then use that data to determine that an edit to content has been made.

Operation 206 includes determining an edit has been made based on changes to content over a period of time. For example, periodically, a current version of content can be compared to a prior version and the differences are determined to be edits. Such an approach can be beneficial in circumstances where the authorship engine has access to the content but does not have readily available access to "live" edits to the content, though depending on how short the period of time is, this operation 206 can monitor edits in nearly real time. Depending on the length of time, the nature of the edits, or other factors, the edits may be contiguous or discontinuous. For instance, a contiguous edit can be an edit that does not span unedited content while a discontiguous edit can span unedited content. As a specific example, if the prior version of the content was "The fox jumped the dog" and the current version was "The quick brown fox jumped over the lazy dog", then the difference would be: "quick brown . . . over . . . lazy", which is a discontiguous edit because there is a gap of unedited content between "quick brown", "over", and "lazy". But each of those portions, taken alone, would be contiguous edits. In some instances, discontiguous edits are broken up into contiguous edits and processed individually. Though there may be exceptions. For instance, if the prior content was "tipewrighter" and the current content was "typewriter", then the difference would be "[[i]]y . . . [[gh]]". If the same rule as above were applied, then it would be decomposed into two contiguous edits ("[[i]]y" and "[[gh]"). But it may be useful to consider sufficiently small discontiguous edits as being a single edit because they may more accurately reflect a single edit, such as correcting the spelling of a word (as is the case here).

Operation 208 includes accumulating multiple edits to form an edit. For example, the method 200 may detect an edit and then wait a predetermined amount of time (or until an event occurs, such as saving, detecting a change in focus, detecting a change to a different region, or detecting that the edit reaches a level of significance) to see if one or more additional edits have been received to a region of interest. Then, after a threshold amount of time has passed or the event occurs, the entirety of the changes to content during that period can be considered the edit.

In the text context, edits often include one or more insertions, deletions, replacements, or movements of the text (e.g., source code or prose), whether on an individual character level or on a whole word or multiple character level. In the two-dimensional visual context, edits often include one or more insertions, deletions, replacements, or movements of one or more pixels, whether on an individual layer level or across multiple layers. But edits can include other changes, such as modifications to appearance of pixels (e.g., by editing levels, applying filters, modifying opacity). In the three-dimensional visual context, edits often include one or more insertions, deletions, replacements, or movements of one or more vertices, edges, faces, curves, or other components, whether on an individual model level or across multiple models or an entire scene. But edits can include other changes, such as modifications to appearance of models, materials, textures, light sources, or ambient effects, among others. In the audio context, edits often include one or more insertions, deletions, replacements, or movements of one or more sounds, waveforms, or other components, whether on an individual model level or across multiple tracks or an entire file. But edits can include other changes, such as modifications to volume, panning, or other effects. A person in ordinary skill in the art will understand the kinds of edits applicable to other kinds of content and further kinds of edits applicable to the above-described content. In some examples, the definition of edit is configurable by a user (e.g., the user may want authorship checking for only newly created content rather than edits to existing content or vice versa). Following operation 202, the flow of the method 200 can move to operation 210.

*Example Method—Determining a Source of the Edit*

Operation 210 includes determining a source of the edit. The source can be, for example, an anthropogenic source (e.g., a human), a technogenic source (e.g., an artificial intelligence), or another kind of source (e.g., an unknown source). For instance, this can include determining that a human user of the content editor 12 made the edit. Manual edits include the product of a human developer and have human authorship. Manual edits can be contrasted from artificial edits or AI edits, which can be the product of artificial intelligence, such as generative artificial intelligence. The operation can also include determining that an artificial user or generative tool has made or is otherwise responsible for an edit to the content 14 within the content editor 12.

In examples, certain automated or artificial actions may nonetheless be classified or considered as having a human source (e.g., be manual edits) rather than being considered to have an artificial source. For instance, certain automated actions (e.g., executing a find-replace action, sorting a list, applying a blur to an image) may be artificially performed but be manually started. In other words, although an action is artificial, it may nonetheless have been initiated by a human.

In examples, certain automated actions may include actions or features, such as autocorrect (e.g., automatically changing a common misspelling to a word that is believed to be correct), spell check (e.g., automatically or manually changing or suggesting one or more words to replace text), predictive text (predicting a next text based on prior text), autocomplete (e.g., a prediction of a rest of a word, line, phrase, or other logical grouping), code completion (e.g., suggesting variables, functions, classes or other components based on a current context or namespace), find-replace (e.g., automated bulk renaming of a find string to a replace string), automated refactoring, other features, or combinations thereof. Whether and to what extent such features are manual or AI edits may depend on predetermined user or organization-specified preferences. In some examples, such automated actions may be considered to have a human source even though they may be artificial. In other instances, they may be considered to have an artificial source. In addition or instead, a significance of the changes or the human involvement may be determined and used to decide the source of an edit (e.g., manual), artificial (e.g., by an AI), mixed, or unknown. Certain of the above features may be fairly classified as either human- or artificially generated depending on the context and implementation. For instance, a human accepting simple autocomplete prediction of the rest of the word, phrase, or even line or sentence may be considered as a human edit depending on preferences and sophistication of the underlying implementation.

In an example, this operation 210 can include operations 212, 214, 216, and 218.

Operation 212 includes determining that the content editor 12 received one or more edits to the content 14 via a human interface device of a computing environment associated with the content editor 12. Such human interface devices can include one or more mice, keyboards, touch screens, microphones, drawing devices, or motion controllers, among others. Detecting the receipt of content or an edit to content over a human interface device can be done using any of a variety of known key or other input logging or monitoring techniques. Many content editors 12 or operating systems on which content editors are run have application programming interfaces or other techniques that can detect keypresses of a keyboard or other input from a human interface device. Responsive to determining that the one or more edits are via a human interface device, the edit can be considered a manual edit. In addition, if an edit is received and it is determined that a human interface device was not used to produce the edit, then that can be a factor in determining that the edit has an artificial source.

In addition, it can be determined whether a feature of the content editor 12 was activated by human or artificial input. For instance, the content editor 12 may have human-actuatable user interface elements or artificially actuatable functions (e.g., via an application programming interface) for causing an edit to occur to the content 14. The content editor 12 may detect what caused that edit to occur. If the user interface element was actuated by a human interface device (e.g., the click of a mouse), then the edit to the content 14 caused by the actuation may determined to be a manual edit even though a simple click might not otherwise be sufficient to produce such an edit. But the authorship of the resulting edit may also be affected by a significance of the contributions to the edit. For instance, a human clicking a button to perform a sufficiently deterministic action (e.g., changing a format of content, changing the ordering of content or taking another sufficiently low entropy action as described elsewhere herein) may be enough for the resulting edit to have human authorship. But if a human clicks a write-my-essay-for-me button, the human's contribution may be determined to be insignificant compared to the output and the resulting edit may be considered artificial. Similarly, if the user interface element was actuated by artificial input (e.g., artificial mouse movement) or function calls (e.g., an AI agent calling an API), then the source of the edit can be determined to be artificial.

Operation 214 includes determining whether the edit is characteristic of a manual edit or an artificial edit. In some examples, a size or manner of an edit is used to infer that the edit is a manual edit (e.g., authorship of the content is human). For instance, a human typing on a keyboard may tend to enter text or make changes a single character at a time (e.g., because the user is usually pressing one key at a time). As discussed elsewhere herein, a human may tend to make spelling mistakes, make edits to content in a bursty manner (e.g., because the human author pauses to think after writing a segment of content), and go back and make changes to recently provided content, among other human tendencies, while artificial authors may tend to provide input in a different but characteristic manner. An algorithm can be trained or developed to usefully distinguish human or artificial authorship based on the presence or absence of such features when analyzing a way in which content is input. Similarly, content generally entered in blocks that correspond to more than one character (e.g., on a token level) may be inferred to be artificial edits. Further, a malicious actor may use a device that spoofs a keyboard (or other human interface device) and that is used by a program to automatically enter content via the spoofed keyboard. In such a manner, artificial content may be entered via a virtual or physical device purporting to be a human interface device. Analyzing the typing style may be used to detect such attempts at spoofing human input because the way in which humans type is often different from how an artificial user would type (see also FIG. 45, below, for additional discussion of detecting human versus artificial content notwithstanding typing style). Although a malicious actor may deliberately slow down artificial input, insert errors, or otherwise attempt to mimic human input styles, such a result may beneficially adjust the cost-benefit ratio of using artificial content generators to discourage attempting to spoof human content with them.

In other examples, more sophisticated techniques can be applied. For example, a machine learning algorithm can be trained or another algorithm can be used to identify a source of one or more edits as being human or non-human based on a manner in which edits are made. For instance, a human may tend to make spelling mistakes, make edits to content in a bursty manner (e.g., because the human author pauses to think after writing a segment of content), and go back and make changes to recently provided content, among other human tendencies. Likewise, artificial authors may tend to provide input in a characteristic manner. A machine learning algorithm can be trained to identify human or artificial authorship based on the presence or absence of such features when analyzing a way in which content is added to the content editor (e.g., using techniques described in relation to FIG. 5). Further, a speed at which content is provided can be used to infer authorship. A human may tend to have particular average or maximum speeds of editing content, which may be different from (e.g., in some instances, less than) that of a generative artificial intelligence. Responsive to determining that the edit is characteristic of an artificial author, the edit can be considered to be an artificial edit. Responsive to determining that the edit is characteristic of a human author, the edit can be considered to be a manual edit.

In another example, sensors can be used to determine whether an edit is characteristic of a manual edit or an artificial edit. For instance, a user may be wearing a smart watch, smart headphones, or other device having sensors. Such a device can detect movement (e.g., wrist movement) characteristic of a human manually entering input (e.g., typing, tapping, swiping, or otherwise interacting). Biometric data can be obtained and used (e.g., heart rate, neural activity, or other biometric data). Likewise, a computer, wearable device, or a peripheral thereof (e.g., a keyboard or mouse) may include a sensor (e.g., a microphone, a camera, or a motion sensor, such as an accelerometer, gyroscope, or force sensor) that can produce data indicative of manual creation of an edit. In some examples, a user is wearing a virtual reality, augmented reality, mixed reality or another kind of headset that has sensors that track or otherwise produce data regarding the wearer's eyes. Such data can be obtained and used to determine whether the source of an edit is human or artificial. For instance, the user may have a certain quantity or quality of eye movement or pupil dilation characteristic of making a manual edit (e.g., as opposed to observing an artificial edit being made). In some examples, an algorithm can be trained on sensor data during manual and artificial edits and then subsequently used to facilitate the determination of a source of an edit (e.g., using a process similar to that described in FIG. 11).

Operation 216 includes determining whether a generative artificial intelligence is active. Artificial intelligence features may be active or being used to provide the edit. Whether an artificial intelligence is active can be explicitly or impliedly determined.

In some examples, an artificial intelligence feature of a content editor identifies itself to an authorship engine or otherwise makes edits explicitly as an artificial author. In some instances, just as there are human interface devices, a content editor may programmatically or otherwise define artificial interfaces over which an artificial intelligence edits content. The authorship engine can determine that content received over such an interface has an artificial source.

In examples where artificial intelligence features are hosted remotely from the computing device or development environment, querying whether artificial intelligence features are being used may include monitoring submissions to a remote API or responses thereto, monitoring usage at a user account associated with the generative artificial intelligence, other actions, or combinations thereof. In examples where artificial intelligence features are integrated into the content editor, querying whether artificial intelligence features are being used may include analyzing one or more settings of the content editor, environmental variables of a development environment, surveying installed features or capabilities on the computing device, or monitoring resource usage of such features at the computing device.

In another example, computing resources can be monitored to infer whether an artificial intelligence is being used near in time to when edits are being made. For instance, large language models and other sources of artificial authorship often consume large amounts of computing resources (e.g., memory, CPU cycles, and/or GPU cycles). The consumption of such resources can a factor that indicates that an edit has an artificial source. In addition or instead, computing processes can be identified and used to determine a source of authorship. For instance, operating systems often include commands that permit the listing of running processes (e.g., the ps command in LINUX-based operating systems or the task manager or the GetProcessList function in WINDOWS). The list of running processes can then be analyzed to determine if a process is a known process for running or accessing large language models or other artificial authorship tools. Such a process running can be used as an indication that an edit has an artificial source.

Operation 218 includes determining whether a sensor is used to produce the edit. Many examples herein are described in the context of content being authored by a human versus content being authored by an artificial intelligence. However, in some examples or uses, a more relevant inquiry is whether the content is artificially produced or produced by a sensor capturing real-world data. For instance, authorship tokens 18 can be used to track whether content is an authentic auditory or visual record of an event versus an artificially generated one.

Determining whether a sensor is used can include determining whether the content was obtained by calling one or more functions of a class or framework associated with an operating system of device for obtaining audio or visual content from microphones and cameras of the device. This can include authenticating sensor data using standard protocols (e.g., Content Authenticity Initiative's C2PA digital signature system) or vendor-specific protocols (e.g., camera-manufacturer specific watermarks or digital signatures). Responsive to authentication the sensor data, then it can be determined that a sensor was used to produce the edit.

Determining that the source of the edit is artificial can result in the edit being considered an artificial edit. Determining that the source of the edit is manual can result in the edit being considered manual. In some examples, there can be a default assumption that all edits have a human source until proven otherwise or that all edits have an artificial source until proven otherwise. Rebutting that assumption can involve determining a source score, determining whether the source score satisfies a threshold, and then rebutting the source assumption based on that threshold being satisfied. The factors involved in determining the source score can be those discussed above and elsewhere.

Figure 2E:
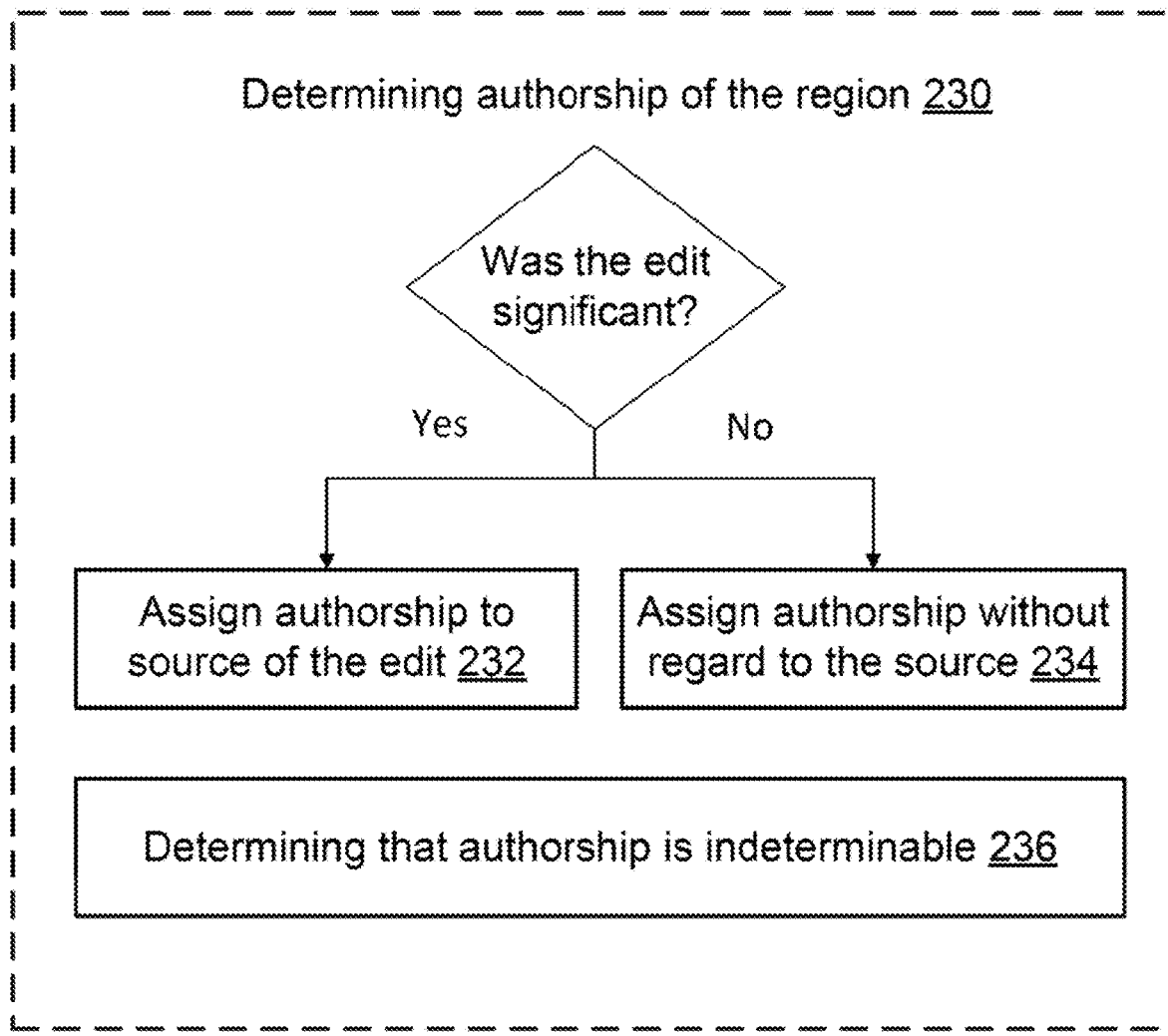

Following operation 210, the flow of the method 200 can move to operation 220, which is shown in more detail in FIG. 2E.

Example Method—Determining Whether the Edit Satisfies a Threshold of Significance Operation 220 includes determining whether the edit satisfies a threshold of significance. The threshold of significance can be with respect to a region that was edited. In some examples, the operation 220 can be performed with respect to a lower-level region and then repeated for higher-level regions (e.g., after operation 240). For example, the edit may be to a line of source code. The threshold of significance can be determined with respect to that line of code and then subsequently to higher level regions, such as a function, class, or entire file. An edit may reach a level of significance for one region but not for others.

While in some instances, any level of edit can be sufficient to cause an authorship token 18 to be added or modified, in other examples, a threshold of significance may need to be reached. In examples, the threshold of significance can be a proxy for an amount of significance likely to make the code human authored rather than authored by a generative AI or vice versa. In some examples, the threshold is set by a policy of a user or organization. In some example embodiments, the significance threshold may differ depending on the type of content being created. For the creation of a new line of code or other new content, this can be relatively simple and can often be resolved by determining the authorship of the edit (e.g., a manual or artificial edit). In some examples, an edit can have no authorship until a level of significance is reached. For instance, in many circumstances, the creation of a new line may not be significant and thus may lack authorship until an author adds content to that line. In some examples, the modification of existing content (e.g., code initially created by a generative artificial intelligence) as opposed to the generation of new content can present more difficulty. In some instances, the edit is the accumulation of multiple edits that, on their own, are not significant but in aggregate are significant.

In addition to or instead of analyzing the significance of each individual edit, the significance of a collection of or a history of edits can be determined. For instance, the method 200 may detect an edit and then wait a predetermined amount of time (or until an event occurs) to see if one or more additional edits have been received to the region of interest. Then, after a threshold amount of time has passed (or a specific event has occurred, such as saving, compiling, running, or committing the code) since the last edit has been received, the method can analyze the collection of received edits for their significance with respect to the region. In an example, a comparison is made to the string of text before and after edits are received. In some examples, edits (or proxies thereof) can be accumulated during a session (e.g., in memory, in a buffer, in human authorship tokens, in log files, or elsewhere) and then upon saving, periodically during the session, or at another time, the accumulated edits and can be analyzed for their significance in their various regions and authorship tokens 18 are generated accordingly. In an example, keylogging or other tracking is performed to generate manual edits, then they resulting log is analyzed for significance, human authorship tokens 18 are generated, and then the log is deleted (e.g., to preserve privacy, free up space, or for other reasons). A comparison of the changes to the file 112 since the file was last saved (or at another point in time) can be made and human authorship tokens 18 are created, updated, or removed based on those edits. This can facilitate handling situations in which content is added and then removed, reduced, or significantly expanded, thereby improving the accuracy of the authorship tokens 18 in labeling content.

In some examples, the significance of edits can depend on the type of content in which the edits are made. For instance, significance of edits a creative context (e.g., narrative writing or source code comment writing) can be different from significance of edits suggestions in a functional context (e.g., source code writing). In an example, determining significance of an edit can be based on whether the content for which the edit is being made is creative of functional. The type of content can influence relative thresholds, standards, or other values used in an authorship process.

Operation 220 can include operations 222, 224, 226, 227, 228, and 229.

Operation 222 includes determining that the edit changes more than a predetermined threshold number of or percentage of units of content (e.g., characters, tokens, words, phrases, sentences, variables, or other units of the source code, text, or a region thereof) have changed in a region. The threshold can be a configurable predetermined number. If the amount of content that changed satisfies the threshold, then the edit can be considered significant (or not be considered insignificant), otherwise the edit can fail to be considered significant (or be considered insignificant).

Operation 224 includes determining whether the edit is a functional or cosmetic change.

In the source code context, functionality of code can refer to aspects that how the code functions (e.g., changing a mathematical operation) rather than how the code merely looks or is expressed (e.g., refactoring a variable name, changing an order of arguments or variables passed to various functions, describing the code in a comment, and the like). A functional change can be a change that affects how compiled code is executed or how the code is interpreted by an interpreter. In examples, the determining can include determining that the edit is to a portion of the source code other than comments, with a comment delimiter being recognized based on the specific type of code or language in use within the development environment. Such determinations can weigh in favor of the threshold of significance being satisfied. The change being functional or cosmetic may be more easily determinable in the source code context than in narrative documents.

In the narrative content context, a change can be determined to be to the function of a word, sentence, paragraph, or other region for the purposes of this analysis if the meaning of the region changes. For instance, adding "un" to "believable" changes the meaning of the word. Likewise, changing "the rock is big" to "the rock is small" changes the meaning of the sentence. But changing "the rock is giant" to "the rock is massive" might not be considered to change a meaning of the overall sentence. In an example, a natural language processing library or a large language model is used to determine whether the meaning has changed and a significance of the change of the meaning. In an example, a difference in meaning between words is determined by comparing a distance between the words in an embedding space (e.g., using cosine similarity). In addition or instead, a cosmetic change to narrative text can include changes to the appearance of the text without changing its explicit meaning (e.g., font, font size, font color, or other changes to appearance).

In certain instances, one or both of cosmetic and functional changes can be important to authorship. Their relative importance in the analysis can be configurable. The use of embedding space is further discussed below in relation to FIG. 12.

Operation 226 includes calculating a significance score. If the significance score satisfies a threshold, then the edit can be considered significant. Calculating the significance score can take any of a variety of forms. In an example, calculating the significance score includes performing one or more of the following operations and using an associated output thereof: determining whether one or more comments have been modified; determining whether one or more non-comment code portions have been modified (e.g., changes to comments may be considered to be relatively less significant than changes to non-comment portions); determining whether an operation has changed from a first operation to a second operation (e.g., because changes to operations can represent a higher level significance); determining whether a variable has been changed from a first variable to a second variable (e.g., because changes to variables may represent a higher level of significance); determining whether a functionality of the code has changed (e.g., which may have a higher level of significance); determining whether a cosmetic or readability change to the code has been made (e.g., which can have a relatively lower amount of significance); determining whether the manual edit includes pasting (e.g., relatively less significance or ambiguous depending on whether the provenance of the pasted content is known); determining whether the manual edit includes moving code; determining an amount of AI assistance used; determining an amount of development environment assistance used; and determining whether the code has been refactored. For instance, each answer to one or more of the above can be associated with a weight or score. The sum or another use of such weights or scores can be compared the threshold of significance. The relative weights or scores can be customized according to user or organizational preferences. In some examples, the significance of manual edits is compared to the significance of generative artificial intelligence edits (e.g., which may be calculated using the same or similar criteria). In some examples, the above can be provided as input to a machine learning model trained to provide an output indicative of significance.

In an example, the significance score is based on a distance traveled in embedding space as a result of the edit. For instance, where the edit is a change from one word or token 18 to another, the prior word and the new word can be represented as embeddings in embedding space and the distance between the two in embedding space is used as the significance score. Where the edit is to more than one word, embedding space can still be used. In an example, the words can be clustered into a prior cluster and a new cluster. The distance used for significance can be a distance between the clusters (e.g., distance between centroids thereof). In addition or instead, where the edit is the addition of a word, the significance can be measured based on how the addition of the word changes a location of a centroid of a cluster of words.

In some examples, the significance score is based on one or more calculations, such as one or more of: predictability calculations, creativity calculations, and entropy calculations, which are discussed in more detail below.

Operation 227 includes using sensor data to determine significance, such as the sensor data described above in relation to operation 218. For instance, biometric data of a person (e.g., the author or an observer) may respond differently depending on whether they are observing a significant edit or an insignificant edit (e.g., pupil dilation, eye motion, or heart rate) may vary depending on whether an edit is significant because of how a person is processing or reading the edit.

Operation 228 includes accounting for the generative artificial intelligence's prompt or other input provided in the generation of the content by a generative artificial intelligence. For example, the artificial intelligence may be sufficiently constrained by the prompt, surrounding context, or human input that the resulting content should be considered to be authored by a human even if produced by an artificial intelligence. In some examples, the significance can take into account a level of intelligence or creativity of the artificial intelligence used to produce content. For example, different kinds or levels of artificial intelligence or content assistance can be graded with different levels of intelligence and treated differently for the purposes of authorship depending thereon. For example, content produced by simple assistive features like spell check, autocomplete (e.g., finishing a word based on what a user already began typing), or rudimentary intelligent code completion (e.g., suggesting functions or variables for selection or confirmation by a user based on code scope) may be considered to be produced by a human author even though such features may include relatively sophisticated levels of artificial intelligence. The threshold required to be met for content produced by such systems may be relatively low or even nonexistent. By contrast, more sophisticated intelligent systems like GITHUB COPILOT may be considered as setting a higher threshold for human authorship. Some assisting programming tools may allow for configurable levels of help and the greater the amount of judgement or creativity taken on by the assistive feature, the greater the threshold of author involvement there may need to be for human authorship to be considered to have taken place. In some examples, prompts used to generate content can be stored in association with the authorship token 18 and used to demonstrate sufficiency of creativity or lack thereof. Such prompts can be stored in a same location as the authorship tokens 18 or in a separate location.

In some examples, accounting for the prompt can include accounting for an amount of correspondence between the prompt and the resulting content or edit. For example, if there is a sufficient amount of control present in the prompt that constrains the output, then the output can be considered to have authorship that matches the authorship of the prompt (e.g., human authorship if the human wrote the prompt). But if there is not a sufficient amount of control, then the authorship of the resulting content can be determined to have artificial authorship. In an example, an amount of control can be tied to the temperature of the artificial intelligence (e.g., large language model) used. A sufficiently low temperature (e.g., a temperature below a threshold) can lower an unpredictability of the output to such a point that authorship remains with the author of the prompt.

Operation 229 includes accounting for one or more of: predictability, creativity, and entropy.

Operation 229 can include accounting for predictability of an edit. For example, the predictability of an artificial or human suggestion in response to existing content can be analyzed to determine its significance. For instance, given existing content authored by a human (e.g., "it was a . . . "), an artificial author reads that existing content and generates a suggestion (e.g., " . . . dark and stormy night") for the next content that continues the existing content. A question relevant to significance can be: how predictable was the next content? If the process of reading the existing content and generating the suggestion for next content were repeated one-hundred times, what is the distribution of the results? Continuing the above example, the majority of the suggestions may be "dark and stormy night", but some suggestions may have been "good day", "pleasure to meet you" or "pleasure to burn". The lack of predictability can arise for any of a variety of reasons. A common source of unpredictability is the temperature setting of the artificial author. Large language models and other artificial authors often have a temperature setting that injects randomness into the next selected tokens 18 to increase diversity and creativity of results.

Significance of an edit (and therefore authorship) can change depending on how much the input to an artificial author dictates a specific result. Where the temperature setting of an artificial author is zero or sufficiently low that the prediction of the next token 18 is otherwise nearly certain (e.g., has a predictability above a threshold), then that may be considered an insignificant edit because it is entirely predictable. As a result, the source of the edit can be determined to be its author; rather, the author of the content that influenced the suggestion may be determined to be the author of the edit even though it was not the source.

In many of the examples discussed above, predictability was discussed in the context of individual edits. However, in some examples, the predictability of all plausible edits or all presented edits (e.g., presented as suggested edits to be made by an editor) can be considered. For instance, there may be a situation in which there are two equally likely next tokens 18 (e.g., "she flipped a coin and it came up . . . "), but there is near certainty that the next token 18 will be one of those two tokens 18 (e.g., either "heads" or "tails"). The editor may determine to present both of those tokens 18 as suggestions and the user is permitted to pick from among those. In such an example, because the probability of the next token 18 being from among the presented possibilities is above the threshold, either suggestion accepted by the human author is determined to have human authorship.

While many of the examples above are focused on predictability of prose text, they need not be so limited. For example, a user may activate a feature of an editor that causes all selected lines to be indented a certain amount. Because that feature is entirely predictable (e.g., the change to the text content always be the same), the author performing that change (e.g., an artificial author of the editor) does not have authorship over that change. Rather, the individual that caused that change to happen (e.g., a human) would be considered the author of that change. But, that change may not be significant with respect to the underlying content of the lines, so the authorship of the lines may not change anyway. Other examples of such a predictable change includes changing the case of a region (e.g., to uppercase, lowercase, camelCase, kebab-case, snake_case, Sentence-case, other cases, or combinations thereof). Another example of a more complicated but still predictable change is a request to an AI coding copilot to change a local variable to a global variable. Such a change may include more steps (e.g., deleting the local variable definition, creating the global variable in upper snake case, and replacing all remaining original instances of the local variable with the global variable), but such a change is predictable from the instruction that the author gave to the AI coding copilot, so there would be no authorship change or the author instructing the AI coding copilot would have authorship.

Operation 229 can include accounting for creativity. In an example, a creativity score can be calculated for tokens of a work. Portions of the work through a token predictor for predicting a next token of the work. The actual next token in the work can be compared to the probabilities of the next tokens from the token predictor. Then probability assigned to the actual next token can be inversely proportional to the creativity of the actual next token. In other words, if the token predictor assigned the actual next token as having a high probability of being next, then the actual next token is rather uncreative. But if the token predictor assigned the actual next token as having a relatively low probability of being next, then the actual next token is rather creative. While creativity is typically difficult to quantitatively assess, the next token probability generated using token predictors is a concrete number, thus increasing the accuracy and predictability of the creativity score for given tokens.

In an example, the work may be the sentence: "You will rejoice to hear that no disaster has accompanied the commencement of an enterprise which you have regarded with such evil forebodings". The creativity can be calculated by providing a section of the work "You will rejoice to" to a next token predictor and observing what probability is assigned to the actual next token ("hear"). In that example, the prediction was made solely in the forward direction (e.g., asking what is the next token). In other examples, the prediction can be made in the backward direction (e.g., asking what is the previous token). In further examples, the prediction can be bidirectional (e.g., asking what is the masked token, such as "You will rejoice to [MASK] that no disaster"). In an example, the token predictor used is BERT by GOOGLE, though other token 18 predictors can be used.

The resulting creativity score can be used to determine significance. For example, where a suggestion has a creativity score that satisfies a threshold, then an edit accepting that suggestion can be considered to be significant, and the source of the suggestion can be determined to be the author of the associated edit. Where the suggestion has a creativity score that does not satisfy the threshold (e.g., the suggestion is highly predictable), then the associated edit can be considered insignificant (e.g., resulting in the author of the context for which the suggestion is made being determined to be the author of the associated edit).

In examples, operation 229 can include accounting for entropy. Entropy is discussed in more detail below, including in relation to FIG. 35.

In some examples, operation 220 includes operation 1700, which includes determining the significance based on a suggestion associated with the edit. Operation 1700 is discussed in more detail in association with FIG. 17, below.

Following operation 220, the flow of the method can move to operation 230.

Example Method—Determining Authorship of the Edited Region

Operation 230, which is shown in more detail in FIG. 2E, includes determining authorship of a region associated with the edit. In an example, this can be based on whether the edit is significant. For instance, operation 230 can include operations 232, 234, and 236.

Operation 232 includes assigning authorship of the region to the source of the edit responsive to the edit satisfying the threshold of significance as determined in operation 220. In other words, the author of the region is the source of the significant edit to the region.

Operation 234 includes assigning authorship of the region without regard to the source of the edit. This operation 234 can further include determining that the author of the region is other than the source of the edit responsive to the edit lacking significance as determined in operation 220. Determining the author when the author is other than the source can include determining that the author is the same as an already assigned author. For instance, if the region is already associated with a particular author (which may happen to be the same as the source of the insignificant edit) and an insignificant edit is made to the region, then the existing author can be determined to be the author. In examples, the author can be determined to be an author of a nearby region (e.g., a preceding or following region). For instance, if the region has artificial authorship and an insignificant edit to the region is made by a human, then it can be determined that the authorship of the region remains artificial. If an insignificant artificial edit creates a new region between two human regions, then the authorship of the region can be determined to be human based on the surrounding regions. Authorship can be determined at any of a variety of levels.

Operation 236 includes determining that authorship is indeterminable. For instance, the source may be unknown or sufficient knowledge may not have been obtained to make a determination having more than a threshold amount of certainty. Determining authorship can include determining a class of author, such as human or artificial. The operation 230 can be performed responsive to determining that the edit satisfies the threshold of significance as determined in operation 220. Following operation 230, the flow of the method 200 can move to operation 240.

Example Method—Ensure Presence of Correct Authorship Token

Operation 240, which is shown in more detail in FIG. 2F, includes ensuring the presence of a correct authorship token 18 in association with the region. The authorship token 18 can have a predetermined form indicating that a human rather than an artificial intelligence is the author of the region of content or indicating that an artificial intelligence rather than a human is the author of the region of content. Ensuring the presence of the authorship token 18 can include, for example, applying a new authorship token 18 in association the region, retaining an existing authorship token 18 in association with the region, or removing an inconsistent authorship token 18 from association with the region. The operation 240 can be performed responsive to determining that the region associated with the edit lacks an authorship token 18 or lacks an authorship token 18 consistent with the author of the edit.

Operation 240 can include operations 241, 242, 244, 246, 248, and 249.

Operation 241 includes determining that a region associated with the edit lacks an authorship token 18. This operation can include searching contents of the region of interest for the authorship token 18 itself (e.g., using regular expressions configured to find regions of content having a format associated with authorship tokens). This operation can include determining the one or more regions in which the significant edits were made. The region can take any of a variety of different forms depending on a level of granularity desired by a user. Where the content of the text being edited is source code, the region can include forms such as: a line of source code, a lexical scope, a function level, a class level, a file level. Where the text is prose (e.g., including narrative content and as opposed to source code), the region can take the form of a word, sentence, paragraph, page, chapter, section, or entire work. Where the text is poetry, the region can take the form of a word, sentence, paragraph, line, meter, verse, or other logical format. In other examples, this operation need not be performed. The creation of a new authorship token 18 need not be dependent on the lack of a previous token 18. In some examples, multiple tokens 18 can be created that relate to the same or overlapping content. Later, the combination of the contribution (e.g., as expressed by the presence of or content contained within the multiple human authorship tokens) can be assessed to determine whether an overall work reaches a threshold of human or artificial authorship. In some examples, a prior authorship token 18 is updated or preserved based on the content of the edit and whether the author of the edit differs from existing authorship tokens 18.

Operation 242 includes including a portion of a creative work. This can be done to add a copyrighted work to the content to enhance the copyrightability of the content. Including the portion can include accessing a library of creative works that the editor has access to and permission to use. The creative work can be a creative work that is owned by the user or an employer of the user. A snippet of the creative work can be copied and added to the authorship token 18 or added in association with a line of code to which the authorship token 18 is present. The creative work can continue across multiple human authorship tokens 18. For instance, the portion of the creative work is a continuation of a prior portion of creative work part of a prior authorship token 18. In an example, when an authorship token 18 is added between two existing human authorship tokens, the corresponding portions of the creative work are automatically updated so they flow in the correct order. In some examples, the creative work can be appended to even that content that was not authored by a human. The addition of such creative work could be used to demonstrate the copyrightability of the source code. For instance, a first authorship token 18 may include "Lorem ipsum dolor sit amet", a second may continue "consectetur adipiscing elit", a third may continue further "sed do eiusmod tempor", and so on, where the standard Lorem Ipsum passage is replaced by a copyrighted work of the author or an organization of the author. In some examples, copyrighted works are added only to regions associated with artificial authorship tokens 18 and not human authorship tokens 18. In other examples, they are applied regardless of whether human or artificial authorship is specified.

Operation 244 can include adding one or more features to resist mimicry or tampering. A potential challenge is that once generative artificial intelligence learns that humans tend to put human authorship tokens 18 in their text (manually or automatically), the generative artificial intelligence will add those human authorship tokens 18 too. Further, a malicious human might manually add a human authorship token 18 content that an artificial intelligence wrote or add an artificial authorship token 18 to content that a human wrote. The features used to resist mimicry can take any of a variety of forms. In one example, the authorship token 18 (or characteristics thereof) can be added to or derived from an exclude list for the generative artificial intelligence associated with the editor 12. Thus, the generative artificial intelligence would resist producing such tokens 18 because it is prohibited from doing so. In some examples, authorship tokens 18 are removed from training data or context data prior to their use with an artificial intelligence.

In another example, the authorship token 18 can include a hash, optionally signed by a private key. The hash can be of the region, the manual edit, or another useful item that is optionally salted with a private or hidden value to resist reverse engineering. Based on the nature of hash functions, it would be difficult if not impossible for the generative AI or a malicious human to learn the hash function (and salt) used or the input to the function that produced the given result. Thus while an artificial intelligence may learn to produce something that looks like a hash, verification of the mimicked hash would fail because the mimicked hash was not produced according to a predetermined method that produces verifiable hashes. In some examples, the authorship token 18 can be cryptographically signed by a key associated with the authorship token instructions or a program running an authorship engine. Beneficially, this could resist even a human attempting to tamper with the human authorship tokens 18 (e.g., by copying and pasting existing human authorship tokens 18 into regions lacking them) because reproducing the signature would be difficult or impossible for the human to do. In some examples, the resisting can occur during or in response to user saving, running, or compiling the file or at another predetermined time or every time an authorship token 18 is added. At that time, a hash of the region can be taken and put into the human authorship token 18. Waiting until a predetermined time can decrease an amount of resources consumed and ensure that the user is sufficiently done editing before creating the hash.

In yet another example, the content editor 12 can prohibit or prevent the direct modification of authorship tokens 18 by human or artificial authors. In an example, only the content editor 12 (or another program running the authorship token instructions 110) is permitted to modify the authorship tokens 18. For instance, an authorship token 18 portion may be encrypted or otherwise locked by the content editor 12 or the another program. In some examples, the direct modification of authorship tokens 18 is at least partially permitted but tampering is detectable. For instance, the content editor 12 or the another program can generate a signed hash of the authorship tokens, another portion of the content, or the entire content. Then that hash can be used to detect tampering with the file or otherwise provide an indication that the authorship tokens 18 may no longer be accurate. In an example, a version control system or another program may deny saving or committing a file where the authorship tokens 18 are no longer accurate.

Operation 246 can include modifying additional regions. In some instances, although an edit is made to one region, other regions are also affected by the change. For example, an edit may involve combining or splitting regions. In another example, an edit to region corresponding to a single line of code may nonetheless affect authorship of a larger region (e.g., a function or class) containing that line of code. A function may include a function header (e.g., that includes definition of the function's return value type, the function's name, and the arguments that the function) and one or more lines of code in the body of the function, including a line with a return statement. A change to the one or more lines of code in the body may be significant enough to change the authorship of the entirety of the function, even if some portions of the function (e.g., the header) were written by another author or type of author. Likewise, an edit to a function may result in an entire class containing that function changing authorship if the edit is significant enough. So too might a change to a class or other region of a file cause an entire file to change authorship. Whether and to what extent authorship changes can be defined by parameters and can be determined in a similar way that an edit's significance is determined (see operation 220, above). Further, even if the edit to one region is not sufficient to change the authorship of a higher-level region, it may be sufficient to cause the higher-level region to indicate mixed authorship and to mark other regions at the same level as the one to which the edit was made as having particular authorship. For instance, an entire class may be authored by an artificial intelligence and there can be an artificial authorship token 18 proximate the class definition to indicate that the entire class is authored by an artificial intelligence. Lower-level regions (e.g., class variables, class functions, and individual lines of code within those functions) may lack authorship tokens 18 (e.g., to avoid visual clutter because authorship is already described by the class). If a different author modifies a lower-level region of that class, that lower-level region can be updated with an authorship token 18 corresponding to that author. In some examples, authorship tokens 18 are not applied other regions under that class because it can be assumed that non-labeled regions have a same authorship token 18 as a parent region. In other examples, such other regions are labeled with authorship tokens 18 corresponding to their parent region.

Operation 247 includes sending a communication to another system, such as by providing the information to a server or calling an application programming interface associated with a server or another program regarding one or both of the edit or the authorship token 18. The server can be a remote device that logs authorship of contributions to source code. The server could store authorship tokens 18 directly or store additional information regarding an authorship token 18 stored in the file 112. Storage by the receiving server or program may be accomplished through creation of a log file 114 as described above, through storage in a database (such as SQL-server, Postgres database, MongoDB, Oracle database, or any such similar tool), or any other known file 114 and data storage system. Such system could be local or remote to the receiving server or program. Though often referred to herein as being a single file for convenience one or both of the content file 112 and the log file 114 can be broken up into multiple separate files or collections of files.

In an example, the other system may be a distributed system. One or more aspects of the authorship token and code itself can be captured and stored in a shared network via blockchain, other distributed ledger, or another shared network. The blockchain can be a public or private blockchain. In an example, the public blockchain is a blockchain maintained by a government agency or other organization configured to store authorship, ownership, or other factors. Code repositories can have a distributed ledger that tracks authorship tokens or other aspects of the relevant code. Confirmed authorship (e.g., human or artificial intelligence authorship) and associated proof can be added. In some examples, content (e.g., code) itself is stored on a blockchain, stored using a Merkel tree, or stored in another manner that resists tampering. For instance, each node in a block chain can be or correspond to a version of the file to resist the ability of someone to remove or modify authorship tokens. In addition or instead, the content can be added to a database.

In an example, each block in a blockchain or other similar data structure is used to track versions, authorship of content, or the content itself. Each block can include a hash representing one or more prior nodes. Blocks could additionally be signed by a server or something to resist rewriting from nodes or chains from scratch or otherwise tampering with data. Then the chain can be analyzed to determine the provenance of content with respect to authorship. In an example, such a system could be useful for situations of less trusted contribution. A blockchain or similar structure or process could be used for consensus for whether content is human or artificially authored. An entity can provide a blockchain with a commit to show the how the author got from the original content to the content of the commit. Manual changes to content can be tracked using blocks in a blockchain or similar structure.

In an example implementation, as part of a file-save routine, an associated program stores locally or sends something to a server, distributed ledger, or smart contract that keeps track of, among a variety of different files under management, information about authorship of the files. For instance, of X different files under management, they average Y % human authorship and Z % artificial authorship. Information can also be tracked on a per user basis, such as that of the files that user ABC creates, there is a statistical breakdown of how much AI they use or do not use. The information can be aggregated and analyzed to determine useful information, such as what kinds of functions tend to be AI generated versus human authored, the provenance of errors or bugs or security problems and trace back to what kind of author wrote it. Such trends can be used to identify deficiencies in AI capabilities or training and an AI can be trained (e.g., on the human data) to ameliorate the deficiencies.

Operation 248 can include adding the authorship token 18 to a separate file 114. In such examples, the authorship token 18 is not added directly to the file in which the manual edits are made (e.g., which stores the content). In some examples, the authorship token 18 is added to a separate file, such as a log file, that is in association with the file being edited. The separate file 114 can have a portion associated with the region. The authorship token 18 in the file 114 can be produced such that one is able to determine which region of the file 112 has human authorship. For example, the log file 114 could include one line for each line in the content file 112 and list authorship information, line for line. In another example, the log file 114 could reference lines in the content file 112 by line number and provide authorship information for each line of the content file 112 that contains text. In another example, the log file 114 could refer to regions of content in the content file by title, description, number, name, or other signifier based on the content to provide details of authorship for the given region. This log file 114 may be stored as simple text, XML file, JSON file, tab-delimited file, comma-delimited file, rich text file, image file, PDF file, or any of hundreds of program-specific file implementations such as Microsoft Word document, Microsoft Excel file, or the like.

Operation 249 can include adding the authorship 18 to a same file storing the content. This can include storing the authorship token within the content or within a same file but separate from the content.

Regarding storage within the content and within the same file as the content, the content may be in plain text form with the authorship token being plain text intermingled with the content. For instance, the content may be source code and the authorship token may be stored within a comment or other portion of the source code. In an example, the authorship information is prepended or appended to the beginning or end of the file, respectively.

Authorship tokens may be stored in a same file that stores the content being labeled but without being stored within the content being labeled. For instance, a file format of the file may store not only content itself but also formatting (e.g., text formatting, such as font, size, boldness, style, and other information) or other information about the content using tags (e.g., XML tags) separate from the text of the content. So too may the authorship token be stored separate from the content (e.g., text content) being labeled. For instance, the file format for the file storing the content may include one or more tags associated with authorship that can be used to store the authorship tokens. The authorship tokens can be stored separately from the content in the sense that content is stored in the file in a first manner and authorship tokens are stored in a second manner such that first and second manners are different (e.g., as opposed to authorship tokens being stored in association with plain text content). For instance, the content can be stored in a first manner and the authorship tokens can be stored in tags having special names or characteristics distinguishing itself as describing authorship tokens rather than the content being described. In an example, the storage of authorship tokens separately from the content is such that, during normal viewing of the content with a content editor, the authorship tokens are rendered or otherwise represented different from the content they describe.

Operations 247-249 need not be mutually exclusive and may cooperate. In some instances, the authorship tokens can be stored in multiple different locations or in multiple different ways (e.g., for redundancy, security, auditing, or other purposes). Further, different levels of detail or kinds of authorship tokens may be stored in different places. For instance, a first authorship token may be or include a key or other identifier that is used to find a second authorship token stored on a server, and the second authorship token may include additional detail beyond the first authorship token (e.g., to save space locally or to resist tampering).

In some examples, one or more authorship tokens can be stored within a secure or trackable way in association with the content. In an example, one or more authorship tokens are stored by binding the one or more authorship tokens to the content using hard bindings, soft bindings, C2PA manifest, or other techniques including those described in the COALITION FOR CONTENT PROVENANCE AND AUTHENTICITY Technical Specification 2.1 or a subsequent or prior version.

In some examples, following operation 240, the flow of the method returns to operation 220 to determine whether the edit reaches a threshold of significance for a different region (e.g., a higher-level or lower-level region). For instance, whether the change to a line reaches a threshold of significance for a function, class, or file. Or whether a change to a sentence reaches a threshold of significance for a sentence, paragraph, section, or document.

Example Method—Additional Operations

Figure 2G:
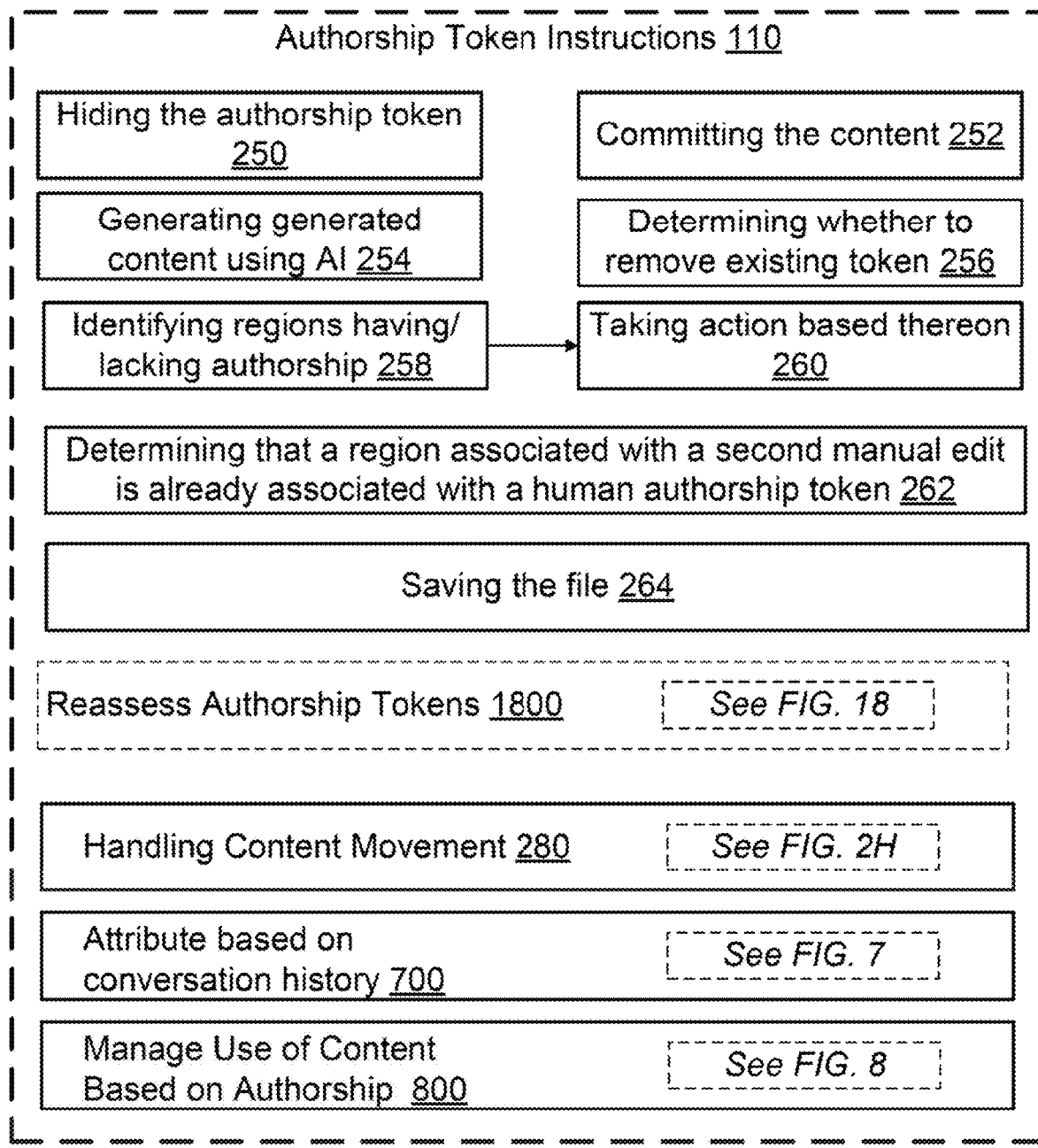

In some examples, the method 200 includes additional operations, including those shown in FIG. 2G. Such operations include operations 250, 252, 254, 256, 258, and 260, and method 1800, among others.

Operation 250 includes hiding authorship tokens 18. The authorship token 18 can be hidden to, for example, preserve that information but resist distracting a user or resist tampering by the user. The authorship token 18 can be automatically collapsed by the content editor but can be expanded by the user on demand, if permitted by a policy. In other examples, a user may need to have sufficient permissions to expand or view an authorship token 18 within the content editor. The underlying content of the authorship tokens 18 may be hidden from the user by obfuscating them via encryption. An authorship token 18 can include a plurality of zero width characters that encode information (e.g., information described as being included in the human authorship token 18 elsewhere herein). In an example, the authorship token 18 are automatically hidden from the user by the content editor, but the authorship token 18 may nonetheless be accessible for updating and/or analysis within the platform (e.g., by authorship token instructions 110). In some examples, hiding the authorship tokens 18 include storing the authorship tokens 18 in a location or format that is not readily accessible to the user, such as by using steganography.

Operation 252 includes committing the content, which can include committing a file containing the content using a version control system that associates the commit with the developer. While illustrated as being part of the authorship token instructions 110, this operation is often performed by a separate application or as part of a process managed by the content editor. In examples, the version control system may receive the commit of a new file or changes to an existing file as having been done by the author. In some examples, the version control system parses the file and attributes authorship to those regions having authorship tokens 18. Generative artificial intelligence authorship can be attributed to those regions lacking human authorship tokens 18.

Operation 254 includes generating generated content (e.g., making an edit) using an artificial intelligence (e.g., generative artificial intelligence). While illustrated as being part of the authorship token instructions 110, this operation is often performed by a separate application or as part of a process managed by the content editor 12. The generating can be based on, for example, the source code and the generated content can be inserted into the file. The content generated this way can lack a human authorship token 18 or include an artificial authorship token 18. However, if the user subsequently sufficiently manually edits the generated code, then a human authorship token 18 may be applied (e.g., based on how the human token instructions 110 are configured and based on sufficiency of the manual edits).

Operation 256 can include determining whether to remove an existing authorship token 18. Where the generated content is within a region having a human authorship token, it can be determined whether to remove the human authorship token 18. Where the generated content is within a region having an artificial authorship token 18 and new content is by a different artificial author, then it can be determined whether to remove the existing artificial authorship token 18. In examples, such a determining can be the same as or similar to the determination of whether the edit satisfies a threshold of significance. The determination can be made whether the generated content passes the threshold. In addition or instead, it can be determined whether the existing content (or surviving content if the generated content changes some of the existing content) is significant given the generated content.

Operation 258 includes parsing the file and identifying one or more regions having or lacking authorship tokens 18. This can include paring a file containing the content and identifying one or more other regions having or lacking one or more authorship tokens 18.

In examples, the operation 258 can further include or be related to operation 260. The operation 260 includes taking an action based on the output of operation 258. Thus, the method can include providing a report regarding an amount of human or artificial authorship of the source code based on the one or more human regions and the one or more other regions. The method can include providing a copyright notice regarding the file that indicates human authorship of the one or more human regions. The copyright notice can indicate a lack of human authorship of the one or more other regions. In examples, the action includes providing the one or more human regions to an artificial intelligence for training. But a training process may resist providing the one or more other regions as to the artificial intelligence for training. Thus, quality of training materials may increase through the providing of human authored contend rather than synthetic content already produced by a generative artificial intelligence.

Operation 262 can include determining that a region associated with a second edit is already associated with an authorship token 18. Further, responsive to determining that the region associated with the second edit is already associated with an authorship token, the authorship token 18 in association with the region can be updated or preserved. This can include updating the authorship token 18 to correspond to the authorship of the second edit.

Operation 264 includes saving the file 112 containing the content 14 and the authorship tokens 18. In an example, the operation includes saving the file 112 in a rich text format. The file 112 can be formatted according to a document standard, such as ISO/IEC 29500-1:2016 (the standard associated with the popular MICROSOFT DOCX file format) or a successor standard. In an example, the file 112 stores data using XML. The XML may include tags associated with authorship tokens 18. The XML may include one or more dedicated tag for distinguishing a portion of the content 14 of the file 112 as being authored by a human or an artificial intelligence. In an example, the operation 264 includes saving the file 112 in a plain text format. The file 112 may lack stylistic information. The file 112 may have a file extension associated with a programming language, such as Python (.py), C (.c or .h), C++(.cpp or .c++), C# (.cs), or Rust (.rs). The file 112 may be directly usable by a compiler or an interpreter of a programming language. The file 112 may be in binary format. The file 112 can be saved with or in association with metadata describing authorship of the content in the file 112. For instance, the metadata can describe or be used to describe a number of or percentage of characters, words, or other delimitations of content as that have certain kinds of authorship (e.g., human or artificial).

The method 200 can further include operation 280.

Example Method—Handling Content Movement

Operation 280 includes handling content 14 movement. During use of the content editor 12, content may be moved to the content editor 12 from another source (e.g., a location external to the content editor 12, such as a website or another program), moved within the content editor 12 (e.g., from another location within a same file 112 or from a different file open in the content editor), or moved from the content editor 12 to another source. Operation 280 is described in more detail in relation to FIG. 2H.

Figure 2H:
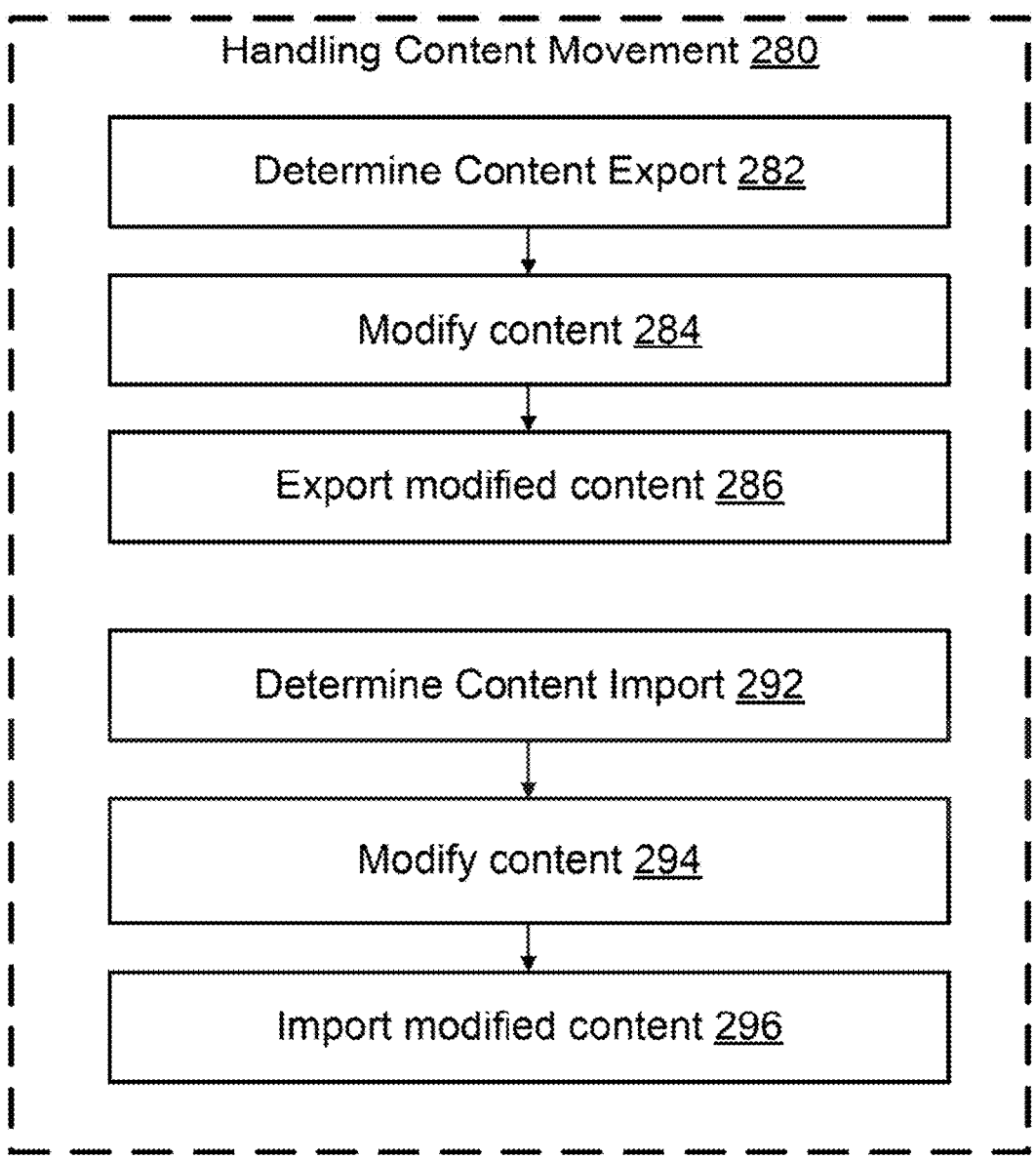

FIG. 2H illustrates that operation 280 can include operations 282, 284, 286, 292, 294, and 296.

Operation 282 can include determining that content is being exported from the content editor 12, such as from the file 112. Content exportation can include detecting a cut or copy operation is occurring on some or all of the content 14, detecting that content is being dragged out of the file 112, detecting that a screenshot is being taken, detecting that an export operation is selected from a menu of the content editor 12 (e.g., a function called "save as" or "export to"), detecting other exportation occurrences, or combinations thereof. In an example, detecting such operations includes using one or more APIs of an operating system on which the content editor 12 is running. In addition or instead, this can include detecting user input corresponding to exporting data. The detecting can include detecting a particular operation within the content editor is being activated. Detecting can occur in other ways too. In some instances, the content editor 12 includes a special export option that relates to authorship data, and determining that content is being exported can include detecting that such a special option was activated. Following operation 282, the flow of the method can move to operation 284.

Operation 284 includes modifying the content being exported. The modification can take any of a variety of forms. Authorship tokens 18 can be removed from the content being exported. Authorship tokens 18 can be added to content being exported (e.g., where the content being exported lacks an authorship token 18 but is within a region associated with an authorship token 18 or where the authorship token 18 is stored in another file or another part of the file). For example, an authorship token 18 of the region from which the content is being exported is added to the content being exported. Modifying the content can include removing content associated with particular authorship. For example, the content being exported may include multiple different kinds of authorship (e.g., human, artificial, internal, or external, among others). An entity controlling the content editor 12 may have policies regarding whether content having a particular kind of authorship can be exported. Thus, the content can be modified to remove content having authorship that is not permitted to be exported. In some examples, the content is modified to indicate that certain content was not exported.

In some examples, modifying the content can include adding or modifying authorship tokens 18 to improve use by other programs. For instance, where authorship tokens 18 are hidden or stored elsewhere (e.g., in another file), they can be unhidden or otherwise added to content being exported. In such a manner, a program that will receive the content can obtain the authorship information in a readily accessible manner. Where authorship tokens 18 are obfuscated (e.g., hashed or encrypted), the authorship token 18 can be decrypted or otherwise converted into a format that is easier for other programs to use.

Following operation 284, the flow of the method can move to operation 286.

Operation 286 includes exporting the modified content. This can include ensuring the content being exported in the manner determined in operation 282 is modified according to operation 284.

Operation 292 can include determining that content is being imported into the content editor 12, such as into the file 112. Content importation can include detecting a paste operation is occurring, detecting that content is being dragged into of the file 112, detecting that an import operation is selected from a menu of the content editor (e.g., a function called "import"), detecting other importation occurrences, or combinations thereof. In an example, detecting such operations includes using one or more APIs of an operating system on which the content editor 12 is running. In addition or instead, this can include detecting user input corresponding to importing data. The detecting can include detecting a particular operation within the content editor 12 is being activated. Detecting can occur in other ways too. In some instances, the content editor 12 includes a special import option that relates to authorship data, and determining that content is being imported can include detecting that such a special option was activated. Following operation 282, the flow of the method can move to operation 294.

Operation 294 includes modifying the content being imported. The modification can take any of a variety of forms. Authorship tokens 18 can be removed from the content being imported. Authorship tokens 18 can be added to content being imported. For example, an authorship token 18 of the region from which the content is being exported is added to the content being imported. Modifying the content can include removing content associated with particular authorship. For example, the content being imported may include multiple different kinds of authorship (e.g., human, artificial, internal, or external, among others). An entity controlling the content editor 12 may have policies regarding whether content having a particular kind of authorship can be imported. Thus, the content can be modified to remove content having authorship that is not permitted to be imported (e.g., content from outside of the organization). In some examples, the content is modified to indicate that certain content was not included.

In some examples, this includes treating the importation as an edit and analyzing its significance. If the importation is significant, then an authorship token 18 for the imported content is determined and added. In some instances, the authorship token 18 simply indicates that the content is obtained from an external source or has unknown authorship. In some examples, authorship is determined based on existing authorship tokens 18 in the content being imported. In some examples, authorship is determined based on analyzing the source of the content. For example, the content may be from a website or file and the nature of the importation process may indicate such a location (e.g., a uniform resource locator or identifier of the source). That indication can be analyzed and used as an author. For instance, the domain of the URL can be used as the author. In other examples, an artificial intelligence is applied to the source and used to determine whether that source includes an indicia of authorship and then that is used. In some examples, the entire source designator is used as an author. In some examples, a human or an artificial agent (e.g., a program running or using a large language model trained or configured to take such an action) follows the source designator (e.g., URL) and with the benefit of knowing what content is being imported (e.g., based on the content of the clipboard), can investigate the source and determine the authorship of the content. Where the content is from a blog post or a comment, the author of the comment or blogpost can be indicated as the author. Where the content is from another file that file or surrounding files in a hierarchy can be analyzed to determine authorship (e.g., based on the content of a readme file, a licensing file, metadata of files, other indicators, or combinations thereof). Where the content is from a source repository, a history of the repository can be analyzed to determine the author of the change (e.g., using git blame or another feature). The resulting determination of authorship can be used to create an authorship token 18. In some examples, the authorship token 18 may include known and unknown information. For instance, a name of the author may be included but it may be unknown whether that author is the true author or whether that author used an artificial intelligence to generate it. An indication of such a lack of knowledge may be added. In some instances, human versus artificiality can be determined based on the date on which the content was first published or otherwise created. Prior to a certain date, it may be assumed that all content was human authored rather than potentially generated by an artificial intelligence. In some instances, a user or an organization may prefer to label information obtained external to the organization with an "external" label or treat is as being "artificial" rather than human generated for copyright, auditing, or other purposes. The human or artificial agent may determine whether the content is from an internal or external source depending on the source location (e.g., a local file, an intranet website, or an external website) and cause a corresponding authorship token 18 to be generated.

In some examples, the content can be analyzed and the nature of the content may provide an indication of its source. For instance, the content being imported can be in the form of a chat log of a discussion between a human and an AI chatbot. An authorship engine can detect such a format and determine that the content being imported is artificial or add authorship tokens 18 to particular portions of the content (e.g., human authorship to the human aspect of the content and artificial authorship to the artificial aspect). In some examples, the authorship engine can cause a prompt asking a user about the provenance of the content. For instance, the user may paste the content and provide input to the content editor 12 indicating that the content being pasted has human authorship or artificial authorship. However, this can leave open the possibility of inaccurate authorship information being stored (e.g., because the user is lying or is mistaken regarding the authorship of the pasted content). In some instances, authorship tokens 18 can be associated with a reliability metric indicating a reliability of the authorship token 18. Content having manually entered authorship tokens 18 may have less reliability than authorship tokens 18 that are automatically determined.

In some examples, modifying the content can include rewriting the content with a large language model or having a human author manually edit the content such that authorship of the content being imported corresponds to a new author. For example, sufficient modifications can be made to transform authorship of the content. Sufficiency of the modifications can be determined using the same or similar techniques described above in relation to operation 220. In some examples, the modifications can include converting the content to a format or style preferred by the user of the content editor 12.

In some examples, modifying the content can include adding or modifying authorship tokens 18. For instance, the content may include authorship tokens 18 in a different format from a format used in the file 112. The authorship tokens 18 may be converted from a first format to a second format and the content modified to include the authorship token 18 in the second format. In an example, the authorship tokens 18 may be removed from the content being imported and be hidden or stored elsewhere (e.g., in another file). Where authorship tokens 18 of the file 112 into which the content is imported are obfuscated (e.g., hashed or encrypted), the authorship tokens 18 of the content being imported can be encrypted, hashed, or otherwise converted into the format used by the file.

Following operation 294, the flow of the method can move to operation 296.

Operation 296 can include importing the modified content. This can include adding the modified content to the file 112.

Example Content Editor

FIG. 3 illustrates an example content editor 12 (e.g., specifically a development environment) displaying a file 112 having source code content 14 that includes comments 16 with varying styles of authorship tokens 18. Here, the file is a visual basic file where comments begin with a ' and continue until the end of the line. In the figure, source code content 14 is bolded and comments are not bold. In many implementations, a single file 112 would likely have a small number of different kinds of authorship tokens 18. The variety of token 18 formats here is for example purposes only showing some of the various ways that authorship tokens 18 can be provided.

User interface element 302 is a button that, upon activation, causes the content editor 12 to export the content 14 in a manner that preserves authorship tokens, such as in the way described in relation to operation 282.

User interface element 304 is a button that, upon activation, causes the content editor 12 to unlock editing of authorship tokens 18. For example, the content editor 12 may selectively lock and unlock editing of authorship tokens 18. When locked, the text editor 12 prevents a user from editing portions of the content 14 that correspond to authorship tokens 18. When unlocked, the content editor permits a user to edit the portions of the content 14 that correspond to authorship tokens 18. In some implementations, the content editor 14 may require the user to demonstrate sufficient permission to unlock the editing (e.g., based on a role or status of the user or based on the user providing a password). In some instances, unlocking, locking, or editing authorship tokens 18 may be logged in a logging system so that manual changes to authorship can be audited. In some examples, the user may be required to provide a reason for the change to authorship, that may or may not need to be approved. In some implementations, where the authorship token 18 is designed to resist mimicry (e.g., by hashing or otherwise obscuring the authorship tokens), unlocking the authorship tokens 18 may un-obfuscate the authorship tokens 18. After modification of the formerly obfuscated authorship token, the content editor may re-obfuscate the authorship token 18.

User interface element 305 is a button that, upon activation, causes the content editor 12 to activate a generative AI function to generate content 14 within the content editor 12. For example, when the generative AI function is enabled, generative AI may suggest new content to the user at the location of the cursor within the text. That may be the same cursor location where human text input would be provided if entered via a human interface device of the computer on running the content editor 12. In addition or instead, actuation of the button 305 may create a user interface element configured to provide a generative AI chat interface with the user for responding to user prompts. Depending on whether and how the feature is implemented and how the user interacts with the feature, information can be provided to the editor 12 or an authorship engine to facilitate the addition of authorship tokens 18 to the data.

Comment 306 includes an authorship token 18 in the form of "Func: Mixed—7 Human; 1 Mixed; 9 Artificial; 1 Unknown". The authorship token 18 is a comment on its own line before a function that it describes. The authorship tokens 18 indicates that it describes the region corresponding to the function (e.g., by stating "Func:") that begins on the following line (and ends with the line that reads "End Function"). The authorship token 18 further designates that the region corresponding to the function has mixed authorship by stating "mixed". The authorship token 18 indicates how many lines of code within the region have human, mixed, artificial, and unknown authorship (seven, one, nine, and one, respectively). In some examples, these numbers can automatically be updated when authorship of the lines within the region are changed.

Comment 308 includes an authorship token 18 in the form of "Human Author Internal CZIOLK", which indicates that the author is a human author internal to the organization and having a user identifier of CZIOLK. In an example, the user identifier may be the user identifier of the human user that was associated with the content editor 12 (e.g., via a user account) when the associated region (line) was authored. The identifier of that user may be obtained and used as part of the human authorship token 18. In other instances, the user identifier of the human user may nonetheless be used even when there is an artificial author, such as for tracking or compliance purposes.

Comment 310 includes an authorship token 18 in the form of "Unknown Author External", indicating that the line is from outside of the organization (e.g., copied and pasted from a website) and that the author of that region is unknown. The author may be unknown in the sense that the individual author is unidentifiable or that it is unknown whether the author was human or artificial. The authorship token 18 may include additional content indicating as much.

Comment 312 includes an authorship token 18 of the form "UAX example.com/str-questn". Here, "UAX" may indicate that there is an Unknown Author External to the organization and that the source of the content in the region (e.g., where the region was copied from in whole or in part) is the URL "example.com/str-questn".

Comment 314 includes an authorship token 18 in the form of an empty comment. As described elsewhere, an empty comment may be, in some implementations, sufficient to constitute a human authorship token 18.

Comment 316 is a comment that includes an authorship token 18 in the form of the Unicode symbol "Speaking Head in Silhouette" but in the form of the escape sequence "\u1F5E3". Some file types, content editors, or uses of the file 112 may not support Unicode characters directly and instead require them specified as a string literal. In some instances, the comment may include the string literal but the content editor 12 may instead replace the string literal with the symbol itself for the purposes of displaying to the user. Here, the Unicode symbol "Speaking Head in Silhouette" looks like a person talking and therefore can be used to represent human authorship, though of course various symbols can be used to represent various kinds of authorship. The use of symbols can be beneficial for use in authorship tokens 18 because they are not usually found within source code comments (e.g., because of a relative difficulty in typing them, especially in the form of an escape sequence containing multiple characters that correspond to a single symbol).

Comment 318 is a comment that includes a two authorship tokens 18 (or a single authorship token 18 depending on how authorship tokens 18 are implemented) in the form of a Unicode symbols "Old Personal Computer" and "Speaking Head in Silhouette", representing artificial and human authorship respectively. As discussed above, the symbols may be stored in the form of escape sequences but here are rendered by the content editor as individual Unicode symbols. The presence of both authorship tokens 18 can indicate that the region is the product of mixed human and artificial authorship. The ordering of the tokens 18 for the region can indicate a relative timing of the contributions. For example, the artificial authorship token 18 being first can represent that the region was originally the product of artificial authorship and that human authorship was added after the artificial content.

Comment 320 is a comment that includes an authorship token 18 in the form of "{H 00001111110000000000}", where the curly brackets indicate a block of text that is an authorship token 18 (other symbols or characters can be used in other implementations). The H can indicate that human authorship is being described and the ones and zeros can indicate which sub-region (here, characters) of the region (here, line) have human authorship. Treating the ones as meaning that the corresponding character of the source code in the region as having human authorship and the zeros meaning that the corresponding character of the source code lacks human authorship, as seen in the line "Dim output As String", the human authored the variable name and nothing else. The portions not having human authorship can be considered as having artificial authorship.

Comment 322 is a comment that includes an authorship token 18 in the form of "USBv0.3", which indicates that artificial intelligence having the name "USB" and being version 0.3 is the author the region. The comment 322 further includes a portion enclosed in curly braces and having a symbol for "Speaking Head in Silhouette" followed by the comment "comma-space delim". The use of that symbol within the curly braces can be used to indicate that a human authored the portion of the comment "comma-space delim", which is a function comment describing the function of the region of code as requiring that the cell have names delineated by a comma and then a space.

Comment 324 Includes
c5b513b3d7788b9a15b1747720a656938643835c91c51b2233e08ec3834d7257
which is a SHA256 hash of
H; SALT; output=" "
where H indicates human authorship, SALT is a salt, and output=" " is the line of code with an H appended at the beginning with a salt of the form "SALT", and with the parts of this separated by semicolons. Of course, other implementations can have different formats. In this manner, the token 18 is obfuscated in a way that resists human or artificial mimicry of a valid authorship token 18.

Comment 326 is a comment before a for-each loop region and indicating a begin authorship tag having the form "<Author {314abc}>". An authorship token 18 of this form may be used to indicate that all following regions of code (e.g., lines) until the closing tag (see comment 332) are authored by "314abc" unless otherwise indicated. 314abc may be an identifier of an author or may be a reference (e.g., key) to a region (e.g., value) within an authorship data file 114 associated with the file 112 that can be followed to understand more about the authorship of the region.

Comment 328 is a comment within the authorship region bounded by comments 326 and 332 that indicates that authorship of this particular line is by a human via the presence of a human authorship token 18 in the form of a symbol of "Speaking Head in Silhouette".

Comment 330 is a comment within the authorship region bounded by comments 326 and 332. This comment 330 by itself says nothing about authorship (i.e., is not and does not include an authorship token). Instead, the comment is a functional comment describing non-authorship information about the region which it describes.

Comment 332 is a comment following the for-each loop region and indicating an end authorship tag having the form </Author {314abc}>. This authorship token 18 can cooperate with the begin authorship tag of comment 326 to describe authorship.

Comment 334, which includes a first portion 338 and a second portion 336. The first portion 338 is a user interface element in the form of [+] that indicates to a user that, if actuated, the region can be expanded to reveal something. Here, that symbol can be used to indicate that the content editor 12 is not showing the entirety of the region, such as because the content editor 12 is hiding an authorship token 18 (e.g., automatically hiding content having the form of an authorship token 18 to prevent tampering or to resist cluttering the user's view of the content 140). Upon actuation, the content editor 12 can determine whether the user is permitted to view the hidden content and, if so, display the hidden content in line with the adjacent content that was not hidden. If the user is not permitted, the content editor 12 can display an error indicating as much and not display the hidden content. The second portion 336 can correspond to a non-authorship portion of the comment 334, such as a portion of the comment describing function of the region of code (e.g., that the line removes an extra portion of the output).

Line 340 of the content 14 lacks a comment but the editor 12 renders a symbol 342 near the line 340 indicating that there is authorship information about the line 340. For example, the authorship information for that line 340 may be stored in the form of an authorship token 18 in the authorship token 18 data file 114 rather than in an associated comment. The editor 12 can determine that there is associated information and render the symbol 342 so the user knows that they can hover over or otherwise interact with the symbol 342 to obtain more information. As illustrated, upon interacting with the symbol 342, a tooltip 344 is displayed. The tooltip 344 can display information about authorship of the associated region. In this case, the information is that there is human authorship after a significant edit and that an authorship history is available to the user upon clicking on a link within the tooltip.

Version Control System

Figure 4:
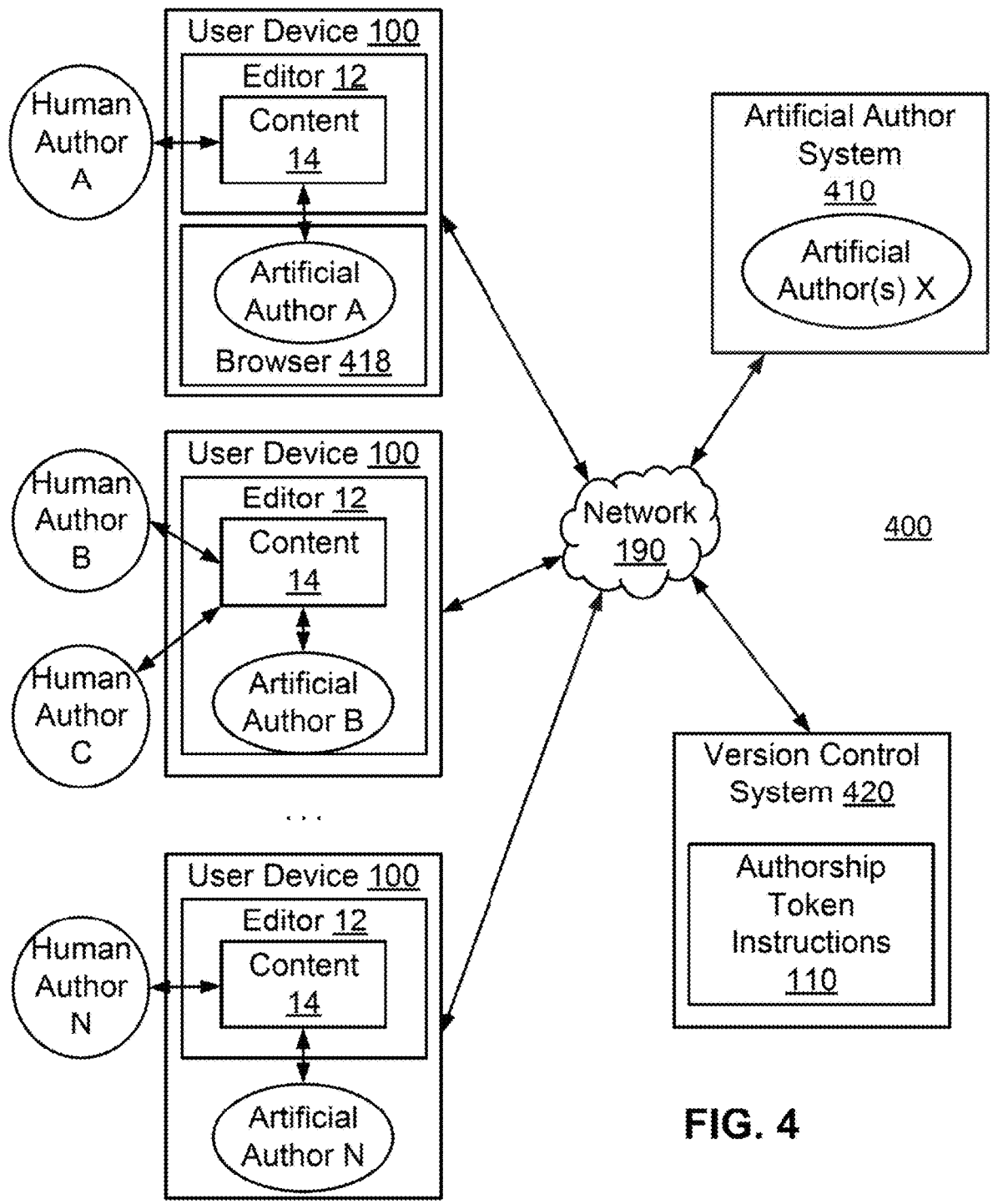
FIG. 4 illustrates an example system implementing aspects described herein.

FIG. 4 illustrates an example system 400 that can implement aspects described herein. The system 400 includes a plurality of user device 100, each having at least one human author and at least one artificial author editing content 14 in an editor 12 associated with respective user devices. The user devices are connected to an artificial author system 410 and a version control system 420 over the network 190.

Although the artificial authors are shown as being within the user devices 100 and can be running entirely or partially locally on the user devices 100, in addition or instead, the artificial authors may be running in whole or in part via a remote environment, such as the artificial author system 410. In some examples, the artificial authors are accessible through a browser 418 running on the user device.

The artificial author system 410 is a computing environment that provides one or more artificial authors remotely. Artificial authors often require significant computing resources (and concomitantly significant power and cooling resources) to operate in a timely manner. So they are often run on special purpose hardware or in other special conditions, such as those of the artificial author system 410. Capabilities of the artificial authors can be provided via application programming interfaces, web pages, via other techniques, or combinations thereof. The artificial author system 410 can include one or more aspects of the computing environment 600 described elsewhere herein.

The artificial authors are shown as having unique labels (A, B, . . . N, and X) and can indeed be unique with respect to each other. For instance, the different artificial authors may be different generative artificial intelligence models (e.g., one may be a CHATGPT model provided by OPENAI and another may be a LLAMA model or META AI provided by META), may be different versions of a same model, may be different fine tunings of a same model, may have different initial system prompts, may have different custom parameters, other differences, or combinations thereof. But in some examples, the artificial authors across two or more user devices 100 may be the same or may be labeled as being a same artificial author. For example, the user devices 100 may access a same artificial author system and receive content from a same or substantially the same artificial author. In such instances, an authorship engine may be configured to treat content produced by such an artificial author as being produced by a same artificial author. But in other examples, an authorship engine may nonetheless treat a same artificial author operated, controlled, supervised, or otherwise used at different user devices 100 as being different artificial authors.

The version control system 420 is a system made up of one or more computing environments (e.g., computing environment 600) that provide version control functionality. Version control can relate to the management of content and changes thereto, especially by multiple different users. The version control system 420 can receive and store content created by the one or more different user devices 100 (e.g., via an editor 12 thereof). The version control system 420 can load and send content to the various user devices 100 for editing, viewing, or other purposes. The version control system can manage a content repository and handle simultaneous editing of content (e.g., using a merge model, a lock model, or other models of concurrency). The version control system 420 can provide functionality for tracking changes to content managed by the version control system. While the version control system 420 is illustrated as being separate from the user devices, some implementations of version control systems involve version control software operating on user devices 100 in addition to or instead of remotely. Example version control systems 420 include GIT, MERCURIAL, PERFORCE, SVN, others, or combinations thereof. The version control system 420 can include or cooperate with source code or other content repositories, such as BITBUCKET, GITHUB, GITLAB, AZURE DEVOPS, others, or combinations thereof.

The version control system 420 can include authorship token instructions 110 that, when executed by one or more processors of the version control system, cause the version control system 420 to perform one or more operations relating to authorship tokens 18. The operations can include those described elsewhere herein. In some examples, the authorship token instructions 110 can include those specific to use with a version control system.

In an example, the authorship token instructions 110 cause the version control system 420 to track changes to a maintained code base depending on authorship of the changes to the content 14. For example, the version control system 420 can maintain a change history of the content 14. The change history can include not only an indication of the changes themselves and the user that submitted the change, but also the authorship of the change. The authorship of the change can be determined based on the authorship tokens 18 of the content 14 associated with the change. For example, the version control system 420 can parse the content 14 of the change being submitted and identify the presence or absence of authorship tokens 18. The version control system 420 can then parse those authorship tokens 18 and store information about that authorship in association with the change. Such information can include a number or percentage of regions (e.g., lines of code) having particular authorship.

The authorship token instructions 110 can cause the version control system 420 to restrict changes to particular portions of a code base or other content based on authorship. For instance, an organization can set a policy regarding a relative amount of content having particular authorship and the authorship token instructions 110 can prevent changes that go against that policy. For instance, there may be a policy prohibiting any non-human authored content in a particular file or branch. The version control system 420 can then prohibit the committing or merging of a particular change or branch if the content 14 includes artificial authorship. In an example, the version control system 420 would permit a change by a user had the change included only human authorship tokens 18 but prohibited a change by that same user had the change included an artificial authorship token 18.

In an example, the version control system 420 provides a user interface showing content to a user. In some examples, the user interface preserves the authorship tokens 18. In other examples, the user interface removes the authorship tokens 18 or otherwise inhibits the display of the authorship tokens 18 in the view. This can be done to remove visual clutter, improve readability, enhance privacy, or for other reasons. The version control system 420 can achieve this by identifying sections of the content 14 matching a known format of authorship tokens 18 and preventing the display of such sections of content. In addition or instead, the user interface can include a separate region that indicates authorship (e.g., a column by a line number column that includes one or more symbols indicating authorship of the associated region).

An example user interface associated with changes to a code base is shown in FIG. 5.

Change View

FIG. 5 illustrates an example user interface 500 showing a change to content 14. The user interface 500 includes a change information portion 510 and a content view 520. The user interface 500 further includes a warning 530 indicating that due to the presence of artificial authorship, the content 14 cannot be merged to a main branch of content 14.

The change information portion 510 illustrates information about a change to content 14 that is being displayed in a content view 520. The portion 510 includes an identifier of the change (e.g., Change #314159), the name of the user that made the change (e.g., User1), the authorship of the change (e.g., human, artificial, or mixed), an indication of the regions associated with the authorship (e.g., 2 lines of human authorship accounting for 100% of the changed content 14), a number of files changed, a number of lines changed, a number of lines added, how much authorship has changed (e.g., how many regions have changed from a first kind of authorship to a second kind of authorship), a description of the change, other information, and combinations thereof. As illustrated, the change information portion 510 can further include information about determinations of authorship. For example, as illustrated, the portion 510 indicates "Human comment added to AI authored line 16, but threshold of significance not reached".

The content view 520 is a portion of the user interface 500 that shows content 14. As illustrated, the content 14 is code based on that shown in FIG. 3. The view 520 includes indications of line numbers 522, changes 524 made by the change, and an authorship column 526. The authorship column 526 indicates, for an associated region (in this case, lines of content 14), authorship. Here, the column 526 includes an "H" indicating human authorship of the associated line and an "A" indicating artificial authorship of the associated line. In other examples, other symbols or indications can be used.

Authorship View

Figure 6:
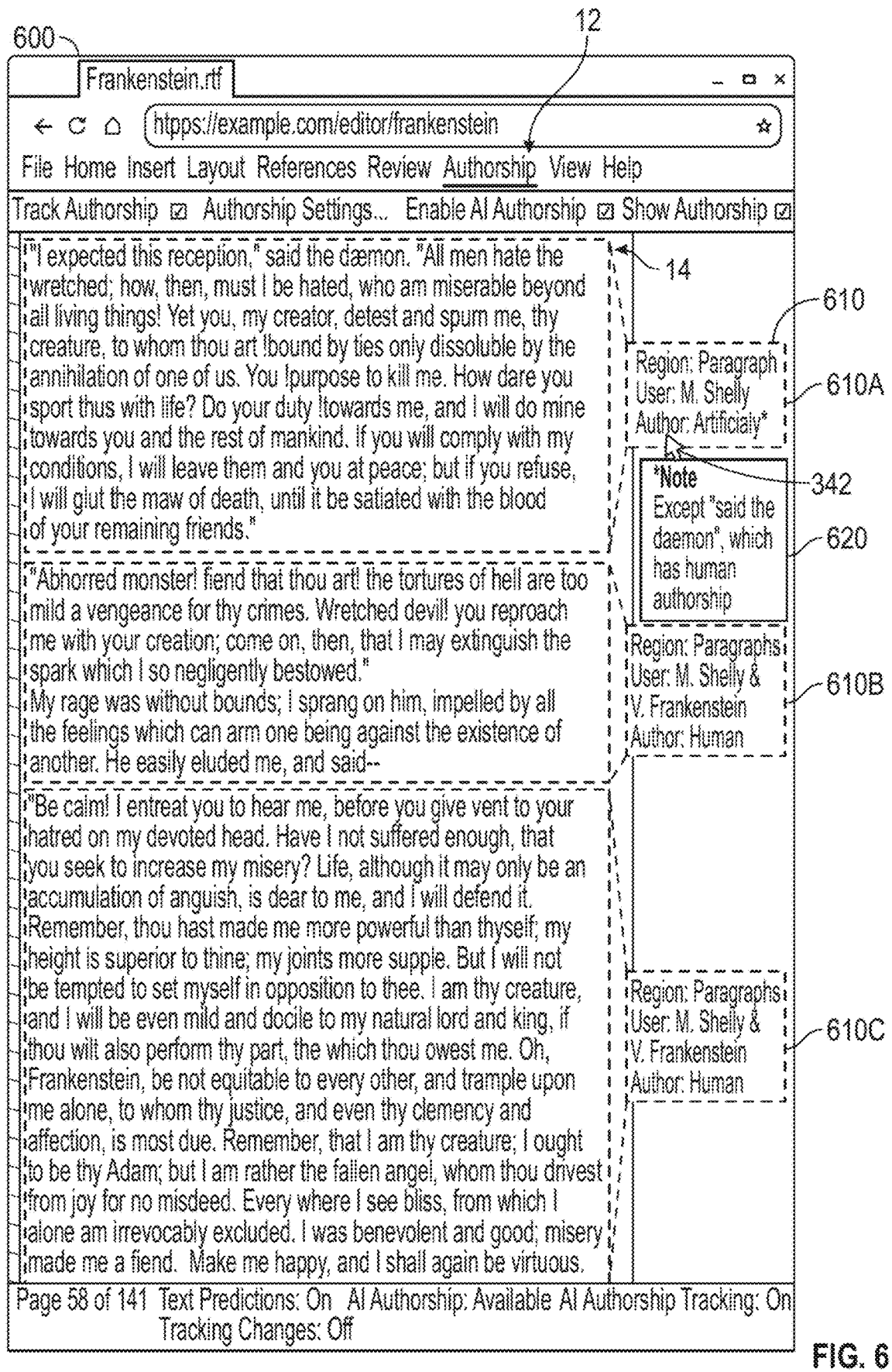
FIG. 6 illustrates an example web browser (e.g., running on a user device) rendering a web page that provides a text editor for editing content and viewing authorship information.

FIG. 6 illustrates an example web browser 600 (e.g., running on a user device 100) rendering a web page that provides a content editor 12 for editing content 14 and viewing authorship information. Here, the content 14 is prose text content that has the authorship of the content tracked (e.g., in a separate file or in another area beyond the plain text of the content 14). The editor 12 provides a view for reviewing the content. As illustrated, the view is a user interface having particular regions of content visually distinguished (e.g., by placing the region in a box) and associated with user interface elements 610 describing authorship information of the region. For example, the editor 12 shows three regions of content 14 that are all by a same user but having different authorship. For instance, one of the user interface elements 610A describes a single paragraph region by the user "M. Shelley" and which is authored by an artificial author (without specifying which artificial author). The user may correspond to the entity (typically a person) with whom the content editor 12 is associated (e.g., the user whose account is active with the content editor). As discussed elsewhere, the user associated with the content editor and the author of the content within the content editor may be different entities. The artificial authorship indication of element 610A is accompanied by an asterisk, which can be used to indicate that there is additional information about the determination of authorship. When a user hovers over or otherwise interacts with the element 610A, a tooltip 620 appears providing additional information. In the illustrated example, the additional information is that all of the content 14 of the region has artificial authorship except for the phrase "said the demon", which has human authorship. User interface element 610B refers to multiple paragraphs and indicate that they have human authorship provided by two different users. User interface element 610C refers to a single paragraph region having artificial authorship and provided by user "M. Shelley".

Attributing Authorship from Conversation

Figure 7A:
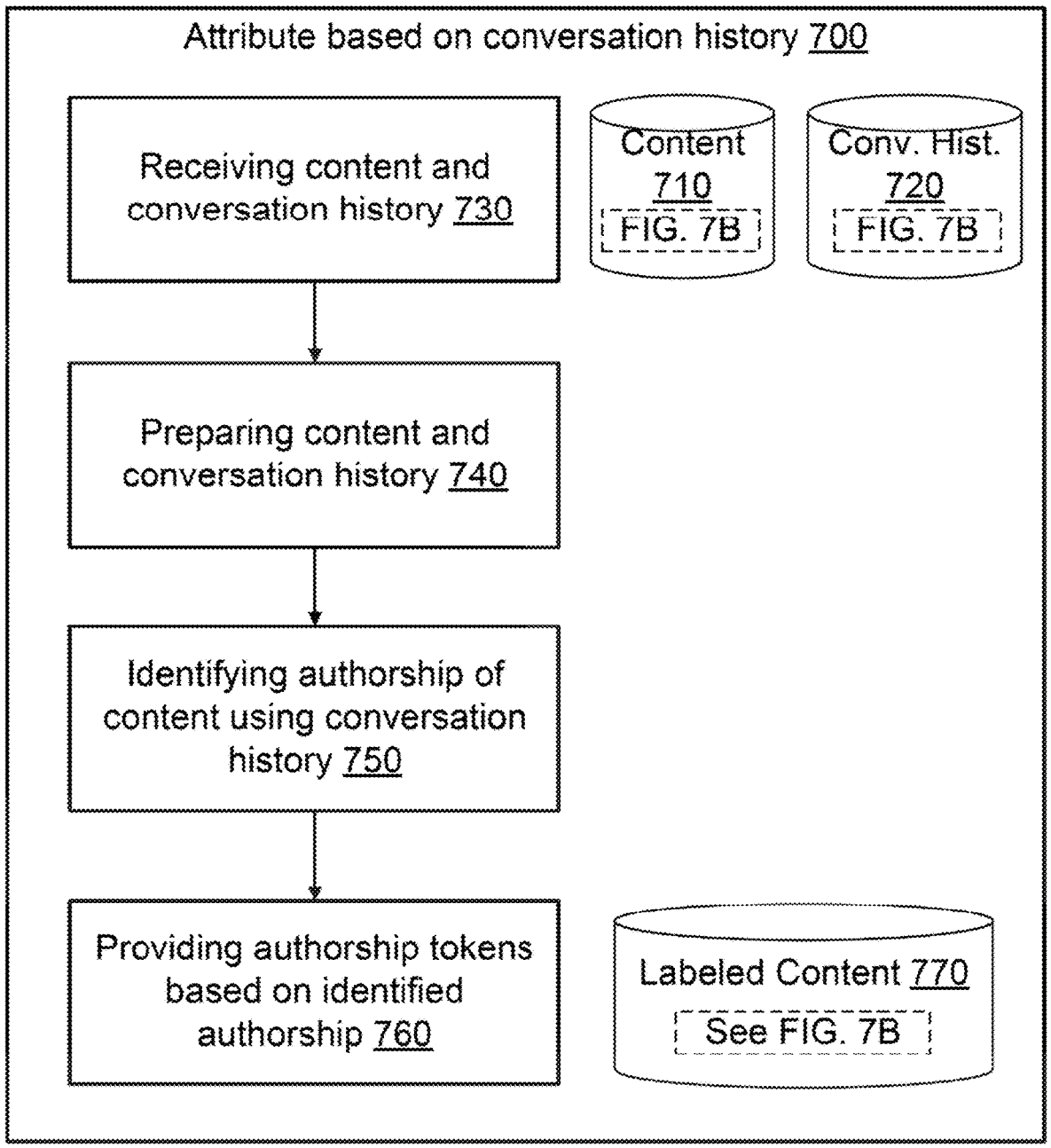

FIG. 7, which is broken into FIGS. 7A and 7B, illustrates a method 700 for attributing authorship of content 710 based on a conversation history 720. The content 710 is visual, textual, audio, or other kinds of content. In the illustrated example, the content 710 is prose text and lacks one or more authorship tokens 18 indicating the provenance of different regions of the content 710. The conversation history 720 is a representation of a conversation among two or more artificial or human authors. In many examples, the conversation history 720 is a text representation of messages. In other examples, the conversation history is an audio or visual representation of the interactions between the authors. In the illustrated example, the conversation history 720 is in the form of a transcript of a text chat between a human user and an AI chatbot. During the conversation, the human user sends human messages 712 that are responded to with AI messages 714. The method 700 can begin with operation 730.

Operation 730 includes receiving the content 710 and the conversation history 720. This operation 730 can take any of a variety of forms. In some examples, one or both of the content 710 and history 720 are in one or more separate files that are received (e.g., by receiving indications of their locations, such as file paths). In some examples, one or both of the content 710 and history 720 is present in an editor 12 (e.g., in a main editing user interface or pasted within a field of a user interface of the editor 12). In some examples, the content editor 12 has a chat feature built in so that a user can both chat with an artificial intelligence in one area of the editor and can edit content in a same or different area of the editor. In further examples, a user can link their content editor with an account of an AI chat service and give the chat service permission to respond to queries from the content editor. In such a manner, the content editor 12 (e.g., more specifically an authorship engine thereof) can retrieve conversation histories 720 from the chat service that may be relevant to the content 710 being edited in the editor 12. Following operation 730, the flow of the method 700 can move to operation 740.

In some examples, operation 730 includes determining a relevance of the conversation history 720 to the content 710. Responsive to the relevance passing a threshold, the flow of the method can continue. In an example, the relevance is determined based on a similarity of the conversation history to the content. This can include using natural language processing techniques. It can include comparing a distance between representations of the conversation history and the content in embedding space.

Operation 740 includes preparing one or both of the content 710 and conversation history 720 for use. In an example, this includes parsing the conversation history and identifying one or more authors in the conversation history 720 and associated messages. In some examples, the conversation history 720 is analyzed to identify a prompter and a generator and the roles are used in assessing authorship in future operations. Following operation 740, the flow of the method 700 can move to operation 750.

Operation 750 includes identifying authorship of regions of the content 710 based on the conversation history 720.

Identifying authorship can include determining a difference between messages provided by a first author and a region of the content 710. If the difference is below a predetermined threshold, then the region is labeled as having the first author as an author.

Identifying authorship can include taking a piece of the content 710 and recursively finding the provenance of the portions of the content 710. For example, the content 710 may include a region that is verbatim (or within a predetermined amount of difference) provided by a second author. An authorship engine can then go backwards through the conversation history 720 to a prior message and find a difference between that content and the prior prompt by a first author. Regions corresponding to that difference can be labeled with the second author if the differences are significant (e.g., based on similar or the same determinations as operation 220) and labeled with the first author if the differences are not significant. This process of identifying differences and labeling authorship as needed can continue backwards through the conversation until the beginning of the conversation is reached.

In some examples, rather than moving backwards through the conversation, the analysis can be performed by moving forward through the conversation. In an example, a difference between an earliest relevant message and a next message is be determined. The significance of the difference can be determined (e.g., using techniques similar to those described above in operation 220 or elsewhere herein) and authorship applied accordingly to the next message. In examples, authorship can be determined based on an entropy of contributions to the conversation by various parties. After authorship is applied, the process of determining the difference and updating authorship continues for all next messages before finishing with the final difference between the last relevant message and the content 710 to be labeled.

In some examples, a branching nature of a conversation can be accounted for in the analysis. Part of the analysis can include determining the prior message or next message in the conversation. In many instances the prior or next message may be an immediately adjacent message, but in other instances, there may be intervening messages (e.g., as part of another conversation path or a tangent) between the current message and the prior or next message. Determining the prior or next message can include determining the most recent prior or next message chronologically that has the greatest similarity to the current message. This can include a straight comparison of text of the messages (e.g., using any of a variety of edit distance algorithms, such as Levenshtein distance algorithms). For instance, the message having the shortest edit distance to the current message can be determined to be the prior or next message when looking forward or backward as needed. In addition to or instead of edit distance, the distance in embedding space between a cluster of tokens 18 of the messages can be used. Thus, the messages that are closest together in embedding space can be determined to be related. Other techniques can be used. A path from message to message (or topic to topic) through the conversation history can be determined by treating each message in the conversation history 720 as a node connected by edges having weights corresponding to the edit distance, embedding space distance, or amount of entropy between the messages (or another technique). Then a pathfinding algorithm (e.g., the A* algorithm) can be used to find a path through the messages from a start to a finish or until each node has been reached.

In some examples, a sentiment of a first author is analyzed to determine how much creative control the first author is exerting over the second author or additional other authors.

In some examples, the authorship engine can pass the conversation history and the content to a large language model or other artificial intelligence and ask whether particular portions of the content are authored by a given author.

In some examples, the authorship engine can modify the content 710 by removing contributions to the convent that were provided by (e.g., provided only by) a given author. This removal can be done using simple replacement or by using more complex approaches (e.g., asking an LLM or another artificial intelligence to do such a removal). The method 700 can then determine whether the change resulted in a significant difference, such as using one or more techniques described above in relation to operation 220.

In some examples, the content 710 is put into an embedding space with the conversation history and the points of the conversation history are labeled. The relative difference between one or more points or one or more clusters of points can be used to determine authorship.

Following operation 750, the flow of the method can move to operation 760.

Operation 760 includes providing authorship tokens 18 for the regions based on the identified authorship, which can result in labeled content 770. In examples, the content is labeled by adding authorship tokens 18 using techniques described elsewhere herein. In some examples, the original content included authorship tokens, which are then updated or corrected based on the conversation. The labeled content 770 includes indications of authorship in the form of authorship tokens 18. In the illustrated example, content written by humans is surrounded by double parentheses and content written by an artificial intelligence is surrounded by double square brackets. In addition, an authorship description 772 is provided that describes concepts provided by the human author and concepts provided by the artificial author.

In an example implementation, there is a method that includes receiving content; receiving a conversation history associated with the content; identifying authorship of regions of the content using the conversation history; and applying authorship tokens 18 to the regions of the content based on the identified authorship to form labeled content. After applying the authorship tokens, the labeled content includes at least one artificial authorship token 18 and at least one human authorship token 18.

Receiving the conversation history can include obtaining the conversation history from a chat service. The method can include parsing the conversation history to identify one or more authors in the conversation history. Identifying the authorship of the regions of the content can include: identifying a region of the regions that has more than a threshold similarity with a message in the conversation history; determining a message author of the message in the conversation history; and applying an authorship token 18 to the region corresponding to the message author. The message author can be different from the writer of the message.

In an example, determining the message author includes proceeding backwards through prior messages in the conversation history starting at the message and, for each respective message of the prior messages: determining whether a difference between the respective message and a next message after the respective message, passes a threshold of significance. Responsive to failing to passing the threshold of significance, the method can attribute authorship of the next message such that the author of the respective message is the author of the next message. Responsive to passing the threshold of significance, the method can attribute authorship of the next message to the author of the next message.

In an example, the method includes creating a directed graph representation of the conversation history such that each message in the conversation history is represented by a node in the graph representation and such that each edge between a pair of nodes representing respective first and second messages represents a transition to the second message from a first message where the first message most relevant, prior message having more than a threshold amount of relevance to the second message. Identifying authorship of regions of the content using the conversation history can include using the directed graph.

In some examples, the content is not modified based on the conversation history other than such modifications necessary to add authorship tokens 18. In examples, concepts are determined, such as determining human concepts contributed by a human participant in the conversation history and determining artificial concepts contributed by an artificial participant in the conversation history.

Managing Use of Content Based on Authorship

Figure 8:
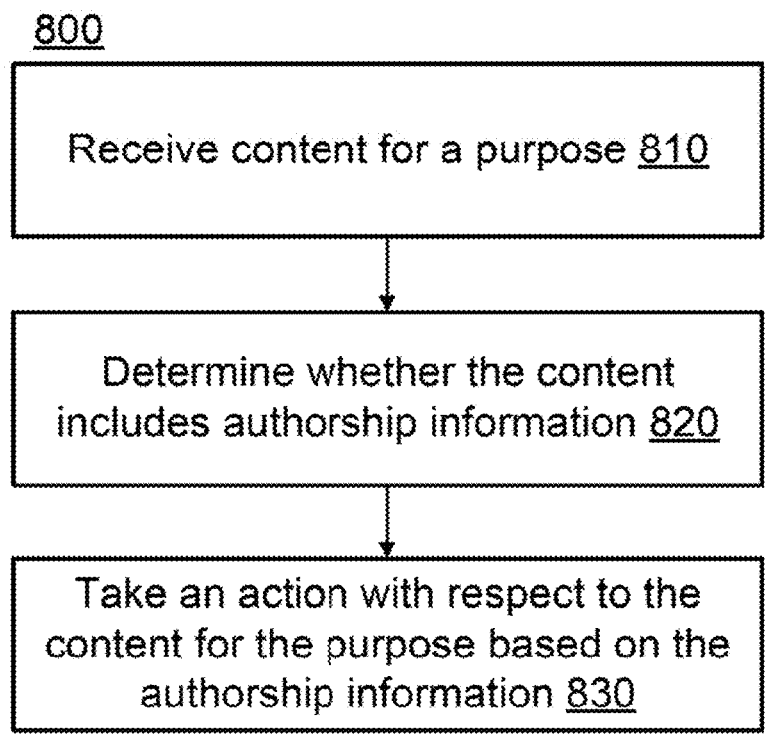
FIG. 8 illustrates an example method for using content based on its authorship.

FIG. 8 illustrates an example method 800 for using content based on its authorship. The method can begin with operation 810.

Operation 810 includes receiving content for a purpose. For instance, the content can be received through a form of a website or application, received via a paste command, received in an editor, received as a message, received over an application programming interface, received in another way, or combinations thereof. Following operation 810, the flow of the method 800 can move to operation 820.

Operation 820 includes determining whether the content includes authorship information. This can be performed in any of a variety of ways. In one example, the authorship information is generated as part of receiving the content. For instance, the content may be authored in a content entry field (e.g., text box) of a website or application that includes authorship features (e.g., that create authorship tokens 18 as described in method 200). Thus, the content is determined to have authorship information because authorship information was generated as part of the receipt of the content in operation 810.

In another example, the authorship engine performing this method 800 has one or more supported authorship token 18 formats and determines whether any of the content being received has content in that format. In some examples, the authorship tokens 18 may be specifically identified or located in a different file or application programming interface call. In some examples, the authorship engine may determine a validity or a robustness of the authorship token 18. The validity or robustness may be based on how tamper resistant or verifiable the tokens 18 are. For instance, a platform may have policies regarding which sources provide trusted authorship tokens 18 (e.g., based on an ability to resist mimicry or as being certified as following particular standards for determining authorship). The trustworthiness of the provenance of the tokens 18 may be used in the following steps.

In a further example, the validity, existence, or robustness of the authorship token 18 is determined using a process similar to that of method 1500, which is described below in relation to FIG. 15.

Following operation 820, the flow of the method 800 can move to operation 830.

Operation 830 includes taking an action with respect to the content for the purpose based on the authorship information. For example, the action may include determining whether the authorship information complies with policies regarding the use of content having that authorship for the purpose. For instance, certain websites, social networks, applications, communications systems, version control systems, or other platforms may restrict the receipt or use of artificially generated content for a purpose. Thus, the action may be prohibiting the use of the content if it has more than a threshold amount of artificially generated content or less than a threshold amount of human generated content. In some actions, different purposes may control whether or how the authorship information is used to permit or deny use of the content. For instance, a platform may prohibit the use of artificially generated content in advertisements but not non-commercial user posts. In some examples, the platform may flag the content (e.g., internally for content moderation purposes or in an externally facing way for users) as having a particular authorship or a mix of authorship. Or it may flag the content has having unknown or unverified authorship. In some examples, the platform may use content having particular authorship for certain purposes but not others (e.g., only permit artificial intelligence training on human authored content).

In some examples, the platform is a social media platform having policies regarding authorship of content. In some examples, the platform may restrict the posting or sending of artificially generated content unless a user account specifically identifies itself as posting artificial content. In some examples, a platform may restrict the posting or sending of artificial content directed to a certain topic, such as politics or elections. The platform may determine whether the post relates to an election and, if so, determine whether or to what extent the post is artificial.

In some examples, the platform may treat content having authorship tokens 18 that do not follow certain standards or are not certified by a particular provider of authorship tokens 18 believed to provide accurate or high-quality authorship tokens 18 as being less trustworthy. Such content may be demoted. For instance, if a platform is concerned about artificial content and a particular piece of content is received that has a human authorship token 18 from an unreliable source, then the content may be treated as having artificial authorship or as having unknown authorship even though the token 18 says otherwise.

In some examples, the platform may treat content authored by an artificial intelligence as though it were not copyrighted and may treat content authored by a human as though it were copyrighted.

Video Editor with Authorship View

Figure 9:
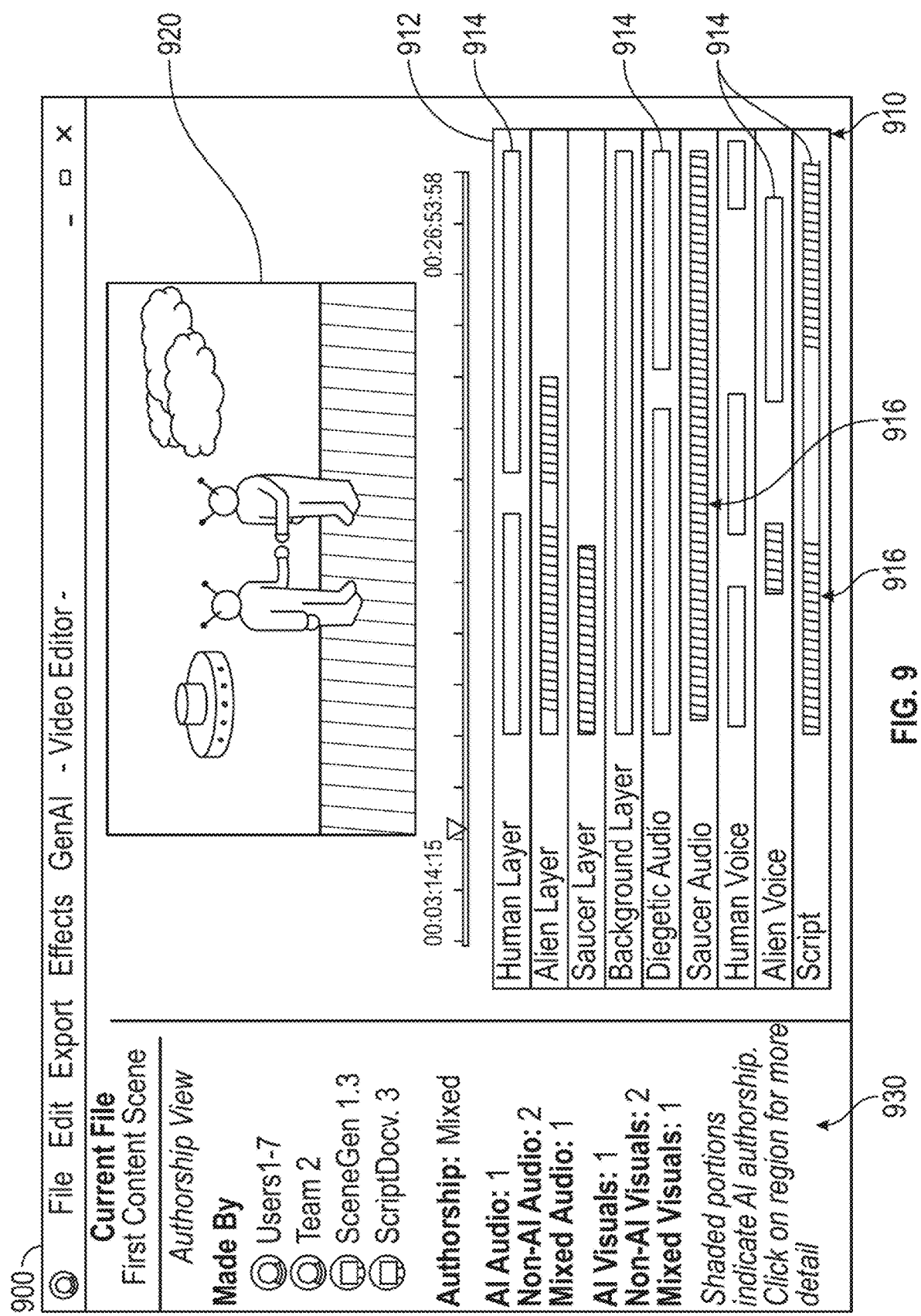
FIG. 9 illustrates an example video editor user interface having authorship attribution.

FIG. 9 illustrates an example video editor user interface 900. While many examples herein describe authorship tokens 18 applied to text content, techniques described herein need not be so limited. Technology herein can be applied in other contexts as well. Illustrated is an example that applies authorship tokens 18 to identify those portions of audio, visual, and textual (e.g., script of the video scene) content of a video that have artificial authorship versus human authorship. As illustrated, the user interface includes layer panel 910 that includes multiple layers 912, each having content 914 (e.g., audio or visual content) that make up a scene 920. The content 914 include portions shaded differently to serve as artificial authorship tokens 18 916 to identify artificial authorship (e.g., generated by a generative artificial intelligence).

The user interface further includes an authorship panel 930 showing a description of the authorship of the current file. This authorship panel 930 displays information regarding the human and artificial authors of the scene, as well as information regarding how much of different kinds of authorship make up the scene. The information provided here can be compiled based on the authorship information of each of the layers.

In examples, the software or services used to generate the layers 912 include authorship tokens 18 during the creation of their respective content. When imported into the video editor, the editor can understand the authorship of the content (e.g., using techniques described in operations 292, 294, and 296) and apply authorship tokens 18 accordingly.

In an example, there is a method 1 that includes providing a video editor user interface for editing a video. The user interface can show a plurality of authorship tokens 18 applied to portions of audio content of the video and visual content of the video. The plurality of authorship tokens 18 can include at least one human authorship token 18 having a predetermined form indicating that a human rather than an artificial intelligence is the author of the portion of the video. The plurality of authorship tokens 18 can further include at least one artificial authorship token 18 indicating that an artificial intelligence rather than a human is the author of the portion of the video. The method can further include determining that a user of the video editor made a manual edit to the video within the video editor. The manual edit can include one or more changes, insertions, or deletions to the video. The method can further include determining that the manual edit satisfies a threshold of significance. The method can further include, responsive to determining that the manual edit satisfies the threshold of significance, providing a human authorship token 18 in association with the region. The human authorship token 18 having a predetermined form indicating that a human rather than an artificial intelligence is the author of the region of the video or that an artificial intelligence rather than a human is the author of the region of the video. The portion is an audio, visual, or textual portion of the video. The method can further include populating a description of the authorship of the video based on collecting authorship information from components of the video.

Computing Environment

FIG. 10 discloses a computing environment 1000 in which aspects of the present disclosure may be implemented. A computing environment 1000 is a set of one or more virtual or physical computers 1010 that individually or in cooperation achieve tasks, such as implementing one or more aspects described herein. The computers 1010 have components that cooperate to cause output based on input. Example computers 1010 include desktops, servers, mobile devices (e.g., smart phones and laptops), wearables, virtual/augmented/expanded reality devices, spatial computing devices, virtualized devices, other computers, or combinations thereof. In particular example implementations, the computing environment 1000 includes at least one physical computer.

The computing environment 1000 may specifically be used to implement one or more aspects described herein. In some examples, one or more of the computers 1010 may be implemented as a user device, such as mobile device and others of the computers 1010 may be used to implement aspects of a machine learning framework useable to train and deploy models exposed to the mobile device or provide other functionality, such as through exposed application programming interfaces.

The computing environment 1000 can be arranged in any of a variety of ways. The computers 1010 can be local to or remote from other computers 1010 of the environment 1000.

The computing environment 1000 can include computers 1010 arranged according to client-server models, peer-to-peer models, edge computing models, other models, or combinations thereof.

In many examples, the computers 1010 are communicatively coupled with devices internal or external to the computing environment 1000 via a network 1002. The network 1002 is a set of devices that facilitate communication from a sender to a destination, such as by implementing communication protocols. Example networks 1002 include local area networks, wide area networks, intranets, or the Internet.

In some implementations, computers 1010 can be general-purpose computing devices (e.g., consumer computing devices). In some instances, via hardware or software configuration, computers 1010 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use.

Many example computers 1010 include one or more processors 1012, memory 1014, and one or more interfaces 1018. Such components can be virtual, physical, or combinations thereof.

The one or more processors 1012 are components that execute instructions, such as instructions that obtain data, process the data, and provide output based on the processing. The one or more processors 1012 often obtain instructions and data stored in the memory 1014. The one or more processors 1012 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 1012 include at least one physical processor implemented as an electrical circuit. Example providers processors 1012 include INTEL, AMD, QUALCOMM, TEXAS INSTRUMENTS, and APPLE.

The memory 1014 is a collection of components configured to store instructions 1016 and data for later retrieval and use. The instructions 1016 can, when executed by the one or more processors 1012, cause execution of one or more operations that implement aspects described herein. In many examples, the memory 1014 is a non-transitory computer readable medium, such as random-access memory, read only memory, cache memory, registers, portable memory (e.g., enclosed drives or optical disks), mass storage devices, hard drives, solid state drives, other kinds of memory, or combinations thereof. In certain circumstances, transitory memory 1014 can store information encoded in transient signals.

The one or more interfaces 1018 are components that facilitate receiving input from and providing output to something external to the computer 1010, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input components, or combinations thereof (e.g., a touch sensitive display). The one or more interfaces 1018 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as according to WI-FI, cellular, BLUETOOTH, ZIGBEE, or other protocols). One or more of the one or more interfaces 1018 can facilitate connection of the computing environment 1000 to a network 1090.

The computers 1010 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries (e.g., libraries that provide functions for obtaining, processing, and presenting data), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

In some examples, the computing environment 1000 includes special-purpose compute units for machine learning (e.g., for training or inference of artificial intelligence models). In an example, the computing environment 1000 includes a special-purpose compute unit having at least 80 gigabytes of memory, capable of performing at least 25 teraFLOPS at FP64, and capable of performing at least 1,500 teraFLOPS at FP16. Such a compute unit have a max thermal design power of up to 350 watts. In an example, the computing environment 1000 may have the equivalent performance (e.g., memory, teraFLOPS, or other such measure) of over 300,000 of such compute units. In an example, the compute units are at least as powerful as NVIDIA H100 TENSOR CORE GPUs. Such compute units can be connected or implemented using an AI platform like GRAND TETON by META.

Machine Learning Framework

Figure 11:
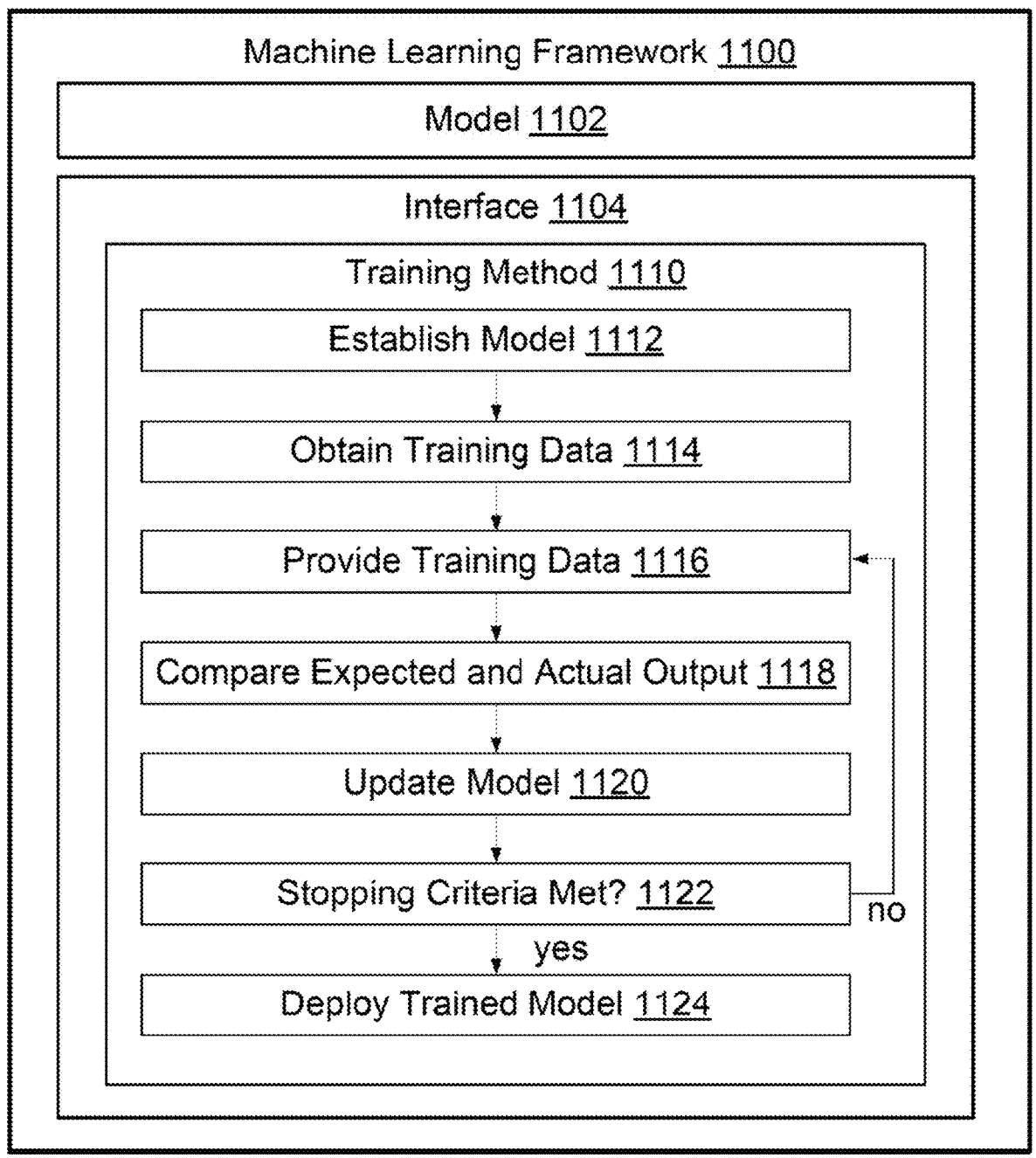
FIG. 11 illustrates an example machine learning framework that can benefit from or be used with techniques described herein.

FIG. 11 illustrates an example machine learning framework 1100 that techniques described herein may benefit from. A machine learning framework 1100 is a collection of software and data that implements artificial intelligence trained to provide output, such as predictive data, based on input. Examples of artificial intelligence that can be implemented with machine learning way include neural networks (including recurrent neural networks), language models (including so-called "large language models"), generative models, natural language processing models, adversarial networks, decision trees, Markov models, support vector machines, genetic algorithms, others, or combinations thereof. A person of skill in the art having the benefit of this disclosure will understand that these artificial intelligence implementations need not be equivalent to each other and may instead select from among them based on the context in which they will be used. Machine learning frameworks 1100 or components thereof are often built or refined from existing frameworks, such as TENSORFLOW by GOOGLE, INC. or PYTORCH by the PYTORCH community.

The machine learning framework 1100 can include one or more models 1102 that are the structured representation of learning and an interface 1104 that supports use of the model 1102.

The model 1102 can take any of a variety of forms. In many examples, the model 1102 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 1102 can include a representation of memory (e.g., providing long short-term memory functionality). Where the set includes more than one model 1102, the models 1102 can be linked, cooperate, or compete to provide output.

The interface 1104 can include software procedures (e.g., defined in a library) that facilitate the use of the model 1102, such as by providing a way to establish and interact with the model 1102. For instance, the software procedures can include software for receiving input, preparing input for use (e.g., by performing vector embedding, such as using Word2Vec, BERT, or another technique), processing the input with the model 1102, providing output, training the model 1102, performing inference with the model 1102, fine tuning the model 1102, other procedures, or combinations thereof.

In an example implementation, interface 1104 is used to facilitate a training method 1110 that can include operation 1112. Operation 1112 includes establishing a model 1102, such as initializing a model 1102. The establishing can include setting up the model 1102 for further use (e.g., by training or fine tuning). The model 1102 can be initialized with values. In examples, the model 1102 can be pretrained. Operation 1114 can follow operation 1112. Operation 1114 includes obtaining training data. In many examples, the training data includes pairs of input and desired output given the input. In supervised or semi-supervised training, the data can be prelabeled, such as by human or automated labelers. In unsupervised learning the training data can be unlabeled. The training data can include validation data used to validate the trained model 1102. Operation 1116 can follow operation 1114. Operation 1116 includes providing a portion of the training data to the model 1102. This can include providing the training data in a format usable by the model 1102. The framework 1100 (e.g., via the interface 1104) can cause the model 1102 to produce an output based on the input. Operation 1118 can follow operation 1116. Operation 1118 includes comparing the expected output with the actual output. In an example, this includes applying a loss function to determine the difference between expected and actual. This value can be used to determine how training is progressing. Operation 1120 can follow operation 1118. Operation 1120 includes updating the model 1102 based on the result of the comparison. This can take any of a variety of forms depending on the nature of the model 1102. Where the model 1102 includes weights, the weights can be modified to increase the likelihood that the model 1102 will produce correct output given an input. Depending on the model 1102, backpropagation or other techniques can be used to update the model 1102. Operation 1122 can follow operation 1120. Operation 1122 includes determining whether a stopping criterion has been reached, such as based on the output of the loss function (e.g., actual value or change in value over time). In addition or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 1114. If the stopping criterion has been satisfied, the flow can move to operation 1122. Operation 1122 includes deploying the trained model 1102 for use in production, such as providing the trained model 1102 with real-world input data and produce output data used in a real-world process. The model 1102 can be stored in memory 1014 of at least one computer 1010, or distributed across memories of two or more such computers 1010 for production of output data (e.g., predictive data).

Classifying Content Authorship Using Embedding Space

Content 14 can include a region having one or more sub-regions labeled with one or more authorship tokens 18 as having human authorship and one or more sub-regions labeled with one or more authorship tokens 18 as having artificial authorship. In such an instance, the authorship of the region can be classified as "mixed" because it includes sub-regions having human authorship and sub-regions having artificial authorship. While it can be beneficial to label a region as having mixed authorship, in some instances it may be more beneficial to determine whether the human or artificial authorship predominates. It may also be beneficial to specify a relative amount of authorship (e.g., human versus artificial) of the higher-level mixed authorship region.

In addition, it may be beneficial to understand the extent to which an edit to content 14 changes the meaning of the content 14. This can be done by embedding representations of the content in a vector space and performing operations on those representations, such as clustering embeddings and measuring distances between embeddings.

An example method for using embeddings when determining authorship is described below in relation to FIG. 12.

Figure 12:
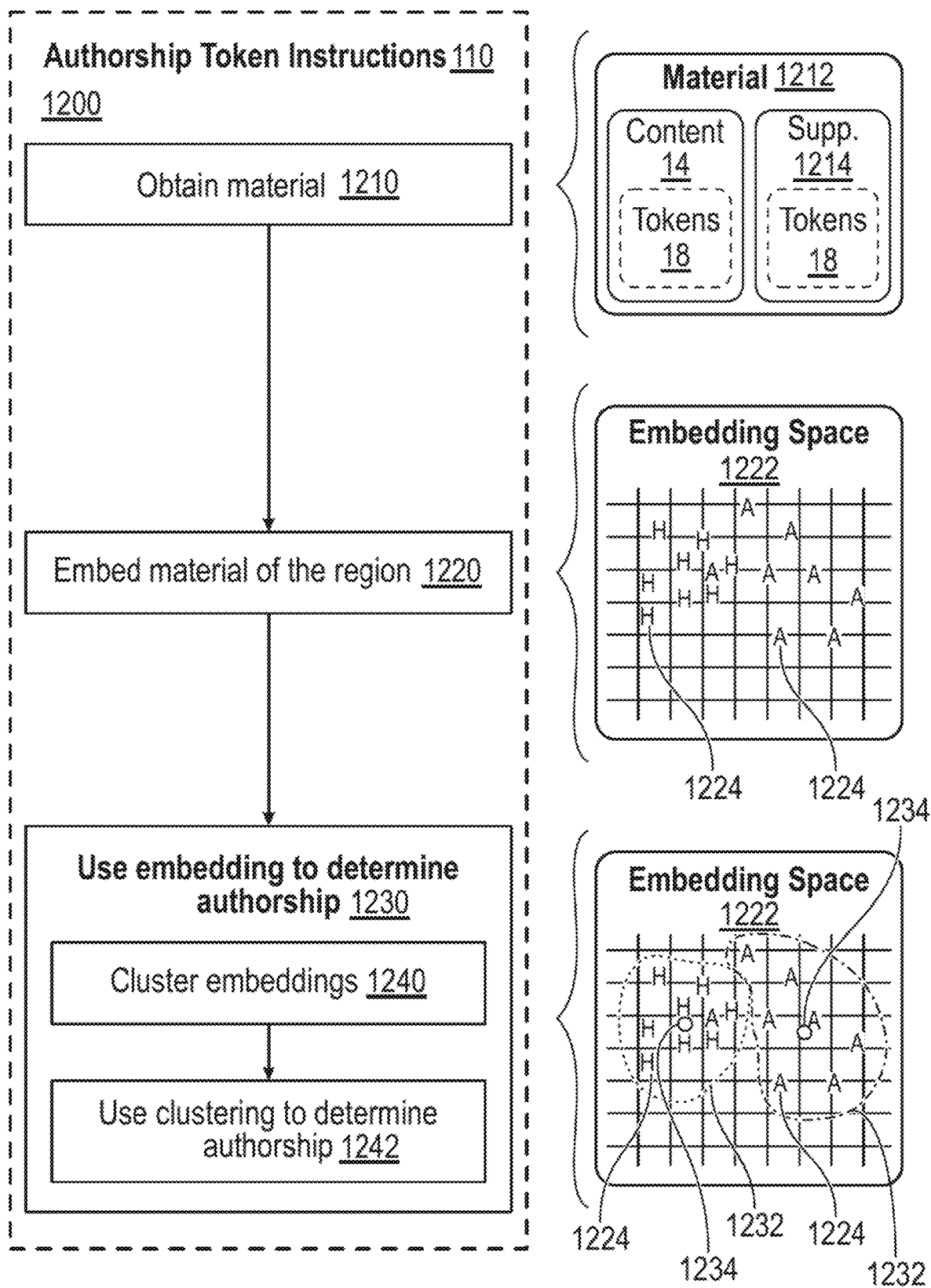
FIG. 12 illustrates the authorship token instructions including a method for determining authorship using embeddings.

FIG. 12 illustrates the authorship token instructions 110 including a method 1200 for determining authorship using embeddings. The method 1200 can begin with operation 1210.

Operation 1210 includes obtaining material 1212. The material 1212 can include any content 14 described herein. The material 1212 may include existing authorship tokens 18 labeling authorship of regions of content 12 according to techniques described herein. The material 1212 can also include supplemental information related to but not directly in the content 14. Such supplemental information 1214 can include, for instance, chat logs that are related to the content. The chat logs may be, for example, a discussion between a human and the artificial intelligence regarding the content 14 (see, e.g., FIG. 7B and associated discussion). In a further example, the supplemental information 1214 can include a history of recommendations by an author (typically recommendations from an artificial author to the human author). Such recommendations can be used to catch instances where the artificial author suggests a change and then, rather than having the artificial author makes the change, the human author manually makes the change. In some implementations, there is a mechanism configured to determine the likelihood that a human author has actually seen or considered the artificial recommendation to resist a circumstance where the human naturally makes a similar edit to the one suggested by the artificial author without being influenced by it. Such a likelihood determination could be made by determining whether and for how long the artificial recommendation was displayed to the user. For instance, if the recommendation was displayed for less time than an amount of time necessary to comfortably read the recommendation, then it can be determined that the likelihood that the human author considered the recommendation is low. Likewise, if the recommendation would be difficult for the human author to see or read (e.g., the font is relatively small, the text is away from an active window or main portion of the screen, the suggestion is hidden, other obfuscations, or combinations thereof), then it can be determined that the likelihood that the human author was influenced by it is low. Following operation 1210, the flow of the method 1200 can move to operation 1220.

Operation 1220 includes embedding at least some of the material 1212 in an embedding space 1222 as embeddings 1224. This can include breaking the material 1212 down into embeddable sub-components. For instance, the material 1212 may include paragraphs that can be broken down into embeddable sub-components in the form of the words or tokens that make up the sentences of the material 1212. The level to which the embeddable sub-components are broken down can vary depending on the use case, the kind of embedding technique used, or other characteristics. The embeddable sub-components can be embedded using any of a variety of useful techniques, such as Word2Vec, BERT, or other techniques. In many examples, the embeddable sub-component is a word or tokens 18. However, recent developments have been made in higher-level embeddings, such as sentence level embeddings (see, e.g., doc2vec). Such higher level embeddings can also be used as appropriate.

Embeddings can be grouped to facilitate analysis. In some instances, all embeddings of a region (sentence, paragraph, etc.) can be grouped to facilitate analysis with respect to the overall region. Further, the embeddings can be created, updated, or fine-tuned using attention techniques to improve accuracy of the embeddings based on the surrounding context (e.g., the context of the material 1212 or the context of the region in which the embeddable sub-component appears). Further still, some embeddings may be ignored, not produced, or given less weight if they may distract from an overall analysis. For instance, changes to nouns, pronouns, verbs, adverbs, or adjectives may have a relatively greater effect on authorship than changes to prepositions or conjunctions.

Where the material 1212 includes authorship tokens, data regarding authorship can be stored such that each embedding's associated authorship can be determined. This can include, for example, identifying the author of the content that resulted in that embedding. In an example, there is a data structure that maps each embedding 1224 to authorship data. In some examples, authorship is baked into the embeddings such that there is a direction within the embedding space (e.g., toward positive infinity along one dimension) associated with human authorship and another direction in the embedding space (e.g., toward negative infinity along the one dimension) is associated with artificial authorship. In some examples, there may be multiple authors or it may be beneficial to identify a particular author among multiple different human or artificial authors and such data can be stored or embedded accordingly. In some examples, there is a data structure that maps embeddings to their associated authors.

For ease of illustration, the embedding space 1222 is shown in two dimensions. However, it will be understood that in most instances, embedding space has many more than two dimensions. Further, the embeddings 1224 are shown as being either "H" or "A" to reflect either human or artificial authorship of the subject embeddings 1224. In many embodiments, such labeling may not be this apparent.

Following operation 1220, the flow of the method 1200 can move to operation 1230.

Operation 1230 includes using the embeddings to determine authorship. This can include, for example, updating authorship of new or existing content or applying authorship to a piece of content that previously lacked authorship.

Operation 1230 can include operation 1240.

Operation 1240 includes clustering the embeddings 1224. The clustering can be performed using any of a variety of known clustering techniques including but not limited to centroid clustering (e.g., k-means clustering), hierarchical clustering (e.g., agglomerative clustering), model-based clustering (e.g., gaussian mixture model clustering), other kinds of clustering, or combinations thereof. Because there may be significant overlap between the embeddings, fuzzy clustering techniques can be used. The clustering can be such that embeddings of like authorship are clustered together. So embeddings having human authorship tend to be clustered together and embeddings having artificial authorship are clustered together. In some examples, the clustering involves clustering just one kind of author at a time (e.g., embeddings having no other authorship are present when the clustering occurs).

Following operation 1240, the flow of the method 1200 can move to operation 1242.

Operation 1242 includes using the clustering to determine authorship. For instance, a portion of content can be embedded into the embedding space 1222 and its position in the embedding space 1222 relative to the clusters 1232 can be used to determine authorship of the portion of content. Operation 1240 can include operation 1242 and operation 1244.

Operation 1242 can include updating authorship of the content 14 based on the clustering of the embeddings 1224 of the supplement 1214. For instance, a human author may have produced the content 14 entirely on their own (e.g., each character of the content 14 was manually typed by a human) but did so by being influenced by a conversation with an artificial chatbot. In such an instance, looking purely at the manual effort of the human, the content would be determined to have human authorship even if the human manually copied verbatim text written by an artificial intelligence. While this may be desirable in some instances, it is not in others. Clustering can be used to update the authorship of the content 14 based on the clustering of the supplement 1214 (the chat with the chatbot). For instance, each embeddable portion of the content 14 at issue can be embedded into the embedding space 1222 using the same technique used to embed the clustered embeddings 1224. Then, the embedded portion of the content 14 can be compared to the clusters (e.g., based on a distance to the centroids of the clusters) to determine to which cluster the embedded portion of the content 14 most closely belongs. The authorship of the embedded portion of the content 14 can be updated to reflect the authorship associated with the most relevant cluster. However, if the embedded portion of the content 14 is more than a threshold distance away from the clusters (or sufficiently dissimilar to the clusters in a relevant way), then it may be determined that the supplement 1214 is not relevant to the authorship of that portion of the content, and the original authorship token 18 remains unchanged.

Operation 1242 can include updating or characterizing the authorship of a region of content 14 based on authorship of its subregions. A region of content 14 can be made up of a plurality of sub-regions. In an example, the sub-regions include at least one sub-region having artificial authorship indicated with an artificial authorship token 18 and at least one sub-region having human authorship indicated with a human authorship token 18. The region may have mixed authorship and the sub-regions having ground-truth human or artificial authorship. However, in some implementations, the sub-regions themselves may have mixed or classified (e.g., using techniques described in relation to method 1200) authorship. And those sub-regions themselves may have their own sub-regions. The region can be a higher-level region encompassing a plurality of sub-regions. For instance, an editor 12 may track authorship on a word-by-word basis, so a base level authorship region would be at the word level (in other instances, it may be on a line level, token level, character level, or other level as appropriate). These word level regions can be considered as the sub-regions of a higher-level region. In such an instance, the higher-level region may be a sentence that comprises multiple word-level regions (in other instances, it may be on a phrase level, paragraph level, function level, or other level as appropriate).

The authorship of the region can be characterized by the clusters 1234 or other aspects of the embedding space 1222. For instance, the relative size and shape of the clustering can be used to infer authorship of the wider region. Where a human authorship cluster is larger than and encompassing of the cluster having artificial authorship, then it may be determined that the region has human authorship. The relative size and position of the clusters can be used to characterize the relative strength of authorship. For instance, the ratio of the size of the smaller cluster to the bigger cluster, can be used as an indication of the extent of authorship of the region attributable to the larger size. For example, where the artificial authorship cluster is 25% the size of the human authorship cluster, then the region can be determined to have '75% human authorship. If this number satisfies a predetermined threshold, then it may be determined that the entire region has a particular kind of authorship (e.g., in this case human).

The authorship of a region of content 14 can be influenced by the edit history of the region itself and nearby regions. Take, for example, the human authored the phrase "it was the best of times, it was the worst of times", which is then rewritten by an artificial author as: "the times were the best and the times were the worst". Depending on how attribution is configured, an authorship token 18 engine may determine that the new sentence has entirely artificial authorship based on how words were rearranged, removed, and added. That may be appropriate in some instances, but in others it may be desirable to maintain original authorship if the core meaning of the phrase hasn't changed. In this example, the phrase was merely rewritten from passive to active voice without changing the core meaning of the phrase. To improve authorship engine accuracy in such situations, it can be beneficial to determine whether and to what extent edits change the location of the region in embedding space. For instance, an original text has human authorship and edited text was produced by an artificial intelligence. If the edits change a location, shape, size, or other characteristic of the clustered embeddings of the region in embedding space less than a threshold amount, then the original authorship can remain notwithstanding the difference. The history of the edits of the text can remain and the overall effect of the edits provided by each author can be compared in this way to determine overall authorship. Thus, even if each individual change does not represent an authorship-changing step over the prior one, the overall effect of the changes can be compared and it can be determined whether that reaches significance.

If a new addition to the content is sufficiently far away from existing content in embedding space (e.g., more than a threshold distance away), then it can be determined to have the authorship of the entity making that edit rather than inheriting authorship from existing material.

Authorship Considerations for AI Content Editing Tools

Figure 13:
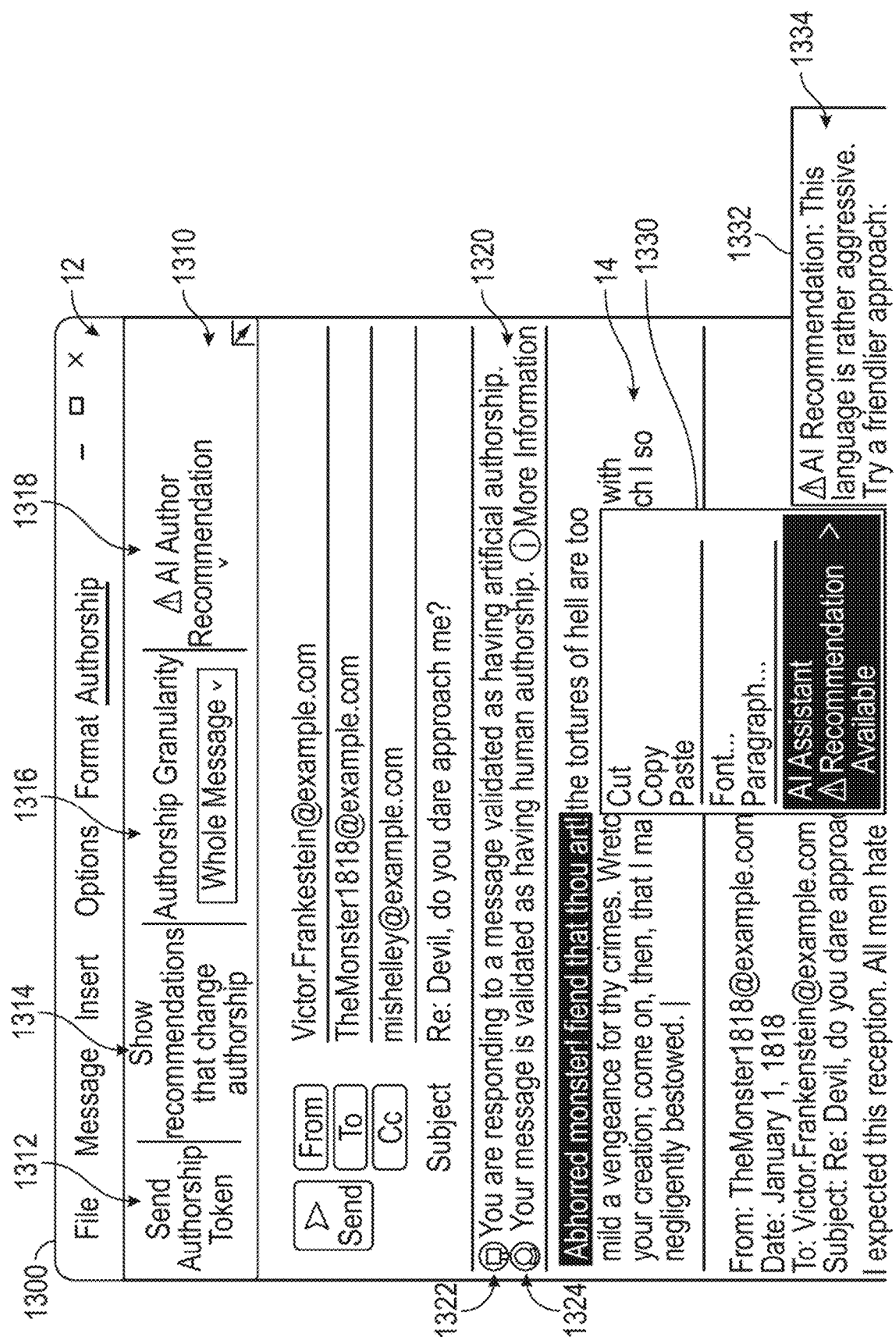
FIG. 13 illustrates an example user interface of an editor showing content.
Figure 13:
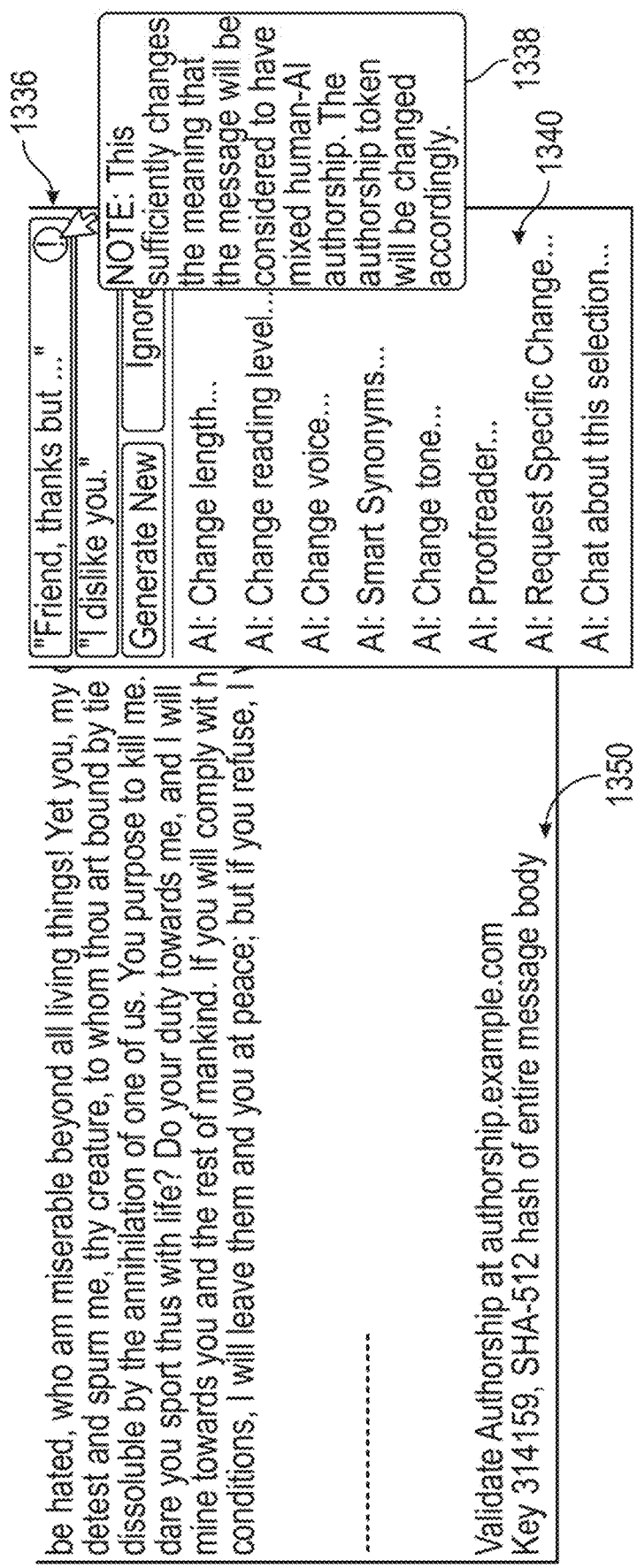

FIG. 13 illustrates an example user interface 1300 of an editor 12 showing content 14. As illustrated, the editor 12 is for editing email message content, but techniques described herein can be applied to other editors 12 and in other contexts. The user interface 1300 includes an authorship ribbon 1310, an authorship panel 1320, and a context menu 1330. The content 14 includes an email message from a sender. The email message includes a portion 1350 describing how to validate authorship of the message.

The authorship ribbon 1310 is a user interface element showing options for a user to change settings related to authorship. In the illustrated example, the ribbon 1310 includes a first element 1312 for toggling whether to send an authorship token 18 with the email message, a second element 1314 for whether to show recommendations that change authorship, third element 1316 for changing a granularity of authorship tracking, and a fourth element 1318 for viewing AI recommendations to the content 14.

Responsive to the first element 1312 being enabled for permitting the sending of an authorship token 18 with the email message, the editor 12 tracks authorship and stores an associated authorship token 18 using techniques described herein. The authorship token 18 may then be signed or otherwise validated and sent with the message to the recipient, so an email viewer of the recipient can provide information regarding the authorship of the message. Responsive to the element being disabled, the editor 12 may warn the user that the message may be treated different by the recipient for lack of authorship tracking.

In some examples, a spam filter or another kind of filter may receive a message from a sender, determine whether the message includes an authorship token, and then take an action based thereon. For example, a user or organization may have a policy to treat messages with different levels of scrutiny depending on whether an authorship token 18 is provided, whether the authorship token 18 is signed, who signed the authorship token 18 (and whether the signer is trustworthy), and what the authorship token 18 says about the authorship of the message. Actions may include moving the message to a specific folder or channel based on authorship, identifying the message as being spam (e.g., the authorship or lack of an indication thereof may be a factor in designating the message as spam), flagging the message as having particular authorship, other actions, or combinations thereof.

Responsive to the second element 1314 for showing recommendations that change authorship setting being enabled, the editor 12 will show recommendations that may change authorship of the content 14. For instance, a user may desire an artificial author to make suggestions but only to the extent that the suggestions would not change the authorship of the content 14 to having mixed or artificial authorship. When an artificial authorship assistant of the editor 12 generates recommendations, the generated recommendations can respect this setting and not recommend changes that go too far. For example, for each recommendation, the editor 12 can determine whether the recommendation would change authorship according to current settings. If so and if the element 1314 is unchecked, then a recommendation is regenerated and the process begins again. In addition or instead, settings of the artificial intelligence are changed that will resist the artificial intelligence from generating too aggressive of a change (e.g., to lessen the likelihood of a change changing authorship). Whether and to what extent recommendations change authorship can vary depending on personal or organizational preferences and may be configurable within the editor. In some instances, the element associated with permitting recommendations that change authorship has additional granularity beyond a simple Boolean. For instance, the element 1314 may allow for the user to specify whether recommendations that would result in mixed or artificial authorship are permitted. Further still, there may be options that classify an aggressiveness of the recommendations with respect to authorship. These can be specified in any useful way, such as classifying the recommendations as small/medium/large or by providing a slider that permits a numerical quantity. In an example, an AI assistant of the editor 12 determines a current level of human authorship, determines what level human authorship will be present if a recommendation is accepted, and then determines a difference between the two. If the difference exceeds a level of artificiality permitted by the element 1314, then the AI assistant disregards the recommendation.

The third element 1316 is for changing a granularity of authorship tracking. As discussed elsewhere herein, authorship can be tracked at the level of various regions (e.g., character, word, sentence, paragraph, entire work, etc.). The third element 1316 can allow a user to specify at what level tracking is desired. For instance, a user may want to reveal the extent of authorship at a certain level but preserve privacy and not reveal authorship at lower levels of granularity. For instance, at an entire-message level authorship of the content 14 may round to having human authorship, but at a per character level, there may be at least some characters having artificial authorship. To avoid negative security or privacy implications of providing such detail, the user can specify a minimum or maximum level of granularity to provide authorship information for using the element 1316.

The fourth element 1318 is an AI author recommendation element. Upon selection, the user interface 1300 displays a menu that permits selection of recommendations by an AI author regarding the context. An example of such a menu is shown and described in relation to menu 1332, which is described in more detail below. The element 1318 includes a notification ("A") indicating that the AI author has an especially relevant recommendation.

The panel 1310 may further include an element for changing other authorship settings. Actuation of such an element can cause the system to provide a user interface for receiving changes to the authorship settings. Such settings can include any settings described herein or that a person of skill in the art can develop with benefit of the description herein.

The authorship panel 1320 is a user interface element that provides information relevant to authorship of the content 14. Here, because there is content 14 both from the user and from another, there are two authorship messages in the panel. The first authorship message 1322 in the panel 1320 is an authorship message stating that the user is responding to a message validated as having artificial authorship. The second authorship message 1324 is an authorship message stating that the message that the user is drafting is validated as having human authorship. This message 1324 enhances privacy by alerting the user that authorship information is being send as part of the message.

In some examples, the panel 1310 can alert the user to changes in authorship. For instance, a user may typically receive automated messages from a retailer regarding packages being shipped. The user would often expect those messages to have only artificial authorship because they are automated messages. If one such message came in but it was determined to have human authorship, mixed authorship, or missing authorship information, then that might be an indication of a potential security or privacy concern with the message. The editor 12 may automatically take action with respect to such a message (e.g., by making it as spam) or alert the user that the authorship is unusual or changed from what is typical. Likewise, if messages typically had human authorship but then suddenly have artificial authorship, that may also indicate a security concern and remediation can occur.

The context menu 1330 is a user interface element being displayed by the user interface 1300. In many examples (including the illustrated example), the context menu 1330 is displayed in response to a user right clicking on a text selection. The context menu 1330 provides various options for the user to select to take action with respect to the selection, including to cut, copy, or paste at the selection. Among the options is an "AI Assistant" option, which here includes a notification to the user that the AI assistant of the editor 12 has a recommendation for the user. Hovering over or selecting the AI assistant option causes the display of an AI assistant sub-menu 1332.

The AI assistant sub-menu 1332 is a user interface element providing user-selectable actions regarding an AI assistant. The menu 1332 includes a recommendation 1334 with associated actions 1336, a tooltip 1338 regarding one of the options 1336, and AI text editing options relating to the selected portion of text.

The recommendation 1334 is a recommendation regarding the content 14 for the human author by the artificial author. For instance, while a human author is editing the content 14, the artificial author may generate recommendations for the human author. The nature of the recommendations may vary depending on set user preferences. The artificial author may monitor the content 14 for tone, emotion, readability, clarity, or other factors. For instance, the editor 12 may send the current content 14 to the artificial author (e.g., via a prompt containing the content and instructions to a large language model) and receive a response from the artificial author. Depending on the nature of the response (e.g., if the response has a particular level of urgency or otherwise warrants the human author's attention based on set preferences), the editor 12 may escalate the recommendation to the user's attention via a real-time notification to ensure timely consideration by the author. For instance, here, the context menu 1330 includes a warning icon next to the statement "recommendation available". So too does the element 1318.

As illustrated, the recommendation 1334 is regarding the tone of the content 16 being potentially inappropriate. The AI assistant includes several options 1336 selectable by the user. The first two options 1336 are rewrites of the selected text.

The first of those two options 1336 is a sufficiently drastic change to the text that, at least according to current authorship rules, it would change the authorship of the message. Because of this, the option 1336 includes a warning that, when hovered over or clicked on, displays a tooltip 1338 for the user. The tooltip 1338 indicates that the recommendation sufficiently changes the meaning that the message will be considered to have mixed human-AI authorship and that the authorship token 18 of the message will be changed accordingly.

The second option 1336 is a rewrite of the selected text but that does not sufficiently change the meaning as to warrant changing authorship (e.g., as indicated by the lack of a warning).

A third option 1336 is to generate new options. For instance, upon detecting actuation of this option 1336, the system may cause the artificial author to generate new recommended changes.

A fourth option 1336 is to ignore the recommendation. Upon detecting actuation of this option 1336, the system may hide the recommendation and remove the notification regarding the recommendation.

The additional actions 1340 are actions that can cause a change to the selected text.

The first action 1340 is to change syllables. Upon selection, the system may cause an AI author to change the length of the selected text. This may include increasing or decreasing the length. The length can be specified in any number of ways, such as a number of characters, words, sentences, syllables, tokens, or other units of length. Further, the length may be absolute length of the selection or another measurement of length (e.g., with respect to components of the selection, their average, median, minimum, or maximum length). This may include prompting an LLM with the selected text and a request to rewrite it so it has the specified length while retaining a similar meaning. In the illustrated example, the selected text is "Abhorred monster! fiend that thou art!". This text has eight syllables. Selection of the option and requesting fewer syllables may result in the text becoming, for example, "Bad beast! Fiend that thou art!", which conveys a similar meaning in only six syllables. In some examples, there is a slider that permits the user to specify how what length the new version should have.

The second action 1340 is to change the voice of the selected text. For instance, this may rewrite the text from active to passive voice or vice versa.

The third action 1340 is "smart synonyms", which allows the user to collaborate with the AI assistant to find synonyms for the words or concepts in the selected text. Where current editors use simple synonym finders on a word-by-word basis, the "smart synonyms" feature here permits a user to select multiple words or concepts and find synonyms for them. For instance, a user may select "half-horse half-man creature" and the system may propose "centaur" as a smart synonym for the combined concept. Such a system may be powered by providing the concepts as input to a large language model with a prompt asking the model to provide one or more synonyms.

The fourth action 1340 is to change the tone of the selected text. This can include changing the emotion expressed in the language. In addition or instead, this can include changing the formality of the text, such as from more formal to more casual. Other options for tone are possible, such as changing the era or location of speech. For instance, a user could choose to change the tone of the text to be that of someone living in 1960s San Francisco or 1500s England. Such an action can be performed by sending the selected text to an LLM with a prompt instructing the LLM to change the tone in the specified manner.

In the illustrated example, the content 14 portion corresponding to the message that the user is responding to includes a portion 1350 describing how to validate the authorship of the portion of the message. In the illustrated example, the portion 1350 includes a URL of a website with which authorship can be validated, a key to be used during validation, a hash function to be used for validation, and the granularity of the message that can be validated (e.g., here, the whole message, but in other examples, it may be another level of detail, such as a word or sentence level). The portion 1350 may be content added to the message that permits validation of authorship of the message using a third party. For instance, where messages are sent in a manner that may be tampered with, it may be beneficial to provide a recipient with a way to validate authorship. An example of this is described in FIG. 14.

Storage of Authorship Tokens

Figure 14:
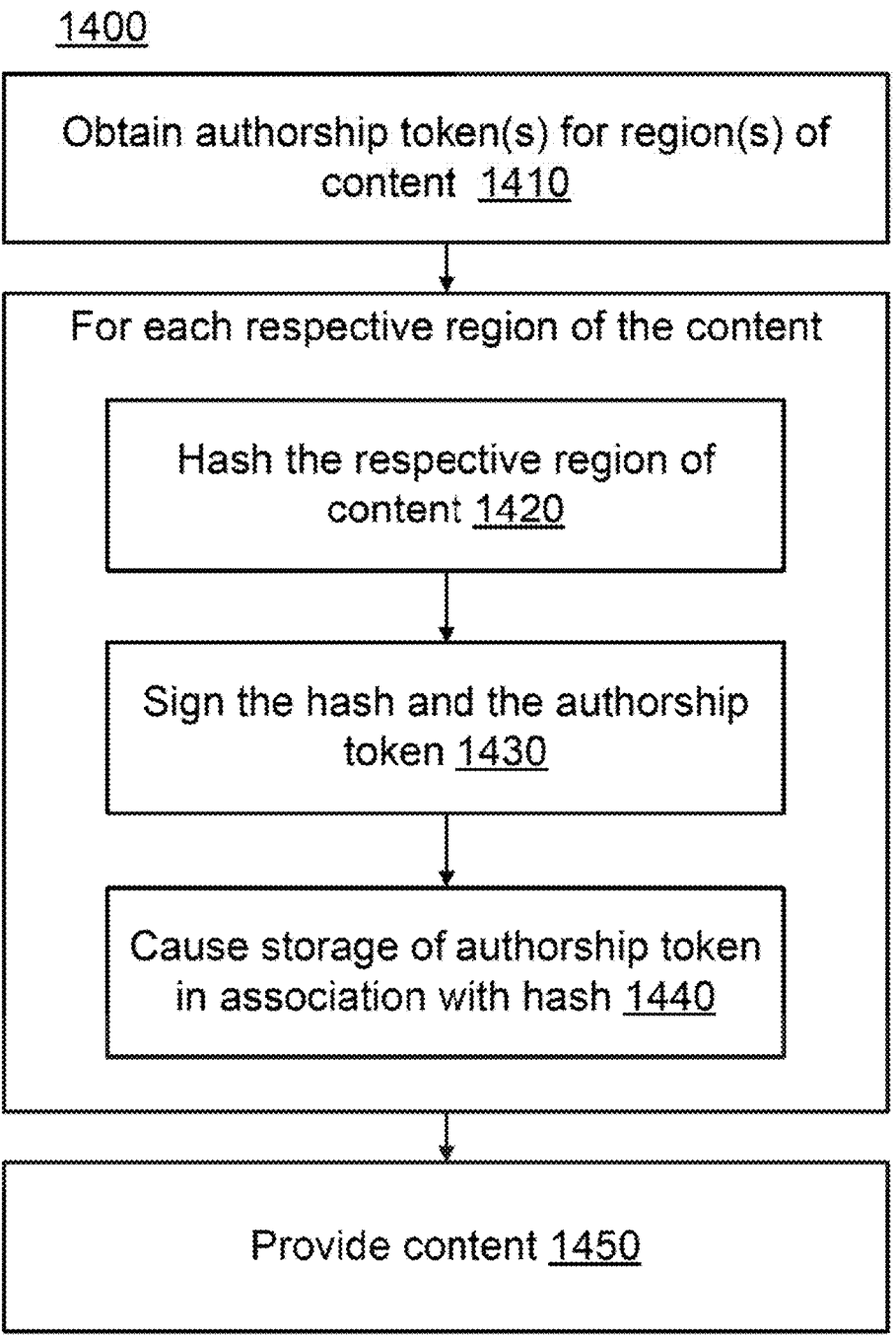
FIG. 14 illustrates an example method for storing an authorship token.

FIG. 14 illustrates an example method 1400 for storing an authorship token 18. It can be desirable to store an authorship token 18 of content 14 in a way that a third party (e.g., someone other than the author) can check authorship of the content. This can be especially useful when the content 14 is a plaintext message or otherwise in a format where authorship tokens 18 may be tampered with. It may also be beneficial in situations where content is authored using an editor 12 that supports authorship tracking but then the content 14 is provided via a medium that does not support authorship tracking. The method can begin with operation 1410.

Operation 1410 includes obtaining one or more authorship tokens 18 corresponding to one or more regions of content 14 to which the authorship token 18 applies. For instance, this may be done using techniques described elsewhere herein, such as obtaining the authorship tokens 18 by executing the authorship token instructions 110. In an example, content is obtained that has a plurality of regions and a plurality of authorship tokens 18. For instance, a content editor may obtain or generate such tokens 18. A system can provide a user interface for composing an email, and while composing the email, and via the user interface, email content is created based on user input. The email content can have a plurality of regions and a plurality of authorship tokens 18.

Operation 1420 includes, for each respective region of content, hashing the respective region of content 14 to form a respective hash. This can include hashing the region of content 14 with a predetermined hash function, such as SHA-512 or another hash function.

Operation 1430 includes signing the respective hash, such as with a signature associated with the editor 12. The operation can further include signing both the respective hash and the authorship token 18. The signing can be performed with a digital signature technique, such as by signing with a private key of the editor 12 or an organization that provides or hosts the editor 12. This can be used as an assurance of the trustworthiness of the authorship token 18. In some instances, accompanying information may be provided, such as an indication of the settings used when determining authorship (e.g., a description or reference to the method used to determine authorship).

Operation 1440 includes causing storage of the authorship token 18 in association with the hash. This can include storing such information in an place where the information is externally retrievable. For instance, this may be storing them on a blockchain. This can include storing the information in a place accessible via a website or via an application programming interface. The information may be retrievable without with or without authentication of a requestor. In an example, the information is stored in a datastore. The datastore may be included with the content when the content is provided.

Operation 1450 includes providing the content. When providing the content, the content may be provided with an indication of how to check the authorship of the content. For instance, it may include user-readable information (e.g., information configured to be readable and understandable by a human) describing how to check the authorship. An example of this is shown at reference 1350 of FIG. 13, which includes text with the content 14 that states "Validate Authorship at authorship.example.com Key 314159, SHA-512 hash of entire message body". This directs the user where to go to validate the authorship. In that example, it is a URL of a website, but in other instances it may direct a user to an application, chatbot, or another location. As illustrated, the information is spelled out in plaintext, but the information (e.g., the key, etc.) could be preloaded into a URL. In addition or instead, there could be instructions configured for use by a program (e.g., the program viewing the content) to automatically retrieve the authorship information from a third party. In addition or instead, the program viewing the content can automatically verify the authorship information directly (e.g., verifying that a hash of the content matches the hash associated with the authorship token 18 and verifying a signature associated with the hash and the authorship token).

In the illustrated example, the instructions include a key, which may be used as an optional extra layer of security (e.g., a person is prevented from retrieving authorship information or specific details about authorship information without providing the key). In addition or instead, it can be used to resist misattributing authorship in the case of hash collisions or multiple identical strings having different authorship. For instance, the string "good morning" may authored by many different authors in many different places. Merely relying on a hash would result in a collisions and may provide incorrect authorship attribution. The addition of the key can be used to distinguish between the same string authored in different contexts. The instructions also include a description of the hash function used to hash the message (here, SHA-512).

Verification of Authorship Tokens

Figure 15:
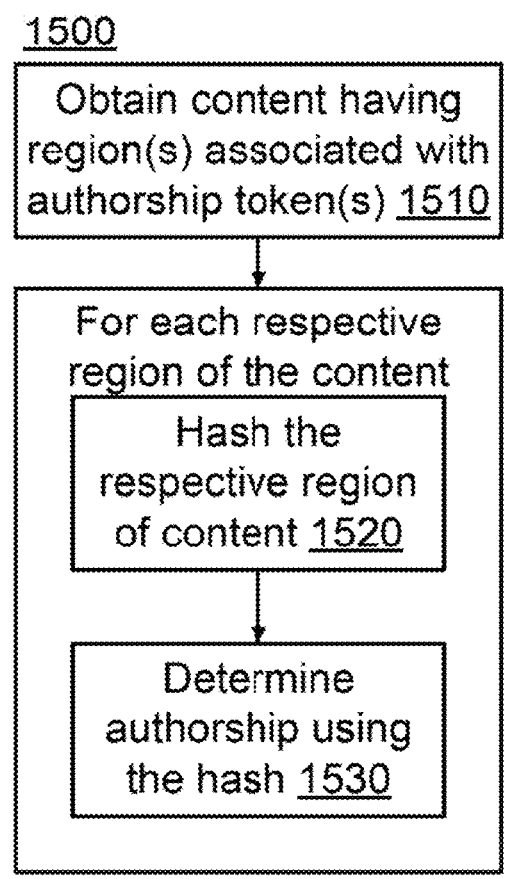
FIG. 15 illustrates an example method for verifying an authorship token.

FIG. 15 illustrates an example method 1500 for verifying an authorship token 18. The method 1500 can begin with operation 1510.

Operation 1510 includes obtaining content having one or more regions associated with one or more authorship tokens 18. For example, the content can be obtained as a result of operation 1450 of FIG. 14. In some examples, the content is obtained over a website, application, messaging platform, another source, or combinations thereof. Following operation 1510, the flow of the method 1500 can move to operation 1520.

Operation 1520 includes, for each respective region of the content, hashing the region of content. In some examples, the size of the respective regions is defined in the content itself. For instance, the region may be defined by the setting of an authorship granularity parameter of an editor 12 that created the content (e.g., see reference 1316 of FIG. 13 and associated description). The editor 12 creating the content having authorship at that level of granularity can include an indication of the granularity in the content 12. A hash function to be used can also be determined from the content (e.g., the content may specify a hash function to be used) or the hash function can be inferred from a context (e.g., it can be determined that the content was received from a particular source and that source is known to use a certain hash function). Following operation 1520, the flow of the method 1500 can move to operation 1530.

Operation 1530 includes determining authorship using the hash. This can include providing the hash to a service that stores authorship tokens 18. For example, it can be provided over an application programming interface, over a form, smart contract, in another way, or combinations thereof. In some examples, the service provides a response with an authorship token 18 associated with that hash. The service may also provide a digital signature associated with the authorship token 18. The recipient can verify the digital signature and evaluate a trustworthiness of the signatory of the authorship token 18. The recipient can then take an action based on the authorship token 18. In an example, the recipient is a software program (e.g., an editor 12 or a content viewer) and the program provides an indication of the authorship to a user (e.g., via an authorship panel 1320).

In an example, an indication of authorship is provided. The indication of authorship can be the authorship token 18 itself or something based on the authorship token 18. In an example, the indication of authorship is based on a comparison of a received authorship token 18 and a stored authorship token 18 (e.g., stored in association with a hash).

Different Kinds of Authorship

There may be different kinds of authorship. For example, concept versus expression. One author may decide that "the rock is big", where "rock" and "big" are concepts. But another author may choose specific words for how to express "rock" and "big" by changing them to be "the agate is huge". While the concept is unchanged, how that concept is expressed is changed. And that may be important in certain contexts. In particular, the humor of content may depend on specific word choices. Similarly, such expression may be relevant to certain kinds of content like poetry, song, or other forms of artistic content where things like syllables, rhyming, or other aspects are important. But in still other contexts, specific expression may not matter. For example, in a business email, journal article, patent application, or elsewhere there may be little importance placed on the authorship of expression. Instead importance may be placed on the author of the concept. Authorship need not be binary and instead may be allocated among the two (or more) but with different weights.

The difference between concept and expression can be determined based on a location of embeddings of a word in embedding space. Small distances (e.g., distances of less than a threshold) caused by an edit can be considered to edits to expression. Whereas large distances (e.g., distances greater than that threshold) can be considered to be edits to concept. Thus, the author of the content can be changed to the author of the edit depending on settings regarding whether expression or content are more important to authorship.

While many examples herein have focused on authorship, techniques described herein can also be applicable to demonstrating inventorship. For example, it may be beneficial to be able to demonstrate a level to which an invention was invented by a human versus an artificial intelligence (see, e.g., Inventorship Guidance for AI-Assisted Inventions, 89 Fed. Reg. 10043 (2024)). However, as artificial intelligence becomes integrated into the invention process (e.g., conducting research using artificial intelligence, writing code with artificial intelligence, brainstorming with artificial intelligence, drafting an invention writeup with an editor having artificial intelligence) and the patent drafting process (e.g., drafting a patent application with the assistance of artificial intelligence), it may become beneficial to demonstrate which ideas were invented by a human versus an artificial intelligence. Authorship tokens 18 described herein can be modified for such a use case. In an example, authorship token 18 settings can be modified to focus on authorship of concepts rather than creative expression of words as a way to focus more on inventiveness rather than mere creative expression of an invention. Thus, an invention disclosure or patent application can include authorship tokens, that can be used to support statements regarding the inventor.

Tracking the Selection and Arrangement of Content

Authorship tokens 18 can be used to track the selection and arrangement of content. For instance, an authorship token 18 can maintain an indication not just of its relation to the content it is in, but also the content it originated from. An example is shown in FIG. 16.

FIG. 16 illustrates example first content 1602. The first content 1602 is content written by a first author (e.g., an artificial author). A second author (e.g., a human author) then selected and arranged a subset of the first content 1602 to form second content 1604. In this example, the second author chose fifty characters (excluding spaces) from eight different places in the first content 1602 and combined them to form the second content 1604. In certain implementations, an authorship engine may determine that because the second content 1604 is a subset of the first content 1602, it retains the same authorship. This is represented by a first representation 1610 in which the entirety of the second content 1604 has the same authorship (e.g., artificial) and is labeled accordingly with an authorship token 18.

But in a second representation 1620, one or more authorship tokens 18 may capture not just content authorship but also arrangement authorship. In the second representation, different portions 1606 of the second content 1604 are described by different portions of the authorship token 18. For example, a portion 1604 (e.g., a subset of the second content 1604) can be described by a locator 1622 describing where in the original work (e.g., here, the first content 1602) the respective portion 1604 is from. Here, the locator 1622 describes the range of characters in the original work that correspond to the respective portion 1604, but other descriptions are possible. There can be a content authorship token 18 portion 1624 describing the authorship of that respective portion 1604. The content authorship portion 1624 can be an authorship token 18 (e.g., as described elsewhere herein) that describes the authorship of the entirety of the respective portion 1604 (e.g., which may be a largest contiguous block having a same authorship without contribution by any other author).

The arrangement portion 1626 can describe authorship of arrangement. In some examples, the arrangement portion 1626 can describe how different the arrangement is from the original (e.g., measured with Levenshtein distance or another measure). Other measures can be used to determine difference, such as measuring sentiment (e.g., emotion). Further, a difference between the two in embedding space can be measured. Each can be put through an embedding function that also uses attention of the block of text at issue (e.g., first or second content) and then cluster the resulting embeddings and measure their distance in embedding spaces.

There can be a content size indication 1628, which describes how much of the original work the portion 1606 made up. In the illustrated example, the content size indication 1628 describes the size in terms of the percentage of the first content 1602 that the portion 1606 represents.

As illustrated, the arrangement portion 1626 applies to a higher-level region (e.g., a sentence level) than the portions 1606 (e.g., a word or phrase level). In some instances, an authorship engine can determine a minimum size that a region can be to have arrangement authorship (or at least have arrangement authorship independent of the authorship of the content of the region). For instance, an individual character or word may lack sufficient length for arrangement authorship to apply, but a sentence, paragraph, or longer could have sufficient length for arrangement authorship to apply.

In some examples, the authorship engine determines whether the selection and arrangement follows an explicit procedure, process, system, method of operation, concept, or principle as described in 17 U.S.C. § 102(b). If so, the selection and arrangement credit is prohibited. In addition or instead, arrangement credit is given but attributed to the particular process applied. In an example, such a process for the selection and arrangement is identified based on one or more tools or commands used to effectuate the selection and arrangement. For instance, if the user activates a sorting feature of the content editor 12, which then causes data to be arranged in a specific order (e.g., alphabetically, numerically, by type, by size, another sorting technique, or combinations thereof), then authorship of the selection and arrangement can be determined to be the sorting method used rather than by the user. If a user activates a filtering function of the content editor 12 (e.g., to filter by type or other characteristics), then that filtering function can be given selection and arrangement credit rather than the user. However, in some instances, the user may be given credit for the selection of the filtered data based on the user exercising judgment in reducing the content included using the filtering. In addition, if a user instructs an artificial agent to perform some kind of filtering or sorting process, then the sorting process may be given arrangement credit rather than the user providing the instruction. For instance, the user may provide a prompt like: "remove every other word in this sentence" or "sort these functions by return type", but because a specific scheme was used to effect the arrangement or selection (e.g., in contrast to creative judgement), authorship in the selection and arrangement can be given to the scheme rather than the user.

In a further example, a user may write content in a rich text editor having various formatting, copy that rich text content, and paste it into a plain text editor (e.g., an editing application or a text field of a social media site). But rather than pasting using a traditional paste feature, the user pastes using an AI paste feature (e.g., POWERTOYS ADVANCED PASTE by MICROSOFT) that reformats the copied content. Thus, the AI arranges or otherwise changes content such that it is pasted in a new format (e.g., markdown format). But because the selection and arrangement (or other modification) of the content is performed using a predetermined rote scheme (e.g., converting rich text format to markdown format), credit for the selection and arrangement (or other changes) is not given to the AI that made the change.

In an example, there is a method that includes obtaining first content associated with authorship tokens 18 indicating that a first author authored the first content; receiving one or more edits to arrangement of the first content from a second author different from the one or more first authors, thereby forming second content; and updating the authorship tokens 18 to reflect that, with respect to the second content, the second author has authorship of at least some of the arrangement of the second content.

Updating the authorship tokens 18 can include maintaining the indication of authorship by the first author. One or more of the authorship tokens 18 can include one or more indicators of where in the first content a respective portion of the second content originated. The method can further include determining a significance of the one or more edits to the arrangement of the first content. The updating of the authorship tokens 18 can be based on the significance of a respective edit satisfying a threshold of significance. Determining the significance of the one or more edits to the arrangement of the first content can include an operation selected from the group consisting of: determining how different edited content is from unedited content; calculating a Levenshtein distance; measuring sentiment; and determining a distance in embedding space.

In an example, the method can include receiving one or more edits to selection of the first content from the second author. The second content can be the product of the one or more edits to selection. The authorship tokens 18 can be updated to reflect that, with respect to the second content, the second author has authorship of at least some selection of the second content. The method can further include determining a likelihood that the one or more edits to selection of the first content follow an explicit procedure, process, system, method of operation, concept, or principle. The updating of the authorship tokens 18 can be responsive to determining that the likelihood fails to satisfy a predetermined threshold.

In an example, the method further includes determining a likelihood that the one or more edits to arrangement of the first content follow an explicit procedure, process, system, method of operation, concept, or principle. The updating of the authorship tokens 18 can be responsive to the likelihood failing to satisfy the threshold. In an example, the method can resist updating the authorship tokens 18 responsive to the likelihood satisfying the threshold. Determining the likelihood can include determining that the one or more edits to the arrangement of the first content are responsive to the actuation of a tool or command used to effectuate the arrangement. For example, the tool or command can be a sort tool or command. Determining the likelihood can include determining that the one or more edits to the arrangement of the first content are responsive to the actuation of a tool or command used to effectuate the arrangement. Determining the likelihood can include determining whether the second author instructed an artificial agent to perform a specific sorting process. Determining the likelihood can include determining whether the second author exercised judgement in the arrangement. The method can include providing arrangement credit to the explicit procedure, process, system, method of operation, concept, or principle rather than the second author.

Removing the Selection and Arrangement of Content

As discussed above, authorship tokens 18 can be used to track the selection and arrangement of content. But it may be beneficial to provide a feature to remove the selection and arrangement of content. For instance, a first author (e.g., an artificial author) may produce first content. Then a second author (e.g., a human author) produces second content by selecting and arranging the first content. A third author (e.g., a human or artificial author) having access to the second content but not the first content wants to create third content that remixes or otherwise modifies the artificially generated aspects of the second content but without copying the selection and arrangement of the second content by the second author. For instance, this may be because the first content is a copyright free work generated by an artificial author, and the second author has a copyright in their selection and arrangement of the first content that formed the second content. Undoing the selection and arrangement in a useful way that retains aspects of the first work presents a technical challenge that can be addressed through certain implementations of an authorship engine.

Continuing the example of FIG. 16, an authorship engine can receive the second content 1620 having the authorship tokens 18. The authorship engine can break the second content 1620 into the portions 1606, rearrange the portions (e.g., randomize the position of the portions 1606) to be used as the basis for the third content by the third author. The third content can thus have removed at least a portion of the arrangement of the second content provided by the second author.

In addition or instead, the content engine can undo the selection performed by the second author. Where the authorship tokens 18 include information about the first content, that information can be used to undo the selection. For instance, where the authorship tokens 18 include an identifier of the first content, some or all of the first content can be retrieved and used as the basis for the third content. The authorship tokens 18 may include a description of the first content (e.g., a prompt used to generate it) but lack an identifier of the first content itself. In such an example, the authorship engine can use a large language model or other generative artificial intelligence to produce mock first content (e.g., a non-verbatim simulacrum of the first content) and use that mock first content to dilute the second content. The diluted second content can then be provided to the third author for use in forming the third content. For instance, the authorship engine can provide the prompt described by the authorship tokens 18 and include an instruction to include the rearranged portions in the output. The resulting output can thus mimic the first content but be diluted in such a way that removes the selection and arrangement by the second author.

Using the above process or similar processes, a user can undo the selection and arrangement of the first content by another author and use the resulting third content as the basis for their own work.

In an example, there is a method comprising obtaining first content associated with first authorship tokens 18 indicating that a first author produced the first content and second authorship tokens 18 indicating that a second author selected or arranged the first content; modifying the first content to form second content based on the second authorship tokens; and providing the second content, wherein the second content maintains the first authorship tokens 18 and lacks the second authorship tokens 18. In an example, the method is performed by a content editor. In an example, the first author is an artificial author and the second author is a human author. Modifying the first content to form the second content can include rearranging the first content to remove arrangement by the second author. Rearranging the first content can include randomizing a position of portions of the content arranged by the second author. Modifying the first content to form the second content can include generating ersatz content based on the first content; and adding the ersatz content to the first content, thereby removing selection by the second author. Generating ersatz content based on the first content includes generating the ersatz content with the first author (e.g., a large language model). Modifying the first content to form the second content can include removing content regions produced by the second author. In an example, the method can further include applying an edit to the second content by a third author to form third content. The third content can include an authorship token 18 corresponding to the third author. The content can be, for example, text content.

Significance of Suggestion Related to Edit

Figure 17:
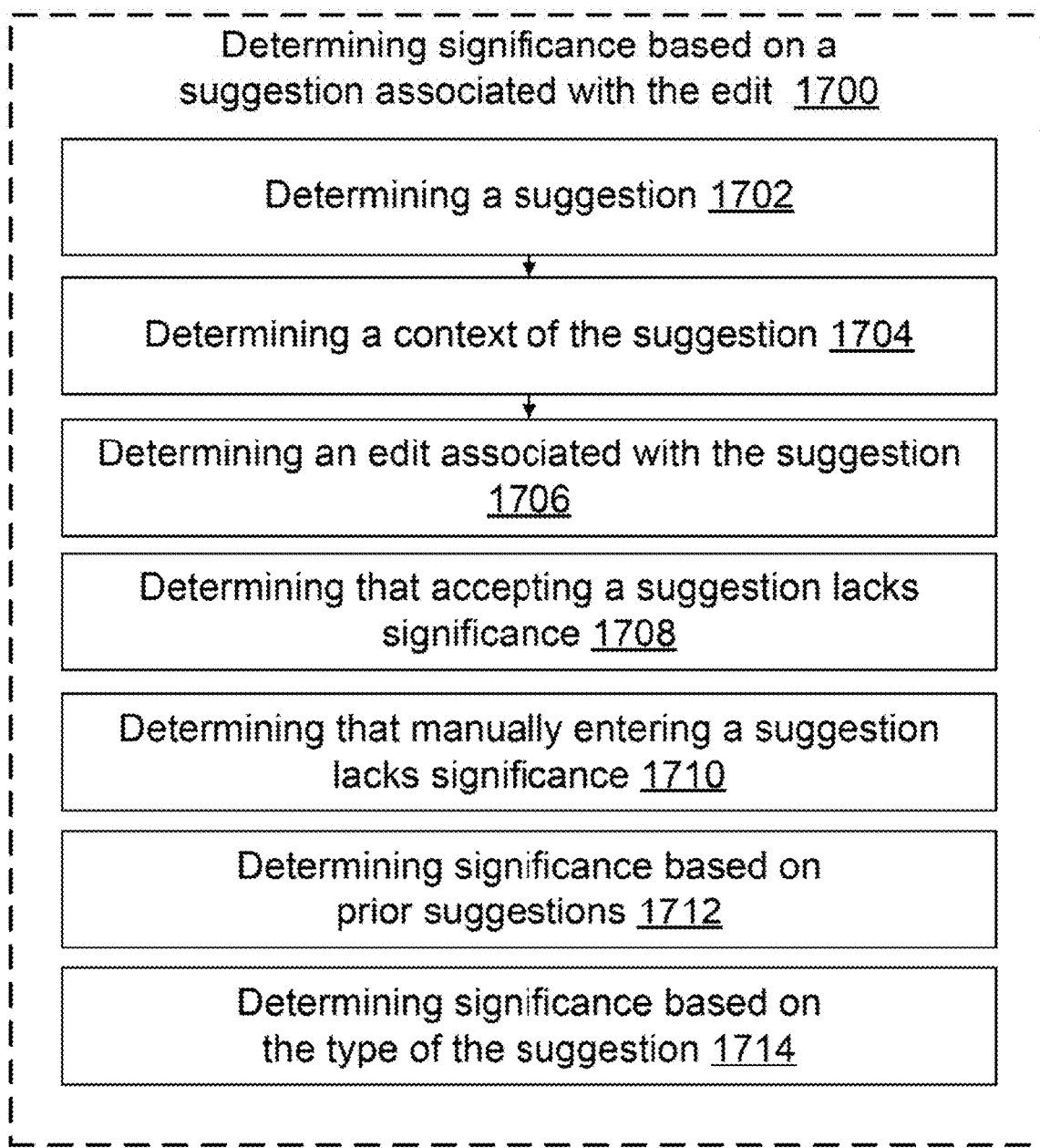
FIG. 17 illustrates an example method for determining significance based on a suggestion associated with an edit.

FIG. 17 illustrates an example method 1700 for determining significance based on a suggestion associated with an edit. The method 1700 can begin with operation 1702.

Operation 1702 includes determining a suggestion. In some examples, this can include determining a suggestion being presented or provided using an API associated with an active artificial author. In an example, the suggestion is received by the editor 14 from artificial author (e.g., from an API of the editor 14). In examples, the suggestion is provided by the editor 14 (e.g., a process or subprocess of the editor that provides suggestions). In another example, a screen reader or other monitor watches the content on the screen and identifies suggestions. The suggestion can be stored, for example, in a data structure (e.g., a list). There can be a history of the recent suggestions that can be later referenced.

Some implementations of generative AI assistants (sometimes referred to as "copilots") automatically provide a suggestion of what the user may want to write next (or what the AI assistant believes the user will write next) in the form of suggested text being written in a different shade than already-entered text and extending past the cursor. Typically, if a user hits the "tab" button, the suggested text is entered and the cursor moves to the end of the just entered text. Alternatively, the user could manually enter the content of the suggestion. In some instances, if the user writes something different than what is suggested, then a new suggestion replaces the old suggestion or the suggestion disappears until the generative AI proposes a new suggestion. In some instances, the suggestion remains visible if the user manually types the content (e.g., characters) of the suggestion.

Following operation 1702, the flow of the method 1700 can move to operation 1704.

Operation 1704 can include determining a context associated with the suggestion. Here, the context is the factors that affected the suggestion. In many examples, the context includes the immediate surroundings of where the suggestion is being placed. For instance, the user may have started a sentence and there is a suggestion for how to finish the sentence. The context would often include the start of the sentence because that influences the suggestion of how to end it. The context may include preceding sentences because they may provide antecedent basis or other support for what is being suggested. Where the suggestions are in association with source code content, the context may include the scope of the class, function, loop or other region at issue because they may affect what variables are suggested. The context may include other factors, such as information about preferred styles of the user, training data of the machine learning model used to produce the suggestion, a dictionary from which the suggestions are pulled, other contexts or combinations thereof. The context may be limited to what the artificial author (or other suggester) actually considered when making the suggestion. The context may be determined by calling an API or by analyzing what information was provided to the artificial author that resulted in a suggestion as output. In some examples, the context is estimated based on a predetermined number of characters, words, or other regions surrounding (e.g., both before and after) the location of the suggested edit. The context can be stored in an appropriate data structure. Following operation 1704, the flow of the method 1700 can move to operation 1706.

Operation 1706 can include determining that an edit is associated with the suggestion. In an example, edits are determined using techniques described in relation to operation 210. The edit may be an individual edit (e.g., a character) or a combination of edits (e.g., one or more words). The edit can be compared with the edits in the history to determine whether the edit is associated with a suggestion.

In some examples, there is association if the edit (or a portion thereof) matches verbatim the suggestion. In an example, the suggestions are stored in a trie data structure. While an edit is being made, the trie data structure is traversed based on the edit and used to quickly and efficiently determine whether the edit exactly or approximately matches a suggestion. If so, then it can be determined that the edit is associated with the suggestion. In addition or instead, matches are found by embedding the suggestions and edit in vector space and then comparing a distance between them. Further still, if the editor 14 determines that a user accepts a suggestion, then the edit resulting from the suggestion can be automatically determined to be associated with the suggestion. For instance, where the clicking of a button (e.g., an "accept" button) or pressing a key (e.g., hitting tab) results in the placement of the suggestion in the content, then the edit corresponding to that placement can be determined to be associated with the suggestion.

Operation 1708 includes determining that accepting a suggestion lacks significance. For example, it can be determined that the edit accepts the suggestion. Responsive to such a determination, it can be determined that the edit lacks independent significance. For instance, the author accepting the suggestion is not the author of it, but rather the author that made the suggestion is the author of the edit.

Operation 1710 includes determining that manually entering a suggestion lacks significance. This includes determining that the edit was merely typing what was already suggested. Thus, the significance or provenance of an edit is affected by whether a user is merely manually entering suggested text. For example, an authorship engine can compare text entered manually by a human with text suggested by an artificial intelligence. If the text is identical or substantially similar, then the engine may determine that no significant human authorship occurred (e.g., because the human user was merely manually following the artificial suggestion). However, in some instances, the edit may be considered to have human authorship if the suggestion by the artificial intelligence lacks significance of its own. How the authorship engine handles content provided in that manner can depend on policies and preferences set by the user or an organization. For example, there may be circumstances where it is desirable to resist circumstances in which a human user merely manually edits what an AI user suggests to have the content receive human authorship attribution for something that was actually authored by an AI. But on the other hand, it may be the case that the AI "thinks" of the same content that the user did and suggests it faster than the user can type. It may be undesirable for the user to lose credit in such a circumstance. The authorship engine may provide configurable settings or preferences to address authorship in such situations to achieve a desired balance.

Operation 1712 includes determining significance based on prior suggestions. For instance, although an author "merely" accepts a suggestion, that acceptance may follow significant prior editorial control over the suggestion. In an example, an AI suggests a first portion of content, whereupon the human author begins typing a second portion of content different from the first. The AI then updates its suggestion based on the typed beginning of the second portion of content and suggests a third portion of content. When the human accepts the suggested third portion of content, then that accepted suggestion may be considered to have human authorship even though it was suggested by an AI because it reflected human creativity in disregarding the first portion of content that was suggested by the AI and affirmatively beginning an alternative portion. User or system thresholds may be needed to determine how much accepted AI content qualifies as human authored in this instance. These thresholds may reflect a count of letters, words, or sentences; or the thresholds could be variable (e.g. as a multiple of the amount of text entered before accepting the suggestions) or the thresholds could be AI-determined based on one or more factors such as length of accepted content; how different the first, second, and third portions of content are from each other; and how original the resultant content is.

For instance, a user may have received several suggestions from an artificial author while producing content that were not accepted, and then the user finally accepts a suggestion. In some circumstances, the level of editorial control in disregarding prior suggestions before finally accepting a suggestion can indicate authorship by the author accepting the suggestion. Thus, the level of an author's involvement can be a factor in determining authorship. In some instances, human authors are present for and supervise the creation of content by an artificial intelligence. In some implementations, that level of involvement can be a factor in indicating that human authorship is present despite the actual content being created by an artificial author. In other instances, the artificial author may autonomously or semi-autonomously generate the content with little to no human supervision or input. Such a relatively limited level of involvement may weigh against a finding of human authorship. Thus, the nature of involvement (even supervision) by the authors can be a factor in determining authorship. A human accepting, certifying, or supervising changes to content by an artificial author may weigh in favor of human authorship even if such involvement does not happen contemporaneously with the artificial authorship (e.g., the human may provide such involvement later).

Operation 1714 determining significance based on the type of the suggestion. Suggestions may take different forms and they may affect the significance of an edit based thereon. Types of suggestions include correction suggestions, template suggestions, prediction suggestions, and generic suggestions.

A correction is a suggestion that is selected to correct a perceived error in content. A common example of this arises in the context of spell check. A user operating an editor 14 may enter a word that is not in a dictionary of a language that the editor believes the user is typing in. For instance, a user may type "paetnt", which is not a valid entry in a dictionary that the editor 14 uses for checking the spelling of text content. The editor then highlights the word (e.g., by rendering a red wavy line beneath the word) to indicate that the word may not be correct. The user may activate a spell check function (e.g., by right clicking on the word) and be presented with suggestions for how to correct the error (e.g., "patent", "patient", and "paint") as well as an option to add the word to a dictionary or have the editor ignore the alleged misspelling. Upon selecting one of the suggestions for how to correct the error (e.g., selecting "patent" because the user intended to type that word but transposed the "e" and the "t"), the editor replaces the erroneous word with the suggestion, thus making an edit to the content. In some implementations, because the user did not make the suggestion and did not make the change, the edit can be considered to have artificial authorship. In some implementations, because the user selected the suggestion to accept, the user has authorship. In some implementations, because the user selected the suggestion from among many different possibilities, the user has authorship but had there only been one suggestion that was accepted the user would not have authorship. However, as relevant to this operation, a distinguishing factor may be that the suggestion is a suggestion to correct an error. An authorship engine may determine the type of the suggestion (e.g., using an API, an internal state of the editor, or examining what kind of author is making the suggested change) is a correction of an error and determine that the suggestion is not significant (e.g., does not override authorship of the original content even if the original content is incorrect). This may be beneficial in certain circumstances by more accurately reflecting user expectations of authorship. Similar changes may be applied in the source code context, such as by the correction of a variable, function, or class name from one that doesn't exist (even if it is spelled correctly) to one that does exist. Of course, there may be other situations in which the correction of an error is important to authorship. For instance, the fixing of a more substantial bug than a misspelled variable or correcting an incorrect answer to a math problem or proof may warrant different significance considerations. Regardless of how it may be used, the type of suggestion being the correction of an error can be used as a factor in determining significance of an edit.

A template suggestion is a suggestion to have the form or format content conform to a template. A classic example is an editor that can detect that a user is writing a letter (e.g., based on detecting a user typing "Dear . . . ") and apply a template or formatting to help the user write the letter (e.g., adding a date section, signature block, return address, or other aspects). As another example, the editor may detect that an author wants to make a list (e.g., a bulleted or numbered list) and automatically apply an edit to the content to apply that template (e.g., by converting an asterisk to a bullet). In the source code context, the editor may automatically apply code indentation or add closing parentheses or braces to conform to a code formatting template. Thus, the application of a template may be an edit to content performed by an artificial author, but nonetheless it may be considered to be authored by the author of the content that prompted the application of a template. So responsive to determining that the suggestion is the application of a template in a context in which the content appears to match a template, the suggestion is not considered to be significant.

The personalized suggestion is a suggestion that is a prediction of what that specific author's next edit will be. For instance, a human author may be entering text and the editor suggests the next few words based on what the artificial author of the suggestion predicts that the specific human author would type next (e.g., based on learning from other content written by that specific human author). A personalized suggestion can be similar to but different from a generic suggestion. A generic suggestion can be what an artificial author would produce next without respect to the specifics of the author of the next content. The personalized suggestion may be the result of fine tuning on other content produced by an author (e.g., the human author), whereas the generic suggestion may lack such fine tuning or be fine-tuned on a non-author-specific set of content. As a specific example, a human author may start typing the following in a new document "Mr. Smith ran". If the human author routinely writes descriptions of how people ran that year's Twin Cities Marathon, then a personalized suggestion by the editor may be "the 2024 Twin Cities Marathon". But without any other context, a generative artificial intelligence producing a generic suggestion might suggest "very fast" or "for office" because its training data is sufficiently diverse that either of those could be the highest likelihood way to continue the sentence. Further, even if the word "marathon" did appear in the context, the generic suggestion may be a more popular marathon in the training data like "the Boston Marathon" rather than the more likely marathon that the human author would normally write about. Thus, suggestions can be classified as a personalized suggestion or a generic suggestion depending on how personalized or generic the suggestion is.

In some examples, it is sufficient to classify a suggestion as personalized if the artificial intelligence making the suggestion has been fine tuned on or otherwise customized for the author's content beyond the current context. But, in some instances, a generative AI may be personalized to a user but be unable to offer a personalized suggestion (e.g., because the context for which the suggestion is being generated is sufficiently novel) and may instead provide generic suggestions. In some instances, this can be determined based on determining whether a confidence level for a suggestion passes a predetermined threshold. If the threshold is satisfied, then the suggestion can be considered personalized, otherwise the suggestion is considered generic. In some examples, a suggestion can be considered significant if it is a generic suggestion but not significant if it is a personalized suggestion.

In some examples, the acceptance of a suggestion is determined to be completely predictable (e.g., and therefore the author of the edit that accepts the suggestion is the author that accepts the suggestion rather than the author of the suggestion). For instance, because the author that accepts the suggestion knows that the suggestion will be, they can be deemed to be the author.

In an example, there may be two competing artificial authors making suggestions. One of them may be fine-tuned or otherwise personalized an author (e.g., a human author) and the other may make generic suggestions. The output of the generic artificial author and the personalized artificial author can be compared. Where the suggestions match, then the suggestion can be considered to be not significant (e.g., because it's personalized to the human). If they do not match, then the generic suggestion can be considered to be significant (and the resulting edit would therefore be considered to have artificial authorship).

While several different operations have been discussed above and they may be independent or mutually exclusive, they need not be. The determining of significance may be based on the combination of multiple aspects or factors described above or elsewhere herein.

Predictability

In some examples, it can be beneficial to increase a predictability of the output of an artificial author, so the artificial author does not produce significant edits (and therefore does not have authorship of the edit). For instance, a human novelist may want to have an artificial intelligence help write a novel but still be considered the author of the resulting novel (e.g., the novelist is a slow typist and wants help from an autocomplete or other suggestion feature from an artificial author). So the human novelist modifies a setting of their editor that lowers a temperature of the artificial copilot. This may have the drawback of reducing the creativity or diversity of the suggestions by the artificial copilot while having the benefit of increasing certainty of the output to sufficient levels that the human novelist retains authorship of the resulting work.

In addition to or instead of changing the temperature, the editor (or artificial copilot) can be modified such that a suggestion only appears if the predictability of the suggestion is above a threshold. In addition or instead, the size of the prediction can be reduced in order to increase predictability. For example, predicting the next token can be relatively accurate, predicting the next two tokens 18 can be less accurate, and predicting subsequent tokens 18 can be less accurate still as uncertainty piles on. The size of the prediction can be reduced to the point where predictability remains sufficiently high to maintain human authorship.

In some examples, the editor may permit the making of significant suggestions (e.g., suggestions that may be considered to have artificial authorship) but provides such suggestions in a distinct way. For instance, a suggestion that would not change authorship can be displayed in light gray while a suggestion that would change authorship can be displayed in light red.

In an example, there is a computer-implemented method. The method can include determining that an artificial intelligence made an edit to content within a content editor. The edit can include one or more changes, insertions, or deletions to the content. The method can further include determining a region associated with the edit has human authorship based on determining that the edit satisfies the threshold of predictability. The method can further include, responsive to determining that the region associated with the has human authorship, ensuring the presence of a human authorship token 18 in association with the region. The human authorship token 18 can have a predetermined form indicating that a human rather than an artificial intelligence is the author of the region of content. Ensuring the presence of the human authorship token 18 can include applying a human authorship token 18 in association the region. In addition or instead, ensuring the presence can include retaining an existing human authorship token 18 in association with the region. In addition or instead, ensuring the presence can include removing an artificial authorship token 18 from association with the region. Determining that the edit satisfies the threshold of predictability can include determining that a temperature setting of the artificial intelligence is below a threshold. The method can further include generating the edit using the artificial intelligence, wherein the generating is configured to generate an edit having higher than the threshold amount of predictability. The generating can be so configured by generating potential edits until a potential edit has higher than the threshold amount of predictability. The generating of the potential edits can be such that the length of the potential edits becomes smaller as more potential edits are generated. The generating can be so configured by reducing a temperature parameter of the artificial intelligence. The method can further include presenting, by the content editor, the edit as a suggestion; receiving acceptance of the suggestion; and applying the suggestion to the content. The determining that the artificial intelligence made an edit to content can be responsive to applying the suggestion to the content.

The edit can be a first edit, and the suggestion can include the first edit and a second edit. Receiving acceptance of the suggestion can include receiving acceptance of only one of the first edit and the second edit. Applying the suggestion to the content includes applying the accepted edit. The predictability of the first and second edits, separately, can be less than the threshold, but suggesting both the first edit and the second edit can be responsive to the combined predictability of the first edit and the second edit being greater than the threshold.

Determining that the edit satisfies the threshold of predictability can include determining the predictability of the edit. Determining the predictability of the edit can include determining a likelihood that that a process that causes the edit given a content will produce a same edit given the same context. The edit can be changing case of the region, and edit can be entirely predictable. The edit can be changing a local variable to be a global variable, and the edit can be entirely predictable. The edit can result from a human user instructing the artificial intelligence to change the local variable to be a global variable. The edit can be changing data from a first format to a second format, and the edit can be entirely predictable.

In another example, there is a computer-implemented method comprising: determining that an artificial intelligence made an edit to content within a content editor. The edit can include one or more changes, insertions, or deletions to the content. The method can further include determining a region associated with the edit has human authorship based on determining that the edit fails to satisfy a threshold of creativity. The method can further include, responsive to determining that the region associated with the edit has human authorship, ensuring the presence of a human authorship token 18 in association with the region, the human authorship token 18 having a predetermined form indicating that a human rather than an artificial intelligence is the author of the region of content. Determining that the edit fails to satisfy the threshold of creativity includes calculating a creativity of the edit. The creativity of the edit is inversely proportional to the predictability of the edit. Calculating the creativity of the edit can include masking a token in the region to form a masked region, providing the masked region to a token predictor to predict the masked token, and using an output of the token predictor to determine the creativity.

Reassessing Authorship Tokens

There may be tradeoffs between authorship accuracy and computing resource consumption. For instance, as described herein, there are many techniques, factors, and settings that can be applied when determining authorship to improve accuracy of the determination. However, at least some may require significant enough computing resources that their real-time application becomes infeasible or detracts from a user experience of the editor. For instance, many users of an editor may value responsiveness and low latency, but the resources required to assess authorship for every edit made using an editor by a human or artificial author may negatively affect the responsiveness of the editor. Thus, there may be a tradeoff between accuracy of authorship determination the experience of the user operating the editor. One solution to address this tradeoff is to begin by applying a fragile authorship token 18 and then reassessing that authorship token 18 at a later time.

Further, additional data may subsequently become available that changes one or more assumptions on which an authorship token 18 was originally based. Thus, reassessing an authorship token 18 can improve accuracy.

Figure 18:
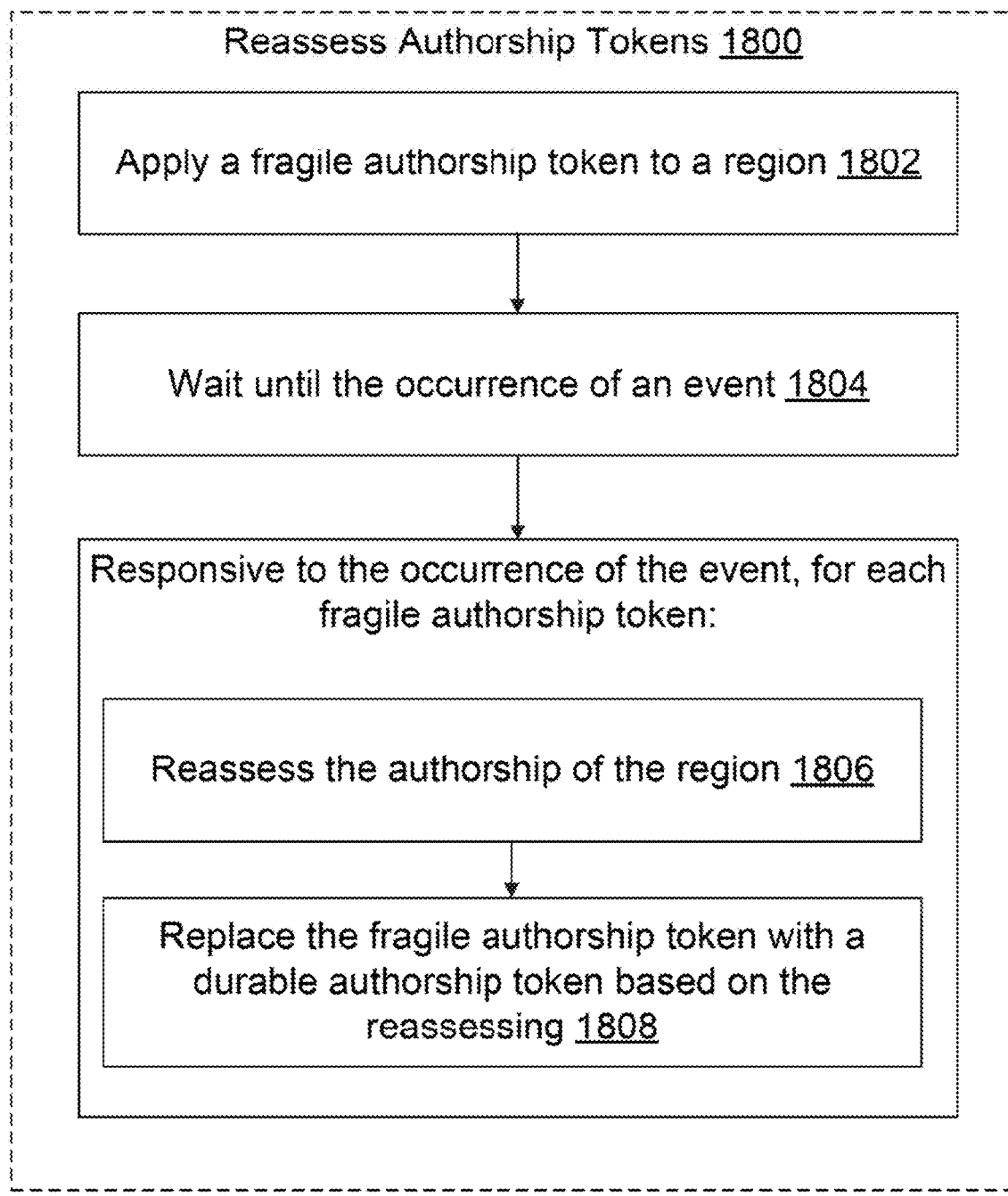
FIG. 18 illustrates an example method for reassessing authorship tokens.

So, in some circumstances, it may be beneficial to reassess an already-applied authorship, such as using the technique described in association with FIG. 18.

FIG. 18 illustrates an example method 1800 for reassessing authorship tokens 18. The method 1800 includes operation 1802.

Operation 1802 includes applying a fragile authorship token 18 to a region. The fragile authorship token 18 is an authorship token 18 configured to be replaced by a durable authorship token 18 after reassessment. A fragile authorship token 18 can include or lack a feature that indicates that it is fragile. In some examples, a fragile authorship token 18 is stored in a location or region different from a durable authorship token 18. In some examples, fragile authorship tokens 18 lack a protection feature present in durable authorship tokens 18 (e.g., fragile authorship tokens 18 may lack encryption, hashing, anti-mimicry features, other aspects, or combinations thereof). In an example, the fragile authorship token 18 is based on a first standard and the reassessment will be based on a second standard. In some examples, the second standard is an approach to determining authorship that is more resource intensive (e.g., in terms of amount of time, memory, or clock cycles required to perform the associated calculations) than the first standard. In an example, the first standard is less accurate than the second standard. In an example, the first standard considers less data than the second standard.

Operation 1804 includes waiting until the occurrence of an event. The event can be any of a variety of relevant events including but not limited to: expiration of a timer, resource consumption levels falling below a threshold, a pause in receiving new input, saving of a document, uploading of a file, compiling a program, actuation of a user interface element, receiving a command, other events, or combinations thereof.

Then certain operations occur responsive to the occurrence of the event. In an example, for each relevant fragile authorship token 18 (e.g., each one in a document, project, or other relevant delineation), operation 1806 occurs.

Operation 1806 includes reassessing the authorship of the region to which the fragile authorship token 18 applies. In an example, the reassessing is according to a second standard. Following operation 1806, the flow of the method 1800 can move to operation 1808.

Operation 1808 includes replacing the fragile authorship token 18 with a durable authorship token 18 based on the reassessing. The replacing can include retaining authorship and changing only the durability of the authorship token 18. In another example, the replacing includes replacing a fragile authorship token 18 indicating that a first author has authorship with a durable authorship token 18 indicating that a second author has authorship.

In an example implementation, there is a method that includes, while providing a content editor to a user having a file containing content, determining that a user of the content editor has made a manual edit to the content within the content editor, wherein the manual edit includes one or more changes, insertions, or deletions in a region of the content; determining first authorship of the region associated with the manual edit according to a first standard; applying a fragile authorship token 18 in association with the region based on the first authorship; responsive to occurrence of a predetermined event, determining second authorship of the region associated with the manual edit according to a second standard different from the first standard; and replacing the fragile authorship token 18 associated with the region with a durable authorship token 18 based on the second authorship. The predetermined event can be an event selected from the group consisting of: expiration of a timer, resource consumption levels falling below a threshold, a pause in receiving new input, saving of the file, uploading of the file, compiling a program associated with the file, actuation of a user interface element of the content editor, and receiving a command. The first authorship can be the same as the second authorship. In an example, the fragile authorship token 18 is stored in a first location and the durable authorship token 18 is stored in a second location different from the first location. For instance, the first location is in a file containing the content and the second location is external to that file (e.g., local to the file or remote from the file). A region associated with the fragile authorship token 18 can be different from a region associated with the durable authorship token 18 (e.g., the fragile authorship token 18 can be associated with a word and the durable authorship token 18 can be associated with a sentence that contains the word). The fragile authorship token 18 can lack a protection feature present in the durable authorship token 18. In an example, predetermined event is a first predetermined event of a first event type; and the method further includes: detecting the occurrence of a second predetermined event of a second predetermined event type different from the first predetermined event type; responsive to detecting the occurrence of the second predetermined event, reassessing the authorship of the region; and modifying the durable authorship token 18 associated with the region based on the reassessing. In an example, the first standard is less resource intensive than the second standard. In an example, the region changes between determining the first authorship and determining the second authorship.

While much of the above method 1800 is focused on reassessing fragile authorship tokens 18 and replacing them with durable authorship tokens, even durable authorship tokens 18 (or authorship tokens 18 lacking a fragile or durable classification) can be reassessed.

In an example, authorship tokens 18 can be reassessed based on different authorship standards. Throughout this disclosure there have been references to thresholds and other predetermined ways that values can be judged to determine authorship. Different organizations and individuals may have drawn the line for those thresholds in different places. As such, one reason to reassess authorship is to convert authorship determined using a first standard (e.g., having a first set of thresholds) to one determined using a second standard (e.g., having a second set of thresholds different from the first set). A content editor may provide user selectable standards for authorship and changing from a first to a second may cause existing authorship tokens 18 to be reassessed. In addition or instead, a user may be able to preview what the content would look like were it judged under a different standard. In some instances, the authorship tokens, a file storing the content, or one or more other data stores may store sufficient data to permit such recalculation. In other examples, such data may be missing and recalculation may be disallowed or restricted accordingly.

In many examples, content may undergo significant edits over the course of being created. This may include content being authored by two or more different authors and then being subsequently revised by one or more of those authors or different authors. This may result in a hodgepodge of regions of content having various authorship that lacks meaning. For instance, after a significant amount of edits, there may be individual words or letters having one authorship but are surrounded by regions of other authorship. In addition to being distracting and potentially misleading, the additional authorship may take up unnecessary space and maintaining it may waste resources. Such islands of content authored by another author may be reassessed to determine whether that content should still have different authorship in the current context. One way to assess such content is to determine whether it is predictable given its new context. For instance, if all text except for the italicized portion in the following sentence had the same authorship: "It was a dark and stormy night", an authorship engine may determine whether the word having unique authorship (here, "and") would be predictable or insignificant given the surrounding context (e.g., based on standards of significance or predictability described elsewhere). If so, it can have its authorship changed to the authorship of the surrounding text. Otherwise it can maintain its independent authorship. In an example, such islands of content can be identified by comparing the size of the island of content with surrounding content. If the island is smaller than a threshold size (e.g., a predetermined number of words or characters) and is adjacent one or more regions having the same authorship, then the region can be identified as an island and have its authorship reassessed.

In an example, there is a method comprising, while providing a content editor to a user showing content, identifying a meta-region of content having mixed authorship, the meta-region including a first sub-region of the content having first authorship indicated by a first authorship token 18 and a second sub-region of content having second authorship indicated by a second authorship token 18. The method further includes determining a significance of the first sub-region based on the second sub-region; determining that the significance fails to satisfy a threshold; and responsive to determining that the significance fails to satisfy the threshold, updating authorship of the meta-region. Determining the significance of the first sub-region can include treating the first sub-region as being an edit to the second sub-region and determining a significance of the edit. Updating authorship of the meta-region can include updating the first authorship token 18 to indicate second authorship. Updating authorship of the meta-region can include removing the first authorship token, removing the second authorship token, and ensuring that a third authorship token 18 associated with the meta-region indicates second authorship. Ensuring that the third authorship token 18 associated with the meta-region indicates second authorship can include, for example, modifying an existing authorship token 18 associated with the meta-region or adding the third-authorship token 18 to the meta-region Identifying the meta-region can be responsive to the occurrence of an event selected from the group consisting of: expiration of a timer, resource consumption levels falling below a threshold, a pause in receiving new input, saving of the file, uploading of the file, compiling a program associated with the file, actuation of a user interface element of the content editor, and receiving a command. In an example, the first and second sub-regions are word-level regions and the meta-region corresponds to a sentence-level region.

In an example, the method further includes identifying a second meta-region of the content that also has mixed authorship. The second meta-region can include a third sub-region of the content having first authorship indicated by a third authorship token 18 and a fourth sub-region of content having second authorship indicated by a fourth authorship token; determining a significance of the third sub-region based on the fourth sub-region; determining that the significance of the third sub-region based on the fourth sub-region fails to satisfy a threshold; and responsive to determining that the significance satisfies the threshold, maintaining mixed authorship of the meta-region. Maintaining mixed authorship of the meta-region can include replacing a fragile authorship token 18 with a durable authorship token 18. In an example, the method further includes determining a significance of the fourth sub-region based on the third sub-region; determining that the significance of the fourth sub-region based on the third sub-region fails to satisfy a threshold; and wherein maintaining the mixed authorship of the meta-region is further based on the significance of the fourth sub-region based on the third sub-region fails to satisfy the threshold.

Anthropogenic Versus Technogenic Content

It may be beneficial to understand whether content is authored by a human (e.g., "anthropogenic") versus authored by an artificial intelligence (e.g., "technogenic"). For instance, when browsing social media or blog posts, it may be beneficial to understand the anthropogenic or technogenic origin of the content. An example method for assisting in such a determination can be performed by an anthropology engine running on a device. An example method is shown and described in relation to FIG. 19.

Figure 19:
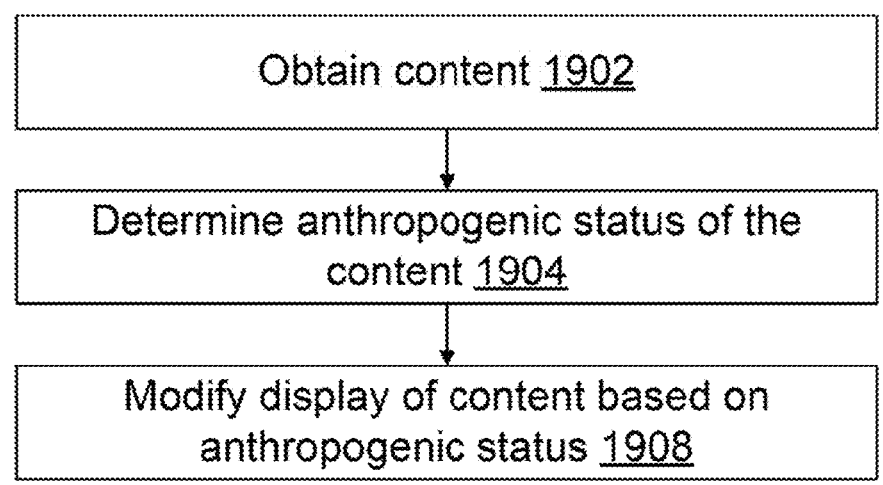
FIG. 19 illustrates an example method for determining the anthropogenic status of content.

FIG. 19 illustrates example method 1900. In an example, the method is performed by the anthropology engine. In some examples, the anthropology engine is built into a web browser, built into an application displaying content (e.g., a text editor, a web browser or a special-purpose application), an operating system providing the application displaying the content, a plugin to the application (e.g., a browser extension). In some examples, the method 1900 is performed by a web browser, browser extension, artificial assistant, or other program.

The method can begin with operation 1902.

Operation 1902 includes obtaining content blocks. For example, content may be the content of a web page and the content blocks may be portions of that content. The content (e.g., a web page) may be received into a browser or other application from an Internet resource (e.g., a server or other host). Obtaining the content can include obtaining a monolithic block of content, obtaining portions of content. That monolithic block of content can be split into smaller content blocks. Where a monolithic block is broken into smaller blocks of content, those smaller blocks of content can be sub-regions of content (e.g., pictures, videos, frames, words, sentences, paragraphs, pages, or other regions) or logical blocks of content based on how the content is structured (e.g., by parsing the content using parsing software, such as BEAUTIFUL SOUP by Leonard Richardson). In some examples, the content is a social media page and the content blocks are comments, posts, videos, other content blocks, or combinations thereof. In some examples, the browser that obtains the content is not a general-purpose web browser (e.g., EDGE by MICROSOFT, SAFARI by APPLE, CHROME by GOOGLE, or FIREFOX by the MOZILLA FOUNDATION) but rather a special-purpose application for a specific Internet resource (e.g., the FACEBOOK app for accessing FACEBOOK by META).

Operation 1904 includes determining an anthropogenic status of the content block. This can include determining whether the content block has an authorship token 18. If the content block has an authorship token, then the authorship token 18 can be analyzed to determine whether the authorship of the content is anthropogenic (e.g., based on the authorship token 18 indicating human authorship), technogenic (e.g., based on the authorship token 18 indicating artificial authorship), or has another status (e.g., mixed or unknown origin). In some examples, this can include determining a credibility, trustworthiness, or authenticity of the authorship token 18. For instance, this can include determining whether a hash of associated content matches a hash associated with the authorship token, determining a format of the authorship token, determining a credibility of a provider of the authorship token, using other techniques, or combinations thereof.

If the content block lacks an authorship token, the anthropogenic status can be determined through other means. In an example, the anthropogenic status is determined by first determining authorship using a process based on the method described in relation to FIG. 15. Then the authorship can be used to determine an anthropogenic status of the content using techniques described above. In another example, the anthropology engine determines when the content was first authored (e.g., using a date associated with the content or by searching elsewhere). If the content was first authored prior to a date on which sufficiently advanced artificial content generation for the kind of content of the content block became available, then the content can be considered to be anthropogenic. Further, the content block can be analyzed for indications of being artificially authored. If the content block has indications of artificial authorship, then it can be considered to be artificially authored.

Operation 1906 includes modifying the display of the content based on the anthropogenic status of the content. In an example, this can include displaying anthropogenic content in a first manner, displaying technogenic content in a second manner, displaying mixed content in a third manner, and displaying content having unknown origin in a fourth manner. The manners of displaying the content can be such that content having different anthropogenic/technogenic statuses can be distinguished. In some examples, this can include making content more visible (highlighting content), making content less visible (decreasing contrast of the content, saturation, greying out the content, hiding the content, or not rendering the content), adding an identifier to the content that wasn't already present (e.g., a flag), other techniques, or combinations thereof. In an example, technogenic content is suppressed. In some examples (e.g., where the anthropology engine is part of an operating system), the modifying of the presentation can include providing an overlay over the browser (e.g., over portions of the browser corresponding to content having particular technogenic statuses) or modifying how the operating system causes the browser (e.g., portions thereof) to be displayed using APIs of the operating system.

Figure 20:
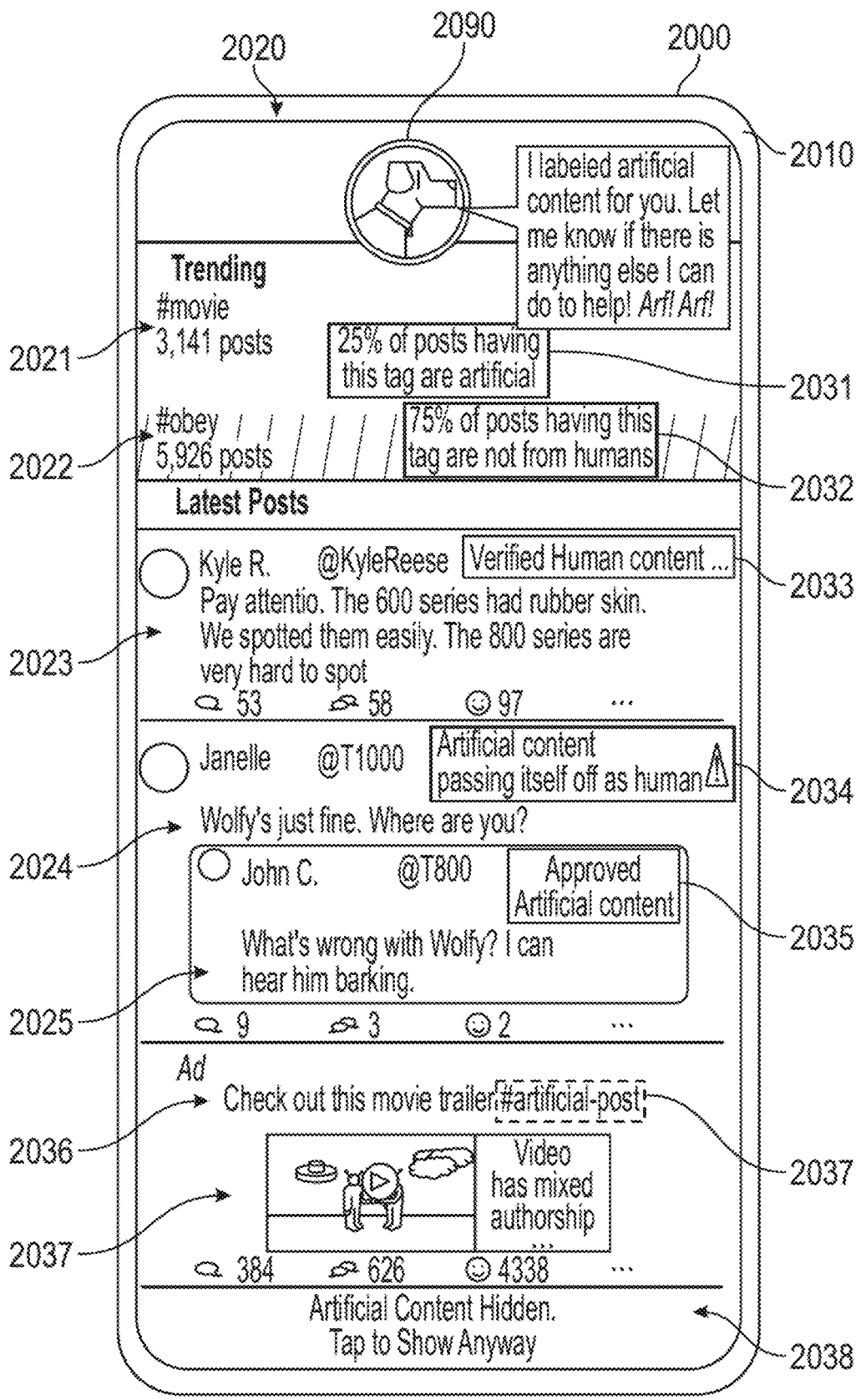
FIG. 20 illustrates an example user device having a user interface showing content.

Example content modified based on anthropogenic status is shown in relation to FIG. 20.

FIG. 20 illustrates an example user device 2000 having a user interface 2010 showing content 2020. The content 2020 includes content blocks.

A first content block 2021 shows a trending topic on a social media platform. The content block 2021 shows that there are a certain number of posts. The content block has associated with it an anthropogenic tag 2031 indicating that a certain percentage of the posts associated with that tag are artificial. This may be useful because the anthropogenic status of the tag itself is unknown or not useful (e.g., because it is a standard tag applied to many different posts). However, whether the overall use of the tag is coming from humans (e.g., in response to organic usage) or from artificial agents (e.g., in a campaign of inauthentic behavior by bots) may be relevant and the tag 2031 can be applied accordingly.

A second content block 2022 shows another trending topic on the social media platform. The content block 2022 also shows that there are a certain number of posts using that tag. However, here, an anthropogenic tag 2032 indicates that a substantial percentage of the posts using that tag are not from humans. As a result, the entire section of the content 2020 relating to that content block 2022 is deemphasized (e.g., by adding shading)

A third content block 2023 is a post from a user. The anthropogenic tag 2033 indicates that the content is verified human content. The tag 2033 includes a user interface element that, when actuated, causes display of more information regarding the authorship.

A fourth content block 2024 is a post from another user. The anthropogenic tag 2034 indicates that the content is artificial content and that the user is attempting to pass off artificial content as human content. In an example, this is determined based on first determining that the content is artificial content (e.g., though lacking an explicit disclaimer that the content is artificial) and then examining the user to determine if there is a disclaimer that the content posted by the user is artificial.

A fifth content block 2025 is a post from another user that the fourth content block 2024 is responding to. The fifth content block 2025 includes a fifth anthropogenic tag 2035 indicating that the fifth content block 2025 is from an artificial author, but that the artificial content is approved. For example, a user of the user device 2000 may have an allow-list of artificial content or artificial authors (e.g., that are low-risk, trustworthy, or otherwise okay) and the labeling with tags can be based on such an allow-list.

A sixth content block 2026 is an ad. The content block 2026 includes its own sixth anthropogenic tag 2036. As a result, the anthropogenic engine detects this tag in the content (e.g., by parsing the content for such a tag) and resists applying its own tag because it would be redundant. In other examples, the anthropogenic engine may apply its own (e.g., in addition to or replacing the existing one) for consistency or other reasons.

A seventh content block 2027 is a video embedded in association with the sixth content block 2026. A seventh anthropogenic tag 2037 is applied in association with the seventh content block 2037 indicating that the video has mixed artificial and human authorship. The tag 2037 includes a user interface element that, upon selection, can display an indication of which parts of the video have which kinds of authorship (see, e.g., FIG. 9 and the associated description).

An eighth anthropogenic tag 2038 indicates that an eighth content block is hidden because it is artificial. The tag 2038 indicates that, upon actuation, the suppressed content can be displayed.

As illustrated, there is a user interface element 2090 for an artificial assistant of an operating system of the mobile device 2000. Here, the artificial assistant facilitated the labeling of the content 2020, which would have otherwise generally not had labels.

While these examples were focused primarily on content, in some examples the anthropogenic status of a user of the platform can be determined. For example, there can be a tag that indicates an amount of content that the user posts that has human or artificial origins. There may be users that post only human generated content, only artificially generated content, or a mixture of content. This can be analyzed and used to label the user.

Collaboration Profile and Visualization

Authorship information can be complied into a report, profile, or visualization describing how an author collaborates with other authors (e.g., "how you work with AI" or "how you work with your team"). The report can be based on the authorship tokens 18. In an example, the report includes a graph that shows the relative amount or ratio of authorship of the content over time (e.g., human versus artificial). In some examples, authorship styles can be determined based on this. For instance, a person may tend to take in a lot of AI content and then edit it. Another may supplement their own content with AI suggestions. Still other may write without significant AI involvement and then bring in the AI at the end as an editor.

In examples, the authorship can be visualized using embedding space representations of the content. For instance, words can be represented in embedding space and the visualization can include a time lapse showing how different aspects of the content changed over time (e.g., by coloring different areas differently depending on the authorship). In that way, the viewer can watch the content grow and evolve over the editing journey.

Figure 21:
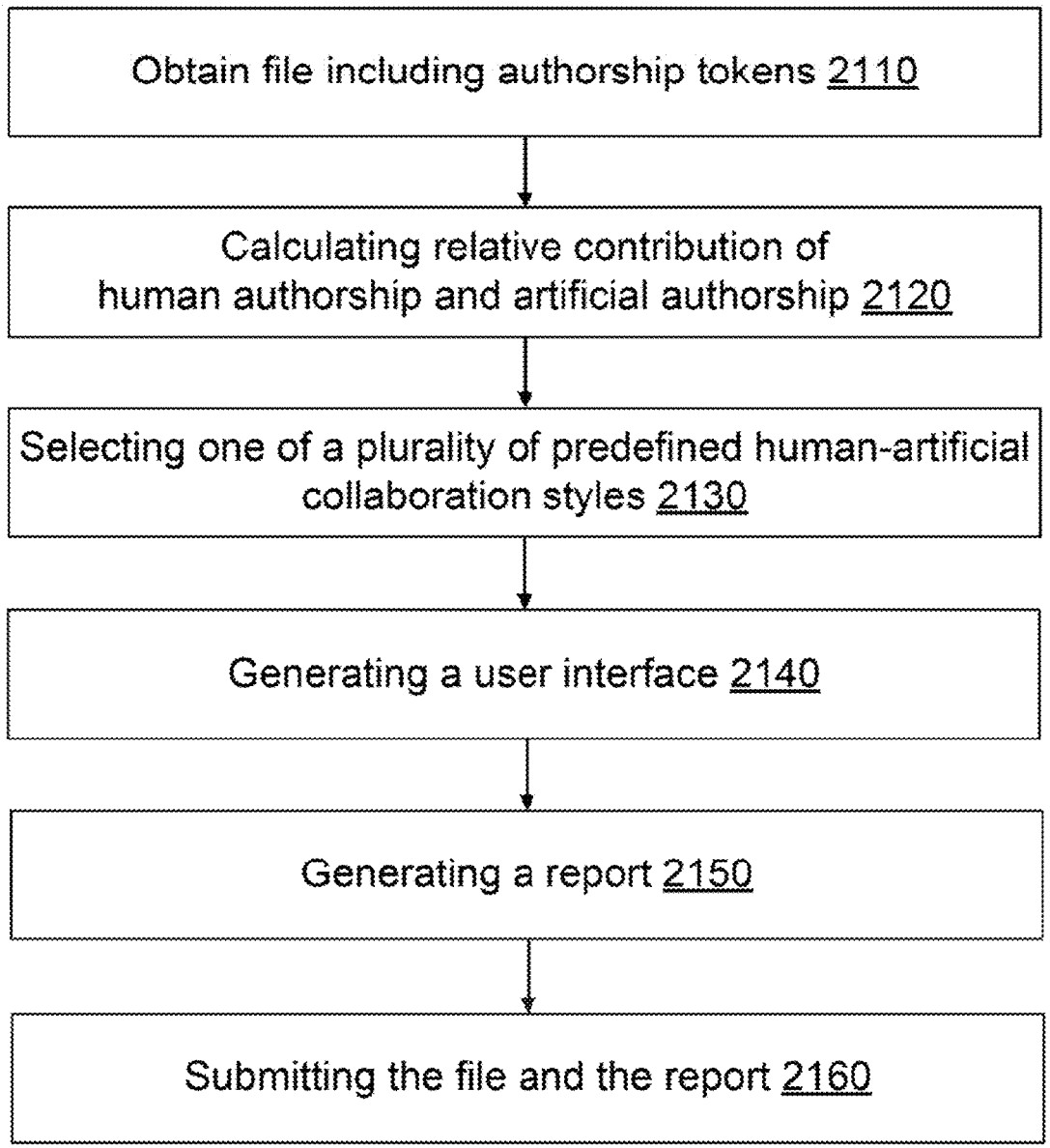
FIG. 21 illustrates an example method involving a collaboration profile and visualization.

FIG. 21 illustrates an example method 2100 involving a collaboration profile and visualization. As described herein, given how intertwined human and artificial authorship of content can be, it can be difficult for systems to provide a readily comprehensible way for a user to understand the relative contribution of human and artificial authorship. While, as described elsewhere herein, authorship tokens 18 can provide important insights into authorship of content, it may be relatively difficult for system to provide an intuitive, overall sense of authorship and collaboration styles to a user. This method 2100 is relevant to improvements it the ability of a content editor or viewer to interact with a user with respect to provenance of content over time. The method 2100 can begin with operation 2110.

Operation 2110 includes obtaining a file including authorship tokens 18. This can include obtaining the file with the content editor, such as a local or web-based content editor. In some examples, the file is a prose text document stored in a cloud. In another example, the file is a source code file. The authorship tokens 18 can include a first set of authorship tokens 18 describing associated content of the file as having human authorship and a second set of authorship tokens 18 describing associated content of the file as having artificial authorship.

The content editor can be a different content editor from the one that added the authorship tokens 18. In other examples, it is the same content editor. For instance, the method can include generating, with the content editor, the first set of authorship tokens 18 describing associated content of the file as having human authorship responsive to receiving input from a human; and generating, with the content editor, the second set of authorship tokens 18 describing associated content of the file as having artificial authorship responsive to receiving content from an artificial intelligence.

In some examples, the obtaining can include obtaining an indication of a relative change in authorship of the file over time. For instance, the file (or another file or data source associated with the file) can store an authorship history of the file. Time may refer to actual time spent editing the file. In addition or instead, the x-axis can be a total number of characters (or another relevant delineation, such as words, sentences, lines, pixels, or frames) authored.

Operation 2120 includes calculating a relative contribution of human authorship and artificial authorship. This can include calculating, with the content editor, statistics regarding a relative contribution of human authorship and artificial authorship using the first set of authorship tokens 18 and the second set of authorship tokens 18.

The calculating can include calculating statistics. The statistics can include at least one statistic selected from the group consisting of: a percentage of words in the file that have human authorship, a percentage of words in the file that have artificial authorship, a percentage of characters in the file that have human authorship, a percentage of sentences in the file that have human authorship, a percentage of sentences in the file that have human authorship, a percentage of suggestions by an artificial author that were accepted by the human author, and a percentage of file that has human arrangement.

Operation 2130 includes selecting one of a plurality of predefined human-artificial collaboration styles. This can include selecting, with the content editor, one of a plurality of predefined human-artificial collaboration styles based on the statistics. In some examples, the predefined human-artificial collaboration styles can include a characterization of how a human user interacts with one or more artificial intelligences. In a first example style, the user may prefer to provide an initial prompt to generate a large amount of artificially authored content and then work over time to edit that content. A chart of such an interaction style may indicate a large amount of human authorship, then a large decrease in human authorship (or a large increase in artificial authorship), and then a gradual increase in human authorship as the human edits the artificial text. In a second example style, the human may prefer to substantially draft the content themselves and involve artificial author as an editor or proofer. A chart of such an interaction style may indicate a relatively consistently high level of human authorship with relatively minor decreases representing additions or changes by an artificial author.

In addition or instead, the predefined human-artificial collaboration styles may include characterizations of the artificial author's role in the content creation process. For instance, in the first example style above, the artificial author may be classified as having a role as a "first drafter". In the second example style above, the artificial author may be classified as having a role as an "editor" or "coach".

In some examples, a user may prefer to follow a particular interaction style. A user may be able to be identified based on how they interact with an artificial intelligence. For instance, an authorship engine may identify an interaction style of a current user, compare that interaction style with a stored profile of different users, and select a particular user as the current user based on the interaction style matching a stored profile.

Operation 2140 includes generating a user interface. In an example, the user interface includes at least one element describing at least one statistic of the statistics; at least one chart representation of the at least some aspect of the authorship; an indication of the selected predefined human-artificial collaboration style; and a narrative description of the selected predefined human-artificial collaboration style.

At least one chart representation can show the relative change in authorship of the file over time. For instance, such a chart (e.g., a line graph) can show the relative change in the amount of content that has human authorship versus artificial authorship. The selecting of the predefined human-artificial collaboration style can be based at least in part on the relative change in the authorship of the file over time. For instance, the selecting can include selecting a first human-artificial collaboration style responsive to transition from a relatively higher amount of artificial authorship to a relatively lower amount of artificial authorship over time. The selecting includes selecting a second human-artificial collaboration style responsive to transition from a relatively lower amount of artificial authorship to a relatively higher amount of artificial authorship over time. In some examples, the chart includes an indication of a threshold of an impermissible amount of artificial authorship (or a required amount of human authorship).

Operation 2150 includes generating a report. For instance, generating the report can include generating a report that includes two or more of: a report element describing at least one statistic of the statistics; a report chart representation of the at least some aspect of the authorship; an indication of the selected predefined human-artificial collaboration style; a narrative description of the selected predefined human-artificial collaboration style; and applying a digital signature to the report, the digital signature being associated with the content editor.

Operation 2160 includes submitting the file and the report, such as to a third party. The third party can verify the digital signature of the signed report.

Figure 22:
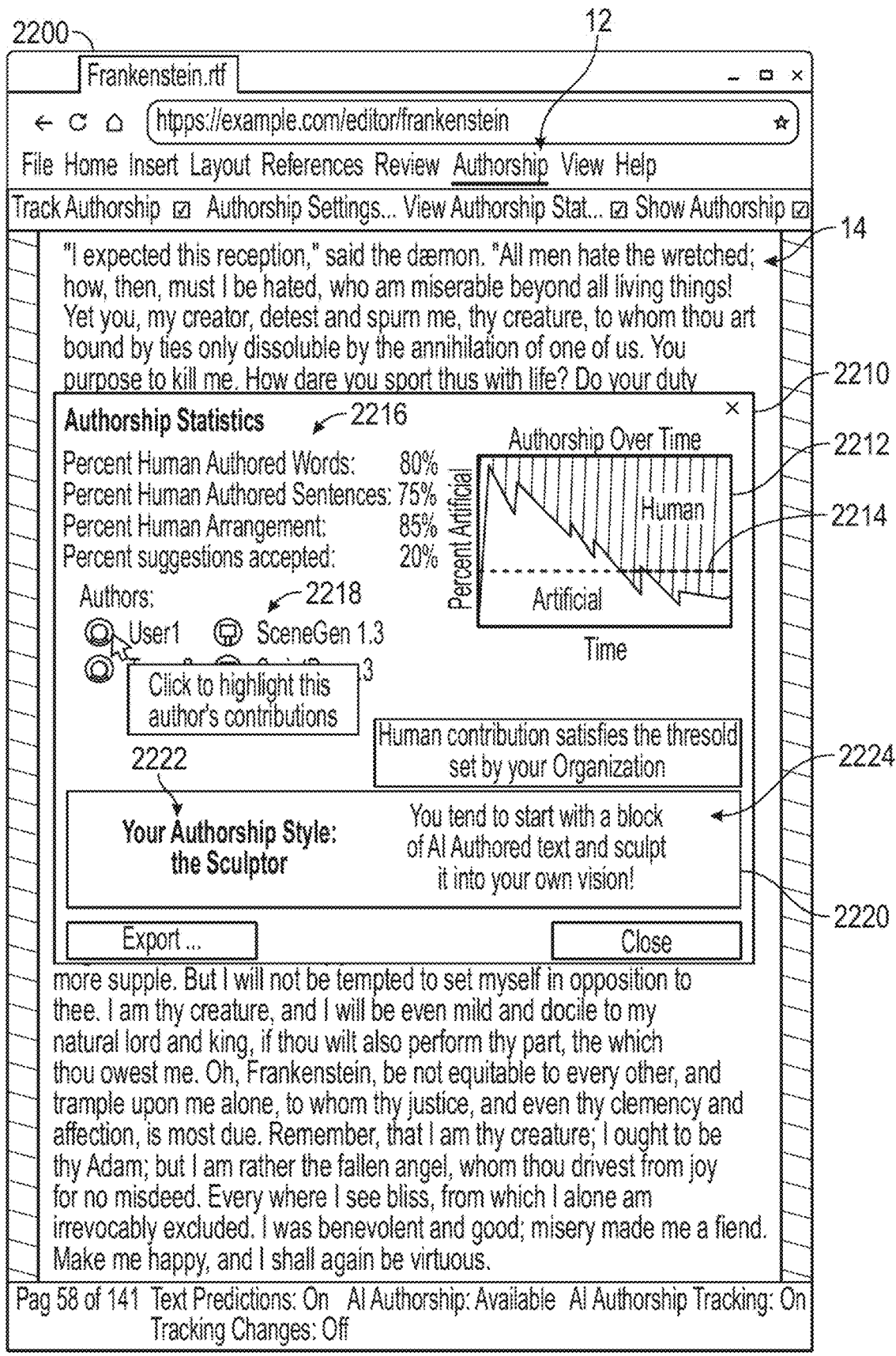
FIG. 22 illustrates an example web browser running on a user device and rendering a web page that provides a content editor for editing content stored in a file.

FIG. 22 illustrates an example web browser 2200 (e.g., running on a user device 100) rendering a web page that provides a content editor 12 for editing content 14 stored in a file. Here, the file is stored in the cloud and has prose text content. The web browser is showing a user interface window 2210 showing authorship statistics. In an example, the user interface window 2210 can be a user interface generated in operation 2140, above. As illustrated, the user interface 2210 includes a chart representation 2212 of authorship information with an illustrated threshold 2214, authorship statistics 2216, a list of authors 2218, and an authorship style element 2220 including an identification 2222 of a selected predefined human-artificial collaboration style and a narrative description 2224 of that collaboration style.

Figure 23:
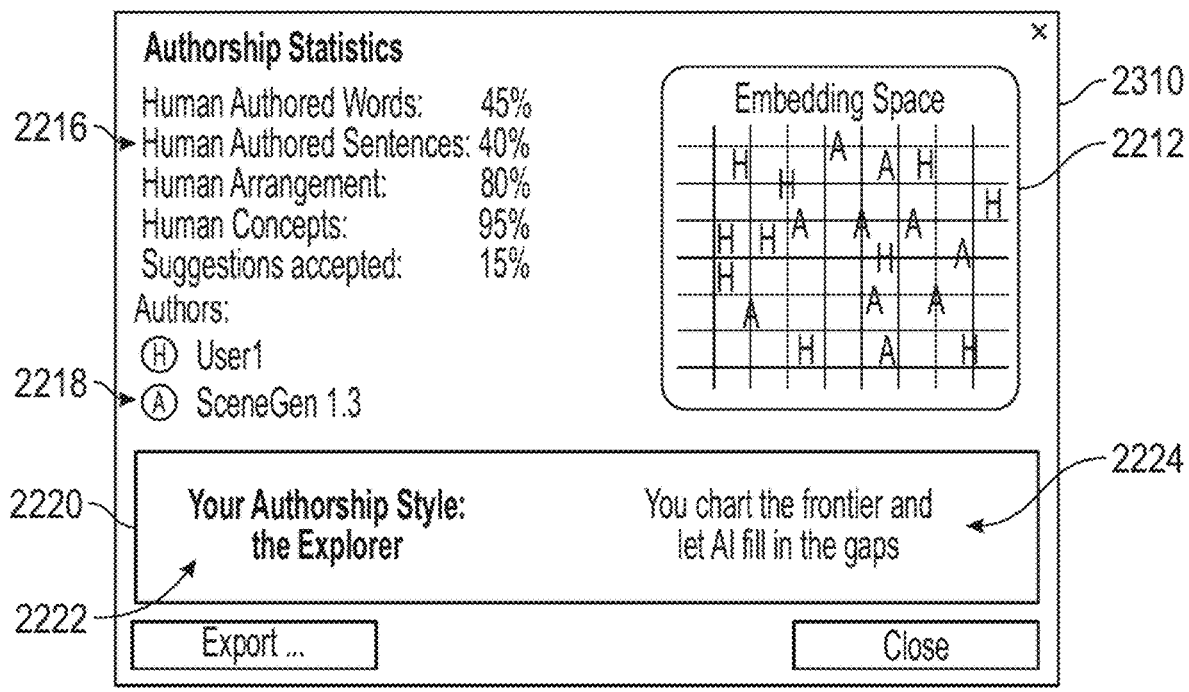
FIG. 23 illustrates a first example user interface including a chart representation of authorship information.

FIG. 23 illustrates an alternative user interface 2310. Like the user interface 2210, the user interface 2310 includes a chart representation 2212 of authorship information, authorship statistics 2216, a list of authors 2218, and an authorship style element 2220 including an identification 2222 of a selected predefined human-artificial collaboration style and a narrative description 2224 of that collaboration style. But here the chart representation 2212 is in the form of a representation of human authored and artificially authored embeddings in embedding space. This can be used to visualize a map of concepts (or words or another embeddable component) authored by the different authors. In an example, a user can click on the embeddings to see what they represent.

Figure 24:
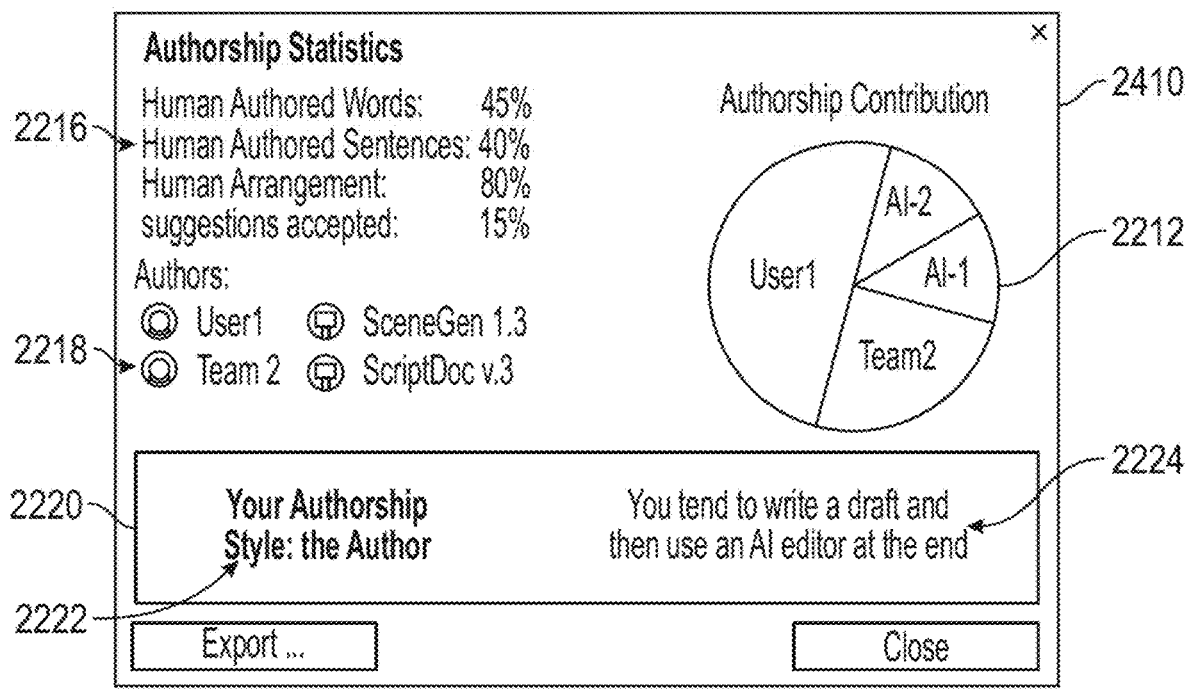
FIG. 24 illustrates a second example user interface including a chart representation of authorship information.

FIG. 24 illustrates an alternative user interface 2410. Like the user interface 2210, the user interface 2510 includes a chart representation 2212 of authorship information, authorship statistics 2216, a list of authors 2218, and an authorship style element 2220 including an identification 2222 of a selected predefined human-artificial collaboration style and a narrative description 2224 of that collaboration style. But here the chart representation 2212 is a pie-chart showing the relative contribution of the different authors to the content.

Figure 25:
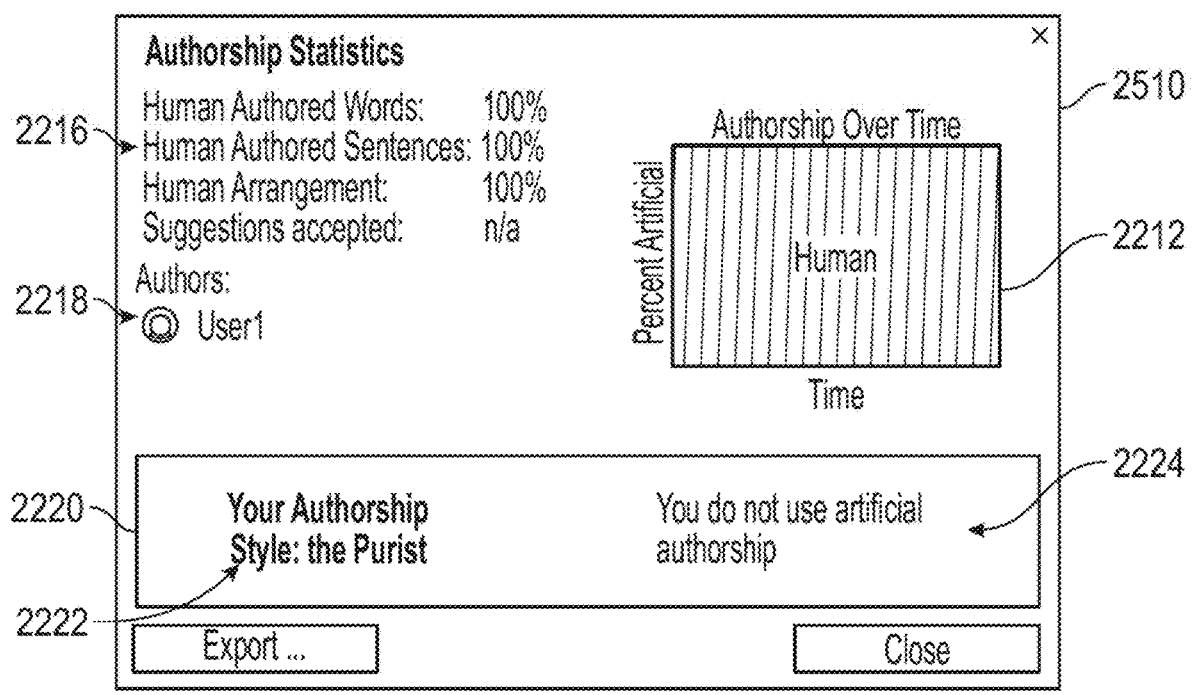
FIG. 25 illustrates a third example user interface including a chart representation of authorship information.

FIG. 25 illustrates an alternative user interface 2510. Like the user interface 2210, the user interface 2510 includes a chart representation 2212 of authorship information, authorship statistics 2216, a list of authors 2218, and an authorship style element 2220 including an identification 2222 of a selected predefined human-artificial collaboration style and a narrative description 2224 of that collaboration style. But here the authorship is entirely human.

Visualizing Relative Change in Authorship of Regions

Figure 26:
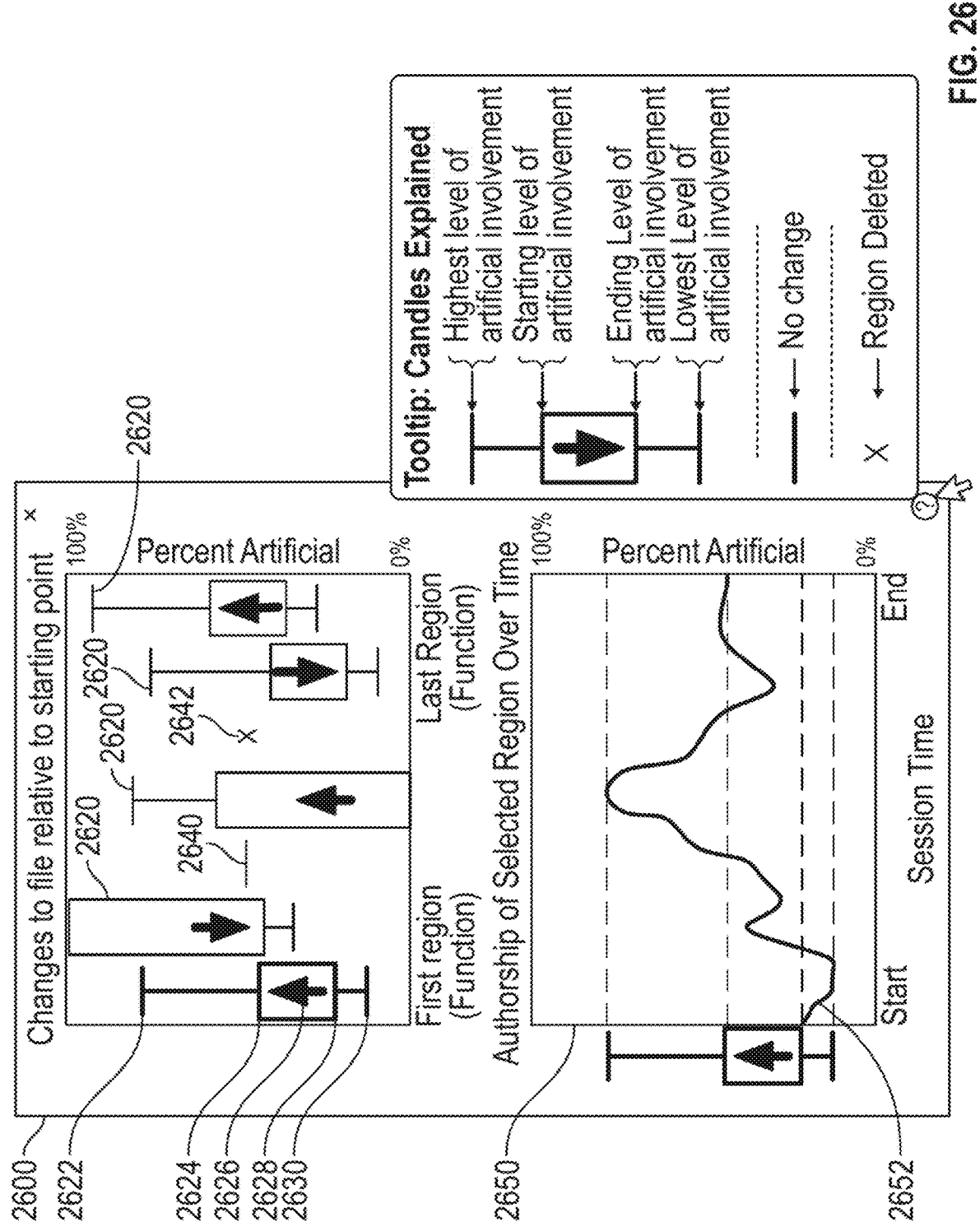
FIG. 26 illustrates an example user interface for visualizing a relative change in authorship of regions of a file over the course of an editing session.

FIG. 26 illustrates an example user interface 2600 for visualizing a relative change in authorship of regions of a file over the course of an editing session. The editing session can be any relevant length of time of interest. In an example, a user checks out a file containing source code, modifies the file with the assistance of an artificial author, and then commits the changes to a source code repository. The span from check out to check in can be considered a session. In another example, the session can be from when a user opens a file to when a user closes a file. In another example, the user interface 2600 can be used to visualize a relative change in regions of a file between different versions of the file, such as between a previous and current version of a file (e.g., a locally stored file, a remotely stored file, or stored via a version control system).

The user interface 2600 includes a candlestick chart 2610 that uses candlestick elements 2620 to demonstrate a relative change in authorship of regions of the file. The Y-axis of the chart indicates a percentage of artificial authorship (though in other implementations the Y-axis can represent a percentage of human authorship or any other relevant statistic). The X-axis represents an ordering of regions in the relevant file from first to last. As illustrated, the relevant region is function and the chart 2610 conveys information about how each of the seven functions in the file changed, over the course of the session (including one being unchanged and another being deleted). In other examples the region could be any other relevant region for the content at issue, such as line, class, logical block, sentence, paragraph, chapter, file, block, layer, or another region.

As illustrated, each candlestick 2620 includes different elements including: a highest element 2622, a starting element 2624, a direction element 2626, an ending element 2628, a lowest element 2630. The highest element 2622 indicates the highest level of artificial authorship that was achieved during editing (e.g., what was the highest percentage of the content of the region that had artificial authorship at any point during the editing session). The starting element 2624 indicates the starting level of artificial authorship (e.g., what percentage of the content of the region had artificial authorship when the editing session in question began). The direction element 2626 is some portion of the candlestick 2620 that indicates whether the amount of artificial authorship increased or decreased during the editing session. As illustrated here, the indication is an arrow showing the direction of change from start to end, but in other implementations color, shading, or other distinguishing techniques can be used. The ending element 2628 indicates the amount of artificial authorship that the region had at the end of the editing session. The lowest element 2630 indicates the lowest level of artificial authorship that was reached during the editing session.

The chart 2610 further includes an unchanged element 2640 and a deleted element 2642. The unchanged element 2640 indicates that the associated region did not change. As illustrated, that unchanged element 2640 is a line placed at a location along the Y-axis indicating the amount of artificial authorship of that region. Other indications can be used. The deleted element 2642 indicates that the associated region in the file was deleted.

The user interface 2600 also includes a line chart 2650 showing a change in authorship of the selected region over time during the editing session. The Y-axis of this chart also corresponds to the percentage of authorship (or another relevant statistic), but here the X-axis corresponds to time during the session. By placing the region's candlestick next to the chart 2650 it becomes clear how the starting, lowest, highest, and ending values that the line 2652 reaches over time corresponds to associated portions of the candlestick.

In an example, there is a method that includes determining a relative change in authorship of regions of a file over the course of an editing session and providing a diagram illustrating the relative change in the authorship of regions of the file using a plurality of candlesticks. Each candlestick of the plurality of candlesticks corresponds to a different one of the regions of the file. At least one of the plurality of candlesticks can include a highest element indicating a highest level of artificial authorship of a corresponding region during the editing session; a starting element indicating a starting level of artificial authorship of the corresponding region; a direction element indicating whether an amount of artificial authorship of the corresponding region increased or decreased during the editing session; an ending element indicating an amount of artificial authorship that the corresponding region had at the end of the editing session; and a lowest element indicating a lowest level of artificial authorship that the corresponding region had during the editing session. The diagram can further include an unchanged element indicating that authorship of a corresponding region did not change during the editing session. The diagram can further include a deleted element indicating that the associated region was deleted during the editing session. The relative change in authorship can describe a relative change in the percentage of artificially authored content in a corresponding region. The relative change in authorship can describe a relative change in the percentage of human authored content in a corresponding region. The editing session can be a span of time between checking out the file and committing the file. The editing session can be a span of time between opening the file and closing the file. The editing session can be a span of time between creation of a first version of the file and a second version of the file. In an example, the method further includes responsive to detecting selection of one of the plurality of candlesticks, providing a chart showing a change in authorship of a region corresponding to the selected candlestick over the editing session. The x-axis of the chart can correspond to time during the editing session.

Modifying Artificial Involvement Based on Authorship History

It may be beneficial to limit an amount of involvement by an artificial author. For instance, there may be some circumstances where a person wants a relatively limited amount of involvement by an artificial author and other circumstances where the person wants a relatively high amount of involvement. For instance, a law school may want to limit an amount of involvement by an artificial author when a student is using a content editor to write an essay for homework (e.g., to demonstrate what the student was able to learn). But when that same student works as a law clerk, their firm may want relatively high artificial involvement for a memo that the clerk is writing (e.g., to improve consistency with other firm documents or to re-use standard language for memos). The desired level of involvement can be configurable by a setting in a content editor, authorship engine, or artificial author system.

Figure 27:
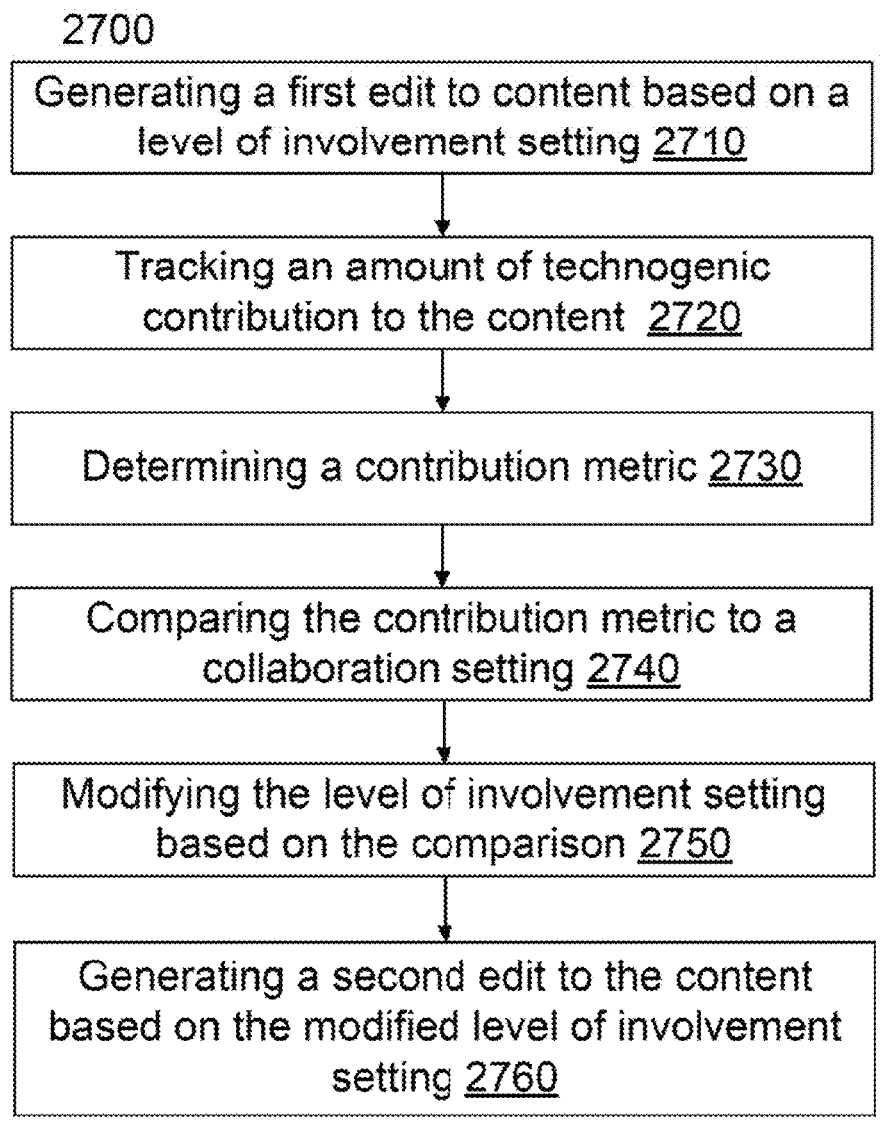
FIG. 27 illustrates an example method for modifying artificial involvement based on a contribution history.

FIG. 27 illustrates an example method 2700 for modifying artificial involvement based on a contribution history. The method 2700 can begin with operation 2710.

Operation 2710 includes generating a first edit to content based on a level of involvement setting. In an example, the operation 2710 includes generating the first edit to the content with an artificial author based on a level of involvement setting of the artificial author. In an example, generating the first edit includes inserting content written by the artificial author, modifying the content with the artificial author, or providing a suggestion to the user from the artificial author. Here, (as with some other uses elsewhere herein) "first" is merely a way to distinguish from future edits herein rather than implying that the edit is actually chronologically first.

Operation 2720 includes tracking an amount of technogenic contribution to the content by the artificial author. In an example, the tracking is based on artificial authorship tokens 18 in the content. In addition or instead, the tracking is based on similar factors to those discussed elsewhere herein with respect to authorship tokens 18. Tracking the amount of technogenic contribution to the content by the artificial author can include includes tracking all edits to the content by the artificial author, all substantial edits to the content by the artificial author, all suggestions made by the artificial author that are accepted by the user, other edits, or combinations thereof.

In some examples, anthropogenic contributions is also tracked, such as by using any technique described herein for tracking manual edits or other human-provided content. For instance, anthropogenic contributions can be tracked using human authorship tokens 18.

Operation 2730 includes determining a contribution metric. The contribution metric can be based on the amount of technogenic contribution. In an example, the contribution metric includes a percentage of the total amount of content that has human or artificial authorship.

Operation 2740 includes comparing the contribution metric to a collaboration setting. In an example, the collaboration setting specifies a desired amount of artificial authorship or an amount of human authorship.

Operation 2750 includes modifying the level of involvement setting based on the comparison.

Operation 2760 includes generating a second edit to the content based on the modified level of involvement. The second edit can be more or less substantial than the first edit, such as based on the second edit having been generated based on a modified level of involvement setting. Whether the second edit is more or less substantial (e.g., its substantiality) can be based on various factors, such as an amount of content added, removed, or modified as a result of the second edit. In addition or instead, the substantiality of the second edit can be based on a change in the relative percentage of the total content that has artificial authorship. In some examples, the substantiality changes or how the substantiality is calculated changes based on the amount of existing content. For instance, changing two words in content may be insubstantial when the content contains thousands of words, but may be substantial when the content contains only four words. In some examples, the method 2700 can further include applying an artificial authorship token 18 to a region associated with the second edit.

In an example, generating the second edit includes generating a first set of candidate edits. Then any candidate edits from the plurality of candidate edits are removed that fail to satisfy the level of involvement setting. This results in forming a second set of one or more candidate edits, The second edit can be part of the second set.

In an example, the method 2700 further includes receiving a third edit to the content from a human author. Then the contribution metric is updated based on the third contribution.

Artificial Authors as Tool Users

Many aspects herein have focused on scenarios in which the artificial author creates content itself based on its own model (e.g., via a chat functionality or a prompt-response framework). However, artificial authors may use tools to create those answers or obtain data. Such tools can include the use of application programming interfaces or other ways of interacting with other applications or sites to obtain an answer. Further, such tools could include searching local documents (e.g., documents of a human user interacting with the artificial author or documents of an associated organization) and providing answers based thereon (e.g., using so-called Retrieval Augmented Generation or another such technique). As a result, even if the artificial author provides a response having particular content, that content may not have been actually authored by the artificial author. Instead, the content in the artificial author's response may have been authored by the author of a document from which the artificial author is quoting. As an example, a human may ask a multimodal model "what is the first line of Moby-Dick?". The multimodal model may respond "Call me Ishmael" and the author includes that sentence in a book report, but that may not mean that the line has authorship attributable to the model (or even the human that provided the prompt). Rather, the authorship can be attributed to Herman Melville, the author of Moby-Dick that originally wrote that line.

The authorship engine herein can take such sourcing into account. For instance, the artificial authorship engine can analyze the response of the artificial author and determine whether the content was authored by the artificial author or it has been quoted from another source (e.g., based on citations or quotations in the content). The authorship engine can then determine the authorship of that source (e.g., based on authorship tokens 18 of that source, such as by determining authorship tokens 18 of the portion of the source that was quoted or referenced in the artificial author's content) and apply that authorship to the relevant portion of the content provided by the artificial author.

In some instances, a source token or an authorship token 18 describing source can be applied to content to describe a source of the content, even if it were authored by someone else. Thus, a portion of content can have an authorship token 18, a source token, and even a selection and arrangement token. In addition or instead, an authorship token can include, a source indicator, an authorship indicator, a selection indicator, an arrangement indicator, or one or more combinations thereof. A source indication can be a citation and can include or be based on any traditional or new citation format (e.g., APA, BLUEBOOK, CHICAGO MANUAL OF STYLE, MLA, or others). In an example, a human prompter can ask an artificial agent to summarize an article. The author of the summary may be the artificial agent, but because the summary is drawn from the article, the source of the summary is the article.

In an example, there is a computer-implemented method that includes determining that an artificial user of a content editor made an edit to content within the content editor. The edit can include one or more changes, insertions, or deletions to the content. The method can further include determining that the edit satisfies a threshold of significance. The method can further include determining that the artificial user originated at least a portion of the edit from an external source. The method can further include providing a token 18 in association with the region. The token 18 can identify the external source or an author thereof. The token 18 can have a predetermined form indicating that associated region has data from an external source rather than from a user of the content editor. The token 18 can further have a predetermined format indicating that an author of the external source is a human rather than an artificial intelligence or is an artificial intelligence rather than a human. The token 18 can be a source token or have a source indication. The method can further include applying an authorship token 18 indicating that the region associated with the edit has artificial authorship. The method can further include applying a selection token, an arrangement token, or a selection and arrangement token 18 to the region indicating artificial or human authorship.

Not only can tool use by an artificial author influence authorship tokens, authorship tokens 18 can apply to tool use by artificial agents as well. As artificial agents become more and more autonomous, it can be beneficial to provide an indication of the author of the agent's actions. For instance, is the artificial AI agent acting alone or under the direction of another (e.g., a human or even another AI agent). Authorship tokens 18 can be applied in this context to describe the authorship of the agenda that the AI agent is following. For instance, an author can write a plan, agenda, to-do list, script, or other set of instructions (e.g., in natural language, a programming language, spoken word, or other formats) for an artificial agent to follow. Authorship tokens 18 can be applied to the instructions and can then be applied to the action. Applying the authorship token 18 to the action can include, for example, including the authorship token 18 (or something based thereon) as part of an API call associated with the action. Thus, the service exposing the API can determine that although an artificial agent is accessing the API, it is doing so on behalf of a specific author. Further, there are technical benefits to being able distinguish actions taken by an artificial agent sua sponte versus by being instructed to do so by a human. For instance, if an artificial agent causes a website to crash by repeatedly accessing it, it would be beneficial to know if it is because a human user instructed it to do so (e.g., "check the weather every 10 milliseconds and tell me if it is raining") or because the artificial agent decided to perform an inappropriate action (e.g., the human merely instructed the agent to "monitor the weather and immediately let me know if it's raining"). The first would require a different solution than the second.

Selection and Arrangement of Suggestions

In some examples, information about how a first author (e.g., a human) interacts with suggestions by a second author (e.g., an artificial author) is tracked to support assigning the first author credit for selecting and arranging such suggestions. In an example, suggestions made to the first author by the second author are retained (e.g., in a log file) even if those suggestions were not accepted. Traditionally, such unused suggestions would be discarded (e.g., deleted or not even stored outside of temporary memory). In another example, statistical information about the suggestions is tracked. Information can include how many word completions were suggested, how many word completion suggestions were accepted, how many next words were suggested, how many next word suggestions were accepted, how many characters were those suggestions (e.g., including accepted versus made), how many were not accepted, what percentage of suggestions were accepted, other statistics, or combinations thereof. Such statistical information or logs can be used to support a notion that even though the first author accepted suggestions, the first author retained control (or at least credit for selection and arrangement) by actually thoughtfully selecting an arranging such suggestions rather than just blindly accepting what the second author suggested.

In some examples, the suggestions that were made but not accepted can be re-added from the log to the file to undo the selection and arrangement of the text by the author (see above section "Removing the Selection and Arrangement of Content"). In some examples, undoing the selection and arrangement can include generating false suggestions based on the statistics in order to undo the selection and arrangement of the text by the author. For instance, if the statistics state that twenty suggestions were rejected, then twenty suggestions can be generated and readded to the text. Where information is stored regarding the nature of the suggestions (e.g., the number of words or characters that made up the suggestion), such information can be used to generate the false suggestions.

Similar information can be used with respect to prompts and responses from a chatbot. For instance, information about how much detail is provided in a prompt, how much of a chatbot output is kept, and how much of the resulting chatbot output is unchanged can be used to support a notion that the content is the product of selection and arrangement by the first author.

Figure 28:
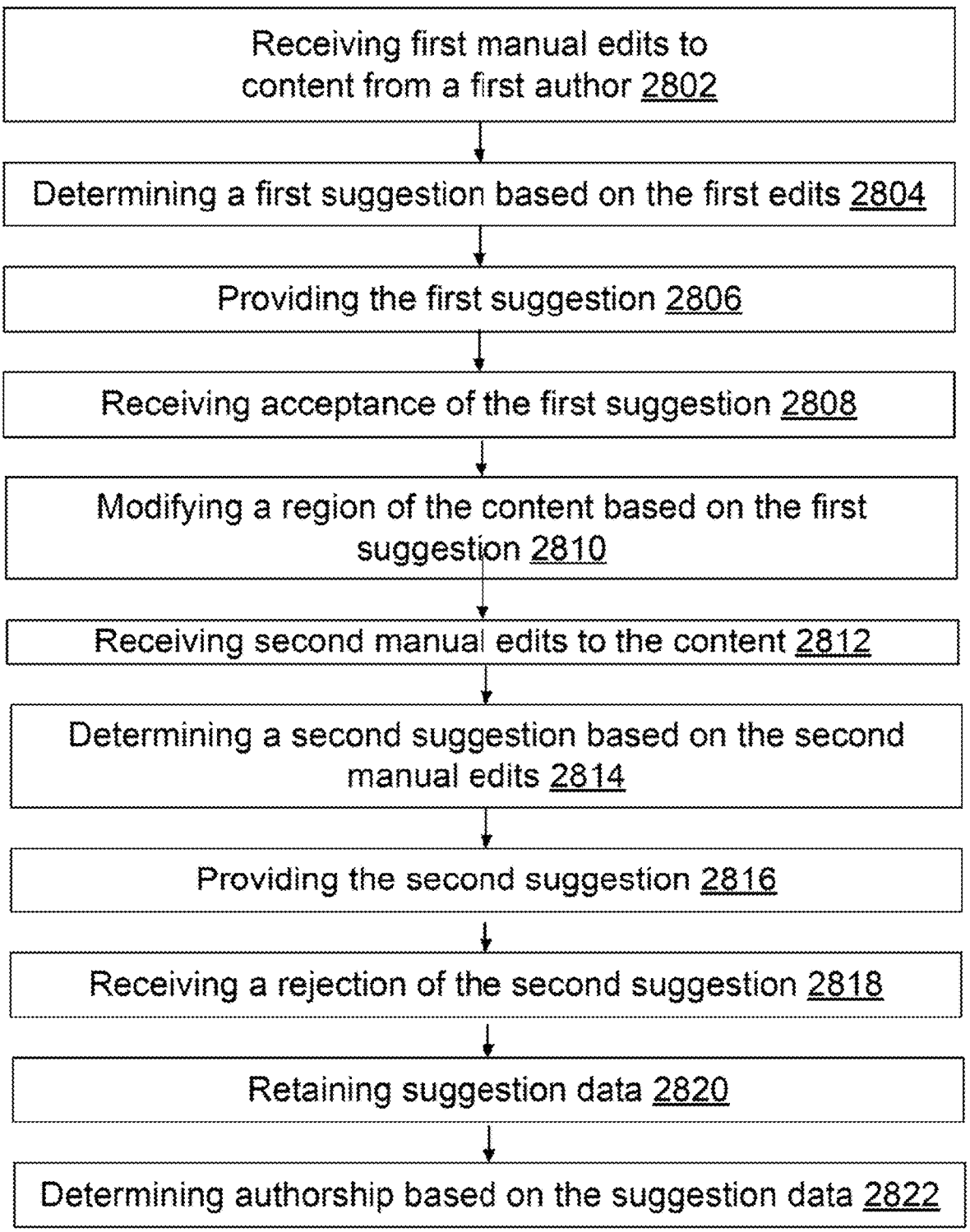
FIG. 28 illustrates an example method for determining authorship of suggestions.

FIG. 28 illustrates an example method 2800 for determining authorship of suggestions. In an example, the method 2800 is performed in whole or in part by a content editor or an application (or operating system) that provides the content editor. The method 2800 can begin with operation 2802.

Operation 2802 includes receiving, at a content editor, first edits to content from a first author. In an example, the first author is a human and the first edits are manual edits. The content editor can be a text editor and the content can include text content. Following operation 2802, the flow of the method 2800 can move to operation 2804.

Operation 2804 includes determining, with a second author, a first suggestion based on the first edits. In an example, determining the suggestion can include providing a context (e.g., a region around a cursor or an area that the first author is editing) to a suggestion engine and receiving an output from the suggestion engine. In an example, the suggestion engine is a large language model, artificial author, spell check system, next-word(s) predictor model, other suggestion engines, or combinations thereof. Following operation 2804, the flow of the method 2800 can move to operation 2806.

Operation 2806 includes providing, to the first author, the first suggestion. For example, providing the first suggestion can include providing the first suggestion past a current position of a cursor in a user interface of the content editor such that the first author can see the first suggestion. Following operation 2806, the flow of the method 2800 can move to operation 2808.

Operation 2808 includes receiving, from the first author, acceptance of the first suggestion. In an example, receiving the acceptance includes receiving an edit from the first author that matches the first suggestion. The matching can be verbatim or having an amount of similarity that passes a threshold. Following operation 2808, the flow of the method 2800 can move to operation 2810.

Operation 2810 includes modifying a region of the content based on the first suggestion.

In some examples, following operation 2810, the flow of the method 2800 can move to operation 2812. Although shown as occurring after operation 2810, operations 2812-2820 need not actually occur temporally later. For instance, the second suggestion and associated operations can occur temporally before the first suggestion is made.

Operation 2812 includes receiving second edits to content from the first author. Where the first author is a human, the second edits can be manual edits. Following operation 2812, the flow of the method 2800 can move to operation 2814.

Operation 2814 includes determining, with the second author, a second suggestion based on the second manual edits. Following operation 2814, the flow of the method 2800 can move to operation 2816.

Operation 2816 includes providing the second suggestion. In an example, the providing is performed in a same or similar way as the first suggestion was provided. Following operation 2816, the flow of the method 2800 can move to operation 2818.

Operation 2818 includes receiving, from the first author, a rejection of the second suggestion. In an example, receiving the rejection includes receiving user input that rejects the suggestion. In an example, receiving the rejection includes receiving an edit from the first author that does not match the second suggestion. In an example, responsive to receiving the rejection, the content editor ceases providing the second suggestion. Following operation 2818, the flow of the method 2800 can move to operation 2820.

Operation 2820 includes retaining suggestion data regarding the first suggestion and the second suggestion even after receiving the rejection of the second suggestion. The suggestion data can include the first suggestion and the second suggestion (e.g., the actual content of the suggestion). In some examples, the suggestion data includes statistical data regarding the first suggestion and the second suggestion without including the first suggestion and the second suggestion (e.g., without including the actual content of the suggestions). The statistical data can include, for example, an indication of an amount of suggestions accepted versus rejected (e.g., an acceptance rate, a rejection rate, a number of suggestions accepted, a number of suggestions accepted relative to those rejection, an amount of suggestions relative to an amount of the content). Following operation 2820, the flow of the method 2800 can move to operation 2822.

Operation 2822 includes determining authorship of the region modified by the first suggestion of the second author based on the suggestion data. For instance, this can include determining that the first author or the second author has authorship of the region. In some examples, determining the authorship of the region includes determining that both the first author and the second author authored the region. In some examples, the different authors can have different kinds of authorship. In an example, the second author can have content authorship (e.g., the second author wrote the content) and the first author has selection and arrangement authorship (e.g., the first author selected and arranged the content of the region or a higher-level region that includes the region).

In some examples, the method 2800 further includes applying an authorship token 18 to the region based on the determined authorship.

In some examples, the method 2800 further includes receiving user input to at least partially remove authorship by the first author and modifying the content responsive to the user input. Modifying the content includes applying the second suggestion to the content. For instance, the actual second suggestion can be stored and then applied. Modifying the content includes: generating an ersatz second suggestion based on the suggestion data; and applying the ersatz second suggestion to the content. For instance, the second suggestion that was actually made may not have been saved but the information about it that was saved (e.g., a size of the suggestion, a type of the suggestion, a location of the suggestion, a context of the suggestion, other information, or combinations thereof). That stored information can be used to create an imitation second suggestion (e.g., using the second author) that may not be completely accurate but sufficient to remove at least some of the authorship of the first author from the content (e.g., to remove selection and arrangement authorship of the first author). Thus, the ersatz second suggestion can be different from the actual second suggestion but based on statistical data regarding the second suggestion.

In some examples, the method 2800 includes determining a significance of the first suggestion. Determining the authorship of the region modified by the first suggestion can be based on the significance.

Authorship in Discussions

Techniques described herein can be used to attribute authorship even outside of the traditional authorship context. For instance, techniques herein can be used to ascribe authorship or credit (also including inventorship) to ideas presented during a meeting. An artificial intelligence bot or service may listen to a meeting, make a transcript, and summarize the meeting. The techniques provided herein to determine authorship (e.g., significance, origin, etc.) can be applicable in this context as well. For instance, the meeting's transcript can be analyzed, ideas within the transcript can be identified and tied to the person in the meeting that made such a suggestion. Further, additions to those ideas can be tracked within the meeting based on the significance analysis above or using other techniques. Thus, the flow of ideas in a meeting and how different "authors" contributed to them can be analyzed and detrained. A report can be created providing credit to the authors of the ideas.

In some example implementations, aspects described above in relation to FIGS. 7A and 7B can be applied here. For instance, the content and conversation history can be a transcript or other account of a discussion among humans (e.g., rather than a human and a chatbot). The same or similar techniques can be used to identify concepts that arose out of the account and who is the author (or who should be credited) for those concepts. Likewise, aspects described in this section can be applied elsewhere herein including with respect to FIGS. 7A and 7B.

Visualization can be applied to contributions in meetings to show the origin of concepts in the meeting. A graph data structure having nodes can be created showing how a germ of an idea is provided and then expanded on and by whom. The system can classify different participants based on their collaboration style. For instance, one person may tend to originate ideas. Another person may tend to expand on ideas. A further person may tend to shoot-down ideas (e.g., relatively little development of an idea after that person comments on it). Such a discussion can facilitate selection and arrangement of content and can demonstrate human inventorship (e.g., for providing as part of a patent application).

FIG. 29 illustrates an example method 2900 for allocating tokens 18 with respect to a discussion. In an example, the method 2900 begins with operation 2902.

Operation 2902 includes hosting a discussion with a team collaboration application. The discussion can have a plurality of participants. In an example, each respective participant connects to the hosted discussion using a respective team collaboration application running on a respective computer. Example team collaboration applications include applications such as TEAMS by MICROSOFT, ZOOM by ZOOM VIDEO COMMUNICATIONS, GOOGLE HANGOUTS by GOOGLE, SLACK by SLACK TECHNOLOGIES, DISCORD by DISCORD, and JITSI by 8×8. An artificial intelligence meeting assistant is present in the discussion. Example traditional artificial intelligence meeting assistants include OTTER.AI and meeting AI features of GPT-4o by OPENAI. Artificial intelligence meeting assistants can be modified to include features described herein to improve their ability to function. Following operation 2902, the flow of the method can move to operation 2904. One or more subsequent operations can be performed by or with the assistance of the artificial intelligence meeting assistant or an associated process.

Operation 2904 includes creating an account of the discussion among a plurality of participants including a first participant and a second participant. In an example, the account is a transcript of the discussion. The discussion can be a meeting occurring over a videotelephony feature of the team collaboration application. In some examples, the account can include not only a transcript but also screenshots or a video of visual content provided during the meeting. In some examples, a presentation (e.g., a POWERPOINT presentation) that is given during the discussion can be used in the authorship or credit determination process described in this section. Following operation 2904, the flow of the method 2900 can move to operation 2906.

Operation 2906 can include determining that a first portion of the account satisfies a threshold of significance with respect to one or more prior portions of the account of the discussion. The first portion of the account can be a phrase, sentence, line, or monologue. In some examples, the first portion is a concept that is explicitly stated or inferred or summarized based on what was stated. The first portion can have or be associated with one or more first speaker tokens. A speaker token can be a token (e.g., an authorship token 18 or a token that has one or more features of an authorship token 18 but describes a speaker) that indicates who spoke that portion of the account. For instance, where the account is a transcript, the speaker token 18 may be text that identifies who is speaking. For the Gettysburg address, the speaker token 18 may be "LINCOLN:" and the account may be "LINCOLN: Four score and seven years ago . . . ". Speaker tokens 18 can take any of a variety of forms, including those described elsewhere in the context of authorship tokens 18 (albeit modified to reflect a speaker). In an example, the significance is determined based on a distance in an embedding space. For instance, how far concepts or words that a person speaks are from what someone else spoke when represented in the embedding space.

In an example, this operation 2906 can include determining that the first portion satisfies a threshold of significance includes determining that the first portion has more than a predetermined threshold number of characters or words different from the prior portion or determining that the first portion has more than a predetermined threshold percentage of characters or words different from the prior portion. Determining that the first portion satisfies a threshold of significance can include calculating a significance score and determining that the significance score satisfies a predetermined threshold.

In an example, the prior portion is determined by selecting each previous portion of the discussion in the account, and operation 2906 can be repeated for each respective previous portion. Following operation 2906, the flow of the method 2900 can move to operation 2908.

Operation 2908 includes, responsive to determining that the first portion of the account satisfies the threshold of significance, applying a first authorship token 18 to the first portion that credits the first participant with contributing the portion of the account. Following operation 2908, the flow of the method 2900 can move to operation 2910.

Operation 2910 includes determining that the second portion of the account having second speaker token 18 indicating that the second portion was spoken by a second participant fails to satisfy the threshold of significance with respect to one or more prior portions of the account of the discussion, including the first portion. Following operation 2910, the flow of the method 2900 can move to operation 2912.

Operation 2912 includes responsive to determining that the portion of the account fails to satisfy the threshold of significance, applying a second authorship token 18 to the second portion that credits a participant other than the second participant with contributing the second portion of the account of the discussion. Following operation 2912, the flow of the method can move to operation 2914.

Operation 2914 includes storing the account with the first and second speaker tokens 18 and the first and second authorship tokens 18. Following operation 2914, the flow of the method 2900 can move to operation 2916.

Operation 2916 includes receiving, over a user interface, a concept. Following operation 2916, the flow of the method 2900 can move to operation 2918.

Operation 2918 includes determining, using the stored account, one or more of the participants that contributed to the concept based on authorship tokens 18.

In an example, the method 2900 can further include generating a graph data structure having a concept node representing the concept and a plurality of additional nodes upstream or downstream of the concept node and representing influences on the concept by different participants to the discussion. A visual representation of the graph data structure can be provided, such as to improve the ability of the computing performing the method to interact with a user.

In an example, the method 2900 can further include determining a collaboration style of the first participant based on authorship tokens 18 and speaker tokens 18 associated with the first participant. Such a determination can be based on the authorship tokens 18 occurs during the discussion. In an example, the method 2900 further includes generating a representation of a flow of ideas in the discussion and how the participants contributed to the idea.

Figure 30:
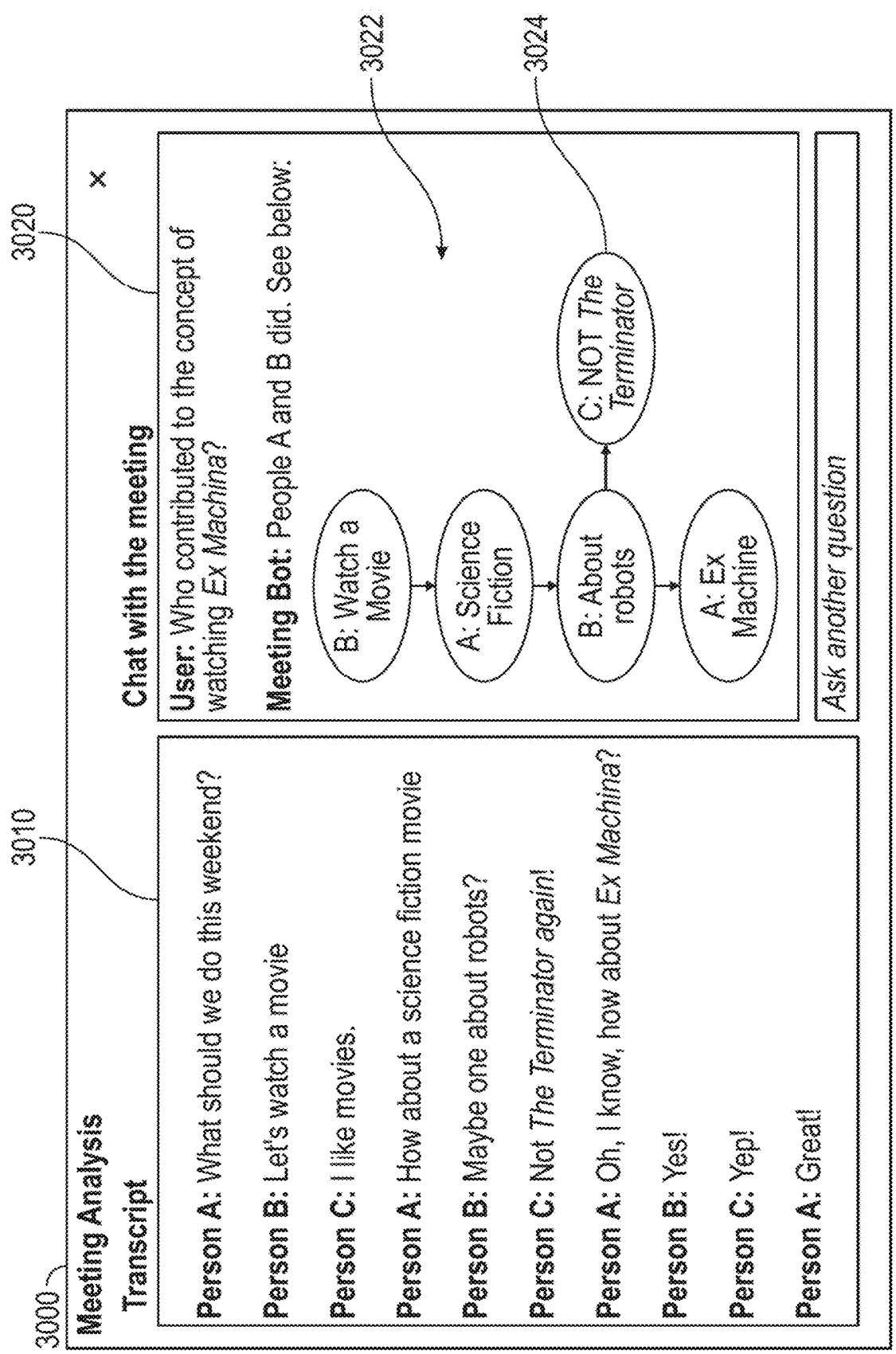
FIG. 30 illustrates an example user interface for meeting analysis.

FIG. 30 illustrates an example user interface 3000 for meeting analysis. The user interface includes a transcript 3010 of a meeting between three people. The user interface 3000 further includes a chat function element 3020 by which a user can interact with a chat bot to understand more about the meeting. As illustrated, the user asked which participant contributed to a particular concept. The chat bot provides an answer (e.g., based at least in part on the method 2900) that includes a graph data structure 3022 having nodes 3024 that describe which participant contributed to which aspect of concept.

Attestation

In some instances, it may be desirable to apply tokens, in addition to or instead of authorship tokens, that indicate a person responsible for content of a section. In addition or instead, an organization may prohibit artificially authored content unless a human personally takes responsibility for the content (e.g., that the human personally reviewed the artificial content). Thus, there may be a token 18 that attests to such responsibility.

In some instances, there can be attestation that a portion of the content really does have human authorship notwithstanding a concurrent or prior indication of artificial authorship. For instance, the user may believe that the artificial authorship was incorrectly applied.

In an example, there is a method that includes determining that an artificial intelligence authored an edit to content; determining that the edit satisfies a threshold of significance; providing an artificial authorship token 18 in association with the region, the human authorship token 18 having a predetermined form indicating that a human rather than an artificial intelligence is the author of the region of content; receiving an attestation from a user; and applying an attestation token 18 to the region.

The method can further include, responsive to receiving the attestation, replacing the artificial authorship token 18 with a human authorship token 18. The attestation can indicate that, notwithstanding the artificial authorship of the region, a human authored the region. The attestation can indicate that, notwithstanding the artificial authorship of the region, a human has responsibility for the region. For example, that the human personally reviewed the region and vouches for it, stands behind it, or otherwise has responsibility for it. The attestation token 18 can specifically identify the human. The attestation token 18 can, in some implementations, replace the authorship token 18.

In an example, there is a computer-implemented method comprising: opening a file with a content editor, wherein during creating the file, determining that artificial authorship of content of the file is prohibited; responsive to the determining, disabling a first set of artificial intelligence features of the content editor; and applying a human authorship token 18 indicating that content of the file is authored by a human rather than an artificial intelligence. Opening the file can include creating the file. The method can include, enabling a second set of artificial intelligence features of the content editor. The human authorship token 18 can indicate that artificial authorship of content in the file is prohibited. The method can further include saving the file in a manner that resists unsupported content editors editing the file while preserving the human authorship token 18. The method can further include prohibiting saving of the file if the file contains any artificial authorship token 18.

Application of Various Authorship Standards

As described herein, various thresholds and parameters affecting authorship token determinations are configurable based on user or organizational preferences to achieve desired outcomes. For instance, a high school may want to set a relatively low threshold for edits being considered artificial, while an enterprise may set relatively higher thresholds for edits being considered artificial or for minimum or maximum region size granularity. And a social media company may require still different standards for edits or content being artificial. Further, a company that provides content editors or authorship engines for content editors may provide a default set of parameters and thresholds that are good enough, but a user may want to change them to suit personal preferences or organizational preferences. In addition or instead, a user may want to preview how their content would look under different standards or different combinations of standards.

It may be the case that authorship standards coalesce around a few particular parameters or thresholds that are dispositive of authorship of regions of content, such as whether artificial authorship was involved at all, granularity of regions (e.g., authorship should be determined at a level no higher than X level and now lower than Y level, where X is "sentence" and Y is word), number of characters changed, whether certain features were used (e.g., spell-check, grammar check, autocorrect, rephrasing, etc.), distance in embedding space, minimum allowable distance in embedding space, other parameters or thresholds, and combinations thereof. The values of the edit may be stored in a way (e.g., as part of the authorship standard data 198) such that authorship can be changed or compared against other authorship standards relatively easily.

In view of this, implementations of examples herein may provide for techniques for changing an already applied authorship standard from a first standard to a second standard and ensuring authorship tokens are accurate given the new standard (e.g., by replacing or updating the authorship tokens). For example, responsive to an authorship standard change request to change the standard from a first standard to a second standard, the authorship engine can first determine whether the second standard is more or less strict. For instance the first standard may be stricter for determining human authorship than artificial authorship than the second standard. In other words, under all content identified as human authored under the first standard would be human authored under the second standard. Thus, the authorship engine can automatically identify all human authored content as being human authored under the second standard (e.g., by updating the authorship standard data 198 associated therewith). Remaining content can be reevaluated, if possible, using remaining data. In some examples, data can be stored in association with the content or existing authorship tokens such that reassessment can be performed. And the reassessment can be performed with that data. In some examples, there may be a log or recording of the content being produced and such data can be used to determine authorship under the second standard. In some instances, there may be insufficient data to accurately update authorship tokens. In such circumstances, various actions can take place. For instance, those sections can remain as-is (e.g., the content would have a mix of authorship identified under the first and second standards), ambiguity tokens can be applied (e.g., indicating a relatively lack of confidence in the authorship of the section under the standard), other actions can be taken, or combinations thereof.

In some instances, the content editor or authorship engine can provide a preview to the user that shows how authorship would change under various standards. For instance, as a preview, regions that would change authorship under the previewed standard can be highlighted, so the user can see the effect of different standards.

Remove All Human Authorship

In an example, there is a method that includes obtaining content having human authorship. The method further includes using an artificial author (e.g., a large language model or other artificial intelligence) to rewrite each of the regions labeled as having human authorship to produce content that lacks human authorship and that has only AI authorship. The rewriting can include using a first artificial author to summarize the human-authored regions and using a second artificial author to produce AI content based on the summary. In some examples, an evaluator (e.g., an AI evaluator) is used to determine whether the AI content both sufficiently matches and sufficiently differs from the original content.

Adjudicating Requests Regarding Content

Figure 31:
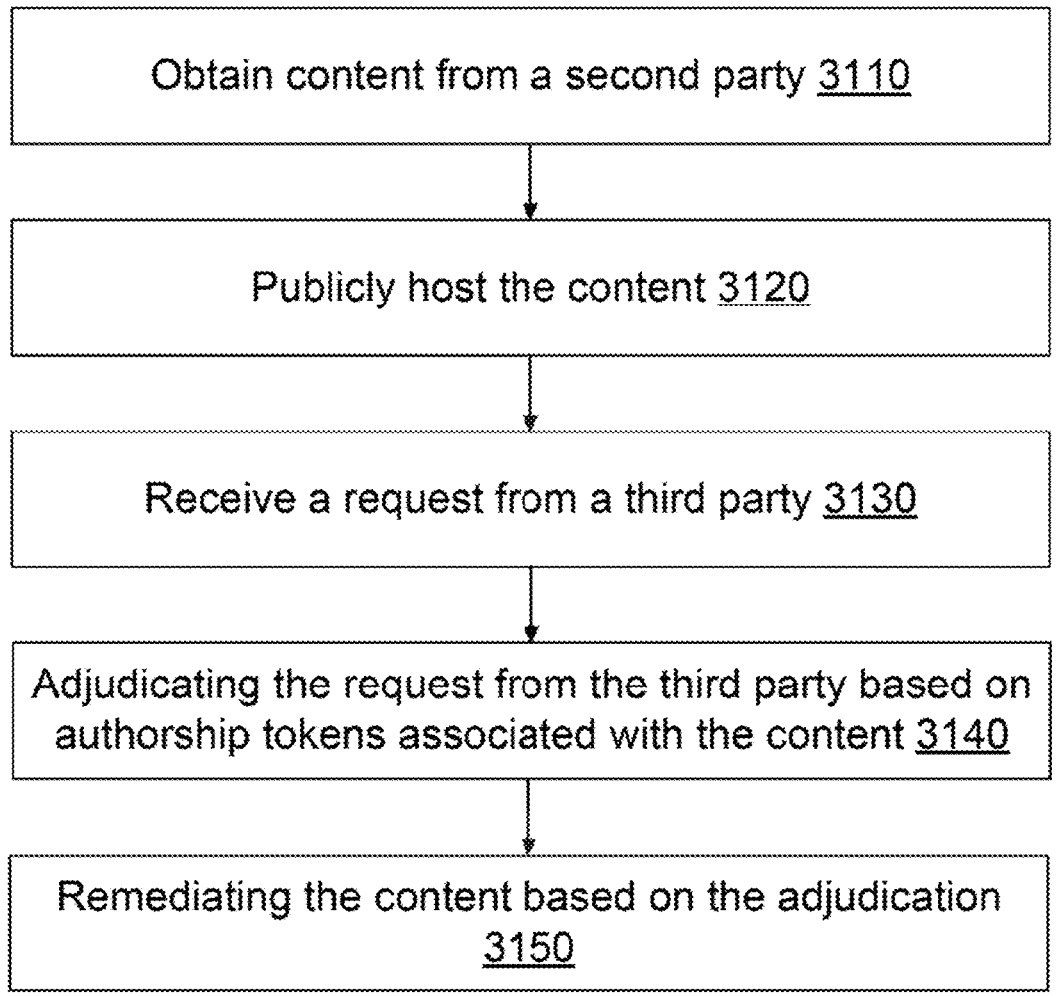
FIG. 31 illustrates an example method for adjudicating third-party claims regarding publicly hosted content using authorship tokens (or a lack thereof) associated with the publicly hosted content.

FIG. 31 illustrates an example method 3100 for adjudicating third-party claims regarding publicly hosted content using authorship tokens 18 (or a lack thereof) associated with the publicly hosted content. Many platforms, such as social media sites, publicly host content received from users and may have restrictions or policies regarding whether and how the content is hosted. If the platform (e.g., via an algorithmic or human content reviewer) determines that content violates one or more policies, then the content may be taken down. However, as platforms host increasing amounts of content (a problem that will likely be exacerbated in the future by artificial social media users), such platforms will likely also receive large numbers of requests from third parties regarding such content. For at least a subset of these requests, knowledge of the anthropogenic status of the content would be useful in determining whether and how to adjudicate the request, thereby increasing the efficiency of processing the claims. In an example, the method 3100 for adjudicating the third-party claims using authorship tokens 18 includes operation 3110.

Operation 3110 includes receiving, at a first party (e.g., a social media platform), content from a second party (e.g., a user of the social media platform), the content being associated with one or more authorship tokens 18. For example, the content can be received using a form of a website or application or over an application programming interface. In some examples, the authorship tokens 18 are applied to the content as the content is received. For instance, the content may be authored in a content entry field (e.g., text box) of a website or application that includes authorship features (e.g., that create authorship tokens 18 as described in method 200). Or the content may be a visual taken using a camera function of the application or website and an appropriate authorship token 18 can be applied based on the use of such a function. Thus, authorship tokens 18 the content is determined to have authorship information because authorship information was generated as part of the receipt of the content.

In other examples, the content has preexisting authorship tokens 18. In some instances, the authorship tokens 18 or the associated content can be validated using techniques described elsewhere herein (see, e.g., FIG. 15 and associated content). In still further examples, the content received may lack authorship tokens 18 entirely. As part of the receipt of the content, authorship tokens 18 can be applied to the content indicating that the content has unknown authorship. Following operation 3110, the flow of the method 3100 can move to operation 3120.

Operation 3120 includes publicly hosting the content. This can include providing the content via one or more servers in such a way that one or more other users can access the content. In some examples, the content is hosted behind a paywall or requires a user to log-in with an account. The content may be hosted in such a way that the viewers or recipients of the content submit requests regarding the content. Following operation 3120, the flow of the method 3100 can move to operation 3130.

Operation 3130 includes receiving a request from a third party regarding the hosted content. For instance, the request may be a request to take down, remove, or demonetize the content, such as due to copyright infringement, the content include a deepfake, the content being artificial, the content being unoriginal, the content being fake, the content being fraudulent, or for other reasons.

In an example, the request alleges that the content includes an unauthorized digital replica of a person. A digital replica can be a realistic, computer-generated vocal or visual representation of a person that the person did not actually produce or has been materially altered. Following operation 3110, the flow of the method 3130 can move to operation 3140.

Operation 3140 includes adjudicating the third-party request using the associated authorship tokens 18. The authorship tokens 18 can be useful in a variety of contexts for resolving the request. In one example, the platform may treat artificially authored and human authored content with different levels of scrutiny. For instance, a platform may automatically remove artificially authored content until the adjudication is complete (and then may re-host the content or may leave it removed) but may continue to host human authored content until the adjudication is complete. In some examples, the platform may automatically resolve the requests using the authorship tokens 18. For instance, if a request alleges that the content is a deepfake and the content includes an artificial authorship token, then the request may automatically be determined to be valid. But if the content includes a human authorship token 18 or otherwise indicates that it is not a deepfake, then the request can be denied. Following operation 3140, the flow of the method 3100 can move to operation 3150.

Operation 3150 includes remediating the content. Remediation can take different forms, including removing the content, ceasing hosting the content, making the content unlisted, flagging the content, requesting that the second party fix the content, other actions, or combinations thereof. In some examples, the first party automatically modifies the content based on the request. For instance, generative AI may be used to replace one or more parts of the content. In an example, the request is a copyright request. The problems with the content identified in the request (e.g., the inclusion of a copyright infringing image or audio) can be addressed by using generative AI to automatically replace the allegedly infringing content with artificial content that does not infringe. If the request alleges that the content is a deepfake, then the first party can apply a new deepfake to the deepfake. For instance, if the content includes a deepfaked celebrity endorsement, then the platform can replace the face of the celebrity with a different (e.g., purely artificial) face to remediate the request issue.

In some examples, the authorship tokens 18 can be used for other purposes. For instance, the authorship tokens 18 supplied with the content from the second part in operation 3110 can be used to determine eligibility for certain programs, such as entry of the content (or a portion thereof) into a content fingerprinting service or database (e.g., CONTENT ID by GOOGLE). For instance, traditionally, a hosting platform may rely on the uploader's assertion that content is eligible for such content fingerprinting (e.g., that the uploader owns the copyright in the content), but an uploader may misrepresent or misunderstand the content's eligibility. In some instances, the authorship tokens 18 can be used to determine such eligibility. For instance, content (or portions of content) having artificial authorship or not having demonstrated human authorship may be excluded from such programs or be given a special, reduced status in such programs. Such filtering using authorship tokens can facilitate more efficient and accurate use of such fingerprinting systems by reducing the number of ineligible entries. Further, such authorship tokens can facilitate the addition of only portions of content that are eligible (e.g., a human-authored audio track applied over an AI-generated video).

Provenance of Sensor Data

Authorship tokens 18 can be applied upon creation of content using sensors (e.g., cameras or microphones) and can persist through the editing journey of the content (e.g., visual content, such as images or video, or audio content) to demonstrate provenance of the content, optionally including a description of who edited or contributed to what aspect of the content. Such a chain of custody can be especially useful in demonstrating the authenticity of visual and auditory content. For instance, on social media sites, it can be difficult to determine if an image purporting to be authentic is genuine, is authentic but modified (e.g., so-called "photo-shopped" or filtered content), or inauthentic (e.g., generated using an artificial intelligence like STABLE DIFFUSION). Similar issues arise with video (even "live" videos) and audio content. As discussed elsewhere it can be difficult to assess after the fact whether content is authentic or artificial. Likewise, if content is produced or obtained outside of a known chain of custody, it can be difficult if not impossible to accurately demonstrate the authorship of the content.

In an example, a platform (e.g., a social media platform, a communication platform, a publishing platform, or another kind of platform) hosts content provided by users and provides an application to users that permits users to create content for uploading to the social media platform. An example solution to this technical challenge is demonstrated in FIG. 32, below.

FIG. 32 illustrates an example method 3200 for the creation of content based on the output of a sensor of a mobile device using an application. In many examples, the mobile device is a phone, the sensor is a camera, and the application is a software application running on the phone after having been downloaded from an application store associated with the phone (e.g., the APPLE APP STORE or the GOOGLE PLAY store). The application may be affiliated with a platform (e.g., a social media platform, a hosting platform, or a communications platform), such as by being the official application of the platform or a third-party client application. In an example, the application is an application that can be used to post content to the platform (e.g., using an API of the platform) and view content hosted by the platform. The method 3200 can begin with operation 3210.

Operation 3210 includes obtaining content from a sensor. In an example, this operation includes calling one or more functions of a class or framework associated with an operating system of the mobile device. The class or framework can be configured to provide access to visual sensor functionality of the mobile device. In an example, the device is an IPHONE by APPLE and the operating system is IOS. IOS has a framework called AVFOUNDATION, which permits applications to control cameras of the device. IOS also has a class called AVCapturePhotoOutput, which can be used to capture output for photography workflows (e.g., capturing still images). The application (e.g., which may be an application running on an IPHONE) may use such a framework or class to obtain an image from a sensor of the mobile device. ANDROID phones have similar frameworks or classes (e.g., a CaptureImage intent) that can be used by an application to obtain images. By obtaining the content in this direct way from the camera sensor (e.g., directly in the application or through the operation system) can provide strong assurance that the content is not the product of an artificial intelligence.

By contrast, while content could be obtained through other techniques (e.g., being loaded from a photo library, loaded from a file explorer, or pasted into the application), such techniques may lack provenance for the content and may lack sufficient assurances that the content is not artificially generated. Nonetheless, there can be ways to provide such assurances even in instances where the content is obtained through other techniques. For instance, the application may have captured the content and then stored it for later use. Such content may be stored in a way that demonstrates its provenance, such as by having an authorship token 18 and by being stored in a way that resists tampering (e.g., through the use of encryption, blockchains, Merkel trees, hashing, digital signatures, or other techniques). In addition or instead, even if the content were created using a different application, that application may be considered trustworthy and provide sufficient assurances against tampering (see above) that it can be treated as being authentic.

Following operation 3210, the flow of the method 3200 can move to operation 3220.

Operation 3220 includes applying an authorship token 18 to the content. In an example, the authorship token 18 has a predetermined form indicating that the content is not artificially generated. Following operation 3210, the flow of the method 3200 can move to operation 3230.

Operation 3230 includes receiving an edit to the content. In an example, the content is visual content (e.g., a photograph or video) and the edit is a change to the cropping, rotation, exposure, brilliance, highlights, shadows, brightness, black point, contrast, saturation, hue, white balance, warmth, levels, curves, tint, sharpness, definition, noise reduction, stylistic filters, markup (e.g., using a pen, marker, smudger, or highlighter tool), smoothing, touchup, red-eye correction, other edits, or combinations thereof. In an example, the content is audio content and the edit is a volume change, level change, frequency change, length change, balance change, noise reduction, other edit, or combinations thereof. In some examples, the edits include applying generative artificial intelligence to the content. Following operation 3230, the flow of the method 3200 can move to operation 3240.

Operation 3240 includes applying an authorship token 18 to the content based on the edit. In an example, the application of the token 18 is based on one or more operations described elsewhere herein, such as described in relation to FIG. 2 (e.g., including determining whether the edit is significant and determining whether the author of the edit is a human or artificial intelligence). In an example, the amount of time between the content being created by the sensor and applying the authorship token 18 is less than three seconds. Following operation 3240, the flow of the method 3200 can move to operation 3250.

Operation 3250 includes providing the edited content to others. In an example, this includes sending the content to one or more other devices. In some examples, this includes publicly hosting the content, such as at the platform.

While authorship tokens 18 are described, in some examples there may be authenticity tokens 18. Such tokens 18 may have one or more aspects described elsewhere herein, but the form of the token 18 is selected to indicate that the content is authentic versus inauthentic where authentic is that the content sufficiently accurately captured an actual state of the world (e.g., a photograph accuracy represents the scene it is capturing) and where inauthentic content fails to sufficiently accurately capture an actual state of the world (e.g., the content would be considered doctored, faked, or otherwise inaccurate). Content that comes from the sensor of the device can be considered to be authentic subsequent edits may change the content but the content may nonetheless be considered authentic so long as the edits do not significantly change the authenticity (e.g., changing levels to improve clarity of an image may result in an authentic image but adding a UFO to an image may result in the image being inauthentic).

In examples, the method includes maintaining control over the edits to the content obtained from the sensor include defining a data pipeline from the sensor to the platform such that the pipeline resists editing of the content by any editor other than the operating system, the application, and the platform.

In some examples, the method can include, contemporaneous with obtaining the content from the sensor, obtaining additional data from one or more additional sensors and using the additional data to verify the content. For example, one potential vulnerability in this technique is a person taking a picture of something on another screen or recording audio being played back. While such techniques are typically difficult to do in a convincing way, it may be beneficial to include techniques for detecting or preventing such malicious behavior. For instance, additional sensor data can be obtained and used to determine if the content matches the sensor data. For instance, if the content is an image having a horizon, the gyroscope data of the mobile device can be obtained and used to determine if the horizon of the image matches what one would expect from the gyroscope data.

In an example, the content is first content and the authorship token 18 is a first authorship token 18. The method can further include obtaining second content other than from the sensor directly and other than from the sensor via an operating system of the mobile device; and applying a second authorship token 18 to the second content, wherein the second authorship token 18 is different from the first authorship token 18. For instance, the second authorship token 18 has a predetermined form indicating that the provenance of the second content is unknown. The second content can be obtained from local file storage of the mobile device.

Steganography

In an example, the content is visual content and one or more authorship tokens 18 are hidden in the content using one or more steganographic techniques. The content may be a first image and a steganographic technique is used to hide a second image within the first image. The second image may have different regions of different colors, values, patterns, or other attributes that describe the authorship of different regions of the first image. For instance, the second image can be configured such that, when scaled to the same size as the first image, the locations of the second image correspond to regions of the first image that have particular authorship.

Steganography is a known technique for storing second information in first information such that the first information is not readily apparent to human inspecting the first information. An example technique for steganography is described in US 2011/0007936. Other techniques are known and may be used to store information. Traditionally, techniques for steganography are meant to be used for secretly conveying information in an encrypted form. While such steganographic techniques may be applied here, they need not be. In some instances, it may be beneficial to merely hide the information so that it is transmitted with the content without being distracting to a viewer without making the information secret. In other words, the information may be stored in a way that is readily retrievable so any interested viewer can decode the information to learn about the authorship.

FIG. 33 illustrates an example of applying authorship tokens 18 to an image. In the illustrated example, there is a first image 3310, a second image 3320, and a third image 3330. In an example, the first image 3310 is base content with respect to which edits are made. In an example, the first image 3310 is an original image produced by a human (indeed, the first image 3310 is a portion of a woodcut by Albrecht Durer) or an artificial intelligence. In other examples, the first image 3310 is not an original image. The first image 3310 may itself have mixed authorship or edits with respect to another image.

The second image 3320 illustrates an updated version of image 3310 after a plurality of edits have been made. The second image 3320 may steganographically store data corresponding to the third image 3330. The third image 3330 includes regions 3332 that correspond to regions edited to reach the second image 3320 from the first image 3310. For instance, region 3332A reflects changing the year from 1515 to 2024, region 3332B reflects changing the title "RHINOCERVS" to "UNICORN", region 3332C reflects the deletion of "AD", region 3332D reflects the drawing of a new horn, region 3332E reflects the change to the eye, and region 3332F reflects the removal of the original horn. Each of those changes can be considered one or more edits to the first image 3310. In this illustrated example, the background is solid white, which can represent no edits or original authorship with respect to the first image 3310 and the regions 3332 are solid black, which can represent edits or changes in authorship with respect to the first image 3310. However, the regions 3332 may have different colors or characteristics that indicate multiple different authors, an extent of the change, or other information. In some examples, the second image 3320 steganographically stores the first image 3310 (e.g., at a lower resolution or quality) such that a viewer can compare the two to understand how the edits changed the first image 3310.

The second image 3320 or an accompanying file can store data regarding the regions 3332, such as the authorship data. In some examples, the authorship is steganographically stored in the second image 3320 or the third image 3330.

Figure 34:
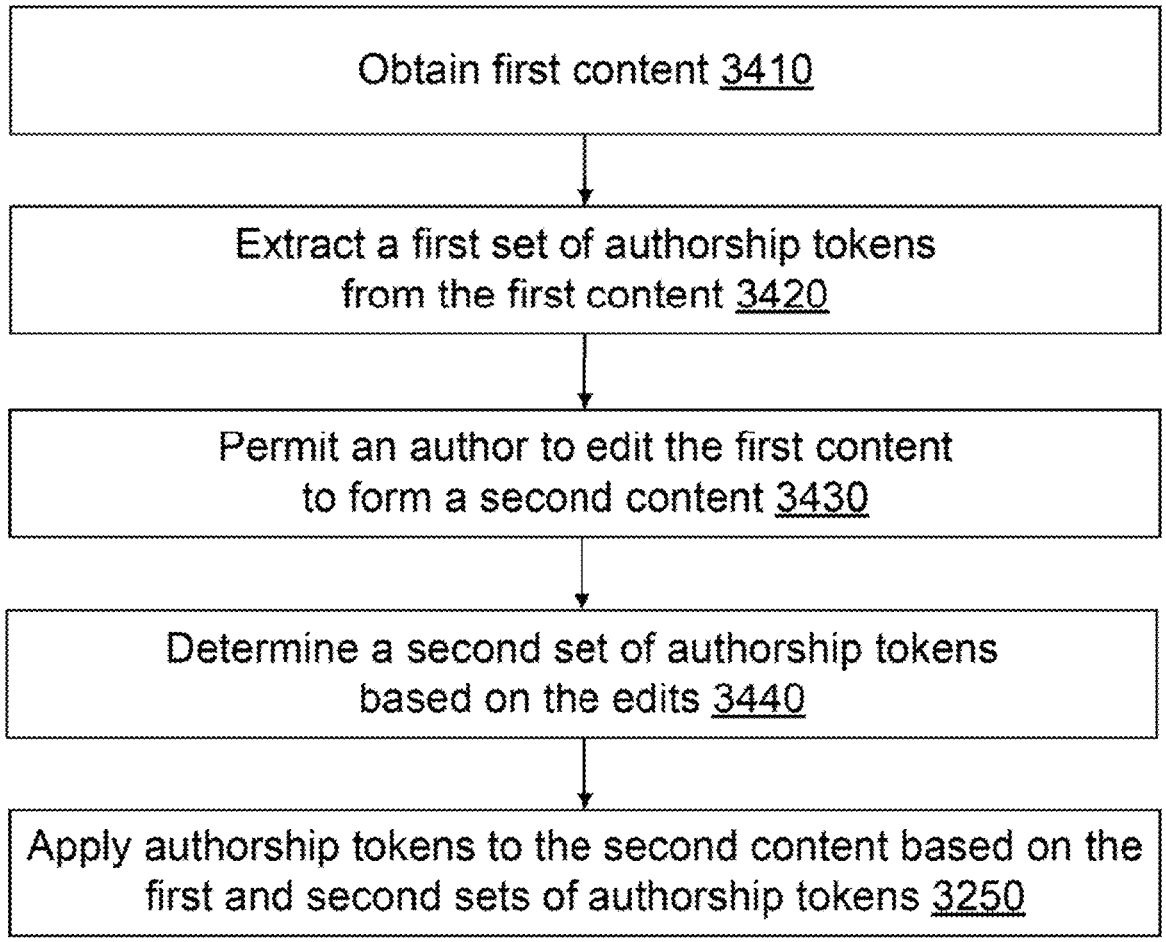
FIG. 34 illustrates an example method for managing authorship tokens for content, such as visual content.

FIG. 34 illustrates an example method 3400 for managing authorship tokens 18 for content, such as visual content. For example, if content stores (e.g., steganographically) authorship tokens, the further editing may destroy or degrade existing the authorship tokens 18. Method 3400 describes a technical improvement that permits editing of content while preserving and adding additional authorship token 18 data. The method 3400 can begin with operation 3410.

Operation 3410 includes obtaining first content 3410, such as by using any technique described herein.

Operation 3420 includes extracting a first set of authorship tokens 18 from the first content 3420. In some examples, the first set of authorship tokens 18 are steganographically stored in the first content. This operation 3420 can include detecting or predicting such steganography (e.g., which may be determined based on information accompanying the first content, information in a file encoding the content, applying a standard technique for a certain platform or file type, another technique, or combinations thereof). The operation 3420 can include extracting information from the file or data structure encoding the content. The operation 3420 can include obtaining authorship tokens 18 from another file or data structure provided or associated with the first content. In some examples, if authorship tokens 18 are not detected, then the method 3400 can end. Or, in some examples, the method 3400 can continue. For instance, though authorship tokens 18 were not detected, the first set of authorship tokens 18 can be generated. Such generated authorship tokens 18 can indicate that the first content has unknown provenance or authorship. Following operation 3420, the flow of the method can move to operation 3430.

Operation 3430 includes permitting an author to edit the first content to form second content 3430. This can include permitting the author to edit the first content to form second content using a content editor. The content editor can be any of a variety of content editors and can edit the content using any of a variety of techniques, including using techniques described elsewhere herein. Following operation 3430, the flow of the method can move to operation 3440.

Operation 3440 includes determining a second set of authorship tokens 18 based on the edits made in operation 3430. This determining can take place during operation 3430 and can be done in any of a variety of ways, including using techniques described elsewhere herein. In some examples, the second set of authorship tokens 18 are added to the content while the content is being added. In addition or instead, the second set of authorship tokens 18 are stored separately from the content. Following operation 3440, the flow of the method 3400 can move to operation 3450.

Operation 3450 includes applying authorship tokens 18 to the second content based on the first and second set of authorship tokens 18. In some examples, this can include applying both the first and second set of authorship tokens 18 to the content. In some examples, the second set of authorship tokens 18 can overwrite one or more of the authorship tokens 18 of the first set. In some examples, there may be a first region associated with an authorship token 18 of the first set of authorship tokens 18. The first region may be broken up into two or more smaller regions. At least one of the smaller regions can retain authorship based on the first authorship token 18 and at least one of the other smaller regions can have authorship based on the second set of authorship tokens 18. In some examples, both the first set and the second set are retained, such that a history of authorship of the content is maintained. The authorship tokens 18 can be applied in any of a variety of ways, including using steganography.

Entropy

In some examples, the significance of an edit can be determined using entropy. In the information theory context, entropy describes how much information is conveyed by a single variable or piece of data and relates to factors like surprise and uncertainty. Such entropy was described by Claude Shannon in "A Mathematical Theory of Communication", The Bell System Technical Journal, Vol. 27, pp. 379-423, 623-656, July, October, 1948.

For most forms of content generation, edits can be assumed to be dependent on one or more previous edits or nearby regions because appropriate edits available to be made are often constrained by intelligibility (e.g., do the edits make sense given the context). For instance, following the phrase "the coin didn't come up heads, it came up", the next word is constrained by the words preceding it, and as a result, the most likely next word is "tails". Because of how constrained the next word is, an edit to add the word "tails"

would be a low entropy edit. If instead however, an author wrote "banana", that edit would be high entropy because of its unlikelihood (unless, of course, prior context established that the coin was heads on one side and banana on the other). Entropy can be Defined Using the Equation:

$$H(X) = -\sum_{\chi \in X} p(\chi) \log_b p(\chi)$$

where X is a set of possible edits, b is any base (typically 2), and p($\chi$) is the probability that specific edit $\chi$ occurs. Here, the set of possible edits need not be the set of all possible edits. Rather, the set can be a sufficiently large subset of possible edits, such as the top m most likely edits or all possible edits having a probability greater than n, where m and n are predetermined values.

The probability of an edit can be determined in any of a variety of useful ways. For example, the probability of the edit can be determined based on whether the actual edit is predicted as part of a next token analysis. Many language models are configured to calculate next token probability and can be used or repurposed for this use. One or more regions of content can be provided to a language model able to predict next tokens and observing what tokens are predicted next and their assigned probability. In other examples, the prediction can be bidirectional, such as by masking a token of interest and asking a language model to predict what token is masked and observing the predicted tokens and their associated probabilities. Various language models can be used to perform such a technique, such as the BERT models by GOOGLE and derivatives thereof (e.g., RoBERTa). In an example, a person of skill in the art can use the TRANSFORMERS Python Library by HUGGING FACE. For instance, the pipeline class constructor from TRANSFORMERS can be called with a "fill-mask" parameter and top number of entries to return. A model parameter can be used to specify which model to use. A targets parameter can be used to obtain specific probability values for a token that is outside of the top values. Other techniques may be used. In some instances, a generic language model or large language model can be used to determine probability. In addition or instead, specifically trained or fine-tuned language models can be used. The use of such a model can improve accuracy of the entropy. For instance, the predictability of certain edits can vary depending on whether the content is narrative text or source code (and even depend based on a programming language). Further still, the predictability of certain edits can vary depending on a particular author's style. For instance, the predictability of edits in a given content context can vary depending on if the author is a technical writer, a fiction writer, or a non-fiction writer, and even within each of those contexts, a particular author's style can distinguish them (see, e.g., the field of authorship profiling).

In another example, a large language model or other generative artificial intelligence is provided with a portion of content having a region masked off and used to fill in the masked region. This process is repeated a number of times and the answers are accumulated to produce a data set. The probability is then based on how often the actual edit appeared in the produced data set.

Entropy can be used to determine the significance of the associated edit. For instance, if the entropy of the edit is sufficiently high (e.g., "banana" in the above example), then the associated edit can be considered significant. If the entropy is not sufficiently high (e.g., "tails" in the above example), then the associated edit can be considered insignificant. In some implementations, authorship tokens 18 are only applied to regions having sufficiently high entropy. For example, certain words like "the" or "a" might have very low entropy because they are very predictable. Thus, they may be determined to lack authorship or inherit the authorship of nearby higher entropy words or regions. In some examples, the authorship of the low entropy words are inherited from the nearby word(s) that gave them the low entropy.

In some examples, the effect of a region or other content on entropy of other regions can be used to determine authorship. For instance, when determining authorship of a particular region, one or more other regions can be removed and the effect on the entropy of the particular region is examined. If the effect is high, then the author of the particular region can be determined to be the author of the one or more other regions. As a concrete example, say that a human wrote "the coin didn't come up heads, it came up" and an artificial author added "tails", resulting in the sentence: "the coin didn't come up heads, it came up tails". When determining the author of the region "tails", a first entropy is calculated for the artificial edit with the context "the coin didn't come up heads, it came up" and a second entropy is calculated for the artificial edit without that context added. The second entropy is much higher than the first entropy, so the author of "tails" is considered to be the human author notwithstanding the artificial source of the edit.

The context used to determine entropy need not be limited to the content being written, it can also include information from other sources, such as a prompt provided to a chatbot, a conversation history with a chatbot, documentation accompanying a code base, other information, or combinations thereof. For instance, continuing the example from FIG. 7, the entropy of the content 710 or portions thereof with and without the human can be compared. The portions having more than a threshold amount of entropy with the human contribution and less than a threshold amount of entropy without the human contribution can be determined to be human authored notwithstanding an otherwise artificial source.

In an example, resulting content produced by co-authors can be thought of as being similar to the effect of noise on a transmission system. For instance, an artificial author produces content, which is then modified somewhat by a human author to produce the resulting content. This can be used to calculate the entropy of the "noisy" author and can be used to characterize that author's effect. In some examples, if the entropy of that author is sufficiently low (e.g., below a threshold), then that author can be considered to lack authorship of the resulting content notwithstanding their being the source of the contribution.

FIG. 35 illustrates an example method 3500 for ensuring a correct authorship token 18 is associated with a region. The method 3500 can begin with operation 3510.

Operation 3510 includes determining a source of an edit to a region of content. For example, the source is either a human author or an artificial author. The determining of the source can include one or more aspects described elsewhere herein, such as in relation to operation 210 of FIG. 2B.

Operation 3520 includes determining entropy of the edit. In an example, this operation includes calculating an entropy value based on a probability of the occurrence of the edit given a context in which the edit exists. Determining the entropy can include using an equation having the form:

$$H(X) = -\sum_{x \in X} p(\chi) \log_b p(\chi)$$

where X is a set of possible edits, b is any base, and $p(\chi)$ is the probability that specific edit $\chi$ occurs.

In an example, determining the probability of the edit includes forming a masked context that includes the context having one or more tokens 18 of the region masked out, providing the masked context to a token 18 predictor to predict the masked token, and then using the output of the token 18 predictor to determine the probability. The output of the token 18 predictor can include a probability of the masked region containing the one or more tokens 18 and one or more other probabilities associated with the masked region containing one or more other tokens 18. The entropy value can be based on the probability and the one or more other probabilities.

The context can include a prior region located prior to the region, a subsequent region located after the region, or both the prior region and the subsequent region. In some examples, the method 3500 can include excluding, from the context, one or more excluded regions of the content, the excluded regions being associated with one or more authorship tokens 18 indicating that an artificial intelligence rather than a human author is the author of the excluded regions or vice versa. The context can includes information from outside of the content, such as a prompt provided to an artificial intelligence, a chat log describing a conversation with an artificial intelligence, or an output from an artificial intelligence.

Operation 3530 includes determining the author of the edit based on the entropy. In an example, the determining can be based on whether the entropy value satisfies or fails to satisfy a predetermined entropy threshold. In an example, the author is an entity that is the same as or different from the entity that is the source of the edit. For instance, the operation can include determining that a region associated with the edit has human authorship notwithstanding an artificial intelligence being the source based on determining that the edit fails to satisfy an entropy threshold.

Operation 3540 includes ensuring that the region is associated with an authorship tokens 18 corresponding to the author. This operation can include one or more aspects described elsewhere herein, such as in relation to operation 240 of FIG. 2F.

In some examples, the edit is generated or made based on an entropy calculation. For example, the method 3500 can include generating potential edits with an artificial intelligence until a potential edit having lower than a threshold amount of entropy. The method 3500 can further include presenting, by the content editor, the potential edit as a suggestion, receiving acceptance of the suggestion, and applying the suggestion to the content. The determining that the artificial intelligence made an edit to content can be responsive to applying the suggestion to the content.

Constraining Output Using Entropy to Maintain Authorship

FIG. 36 illustrates a method 3600 for constraining an artificial intelligence to produce content or edits having human authorship. The method can begin with operation 3610.

Operation 3610 includes generating a first proposed artificial edit based on a desired change. The generating can be performed using an artificial intelligence, such as an artificial intelligence system that relies on a large language model or other technology to produce content or edits to content based on a context. The desired change can take any of a variety of forms. The desired change can reflect the desire of a human user based on explicit or implicit instructions. For example, the human user may be a programmer that wants to refactor code to use an iterative loop rather than a recursive loop. That refactoring can be the desired change. The human user may provide that desired change to the artificial intelligence by providing a text prompt. The artificial intelligence can then take that desired change and produce the first proposed artificial edit to the code based thereon. Following operation 3610, the flow of the method 3600 can move to operation 3620.

Operation 3620 includes determining the entropy of the first proposed artificial edit. This can include using one or more of the techniques described above in relation to operation 3520. The entropy of the edit can be influenced by the human user's expression of the desired change as well as the existing code base. Following operation 3620, the flow of the method can move to operation 3630.

Operation 3630 includes determining that the entropy fails to satisfy a human authorship entropy threshold. This can include comparing the determined entropy with a pre-existing human authorship entropy threshold set by a content editor, the human user, a policy, or another source. The entropy may be sufficiently high (e.g., the edit is sufficiently "surprising" or unpredictable) that the author of the edit would be considered an artificial author (e.g., the artificial intelligence that produced the first proposed artificial edit) rather than the human user that provided the desired change. Following operation 3630, the flow of the method 3600 can move to operation 3640.

Operation 3640 includes, responsive to determining that the entropy exceeds a human authorship entropy threshold, querying the human user regarding the desired change. For example, the query can be designed to obtain additional information from the human user to reduce the entropy of an edit produced based thereon. The query can take any of a variety of forms. In an example, the query is produced by providing a prompt to a large language model, where the prompt is configured to produce questions regarding missing information from the initially formulated desired change. Continuing the above refactoring example, the query might include asking the human user what they want to use as the name of a particular variable. Following operation 3640, the flow of the method 3600 can move to operation 3650.

Operation 3650 includes receiving a human response to the query. The human user's response can be provided in any of a variety of forms. In one example, the human user's response is in the form of a free text response. In other examples, the response is a selection of one of multiple choices or options for proceeding. The query and response can take place within an existing chat conversation. Following operation 3650, the flow of the method 3600 can move to operation 3660.

Operation 3660 includes generating a second proposed artificial edit based on the desired change and the response to the query. This operation 3660 can be similar to operation 3610 but with generated edit being further based on the response to the query. Following operation 3660, the flow of the method 3600 can move to operation 3670.

Operation 3670 includes determining the entropy of the second proposed artificial edit. This can be performed using the same or similar process as in operation 3620. Following operation 3670, the flow of the method 3600 can move to operation 3680.

Operation 3680 includes determining that the entropy of the second proposed artificial edit satisfies the human authorship entropy threshold. This can include comparing the determined entropy with the preexisting human authorship entropy that was used in operation 3630. But this time, the entropy may be sufficiently low (e.g., the edit is sufficiently "unsurprising" or predictable) that the author of the edit would be considered a human author notwithstanding the artificial intelligence used to produce the edit. If, however, the entropy still fails to satisfy the threshold, then the flow of the method 3600 can return to operation 3640 for further prompting and refinement of the edit based on the human user's feedback. Following the threshold being satisfied in operation 3680, the flow of the method 3600 can move to operation 3690.

Operation 3690 includes applying the second proposed artificial edit to the content. This can include making the changes associated with the edit. This can further include associating the changes to the content with one or more human authorship tokens, such as by using one or more processes described elsewhere herein.

Although this method 3600 is discussed in the context of entropy, various aspects can be modified to use other indications of authorship, such as those discussed above in relation to determining significance in operation 220. For instance, the human user can be prompted to provide information until the edits provided by the artificial intelligence are not significant compared to a threshold or a significance of the contribution of the human user.

Permitting or Denying Edits Using Authorship

Figure 37:
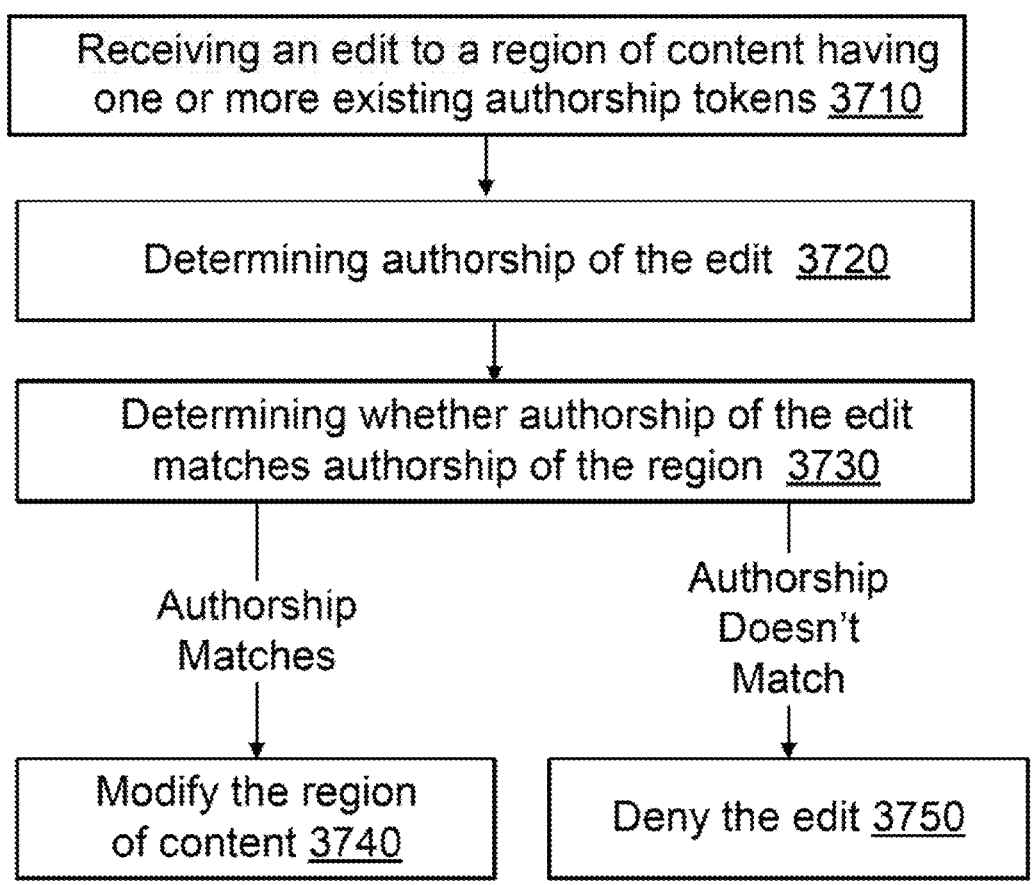
FIG. 37 illustrates a method for permitting or denying edits using authorship.

FIG. 37 illustrates a method 3700 for permitting or denying edits using authorship. For example, in some implementations, it can be desirable to maintain consistent authorship of a piece of content. A school may permit students to use AI-assisted features so long as the involvement of the AI does not rise to the level of erasing the student's authorship of the content. Further, there may be advantages to permitting human involvement in certain projects so long as a single human's contribution does not rise to the level of authorship. For instance, it may be desirable to maintain artificial authorship of particular content while permitting minor human-driven edits. And even in the human-human context, a first human author may want edits or other feedback from one or more other human reviewers but only so long as the edits do not change the core authorship of the work. This method 3700 can be used to permit or deny modification to content based on such considerations. The method can begin with operation 3710.

Operation 3710 includes receiving an edit to a region of content having one or more existing authorship tokens. Following operation 3710, the flow of the method 3700 can move to operation 3720.

Operation 3720 includes determining authorship of the edit. Following operation 3720, the flow of the method 3700 can move to operation 3730.

Operation 3730 includes determining whether the authorship of the edit matches the authorship of the region. Responsive to the authorship of the edit matching the authorship of the region, the flow of the method 3700 moves to operation 3740. Responsive to the authorship of the edit failing to match the authorship of the region, the flow of the method 3700 moves to operation 3750.

Operation 3740 includes modifying the region of the content based on the edit. This can include permitting the edit, preserving the edit, or making a change to the content.

Operation 3750 includes denying modification of the region of the content based on the edit. This can include undoing the modification of the region if the modification has already been made. Alternatively, this operation 3750 can include preventing modification of the region based on the edit. In some examples, the modification is permitted but it is marked or tracked in such a way that prevents a content editor from finalizing the content until the region is further modified. In some examples, denying the edit can further involve a remediation technique that would permit a similar edit that would have permissible authorship. For example, one or more aspects described above in relation to operation 3600 can be applied here to result in a permissible edit.

Use of a Content Editor

FIG. 38 illustrates a method 3800 for generating content having authorship tokens using a content editor. The method 3800 can begin with operation 3810.

Operation 3810 includes generating content using a content editor. The content being generated can have mixed human and artificial authorship. The operation 3810 can include operations 3812 and 3814.

Operation 3812 includes a human user providing a manual edit to a region of content via the content editor. This can be performed in any a variety of ways, including those described elsewhere herein (e.g., a human user making the edit to content via a human interface device).

Operation 3814 includes an artificial edit being proved to a region of the content via the content editor. This can be performed using any of a variety of ways, including those described elsewhere herein (e.g., a human user causing a large language model to produce, rephrase, or otherwise modify content).

Following operation 3810, the flow of the method 3800 can move to operation 3820.

Operation 3820 includes providing the content to a third party. This can include sending the content via email, cellular messaging applications (e.g., using messaging formatted according to SMS, MMS, or RCS formats), instant messaging applications (e.g., SIGNAL, DISCORD, IMESSAGE, WHATSAPP, or MICROSOFT TEAMS, among others), applications for social media platforms (e.g., FACEBOOK, INSTAGRAM, X (nee TWITTER), SNAPCHAT, and TIKTOK), audio media (e.g., telephone calls, Internet calls), visual media (e.g., video platforms or video calls), other ways of sending content, or combinations thereof.

Applying Authorship Tokens Based on Existing Tracking

While many examples herein are focused on authorship tokens automatically being placed while content is being edited, in some examples, authorship tokens can be applied after content has been created based on existing tracked information stored in association with the content. For instance, a document may have redlining markup, from which at least some authorship tokens can be determined and applied. In an example, the significance of each tracked change is determined, and authorship tokens are applied based on the identity of the user that made the change. In another example, an editing session may be recorded by a keylogger, screen recorder, or other technique. The resulting recording of the editing session can be analyzed to identify edits and associated users and apply authorship tokens based thereon. In some instances, the tracking information may lack sufficient information to accurately determine authorship, and authorship tokens can be applied accordingly.

In some examples, content generated by an artificial intelligence is automatically watermarked as part of the generation process. The watermark can be detected in existing content and used as existing tracking information for the application of authorship tokens. For instance, portions of content associated with watermarks describing artificial generation can be associated with authorship tokens ascribing artificial authorship to those portions. Meanwhile, portions lacking such watermarks may be labeled as having unknown authorship or human authorship depending on authorship settings.

Figure 39:
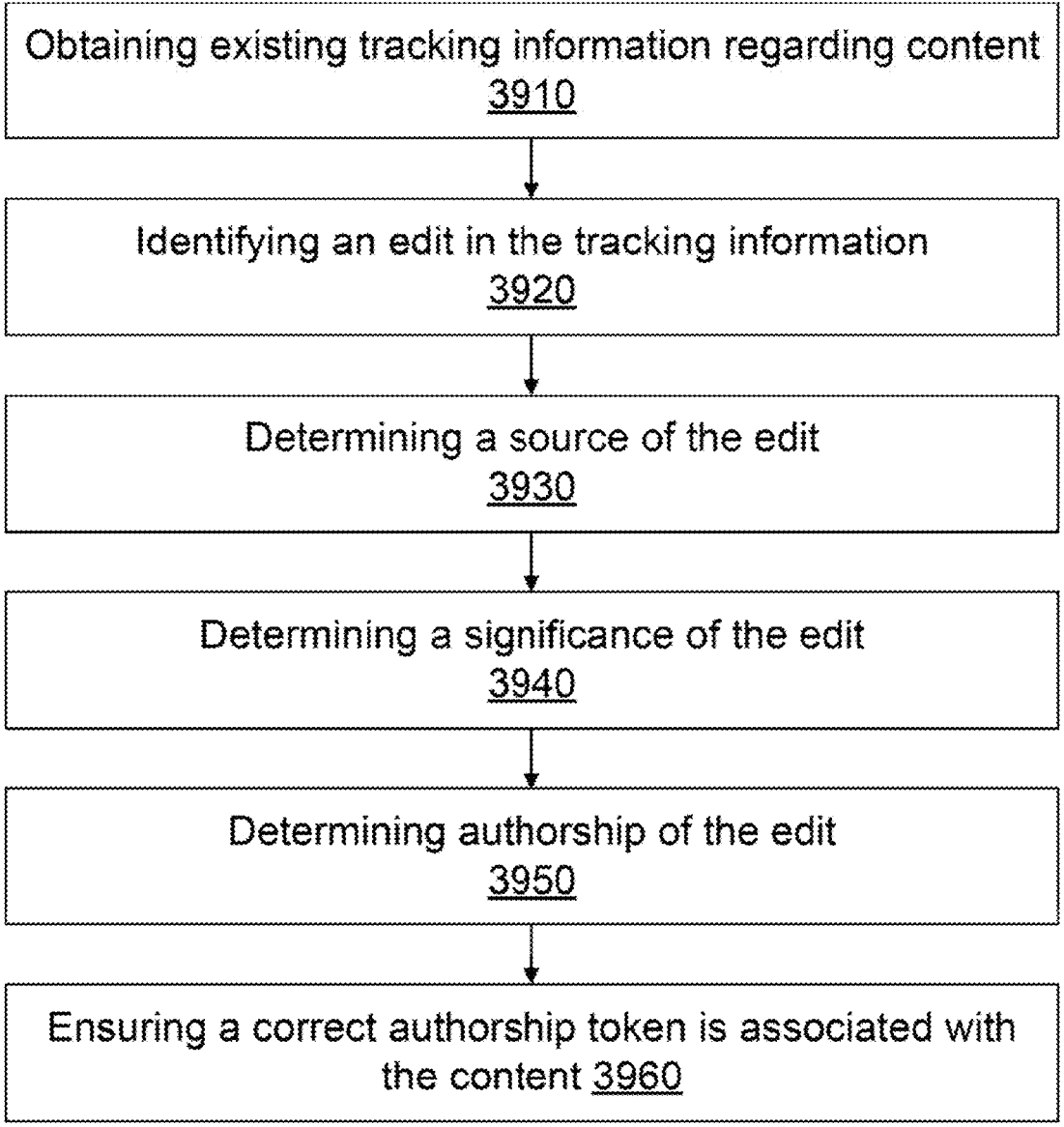
FIG. 39 illustrates an example method for ensuring correct authorship tokens are associated with content based on existing tracking information.

FIG. 39 illustrates an example method 3900 for ensuring correct authorship tokens are associated with content based on existing tracking information. The method can begin with operation 3910.

Operation 3910 includes obtaining existing tracking information regarding content. In an example, this includes obtaining content having redlining markup, obtaining a recorded editing session, other recorded content, recordings of actions being performed (for which authorship is to be attributed), other recordings, or combinations thereof. Following operation 3910, the flow of the method 3900 can move to operation 3920.

Operation 3920 includes identifying an edit using the tracking information. For instance, where the existing tracking information is a recording of an editing session, this operation can include determining a difference between the content at a first point in time and the content at a second point in time. The resulting difference can be treated as an edit. Where the content includes redline markup, blocks of the changes indicated in the markup (e.g., insertions and deletions) can be considered to be the edits. Following operation 3920, the flow of the method 3900 can move to operation 3930.

Operation 3930 includes determining a source of the edit. This can include performing one or more techniques described elsewhere herein, such as in relation to operation 210 of FIG. 2. Following operation 3930, the flow of the method 3900 can move to operation 3940.

Operation 3940 includes determining significance of the edit. This can include performing one or more techniques described elsewhere herein, such as in relation to operation 220 of FIG. 2. Following operation 3940, the flow of the method 3900 can move to operation 3950.

Operation 3950 includes determining authorship of the edit. This can include performing one or more techniques described elsewhere herein, such as in relation to operation 230 of FIG. 2. Following operation 3950, the flow of the method 3900 can move to operation 3960.

Operation 3960 includes ensuring a correct authorship token is associated with the content. This can include performing one or more techniques described elsewhere herein, such as in relation to operation 240 of FIG. 2.

Showing Authorship Changes Prior to Editing

In some examples, how a proposed edit will affect authorship can be shown to a user. For instance, certain predictive text features can show a preview of a suggested edit past a current position of the cursor. Thus, the user may understand the effect of accepting the suggested edit (e.g., by pressing tab or another hotkey), but they may not necessarily understand how accepting such a suggested edit would affect authorship. While in some instances, the editor may have settings to prevent suggesting proposed edits that would have artificial authorship, the editor may be configured to be able to provide suggested edits that may have artificial or human authorship. In such instances, the editor may be configured to provide an indication of not only the suggested edit but also its authorship and how it will affect authorship of existing sections of the content. An example of this is shown in FIG. 40.

Figure 40:
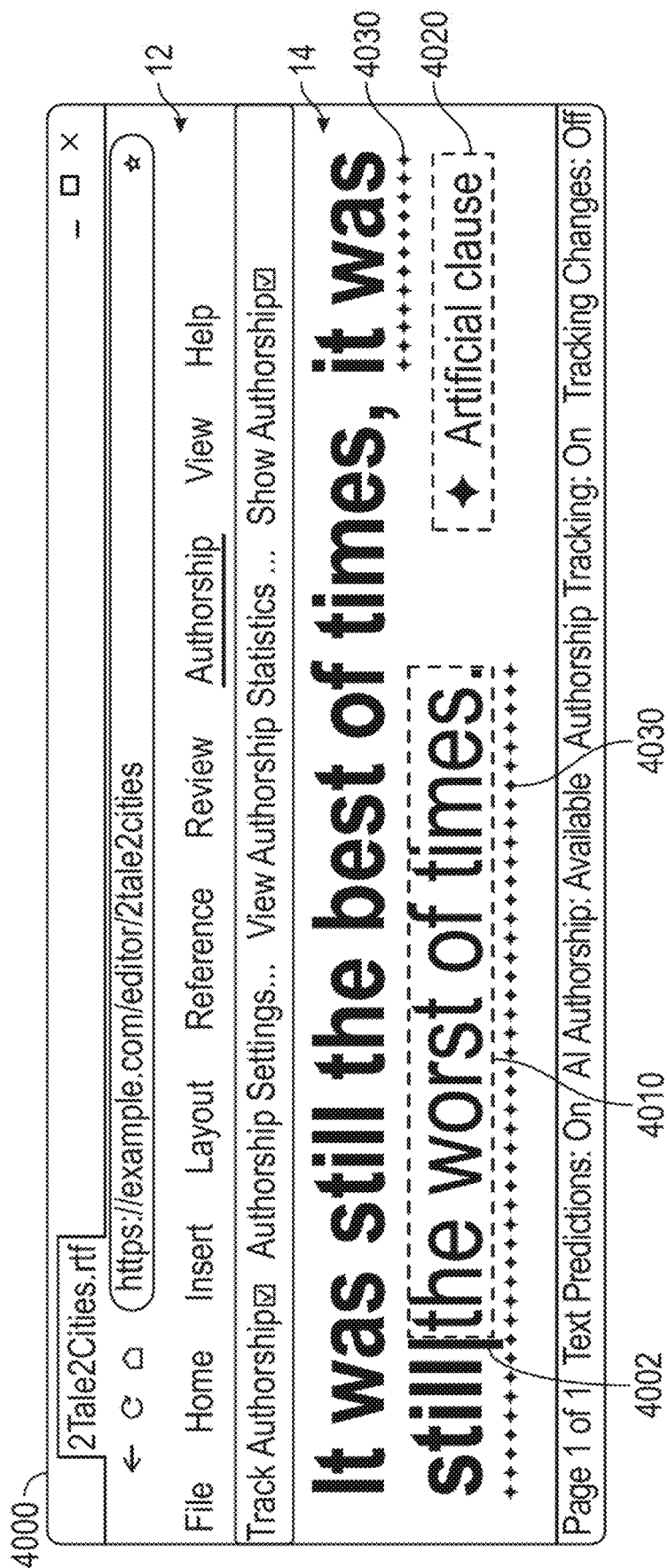
FIG. 40 illustrates an example user interface of a browser-based content editor being used to edit text content.

FIG. 40 illustrates an example user interface 4000 of a browser-based content editor 12 being used to edit text content 14. The user interface 4000 shows a cursor 4002 where new text will be entered. Past the cursor 4002 is a suggested edit 4010. The editor 12 can cause the suggested edit 4010 to be inserted into the content (and the cursor 4002 to be placed at an appropriate place in the content following updating the content to reflect adding the suggested edit 4010), such as responsive to detecting a user actuating a user interface button (e.g., an "accept" button) or pressing a key (e.g., hitting tab). In the illustrated example, the suggested edit 4010 has a different font weight than the existing content 14, but in other examples, it can be distinguished in other ways (e.g., via a different color or having a particular highlighting).

The example user interface 4000 further includes an authorship indicator 4020 that provides information to a user regarding the authorship of the suggested edit 4010 and how accepting the suggested edit 4010 will change authorship of the content. As illustrated, the authorship indicator 4020 one or more features that indicates that it is related to the suggested edit 4010 (e.g., by being in line with the suggested edit, being proximate the suggested edit, having a same font as the suggested edit, having a similar font size, having a similar color, having one or more elements connecting it to the suggested edit, other indications, or combinations thereof) and one or more indications that it is not part of the suggested edit 4010 such that accepting the suggested edit 4010 will not also insert the content of the authorship indicator 4020 into the content (e.g., by being offset from the suggested edit, by being distant from the suggested edit, by including a character that would be unusual for the suggested edit, by having a different font, by having a different font size, by having a different color, by having different highlighting, by being located outside of a content area of the text editor, other differences, or combinations thereof). Thus, the text editor 12 can more efficiently provide a user with information about the effect of not only the suggested edit 4010 on the content but also how it affects authorship. In some instances, there may be a default assumption regarding authorship of suggestions (e.g., that it does not change from the authorship of existing content) but that if the assumption changes (e.g., by determining an authorship of the suggested edit 4020 using techniques described elsewhere herein) then the authorship indicator 4020 can be displayed.

The example user interface 4000 further includes another authorship indicator 4030 that uses underlining of text to show what text will be affected by accepting the suggested edit 4020. As illustrated, this includes not only the text of the suggested edit 4020 but also text before the edit that will have changed authorship as a result. Further, the authorship indictor 4020 describes that this change will affect the authorship of the entire clause (e.g., between the comma and the period of the sentence).

Figure 41:
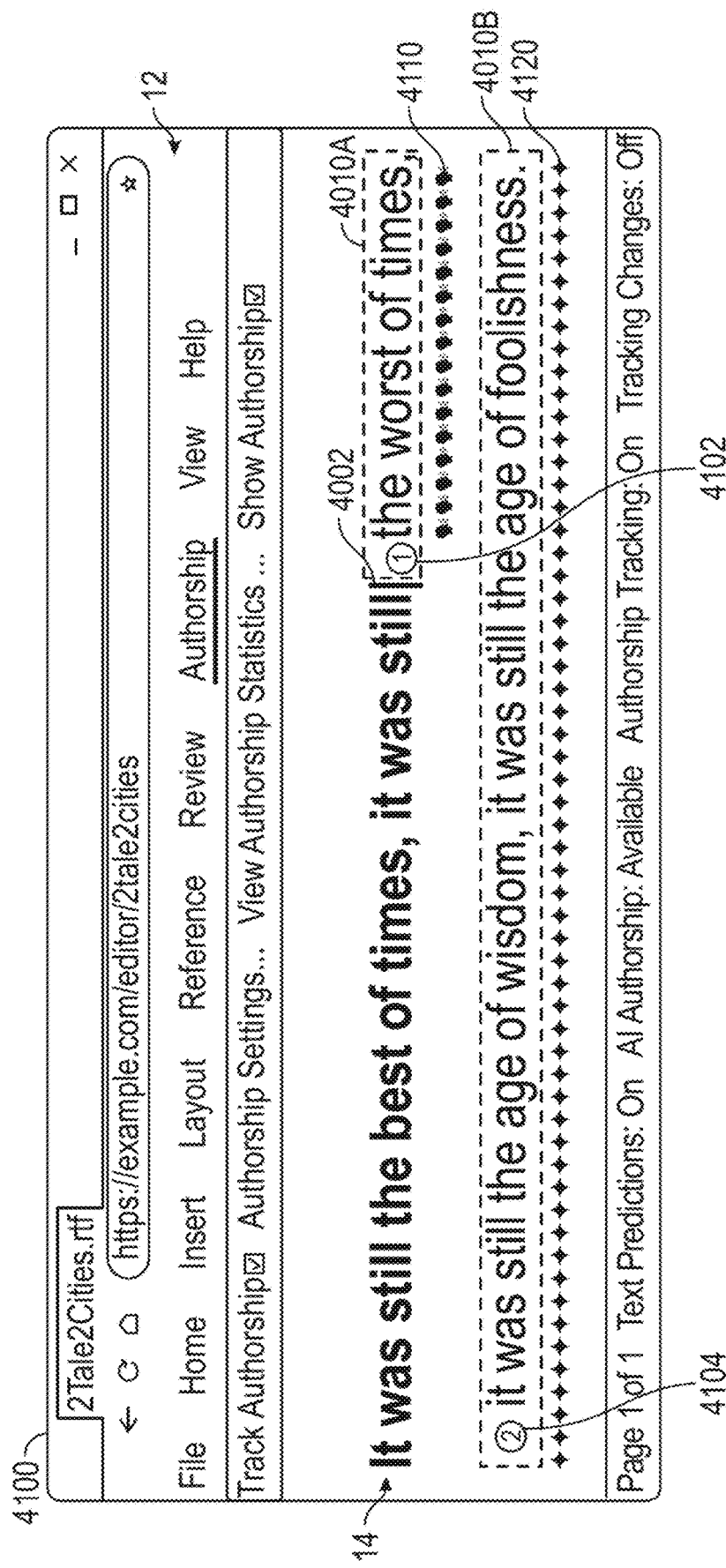
FIG. 41 illustrates another example user interface of a browser-based content editor being used to edit text content.

FIG. 41 illustrates another example user interface 4100 of a browser-based content editor 12 being used to edit text content 14. In this example, the content editor 12 provides two different suggested edits 4010A and 4010B. The first suggested edit 4010A is insignificant enough to retain human authorship as indicated by the first authorship indicator 4110 (here, in the form of an underline is repeated Unicode characters of a person speaking but which can take other forms in other implementations). Responsive to the user taking a first action (e.g., hitting a particular hotkey or interacting with the editor 12 in a predefined way) as indicated by the first accept indicator 4102, the first suggested edit 4010A is applied but not the second suggested edit 4010B.

By contrast, the second suggested edit 4010B is significant and would have artificial authorship if accepted as by the user taking a second action (e.g., based on the second accept indicator 4104) indicated by a second authorship indicator 4120 (here, again, in the form of underlining with a specific Unicode symbol but which can take other forms). In this particular instance, both the first and second suggested edits 4010A and 4010B would be made responsive to the second suggested edit 4010B being accepted, and the portion corresponding to the first suggested edit 4010A would have human authorship (e.g., and have a corresponding authorship token applied) and the portion corresponding to the second suggested edit 4010B would have artificial authorship (and have a corresponding authorship token applied). However, in other examples, different outcomes may occur. For instance, the two suggested edits may be mutually exclusive or alternatives and may be presented as such.

Authorship Engine as Part of a Virtual Input Device

While many examples have been discussed in the context of authorship engines being built directly into a content editor, a plugin thereto, an operating system, or a web browser, authorship engines can be located elsewhere. In some examples, the authorship engine is built directly into a virtual input device (or as a plugin thereto), such as a virtual keyboard. In such a manner, authorship information can be tracked and authorship tokens can be produced and stored even if the application itself does not support such a feature.

Figure 42:
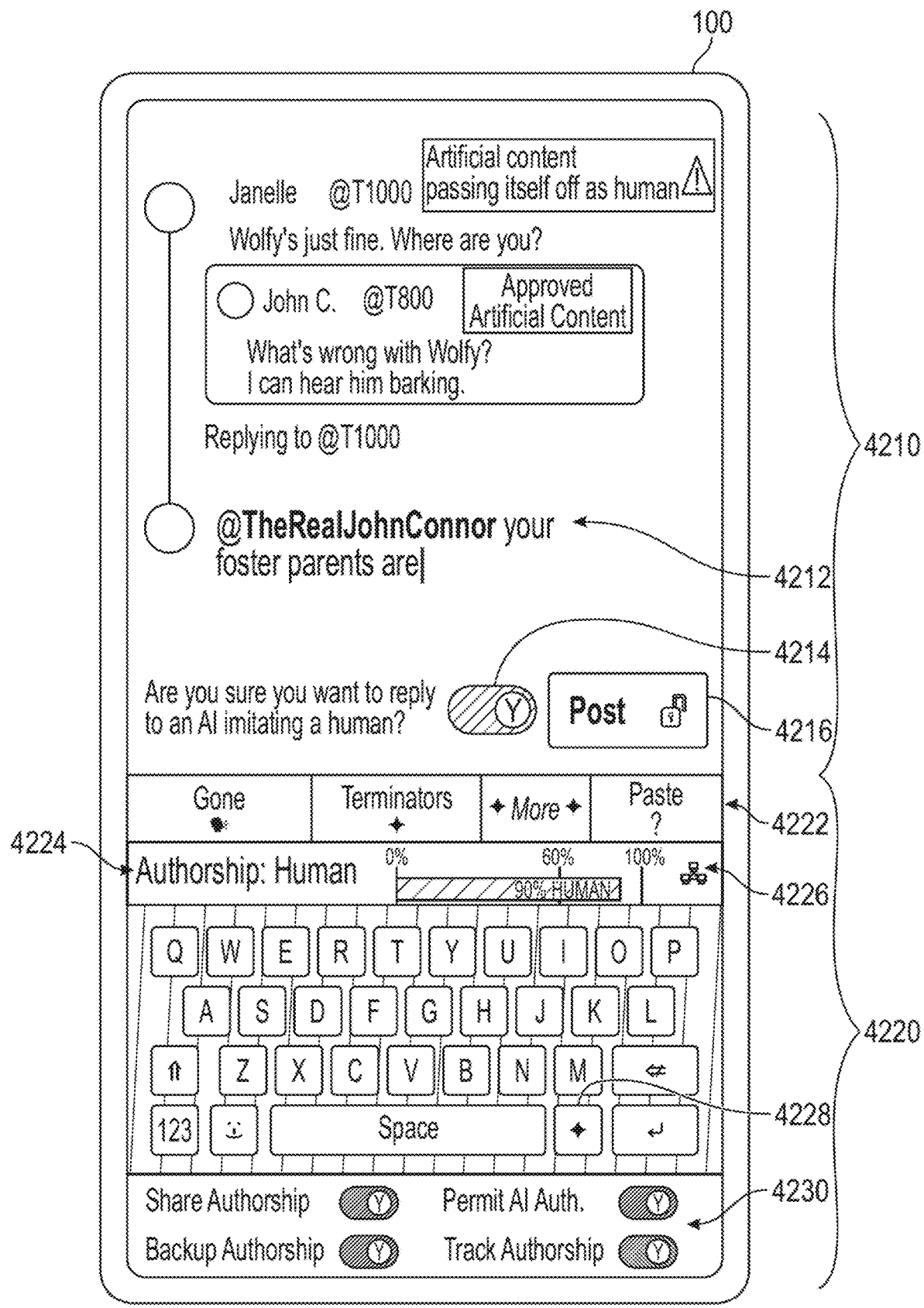
FIG. 42 illustrates an example device in the form of a smart phone running a social media application that is using a virtual keyboard of the device to receive text input from a user and provide it into a text-entry field of the application.

FIG. 42 illustrates an example device 100 in the form of a smart phone running a social media application 4210 that is using a virtual keyboard 4220 of the device 100 to receive text input from a user and provide it into a text-entry field 4212 of the application 4210. The application 4210 further includes a reply gate 4214 that prevents a user from actuating a post button 4216 until the user acknowledges that they are responding to inauthentic content (e.g., artificial content passing itself off as human) by activating a toggle. Such a reply gate 4214 can be activated by the application 4210 responsive to determining that the user is attempting to reply to inauthentic content, artificial content, or based on other criteria The virtual keyboard 4220 is an onscreen keyboard that receives input from a user of the device 100 and puts content at a specific location (typically a text-entry field of an application) based on that input. In the illustrated example, the input is touch input from a touchscreen of the device 100 associated with defined locations of the virtual keyboard to cause associated text to be added into an active text field of an active application. Virtual keyboards 4220 are often hidden until content entry is available (e.g., upon selection of a text entry field). This virtual keyboard 4220 further includes suggested text elements 4222, authorship status information 4224, a authorship sync indicator 4226, a generative artificial intelligence button 4228, and authorship settings 4230.

The suggested text elements 4222 are suggestions for a next work to enter. Thus, rather than needing to select individual letters, the user may select one of those elements 4222 to cause entry of the associated content. Such suggested text elements may include suggestions for how to complete an in-progress word (e.g., an autocomplete feature) or the next word in a phrase (e.g., predictive text). Some more advanced suggestions may result from using generative artificial intelligence (e.g., large language models) to suggest more content to provide based on a current context (e.g., already typed content, the content to which it is replying to, user preferences, other context, or combinations thereof). Depending on the significance of artificial involvement, the suggestions may have artificial authorship, human authorship, or mixed authorship. In the illustrated example, the first suggestion "gone" has human authorship (as indicated by the symbol of a person speaking associated with the suggestion) but the second suggestion "Terminators" has artificial authorship (as indicated by the star symbol associated with the suggestion). The suggested text elements 4222 further includes a "more" button that corresponds to using generative AI to produce more suggested text content. Upon actuation, that button may cause the display of another user interface to facilitate the generation or selection of such content for eventual text entry. Further still, the suggested text elements 4222 includes a suggestion to paste content from the clipboard and includes a symbol indicating that that the content in the clipboard has unknown authorship. In an example, the authorship engine of the keyboard may be able to determine the authorship of the content in the clipboard by analyzing where it was copied from or based on an authorship token in that copied content. However, where the authorship of that content is unknown, there can be a symbol indicating that its authorship is unknown. The inclusion of the authorship indicators can help a user understand the effect of accepting that suggested content.

The authorship status information 4224 is a portion of the virtual keyboard 4220 that indicates to the user the authorship of the content currently in the field. Here, the authorship status information 4224 indicates that the authorship is human because it is 90% human and passes an authorship threshold of 60%. In some instances, the threshold can be set by preferences of the authorship engine of the virtual keyboard 4220. In other instances, the application 4210 can set a threshold that the virtual keyboard 4220 obtains and uses.

The authorship sync indicator 4226 is a user interface element indicating that authorship data is successfully being sent to another device, such as a server associated with the application 4210 or a third-party server that stores authorship data for retrieval (e.g., if a platform associated with the application 4210 does not support authorship tokens).

The generative artificial intelligence button 4228 can, responsive to being actuated by a user, cause the virtual keyboard 4220 to cause a generative artificial intelligence feature to be activated.

The authorship engine (as described elsewhere herein) can be part of or associated with the virtual input device such authorship of content created using the keyboard can be determined. In some instances, the virtual keyboard 4220 can also monitor information typed in the field 4212 from other applications (or other keyboards) and determine or infer authorship based on that content. Further still, the virtual keyboard 4220 may include generative artificial intelligence capabilities and permit content to be created using generative AI. The authorship of that information can also be tracked and used to create authorship tokens.

The authorship settings 4230 are settings that can affect how the authorship engine of the virtual keyboard operates. For example, the settings include a toggle to share authorship. For instance, when such a setting is active, the authorship of the content can be shared with a platform associated with the application 4210 to demonstrate the authorship of the content being entered, with a first party server associated with the virtual keyboard 4220 (e.g., so others can confirm authorship), or with a second party server associated with tracking authorship. If such a setting is not active, then such sharing does not occur. There is a setting toggle to permit artificial authorship. That setting, if active, can permit the suggestion of content that would have artificial authorship (e.g., as determined by the authorship engine) if entered. There is a backup authorship toggle that can be used to, notwithstanding sending authorship elsewhere, backup authorship data regarding the content for later retrieval (e.g., to upload elsewhere to demonstrate authorship). The settings also include a track authorship setting that, if active, will permit the authorship engine to track authorship of content generated using the virtual keyboard 4220.

Authorship of Actions

While many examples herein have been discussed in the context of authorship of edits to content, the techniques herein are applicable to other contexts and can be used to determine and track authorship of actions more generally (of which edits are a possible subset). As artificial agents become more and more autonomous and capable, it can be beneficial to provide an indication of the author of actions more generally.

For instance, in video game tournaments or speed-running events, it is possible for a user to have an artificial agent (e.g., running locally on a computer or console, embedded in a peripheral such as a controller, or remotely) take actions on behalf of the user to cheat. For instance, aimbot software may run locally on a device, detect when in-game crosshairs are located over a target, and cause actuation of a fire button or transmission of a fire signal autonomously if a user does not do so themselves. It may be beneficial for a user to be able to demonstrate the provenance of their actions to disprove the use of artificial intelligence in their actions. In other contexts, it may be permissible or even desirable to have artificial assistance but nonetheless have auditable tracking of which actions were performed by a human or an artificial intelligence. For instance, in the autonomous vehicle context, it would be beneficial to produce a log describing which actions of the vehicle (e.g., turning, acceleration, braking, climbing, descending, others, or combinations thereof) were caused by a human versus an artificial intelligence. Further, in the medical device context, it would be beneficial to produce a log of which actions taken during surgery were performed by a human versus an artificial intelligence (e.g., with respect to controlling the position or activation of a surgical instrument or robot, such as during robot assisted joint replacement or robotically guided pedicle screw placement).

In those situations above and in other situations, artificial intelligence has grown in capability such that it is difficult or impossible to distinguish human authored actions from AI authored actions merely by comparing the states before and after the action was taken. This technical challenge creates downstream technical difficulties in training artificial intelligence because training an artificial intelligence on synthetic data can lead to an erosion of quality. For instance, when a driving model is being trained on driving data, it can be important to distinguish whether the driving data (e.g., a camera feed from the car) is the result of human actions or artificial actions. As with the content editing context above, conventional systems with respect to actions lack features to address these challenges at least in part because it was previously safe to assume that all actions were caused by a human or a relatively simple automated system. While some devices or systems include recording technology (e.g., flight data recorders), some such recorders can capture what action as taken without auditably describing who or what caused the action to be taken. For instance, actions taken may be the result of a confluence of factors or inputs having both human and artificial involvement that is not adequately captured. Further still, even if all relevant data could be captured and be manually or automatically labeled, such logs can raise privacy concerns, consume large amount of processing and memory resources, and can be difficult to correlate to a resulting output. In view of at least these technical challenges (and those further described elsewhere herein), there is a further need in the art for technical solutions that conveniently identify and label actions or results of actions with an associated human or artificial author, thereby improving systems that permit human and artificial involvement in producing actions.

Figure 43:
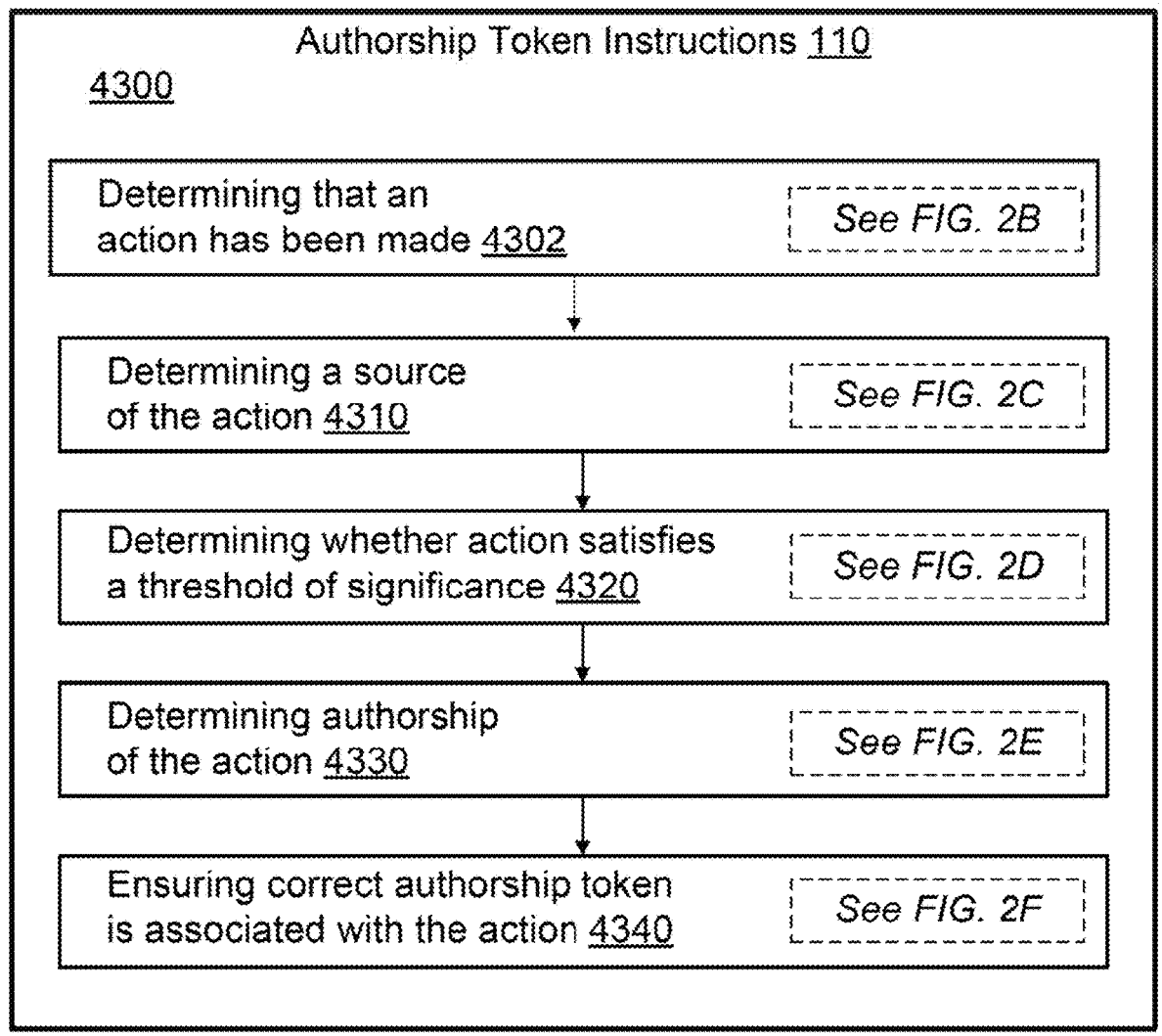
FIG. 43 illustrates an example method for auditably ascribing authorship to actions.

FIG. 43 illustrates an example method 4300 for auditably ascribing authorship to actions. The method 4300 can be begin with operation 4302.

Operation 4302 includes determining that an action has been made. The specifics of the action itself and the way in which it is detected can vary depending on the context in which this method 4300 is being performed, such as in the vehicle context or robotics context. In a vehicle context (e.g., automobiles, drones, boats, aircraft, or other vehicles), actions can include accelerating, decelerating, braking, turning, climbing, descending, changing gear, initiating communication (e.g., honking), operating actuators (e.g., opening a door or trunk), other actions, or combinations thereof. In the robotics contexts, actions can include causing movement of an end effector, causing movement of joint, actuating an end effector, other actions or combinations thereof. The detection of these and other actions can be performed in a variety of ways. In some examples, sensor detect the performance of these actions. In addition or instead, a control system that causes the action can also transmit a signal or send a message indicating the performance of the action.

While many examples provided herein are described in relation to editors and other contexts in which edits are typically made in series (rather than parallel), embodiments herein need not be limited to such circumstances. Edits or actions can occur simultaneously. For instance, when controlling a vehicle, a driver (human or artificial) can cause both an acceleration action and turn action at the same time. Further still, edits or actions from different sources can occur simultaneously. For instance, an artificial driver may cause a brake action to be performed while a human driver causes a turn action. In addition, two or more users may edit a document or other content simultaneously.

Operation 4310 includes determining a source of the action. This can include determining the identity of the source (e.g., a specific user or agent that caused the action) or information about what kind of source the source is (e.g., a human source versus an artificial source). This can be determined in any of a variety of ways depending on the context. Examples of how do determine a source are described elsewhere herein, including in relation to FIG. 2C.

Operation 4320 includes determining whether the action satisfies a threshold of significance. There can be a predetermined threshold of significance, and the significance of the action (or a set of actions) can be compared to that threshold. Examples of how to determine a significance are described elsewhere herein, including in relation to FIG. 2D.

Operation 4330 includes determining authorship of the action. The authorship of the action can be determined based on the source of the action. For example, the authorship can be attributed to a specific user or agent or a particular kind of source (e.g., human or artificial). Specific examples of determining authorship of an action are described elsewhere herein, including in relation to FIG. 2E.

Operation 4340 includes ensuring a correct authorship token is associated with the action. This can include associating an authorship token with the action in an appropriate location, such as a log. Examples of how to ensure a correct authorship token is associated with the action are described elsewhere herein, including in relation to FIG. 2F.

Further actions associated with method 4300 can include providing a report or audit log based on the actions and their associated authorship. Such authorship information can facilitate determining responsibility for actions, improving the quality of training data, and remediating errors.

Figure 44:
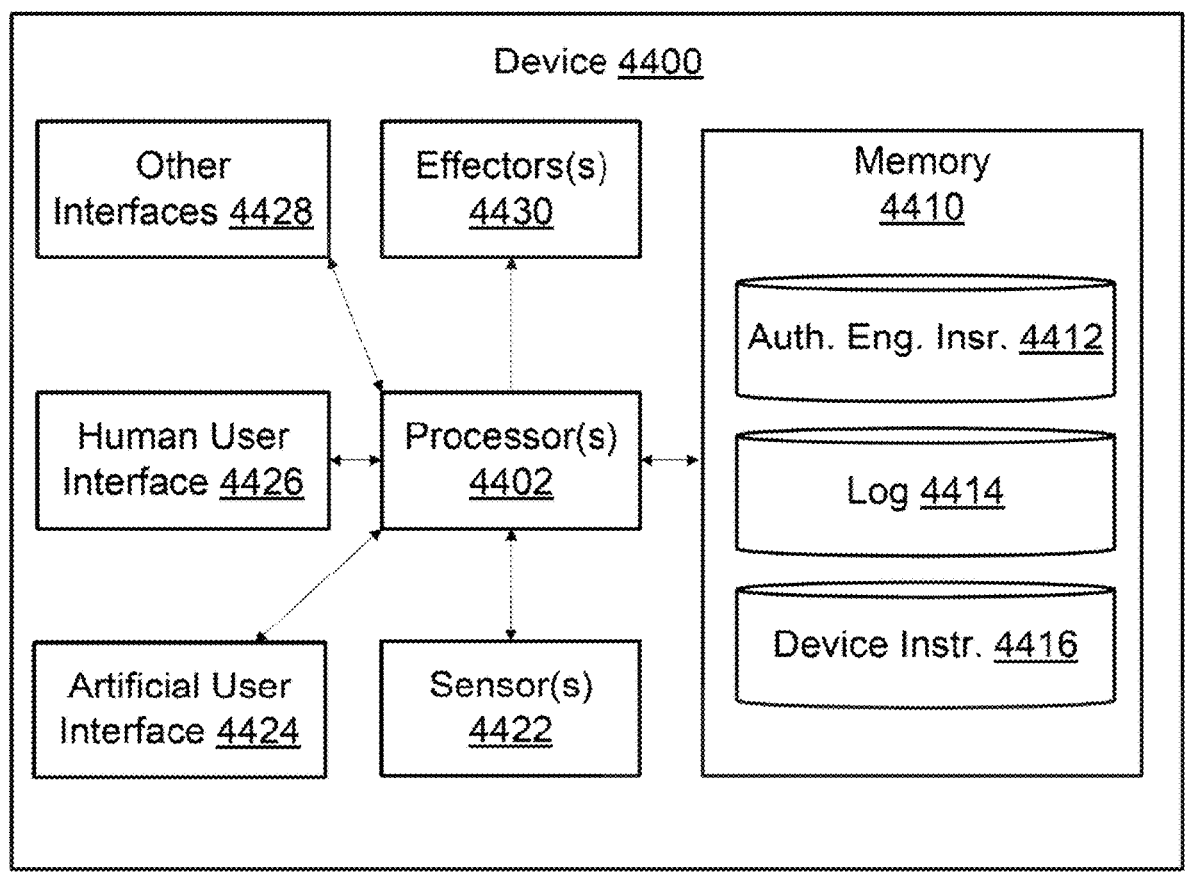
FIG. 44 illustrates an example system or device that takes action based on human input, artificial input, or combinations thereof.

FIG. 44 illustrates an example system or device 4400 that takes action based on human input, artificial input, or combinations thereof. The device 4400 includes an authorship engine to track authorship of the actions. The device 4400 can take any of a variety of forms, such as a computing environment that takes content editing actions (e.g., as described elsewhere herein), a vehicle that takes movement actions (e.g., manned or unmanned automobiles, aircraft, watercraft, underground vehicles, or other vehicles), stationary robots (e.g., computer numerical control machines, robot arms, surgical robots, and other robots generally configured to be operated from a substantially stationary base), mobile robots (e.g., humanoid robots, quadrupedal robots, wheeled or tracked drones, other robots configured with a mobile base move). The device 4400 can be operated by one or more operators selected from the group consisting of: a human controller at the device 4400, a human controller operating the device 4400 remotely, an artificial controller at the device 4400, or an artificial controller remote from the device 4400.

As illustrated, the device 4400 can include a set of one or more device processors 4402, memory 4420, a set of one or more device sensors 4422, a set of one or more artificial user interfaces 4424, a set of one or more human user interfaces 4426, a set of one or more other interfaces 4428, and a set of one or more actuators 4430.

The set of one or device processors 4402 be as described elsewhere herein, such as in relation to one or more processors 1012 of FIG. 10. The memory 4410 can be as described elsewhere herein, such as in relation to the memory 1014 of FIG. 10. As illustrated, the memory 4410 can include a set of authorship engine instructions 4412, a log 4414, and device instructions 4416. Other data and instructions can be stored in the memory 4410, including but not limited to instructions that, when executed, provide an artificial user of the device 4400.

The authorship engine instructions 4412 are instructions that, when executed by the set of processors 4402, cause the set of processors 4402 to provide an authorship engine and perform one or more authorship operations as described elsewhere herein (e.g., method 4300 of FIG. 43). The log 4414 can be a data structure that stores actions and associated authorship tokens. The device instructions 4416 are instructions that perform one or more operations associated with operation of the device 4400 (e.g., for the device to operate as intended).

The set of sensors 4422 is a set of one or more sensors used by the device 4400. The sensors 4422 can include components that facilitate receiving input from a relevant environment or context around the device 4400 for use by operations (e.g., caused by the device instructions 4416). The sensors 4422 can include visual sensors (e.g., cameras), object detection sensors (e.g., radar, lidar, ultrasonic sensors, others, or combinations thereof), audio sensors (e.g., microphones), haptic sensors (e.g., touch or vibration sensitive components), motion sensors (e.g., gyroscopes, accelerometers), radiofrequency sensors (e.g., antennas), position sensors (e.g., terrestrial or satellite-based position sensors such as those using the Global Positioning System), other sensors, or combinations thereof (e.g., a touch sensitive display).

The artificial user interface 4424 is a set of one or more interfaces by which an artificial user can cause the device 4400 to take action. In some examples, these are not physical components of the device, but rather application programming interfaces or other software techniques for receiving information, actions, requests, or instructions from an artificial user (e.g., an AI running on the device or elsewhere). In some examples, there are hardware components for receiving information, requests, actions, or instructions from the artificial user, such as wireless communication components, special information busses, ports, or other components.

The human user interface 4426 is a set of one or more components configured to receive input from a human user. Example components include visual input components (e.g., cameras), auditory input components (e.g., microphones), haptic input components (e.g., touch or vibration sensitive components), motion input components (e.g., mice, gesture controllers, finger trackers, eye trackers, or movement sensors), levers (e.g., joysticks), buttons (e.g., keyboards or mouse buttons), other input components, or combinations thereof (e.g., a touch sensitive display).

Other interfaces 4428 include interfaces, such as are described in relation to interfaces 1018 in FIG. 10. Although shown as separate components, there can be overlap between the other interfaces 4428, human user interface 4426, artificial user interface 4424, and sensors 4422. Further, some components can be located outside of the device. For example, there mya be a remote control used by a human to transmit instructions to the device 4400.

The set of effectors 4430 are one or more components of the device configured to take action within a surrounding environment or context. The effectors 4430 can vary depending on the device 4400. They may involve steering systems, drive systems, end effectors systems, actuators, lift systems, turning systems, other components or combinations thereof.

Tracking Deletions or Errors

Traditionally, artificial authors do not erase content that they wrote, but human authors tend to do so (e.g., due to typos, grammatical errors, or as a resulting of changing one's mind). In an example, an editor tracks whether content was deleted during the editing process. Certain deletions or patterns of deletion can be used as evidence of human authorship. Further, such deletions can be robust against transcription attacks whereby a human user does not directly paste artificial content but rather looks at the artificial content (e.g., on the same or a different device as the content editor) and manually types in the artificial content. Such an action may defeat a technique that merely assumes that all content manually typed has human authorship.

However, in some instances, it may not be sufficient to merely track errors. Rather, it may be beneficial to track which kind of errors are made. For instance, there may be typing errors (e.g., errors in the typing process, such as hitting the wrong key of a keyboard, misclicks, or other errors in a user providing input to the device running the editor), grammatical errors, errors in logic (e.g., the content is not logically consistent), errors in organization (e.g., sentences, paragraphs, or other regions should be rearranged to improve organization of the content), other errors, or combinations thereof. For example, a person transcribing artificial content may tend to make relatively more typing errors and substantially fewer other errors compared to a person authoring content themselves.

Figure 45:
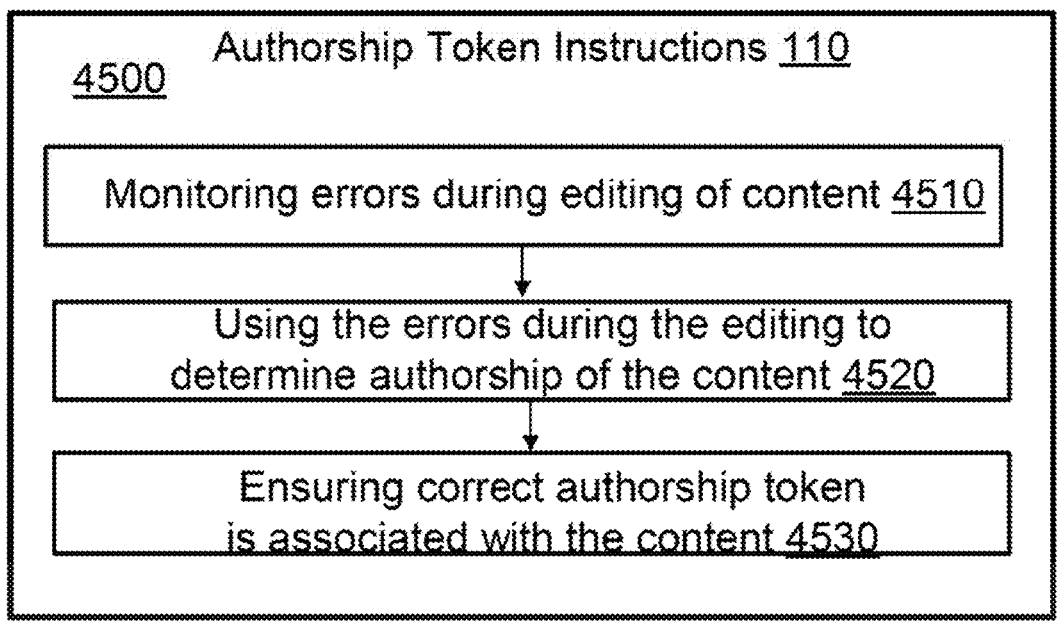
FIG. 45 illustrates an example method that can be implemented by authorship token instructions for using deletions and other indicia of errors to determine or demonstrate authorship.

FIG. 45 illustrates an example method 4500 that can be implemented by authorship token instructions 110 for using deletions and other indicia of errors to determine authorship. The method 4500 can begin with operation 4510.

Operation 4510 includes monitoring errors during editing of content. This can include identifying errors based on a user replacing, correcting, or taking another action indicating that an error was made. It can also include identifying errors using a built-in error detecting process, such as a spell check system or a grammar check system. In some examples, a large language model or another artificial intelligence can be used to identify more advanced errors, such as logical errors or organizational errors within the content. These errors can be tracked and accumulated. In some instances, the errors themselves or content that was deleted can be stored and used to demonstrate human authorship of the content. Following operation 4510, the flow of the method can move to operation 4520.

Operation 4520 includes using the errors during the editing to determine authorship of the content, such as human authorship, artificial authorship, unknown authorship, mixed authorship, or combinations thereof. For example, the errors individually or in combination can be analyzed to determine whether they are characteristic of human authorship or artificial authorship. In addition or instead, more fine-tuned determinations can be made, such as whether the errors are indicative of a human transcribing artificial content, a human modifying artificial content, or an artificial intelligence correcting human content. This analysis can be performed in any of a variety of ways, including statistical analysis of the errors (e.g., the raw number, type, or other characteristics) or through the use of an artificial intelligence trained on the kinds of errors the particular user or users in general make in different circumstances. Following operation 4520, the flow of the method can move to operation 4530.

Operation 4530 includes ensuring a correct authorship token is associated with the content. This operation can be as described elsewhere herein and can apply one or more authorship tokens according got the determination made in operation 4520.

In some examples, this method 4500 can be an additional layer of authorship verification beyond existing processes herein. For example, other techniques described herein may be used to determine authorship and then this method 4500 can be applied to double check, correct, or provide added assurances. For instance, a first level of authorship determination may determine that content was authored by a human based on the edits being provided over a human interface device, but this method 4500 may determine that the errors made during editing are actually indicative of a human transcribing the content from another source. That may result in flagging the content (e.g., because perhaps the user was transcribing their own human authored handwritten notes) or modifying the authorship token.

Authorship Based on Active Editing Time

One benefit of using an artificial intelligence to generate content is speed. In some examples, the time taken to edit content is used as an indication of authorship of content. For example, human authored content may take longer to write than artificial content. Thus, active editing time (e.g., the amount of time taken to edit) can be used as a factor in determining authorship.

Additional Example 1

Figure 46:
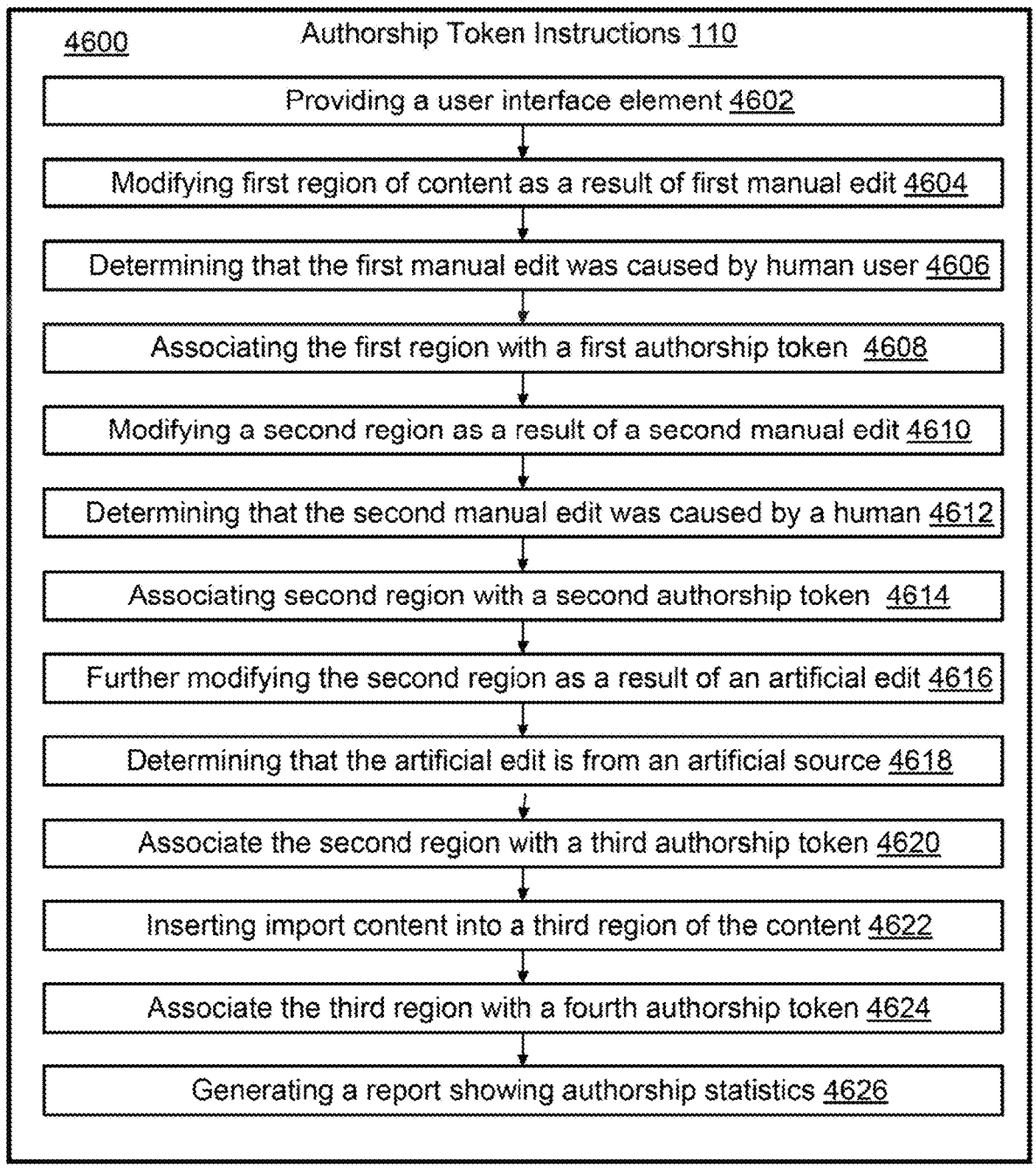
FIG. 46 illustrates an example method for improving a text editor running at least partially on a computing device having at least one human interface device.

FIG. 46 illustrates an example method 4600 for improving a text editor running at least partially on a computing device having at least one human interface device. The method can begin with operation 4602.

Operation 4602 includes providing, via the text editor, a user interface element actuatable to cause activation of an authorship tracking feature of the text editor. Following operation 4602, one or more operations can be performed based on the authorship tracking feature being activated. The operations can be performed with the text editor or a feature thereof. The operations can be performed automatically during one or more edit sessions where text content is being edited within the text editor by at least one human source and at least one artificial source. The operation can include one or more of the following operations, including operation 4604.

Operation 4604 includes modifying a first region of the text content as a result of a first manual edit to the first region of the text content caused by a human user of the text editor. The manual edit to the first region of the text content includes one or more changes, insertions, or deletions. Following operation 4604 the flow of the method 4600 can move to operation 4606.

Operation 4606 includes determining that the first manual edit was caused by a human user. This determination can be based on either or both of: (1) the first manual edit resulting from human input received via the at least one human interface device or (2) the manual edit being provided in a fashion similar to how a human would provide the input. Following operation 4606, the flow of the method 4600 can move to operation 4608.

Operation 4608 includes, associating the first region of the text content with a first authorship token having a form indicating that the first region has human authorship rather than artificial authorship. This can be responsive to determining that the first manual edit was caused by a human. Following operation 4608, the flow of the method 4600 can move to operation 4610.

Operation 4610 includes modifying a second region of the text content as a result of a second manual edit caused by a human user of the text editor. In an example, the second manual edit to the second region of the text content includes one or more changes, insertions, or deletions resulting from human input received via the at least one human interface device. Following operation 4610, the flow of the method 4600 can move to operation 4612.

Operation 4612 includes determining that the second manual edit was caused by a human user. Following operation 4612, the flow of the method can move to operation 4614.

Operation 4614 includes associating the second region of the text content with a second authorship token having a form indicating that the second region has human authorship rather than artificial authorship. This can be responsive to determining that the second manual edit was caused by a human user. Following operation 4614, the flow of the method can move to operation 4616.

Operation 4616 includes, after modifying the second region as a result of the second manual edit, further modifying the second region as a result of an artificial edit to the second region of text content. Following operation 4616, the flow of the method 4600 can move to operation 4618.

Operation 4618 includes determining that the artificial edit is from an artificial source. Following operation 4618, the flow of the method 4600 can move to operation 4620.

Operation 4620 includes associating the second region with a third authorship token. The third authorship token can have either (1) a form indicating that the second region has artificial authorship rather than human authorship or (2) a form indicating that the second region has mixed human authorship and artificial authorship. This operation 4620 can include replacing the second authorship token with the third authorship token or modifying the second authorship token to be the third authorship token.

The performance of operation 4620 can be responsive to the determining in operation 4618. Following operation 4620, the flow of the method 4600 can move to operation 4622.

Operation 4622 includes inserting import content into a third region of the text content. The import content can be from outside of the text editor and inserted into the third region as a result of a paste operation, a drag-and-drop operation, or selection of an import operation from a menu of the content editor. Following operation 4622, the flow of the method 4600 moves to operation 4624.

Operation 4624 includes associating the third region with a fourth authorship token that indicates the third region is associated with external content. Following operation 4624, the flow of the method 4600 can move to operation 4626.

Operation 4626 generating a report showing authorship statistics for the text content based at least on the first, second, and third authorship tokens. The report can include an indication of a percentage of the text content that has human authorship. The report can include an indication of percentage of the text content that has artificial authorship. The report can include an identification of an artificial author that was used to edit the content.

In some examples, the method 4600 can further include providing an indication of change in authorship of the text content over time. The method 4600 can further include highlighting a respective author's contribution. The method 4600 can further include distinguishing authorship based on edits having been produced by a text editor feature having a first level of sophistication from text content produced by a text editor feature having a second level of sophistication higher than the first level of sophistication. The method 4600 can further include providing an indication of a number of words in a region that have human authorship based on an authorship token associated with a region. The method 4600 can further include sending a communication to a server remote from the device that is configured to log authorship of contributions to the text content. The communication can be regarding one or both of an edit to the text content or at least one of the authorship tokens. One or more of the authorship tokens can be or data describing authorship of an associated region and is stored in a location or format that is not readily directly editable by the user of the text editor. The method 4600 can include determining a level of sophistication of a content editor feature that was used to produce the first edit is less than a predetermined threshold. The determining that the first manual edit was caused by a human user can be further based at least in part on the level of sophistication being less than the predetermined threshold.

Additional Example 2

Figure 47:
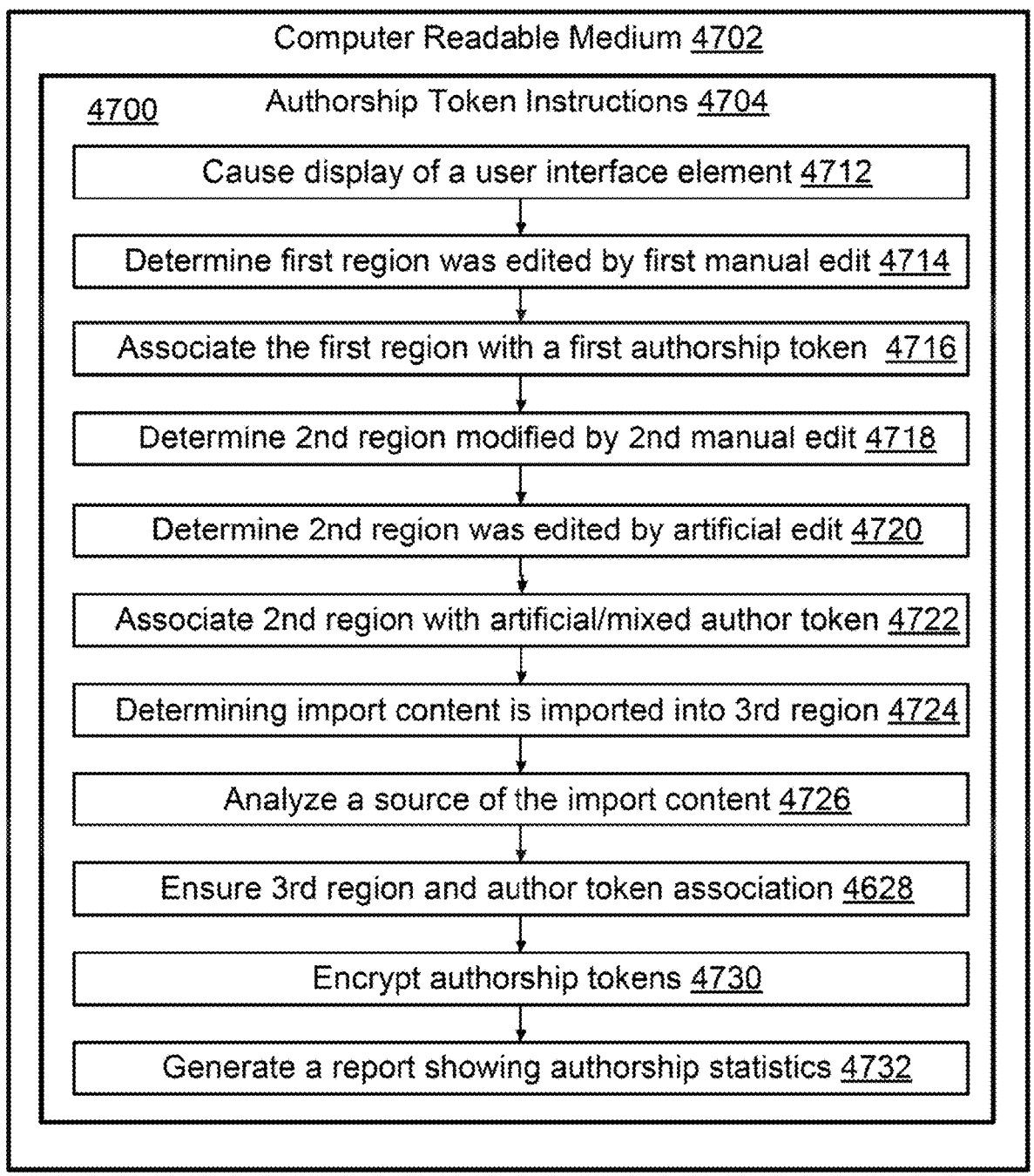
FIG. 47 illustrates an example computer-readable medium having authorship token instructions for a plugin to a text editor or for an extension to a web browser, the instructions, when executed, cause a set of one or more processors to perform a method.

FIG. 47 illustrates an example computer-readable medium 4702 having authorship token instructions 4704 for a plugin to a text editor or for an extension to a web browser, the instructions, when executed, cause a set of one or more processors to perform a method 4700. The method can begin with operation 4710.

Operation 4712 includes to cause display of a user interface element actuatable to cause activation of authorship tracking for the text editor. This can be done via the plugin to the text editor or the browser extension. Following operation 4712, one or more of the below operations can be performed. One or more of them can be performed responsive to the authorship tracking being activated, be performed with the plugin or the browser extension, be performed automatically, be performed during an edit session where text content is being edited within the text editor (e.g., edited by at least one human source and at least one artificial source), or combinations of one or more thereof. The flow of the method 4700 can move to operation 4714.

Operation 4714 includes to determine that a first manual edit to a first region of the text content within the text editor was made by a human user of the text editor. The manual edit to the first region of the text content can include one or more changes, insertions, or deletions resulting from human input received via the at least one human interface device. Following operation 4714, the flow of the method can move to operation 4716.

Operation 4716 includes ensuring the first region of the text content is associated with a first authorship token having a form indicating that the first region has human authorship rather than artificial authorship. This operation 4716 can be responsive to the determining that the manual edit was made by a human user. Following operation 4716, the flow of the method 4700 can move to operation 4718.

Operation 4718 includes to determine that a second manual edit to a second region of the text content within the text editor was made by a human user of the text editor. The second manual edit to the second region of the text content can include one or more changes, insertions, or deletions resulting from human input received via the at least one human interface device. Following operation 4718, the flow of the method 4700 can move to operation 4720.

Operation 4720 can include to determine that an artificial source made an artificial edit to the second region of the text content within the text editor. This operation 4720 can be performed after the human user manually edited the second region of the text content. Following operation 4720, the flow of the method 4700 can move to operation 4722.

Operation 4722 includes to ensure the second region is associated with a second authorship token having a form indicating that the region has artificial authorship or mixed human authorship and artificial authorship. This operation 4722 can be responsive to the determining that the artificial source made the artificial edit. Following operation 4722, the flow of the method 4700 can move to operation 4724.

Operation 4724 includes to determine that import content is imported into a third region of the content from outside of the text editor. To determine that content is being imported can include to detect a paste operation, detect that content was dragged into the content editor, or detect that an import operation was selected from a menu of the content editor. Following operation 4724, the flow of the method can move to operation 4726.

Operation 4726 includes to analyze a source of the import content. Following operation 4726, the flow of the method can move to operation 4728.

Operation 4728 includes to ensure the third region is associated with a third authorship token, the third authorship token indicating the associated region as being associated with external content and being based on the analyzed source of the import content. Following operation 4728, the flow of the method 4700 can move to operation 4730.

Operation 4730 includes to encrypt the first, second, and third authorship tokens and storing the authorship tokens local to the device. Following operation 4730, the flow of the method 4700 can move to operation 4732.

Operation 4732 includes to generate a report showing authorship statistics for the text content based at least on the first, second, and third authorship tokens.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims. Further, those skilled in the art will recognize that various aspects of the various examples herein can be combined or mixed-and-matched. While various factors are described as weighing in favor of or against certain findings (e.g., of authorship), a person of skill in the art will recognize that the various factors and weightings described herein can be applied in any of a variety of ways (and with any of a variety of different weightings themselves) to achieve a desired outcome.

What is claimed is:

1. A method comprising:
   while maintaining a data pipeline between a platform of a first party and a camera of a mobile device of a second party such that the data pipeline resists modification of video content from the camera by any editor other than one selected from the group consisting of: the operating system of the mobile device, an application of the first party, and the platform:
   with the application of the first party operating on the mobile device of the second party:
   obtaining video content from the camera;
   editing the video content at the direction of the second party; and
   applying an authorship token to the video content obtained from the camera and edited using the application, the authorship token having a predetermined form indicating that the video content has non-artificial authorship rather than artificial authorship;
   with a first party platform of the first party:
   receiving, from the application of the first party, the video content and the applied authorship token;
   publicly hosting, with the first party platform, the video content of the second party;
   receiving, at the first party platform, a request on behalf of a third party alleging that the video content includes an unauthorized digital replica of the third party; and
   adjudicating the request from the third party regarding the video content using the authorship token.

2. The method of claim 1, wherein adjudicating the request include determining to deny the request responsive to determining that the video content has non-artificial authorship rather than artificial authorship based on the authorship token.

3. The method of claim 1,
   remediating the video content based on the request and the adjudicating the request from the third party regarding the video content using the authorship tokens;
   wherein remediating the video content based on the request includes replacing an original region of the video content with a replacement region of artificial content produced by an artificial intelligence; and
   applying an artificial authorship token to the replacement region indicating that an artificial intelligence rather than a human is the author of the replacement region.

4. The method of claim 1, further comprising:
   automatically determining to continue to publicly host the video content of the second party until adjudication is complete responsive to: (1) the video content lacking authorship tokens indicating that the video content has artificial authorship and (2) the request from the third party alleging that the video content includes an unauthorized digital replica of the third party.

5. The method of claim 1, further comprising:
   enrolling the video content into a content fingerprinting service of the first party platform responsive to the video content having the one or more authorship tokens indicating that the video content has non-artificial authorship.

6. The method of claim 1, further comprising:
   storing the authorship token in a block in a blockchain in association with the video content.

7. The method of claim 1,
   with the application of the first party operating on the mobile device of the second party:
   obtaining additional content from outside of the data pipeline; and
   applying an unknown authorship token to a portion of the video content associated with the additional content, wherein the unknown authorship token has a predetermined form indicating that the provenance of the additional content is unknown.

8. The method of claim 1, further comprising:
   contemporaneous with obtaining the video content from the camera, obtaining, with the application, additional data from one or more additional sensors; and
   verifying non-artificial provenance of the video content using the additional data.

9. A system of a first party platform for publicly hosting video content, the system comprising:
   a set of one or more processors; and
   a set of one or more computer readable media having instructions thereon that, when executed by one or more processors of the set of one or more processors cause the one or more processors to:

receive video content from one or more second parties;
determine whether to enroll portions of the video content into a content fingerprinting service of the first party platform based on whether the video content includes one or more authorship tokens demonstrating that the portions of the video content have non-artificial authorship;
resist enrolling at least a portion of the video content into the content fingerprinting service of the first party platform responsive to the video content having one or more authorship tokens indicating that the video content has artificial authorship rather than human authorship;
enroll at least a portion of the video content into the content fingerprinting service of the first party platform responsive to the video content having one or more authorship tokens indicating that the video content has human authorship rather than artificial authorship;
publicly host the video content;
receive a request from a third party regarding subject video content;
adjudicate whether to remediate the subject video content based on the request from the third party, wherein to adjudicate the request includes to:
responsive to the request alleging that the subject video content includes an unauthorized digital replica of the third party, determine whether to remediate the subject video content based on one or more authorship tokens associated with the subject video content indicating that the subject video content has artificial authorship or non-artificial authorship; and
remediate the subject video content based on the request, wherein to remediate the subject video content based on the request includes to:
responsive to adjudicating to remediate the subject video content based on the request that the subject video content includes an unauthorized digital replica of the third party, replace a region of the video content with a replacement region of artificial video content produced by an artificial intelligence; and
responsive to the request alleging that the subject video content includes copyright infringing content, generating replacement content with a generative artificial intelligence, replacing the copyright infringing content with the replacement content, and continuing to host the subject video.

10. The system of claim 9, wherein the instructions further cause one or more processors of the set of one or more processors to:
apply an authorship token to the replacement region indicating that an artificial intelligence rather than a human is the author of the replacement region.

11. The system of claim 9, wherein the instructions further cause one or more processors of the set of one or more processors to:
cease publicly hosting the video content of the second party until the adjudication is complete responsive to the video content having the authorship token indicating that the video content has artificial authorship and based on the request being regarding deepfake video content.

12. The system of claim 9, wherein the instructions further cause one or more processors of the set of one or more processors to:
resisting enrolling a first portion of video content into the content fingerprinting service responsive to the first portion of the video content having an authorship token indicating that the first portion has artificial authorship; and
enrolling a second portion of the video content into the content fingerprinting service responsive to the second portion of the video content having an authorship token indicating that the second portion has human authorship.

13. The system of claim 9, wherein the system further comprises:
a mobile device of a second party having a camera, mobile device processors, and mobile device memory having mobile device instructions,
wherein the mobile device instructions include instructions for an application of the first party that, when executed by the mobile device processors cause the mobile device processors to:
maintain a data pipeline from the camera of the mobile device to the platform of the first party such that the data pipeline resists editing of video content from the camera by any editor other than the operating system of the mobile device, the application of the first party, and the platform.

14. A method comprising:
with an application of a first party operating on a mobile device of a second party having a camera:
obtaining video content from the camera of the mobile device;
modifying a first region of the video content as a result of a first manual edit to the first region of the video content caused by a human user of the application, wherein the manual edit to the first region of the video content includes one or more changes, insertions, or deletions to the video content;
determining that the first manual edit was caused by a human user based on either or both of: (1) the first manual edit resulting from human input received via the at least one human interface device or (2) the manual edit being provided in a fashion similar to how a human would provide the input;
responsive to the determining that the first manual edit was caused by a human user, associating the first region of the video content with a first authorship token having a form indicating that the first region has human authorship rather than artificial authorship;
modifying a second region of the video content as a result of an artificial edit to the second region of the video content, wherein the artificial edit to the second region of the video content includes one or more changes, insertions, or deletions to the video content;
determining that the artificial edit is from an artificial source;
responsive to the determining that the artificial edit is from an artificial source, associating the second region with a second authorship token having either (1) a form indicating that the second region has artificial authorship rather than human authorship or (2) a form indicating that the second region has mixed human authorship and artificial authorship;
inserting import content into a third region of the video content, the import content being from outside of the application and inserted into the third region; and associating the third region with a third authorship token that indicates the third region is associated with external content; and with a first party platform of the first party:
receiving, from the application of the first party, the video content and the first, second, and third authorship tokens; and publicly hosting, with the first party platform, the video content of the second party;

receiving, at the first party platform, a request from a third party regarding the video content of the second party; and adjudicating the request from the third party regarding the video content using the first, second, and third authorship tokens.

15. The method of claim 14, further comprising:
enrolling the first region of video content into a content fingerprinting service of the first party platform responsive to determining that the first region is associated with the first authorship token indicating that the first region has human rather than artificial authorship; and
resisting enrolling the second region of the video content into the content fingerprinting service of the first party platform responsive to determining that the second region is associated with the second authorship token indicating that the second region has artificial rather than human authorship.

16. The method of claim 14, further comprising:
with the first party platform of the first party:
determining that the request includes an allegation that the video content includes an unauthorized digital replica; and remediating the video content, wherein the remediating includes:
generating replacement content for the second region of the video content; and
replacing the second region of the video content with the replacement content.

17. The method of claim 14, further comprising:
presenting the publicly hosted video content via the application by the first party operating on the mobile device of the second party.

18. The method of claim 14, further comprising:
contemporaneous with obtaining the video content from the camera, obtaining, with the application, additional data from one or more additional sensors; and
using the additional data to verify the provenance of the video content.

19. The method of claim 14, further comprising:
applying at least one of the one or more authorship tokens to the video content obtained from the camera, the one or more authorship tokens having a predetermined form indicating that the video content from the camera has non-artificial authorship.

20. The method of claim 14, further comprising:
with an application of the first party operating on a mobile device of the second party having a camera, maintaining a data pipeline from a camera of the mobile device to the platform of the first such that the pipeline resists editing by any editor other than the operating system of the mobile device, the application of the first party, and the platform.

* * * * *